United States Patent
Montesanti et al.

(10) Patent No.: US 7,574,947 B2
(45) Date of Patent: *Aug. 18, 2009

(54) ROTARY FAST TOOL SERVO SYSTEM AND METHODS

(75) Inventors: Richard C. Montesanti, Cambridge, MA (US); David L. Trumper, Plaistow, NH (US); James L. Kirtley, Jr., Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 801 days.

This patent is subject to a terminal disclaimer.

(21) Appl. No.: 10/940,427

(22) Filed: Sep. 14, 2004

(65) Prior Publication Data

US 2005/0166726 A1    Aug. 4, 2005

Related U.S. Application Data

(63) Continuation-in-part of application No. 10/448,336, filed on May 29, 2003, now Pat. No. 7,275,468.

(60) Provisional application No. 60/383,956, filed on May 29, 2002.

(51) Int. Cl.
B23B 29/16    (2006.01)
B23B 5/00    (2006.01)

(52) U.S. Cl. .............................. 82/1.11; 82/157; 82/158

(58) Field of Classification Search ................. 318/135; 82/157, 1.11, 158, 162, 170; 407/48, 40, 407/53, 103, 33, 34, 64, 102; 384/45
See application file for complete search history.

(56) References Cited

U.S. PATENT DOCUMENTS 2,323,324 A    7/1943    Clifford (Continued)

FOREIGN PATENT DOCUMENTS

DE    41 13 667    4/1991

(Continued)

OTHER PUBLICATIONS

International Search Report Dated Feb. 10, 2005.

(Continued)

*Primary Examiner*—Willmon Fridie
(74) *Attorney, Agent, or Firm*—Sheehan Phinney Bass & Green P.A.; Peter A. Nieves

(57) ABSTRACT

A high bandwidth rotary fast tool servo provides tool motion in a direction nominally parallel to the surface-normal of a workpiece at the point of contact between the cutting tool and workpiece. Three or more flexure blades having all ends fixed are used to form an axis of rotation for a swing arm that carries a cutting tool at a set radius from the axis of rotation. An actuator rotates a swing arm assembly such that a cutting tool is moved in and away from the lathe-mounted, rotating workpiece in a rapid and controlled manner in order to machine the workpiece. One or more position sensors provides rotation and position information for a swing arm to a control system. A control system commands and coordinates motion of the fast tool servo with the motion of a spindle, rotating table, cross-feed slide, and in-feed slide of a precision lathe.

37 Claims, 88 Drawing Sheets

U.S. PATENT DOCUMENTS

| | | | | |
|---|---|---|---|---|
| 2,746,332 | A * | 5/1956 | Smith | 82/157 |
| 4,373,404 | A | 2/1983 | Heinz | 74/424.8 B |
| 4,428,704 | A | 1/1984 | Kolokhe | 408/156 |
| 4,528,533 | A | 7/1985 | Montagu | 335/230 |
| 4,590,828 | A | 5/1986 | Sullivan | 82/24 R |
| 4,634,191 | A | 1/1987 | Studer | 310/90.5 |
| 4,797,039 | A | 1/1989 | Bosek | 407/87 |
| 4,813,829 | A | 3/1989 | Koppelmann | 409/136 |
| 4,878,787 | A | 11/1989 | Hunt | 408/181 |
| 4,986,151 | A | 1/1991 | Horn | |
| 4,987,526 | A | 1/1991 | Slocum et al. | 364/167.01 |
| 5,196,745 | A | 3/1993 | Trumper | 310/12 |
| 5,294,854 | A | 3/1994 | Trumper | 310/90.5 |
| 5,417,130 | A | 5/1995 | Dorsch | 82/1.11 |
| 5,467,675 | A | 11/1995 | Dow et al. | 82/1.11 |
| 5,625,267 | A | 4/1997 | Gregory | 318/625 |
| 5,631,618 | A | 5/1997 | Trumper et al. | 335/299 |
| 5,647,321 | A | 7/1997 | Ichikawa et al. | 123/399 |
| 5,699,621 | A | 12/1997 | Trumper et al. | 33/1 M |
| 5,718,154 | A | 2/1998 | Council, Jr. | 82/1.11 |
| 5,719,543 | A | 2/1998 | Berling | 335/229 |
| 5,809,855 | A * | 9/1998 | Francia | 82/157 |
| 5,823,720 | A | 10/1998 | Moore | 408/204 |
| 5,825,112 | A | 10/1998 | Lipo et al. | 310/181 |
| 6,062,778 | A | 5/2000 | Szuba et al. | 408/156 |
| 6,092,447 | A * | 7/2000 | Schlitters | 82/157 |
| 6,170,367 | B1 | 1/2001 | Keller et al. | 82/1.11 |
| 6,237,452 | B1 | 5/2001 | Ludwick et al. | 82/12 |
| 6,323,483 | B1 | 11/2001 | Cleveland et al. | 250/306 |
| 6,356,391 | B1 | 3/2002 | Gardiner et al. | 359/628 |
| 6,457,379 | B1 | 10/2002 | Mirone | 74/552 |
| 6,523,443 | B1 | 2/2003 | Hof et al. | 82/1.4 |
| 7,089,835 | B2 | 8/2006 | Byran | |
| 7,275,468 | B2 * | 10/2007 | Montesanti et al. | 82/157 |
| 2002/0036748 | A1 | 3/2002 | Chapoy et al. | 351/160 R |
| 2002/0057497 | A1 | 5/2002 | Gardiner et al. | 359/625 |
| 2002/0057564 | A1 | 5/2002 | Campbell et al. | 362/31 |

FOREIGN PATENT DOCUMENTS

| | | |
|---|---|---|
| EP | 0 354 639 | 2/1990 |
| EP | 0 439 425 B1 | 4/1993 |
| EP | 0 786 309 | 7/1997 |
| EP | 0 786 309 B1 | 7/1997 |
| JP | 11-309646 | 4/1998 |
| SU | 914188 | 5/1980 |
| SU | 984794 | 7/1980 |
| WO | 03/101666 | 12/2003 |

OTHER PUBLICATIONS

Rivin, E.I., "Properties and Prospective Applications of Ultra Thin Layered Rubber-Metal Laminates for Limited Travel Bearings," *Tribology Int*. 1983, vol. 18, No. 1.

Davidson, P., et al., "A New Symmetric Scanning Tunneling Microscope Design," J. Vac. Sci, Technol. A 6(2), Mar./Apr. 1988 p. 380-382.

Goto, T., et al., "Development of a Rotary Fast Tool Servo for Ultraprecision Grinding of Silicon Wafer," Proc. Of $2^{nd}$ euspen International Conference, Turin, Italy, May 27-31, 2001, p. 790-793.

Gutierrez, H., et al., "Fabrication of Non-Rotationally symmetric Surfaces Using a Magnetically Levitated Fast-Tool Servo," http://airy.pec.ncsu.edu/PEC/publications/annual_reports/acutation/1997/97gutierrez.html, Abstract only, Oct. 21, 2002.

Hameyer, K. & Nienhaus M., "Electromagnetic Actuators—Current Developments and Examples," Paper Presented at the $8^{th}$ International Conference on New Actuators—Actuator 2002, Bremen, Germany (Jun. 2002).

Kaji, S., et al., "Ultraprecision Grinding of Large Silicon Wafer Using a Rotary Fast Tool Servo," Proc. Of $2^{nd}$ euspen International Conference, Turin, Italy, May 27-31, 2001 p. 802-805.

Ludwick, S., "Design of a Rotary Fast Tool Servo for Ophthalmic Lens Production," http://www.me.gatech.edu/me/events/seminars/Ludwick.html, Abstract only, Oct. 21, 2002.

Ludwick, S. J. et al., "Calibration and Control of a Rotary Fast Tool Servo," Proceedings of ASPE Fourteenth Annual Conference, Oct. 1999.

McKinney, M., "The Many Facets of Diamond Turning," Laser Focus World, Oct. 2001.

"Machining a Biconic Mirror," http://airy.pec.ncsu.edu/PEC/research/projects/biconic/index.html, Abstract only, Oct. 21, 2002.

Popham, V.W., et al., "Variable Gap-Reluctance Linear Motor With Application to Linear Resonance Compressors," ASME, New York, Nov. 11-16, 2001.

"Rotary Fast-Tool Servo for Diamond Turning of Asymmetric Optics," http://web.mit.edu/pmc/www/Newprojects/FastTool/fast-tool.html, Oct. 21, 2002.

\* cited by examiner

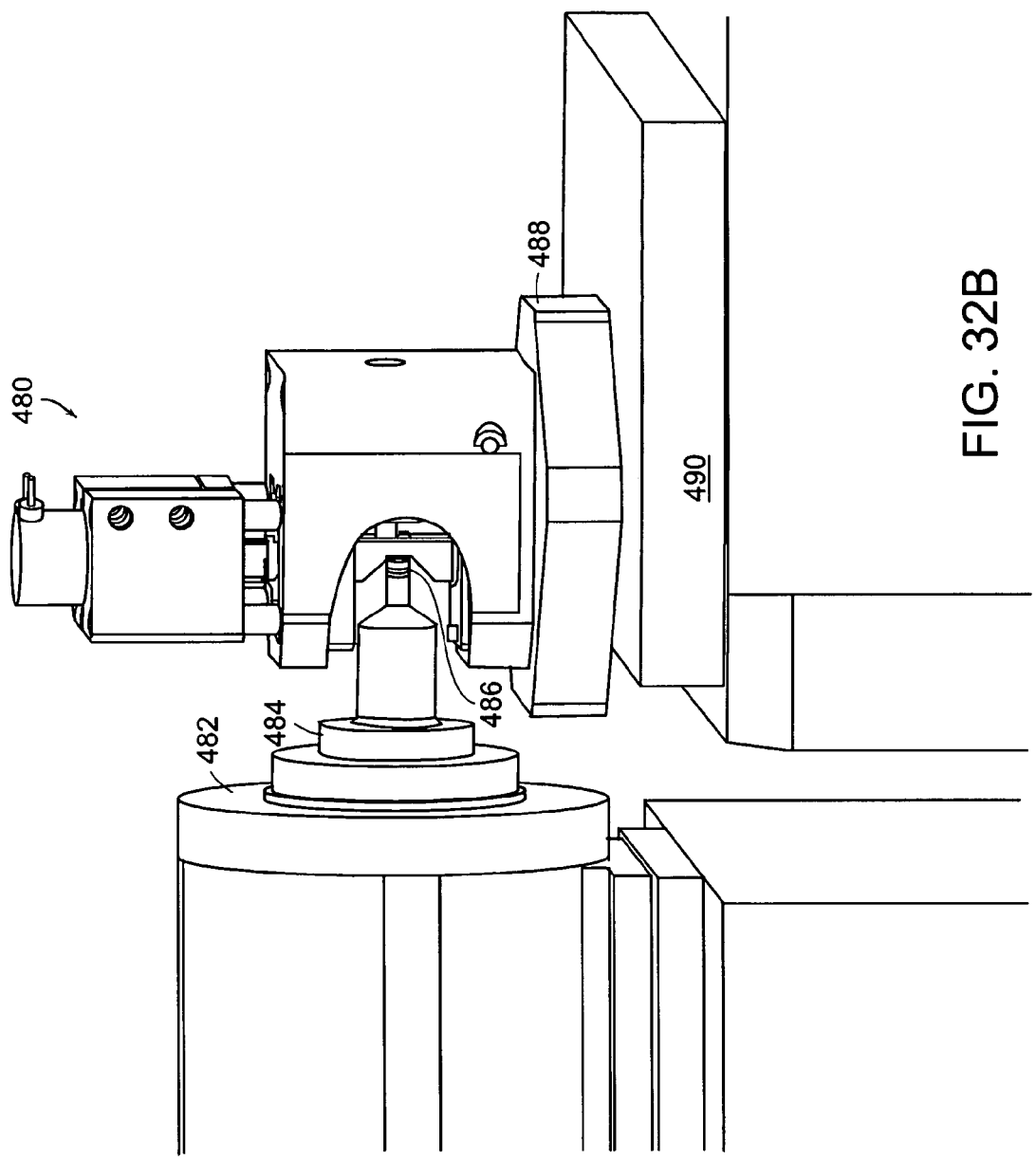

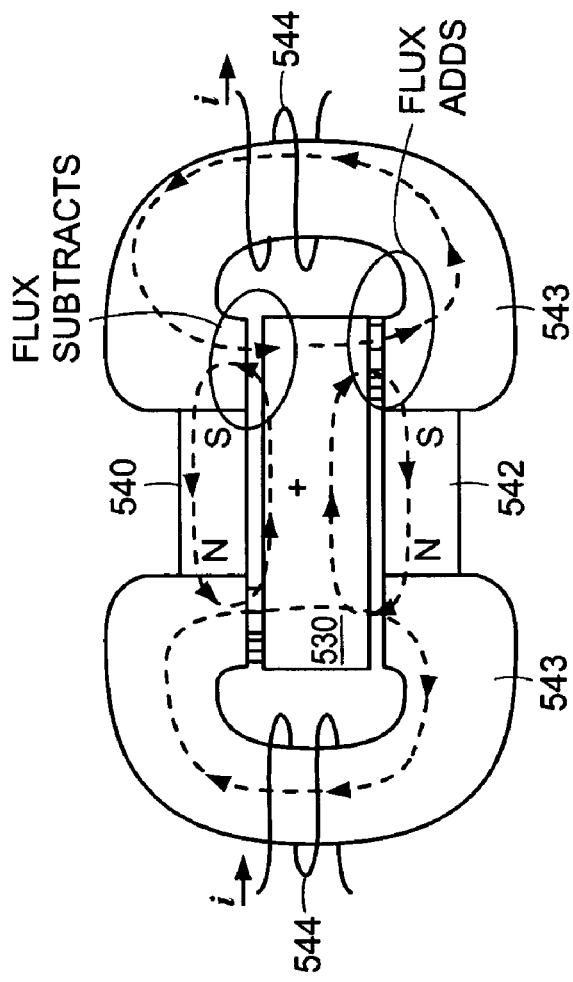
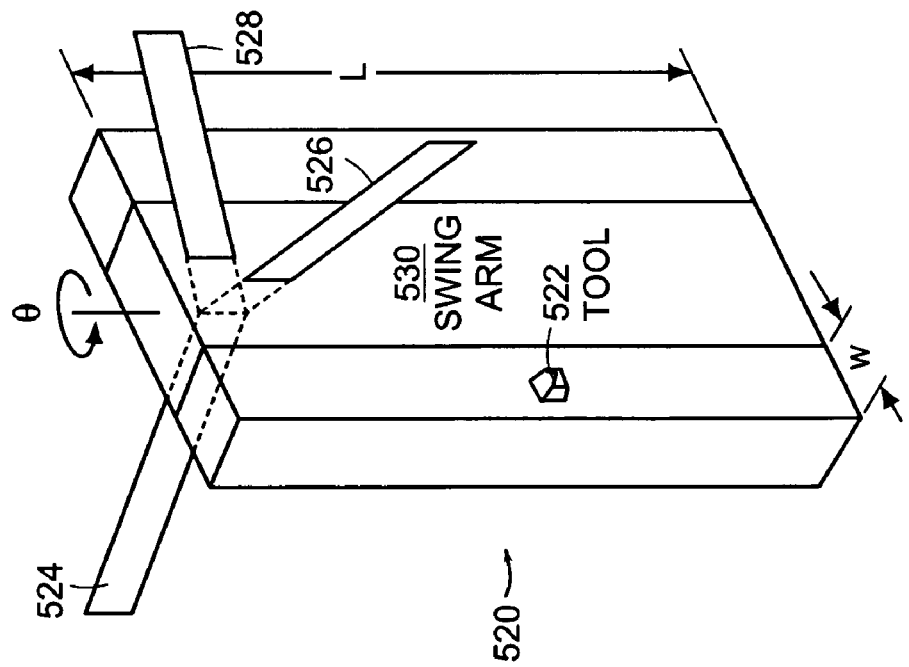
FIG. 33B
FIG. 33A

SHELLED X-ROTOR

ADAPTING X-ROTOR TO 2-AXIS ROTATION
(E.G., FOR A 2-AXIS LIGHT STEERING MIRROR)

CERAMIC STIFFENERS ARE EPOXY BONDED TO THE LAMINATED IRON ROTOR CORE AND TO THE ALUMINUM FLEXURE HUBS

STATOR HOUSING ALSO SUPPORTS OUTER ENDS OF FLEXURES

STATOR CORE IS MOUNTED WITH ADHESIVE AND A CLAMP

SHIMS PROVIDE ABILITY FOR ADJUSTMENT DURING ASSEMBLY

TOOL POSITION MEASURED WITH A CAPACITANCE SENSOR

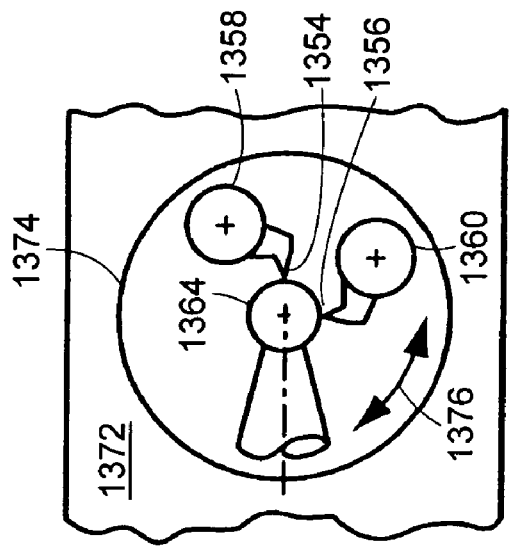
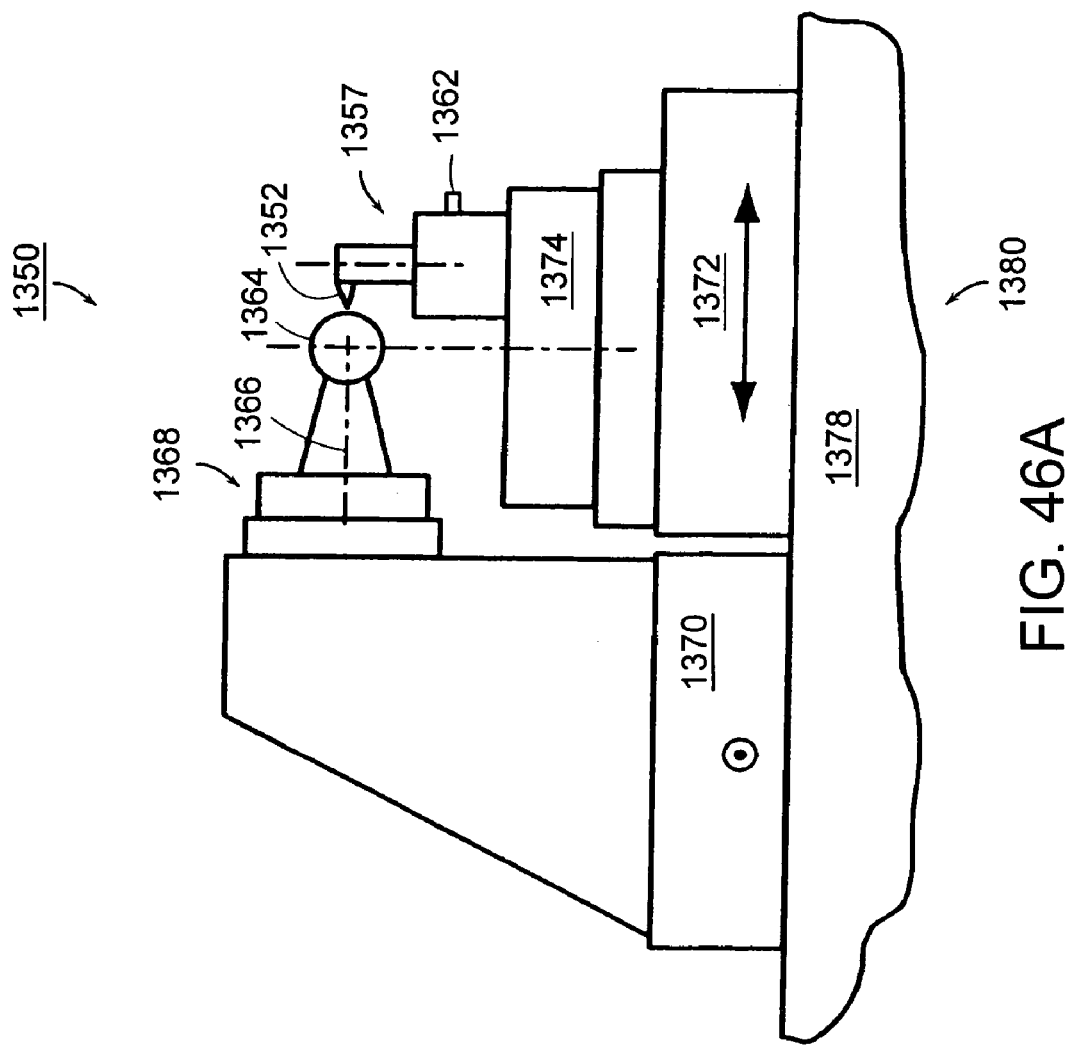
FIG. 46B
FIG. 46A

ROTARY FAST TOOL SERVO SYSTEM AND METHODS

CROSS REFERENCES TO RELATED APPLICATIONS

The present application is a continuation-in-part of U.S. patent application Ser. No. 10/448,336, filed May 29, 2003 now U.S. Pat. No. 7,275,468, and claims the benefit of U.S. Provisional Application No. 60/383,956, filed on May 29, 2002. The entire contents of the above applications are incorporated herein by reference.

GOVERNMENT SUPPORT

This invention was supported, in whole or in part, by Lawrence Livermore National Laboratory, Subcontract No. B516613, under Grant No. W-7405-ENG-48, awarded by the Department of Energy. The government has certain rights in the invention.

BACKGROUND OF THE INVENTION

A fast tool servo is a well-known device that can be added to a new or existing machine tool to provide an additional axis of motion between the cutting tool and a workpiece. A fast tool servo most notably distinguishes itself by its ability to move the tool at a much higher bandwidth, that is at a high speed of controlled, repetitive motion, on its axis relative to the other machine tool axes, with accuracy equal to or better than that of the other tool axes. Fast tool servos fall into two broad categories: rotary and linear. A rotary fast tool servo produces relative motion between the cutting tool and a workpiece by rotation of a swing arm that carries the tool at a fixed radius from the axis of rotation. A linear fast tool servo produces relative motion between the cutting tool and a workpiece by producing a linear translation of the tool.

A rotary fast tool servo is preferred in certain precision machining applications that are intolerant to the reaction force developed by a linear fast tool servo. For instance, in an application where it is desired to produce a textured surface on a spherical-shaped workpiece a fast tool servo is mounted on a rotary table that allows the tool to engage the workpiece, which is mounted to a spindle, at all points from its "pole" to its "equator". A rotary-type mechanism oriented with its rotation axis parallel to the rotation axis of the rotary table generates a reaction torque on the rotary table, which can be allowed to rotate freely as a reaction mass or be locked and allowed to transmit the torque to the machine structure. In the first case motion of the rotary table is insignificant in most cases. In the later case the machine structure experiences a disturbance torque whose value does not depend on the angle of the rotary table. In contrast, a linear fast tool servo generates a reaction force on the rotary table. This is generally not a problem when the rotary table is positioned so that the reaction force is parallel to the direction of travel of the slide carrying the rotary table. However, when the rotary table is positioned so that a component of the reaction force is perpendicular to the direction of travel of that slide, that force component is transmitted by the slide to the machine structure as a disturbance. To the extent that the tool/workpiece interaction is affected by disturbances to the machine structure, the linear fast tool servo will produce errors in the desired surface texture as a function of "latitude" on a spherical workpiece if the reaction force is not dealt with.

Current fast tool servo technology does not support sufficient bandwidth to meet certain manufacturing goals and is also not sufficiently fast to machine certain types of materials, for example, some plastics, properly. It is desirable to have a method and apparatus for a rotary fast tool servo having a higher bandwidth than currently available systems.

SUMMARY OF THE INVENTION

The present invention is directed to a rotary fast tool servo system that improves the accuracy and speed to enable and meet manufacturing goals for, for example, fabricating three-dimensional surface features. The embodiments of the present invention provide a high level of bandwidth and precision control to form short spatial wavelength features, for example, 50 micron long features with 5 micron peak to valley dimensions at 10 kHz or more. In a preferred embodiment, the rotary fast tool servo system includes a cutting element mounted to a rotating arm that is driven by an actuator. The arm is mounted to the fast tool servo base by flexures on at least one side of the cutting element. Each flexure preferably includes orthogonally positioned flexure elements that extend from the rotating arm to the base. The rotating arm can be oriented vertically, horizontally, or in any other desired orientation. The flexures serve to guide movement of the tool during cutting. The workpiece can be mounted on the spindle of a precision lathe which can rotate the workpiece during operation.

In a preferred embodiment, the system has an additional actuator to adjust the tool position relative to the workpiece and can employ coarse and fine adjustments. Sensors can be used to measure position, displacement and/or rotation of system elements and provide feedback control signals. Damping elements can be added to adjust the dynamic performance for certain applications.

The embodiments of the present invention relate to a system for a high bandwidth rotary fast tool servo, and in a preferred embodiment provides tool motion in a direction nominally parallel to the surface-normal of a workpiece at the point of contact between the cutting tool and workpiece. In one embodiment, the invention provides ±25 microns of tool motion with ±0.025 micron (±25 nm) of accuracy when operating at a frequency of at least 2000 Hz, while producing negligible reaction forces and torques on the machine tool that the fast tool servo is attached to. The fast tool servo device of the present invention can achieve a bandwidth of at least approximately two to ten times that of current commercially available systems. Consequently, the embodiments of the present invention can increase production rates by at least two to ten times in manufacturing processes that utilize fast tool servos.

A preferred embodiment of the present invention includes a high bandwidth rotary fast tool servo device, having a base, a cutting tool, a rotatable swing arm to hold the cutting tool at a fixed radius from an axis of rotation, and at least three flexures attached to the swing arm and extending radially from the swing arm relative to the base, the flexures being positioned such that rotation of the rotatable arm flexes the flexures. The first, the second and the third flexures have an angular separation from each other and support the rotatable swing arm in the base and establish an axis of rotation for the swing arm.

The device further includes a fourth flexure attached to the swing arm and extending radially from the swing arm relative to the base, the fourth flexure can be co-linear with one of the other flexures. In an alternate preferred embodiment, a pair of flexures can be co-linear and can be formed from a single blade. The device also includes the swing arm being driven by an actuator. A controller is included in the device.

In accordance with another aspect of the invention, a method of machining a part from a workpiece includes the steps of rotating a workpiece on a spindle, providing a cutting tool carried by a swing arm and offset from a rotational axis of the swing arm, supporting the swing arm and establishing a rotation axis for the swing arm with a plurality of flexures wherein both ends of the flexures are substantially fixed, rotating the swing arm for moving the cutting tool into and out of engagement with the workpiece and establishing relative motion between the workpiece and the cutting tool to form the part. In alternate embodiments, either the workpiece or the rotational axis of the swing arm carrying a cutting tool can be stationary while the other moves in a plane relative to the stationary piece. In an embodiment both the workpiece and the cutting tool can travel along at least two axes.

The method of machining includes rotating the workpiece at a speed in excess of 300 revolutions per minute. Further, the workpiece can rotate in a range of between 10 and 10,000 revolutions per minute. The method of machining includes the actuator moving the swing arm at a frequency of at least 1500 cycles per second. The cutting tool can have a full stroke length of 5 microns or a stroke length of ±2.5 microns for a rotation frequency of approximately 2 kHz, for example. A full stroke length of 50 microns or a stroke length of ±25 microns can be achieved in a preferred embodiment.

In accordance with another aspect of the invention, a method of controlling relative motion between a workpiece and a cutting tool of a fast tool servo includes the steps of providing a machine tool with a cross-slide and an in-feed slide, determining with at least one sensor the rotation of a workpiece spindle of the machine and the workpiece carried by the workpiece spindle, determining with at least one sensor the position of the cross-slide of the machine, determining with at least one sensor the position of the in-feed slide of the machine, determining with at least one sensor the position of a cutting edge carried by a swing arm of the fast tool servo relative to the portion of a machine tool that the fast tool servo is attached to, and moving the machine tool with the workpiece and the cutting edge of the fast tool servo relative to each other to form a part. The method further includes the steps of providing a base unit of the machine tool for holding the rotatable spindle, determining the position of the base unit, the base unit movable in at least one of an in-slide or cross-slide directions; and providing the position of the base unit and the rotational position of the workpiece spindle to a precision lathe controller and servo controller. The method can also include the steps of determining with at least one sensor the rotational position of the swing arm, and providing the position of the swing arm to a fast tool servo controller. The method further includes the steps of synthesizing angular velocity of the swing arm from the position sensor, providing additional sensors associated with one of the swing arm and the actuator, and providing information from the additional sensors to the fast tool servo controller to determine the exact position and the rotation of the swing arm.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 32B and 32C are views illustrating a lathe with a workpiece and a rotary tool servo system in accordance with a preferred embodiment of the present invention;

FIGS. 33A and 33B are schematic diagrams of a variable reluctance actuator and swing arm assembly in accordance with a preferred embodiment of the present invention;

FIGS. 46A and 46B are sketches depicting the use of rotary fast tool servo designed according to the principles of this invention with a two-axis lathe and rotary axis to matching a textured surface on a spherical workpiece;

DETAILED DESCRIPTION OF THE INVENTION

Figure 1:
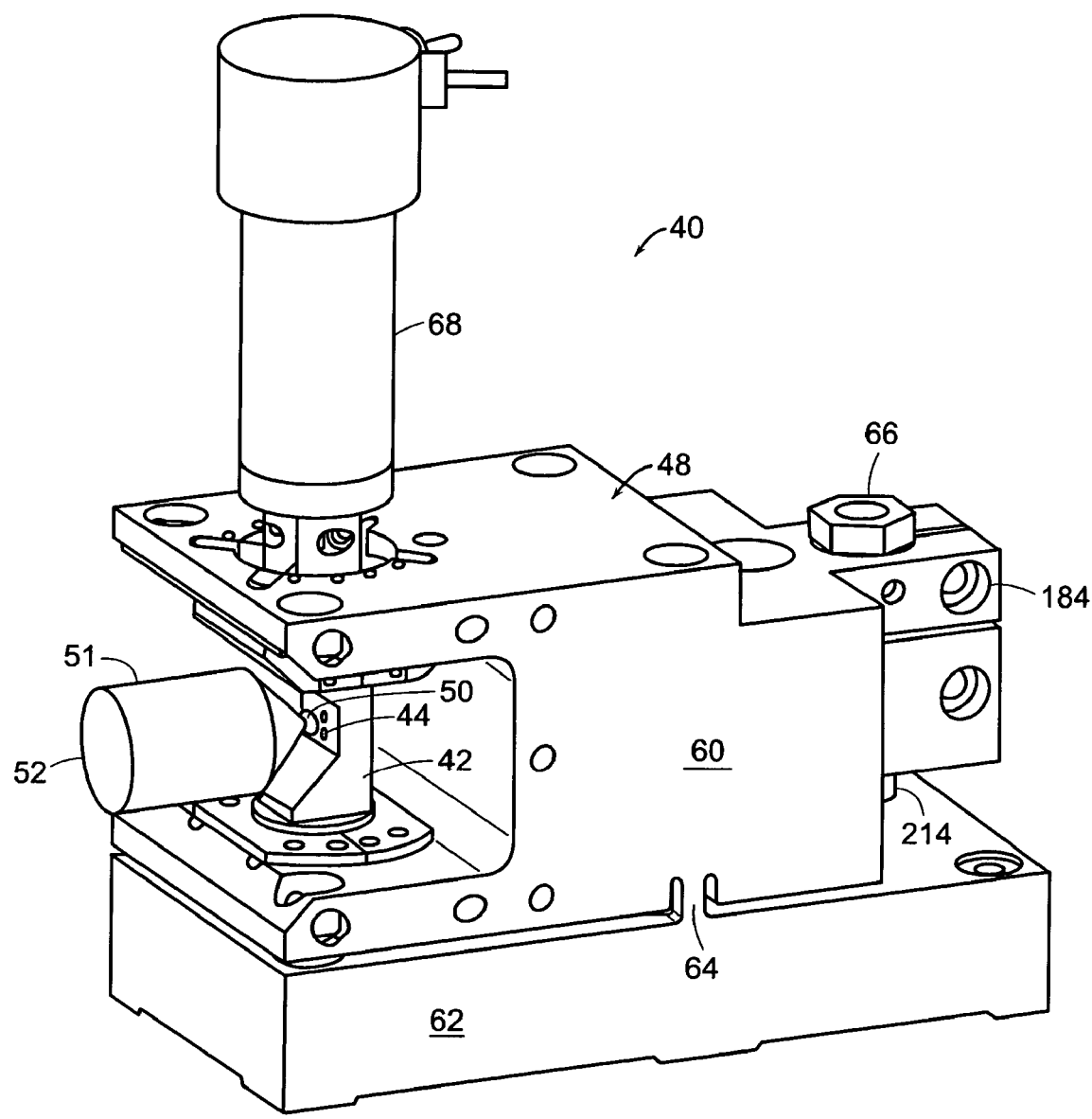
FIG. 1 is an isometric projection of the rotary fast tool servo assembly in accordance with a preferred embodiment of the present invention.

Referring to the drawings in detail, a high bandwidth rotary fast tool servo system is illustrated in accordance with a preferred embodiment of the present invention designated generally as 40. In a preferred embodiment, the high bandwidth rotary fast tool servo provides tool motion in a direction nominally parallel to the surface-normal of a workpiece at the point of contact between the cutting tool and workpiece.

Figure 5:
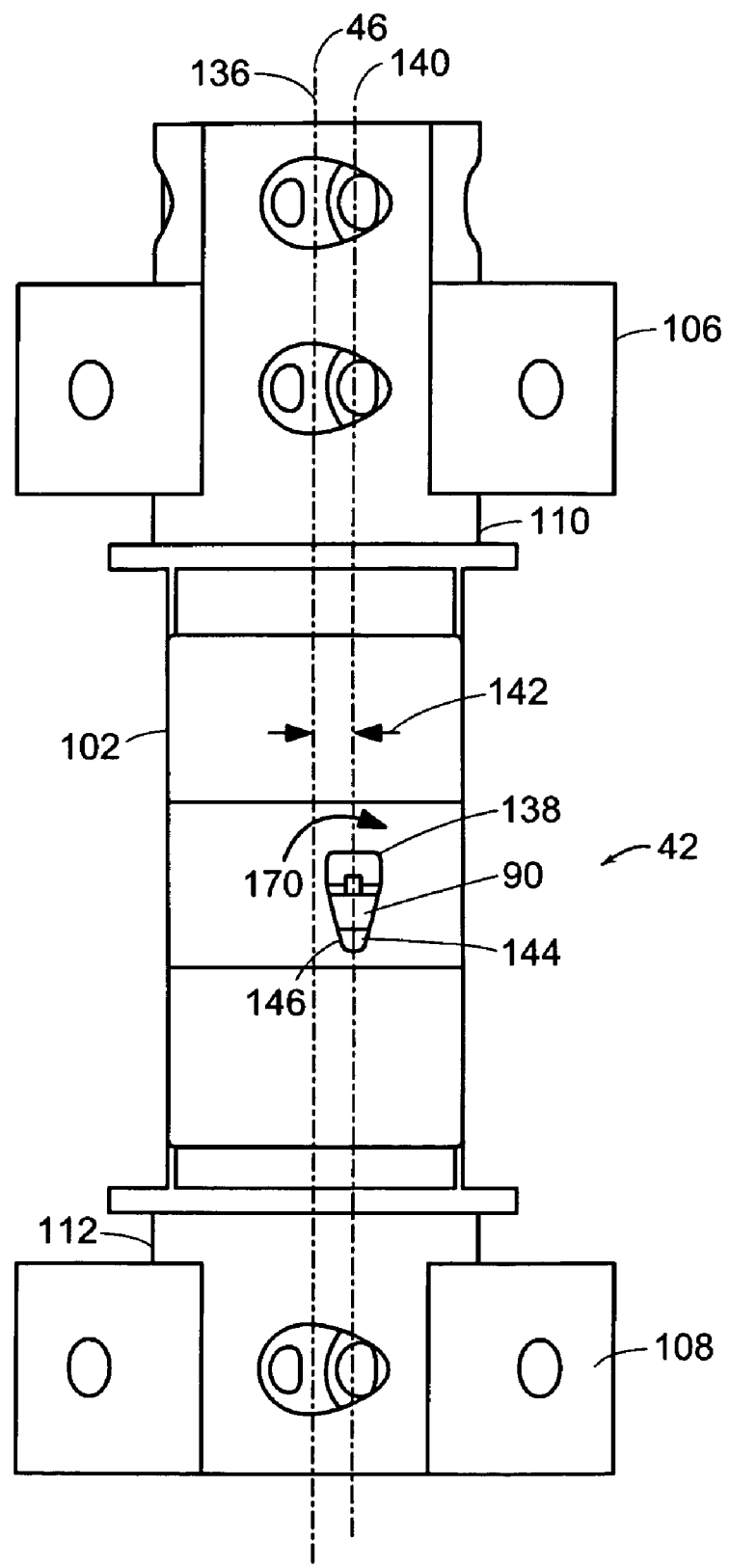
FIG. 5 is a front view sketch of the swing arm assembly of FIG. 4.

FIG. 1 shows the high bandwidth rotary fast tool servo 40 having a swing arm assembly 42 holding a cutting tool 44 to machine a workpiece 50. The cutting tool 44 is offset from the axis of rotation 46, as best seen in FIG. 5, of the swing arm assembly 42. The workpiece 50 is held typically by a workpiece holder 51 that attaches to a lathe spindle at surface 52. The swing arm assembly 42 is supported in a base 48 having an upper portion 60 and a lower portion 62. The upper portion 60 and lower portion 62 are connected by a flexure hinge 64. The upper portion 60 of the base 48 has a differential screw assembly 66. An actuator 68 is connected to the top of the swing arm assembly 42.

In operation, the actuator 68 rotates the swing arm assembly 42 such that the cutting tool 44 is moved into and away from the lathe-mounted, rotating workpiece 50 in a rapid and controlled manner in order to machine the workpiece. In an alternate embodiment the swing arm assembly 42 and the moving member of the actuator 68 are integrated and are one and the same and carry the cutting tool 44. The differential screw assembly 66 together with the flexure hinge 64 provide accurate cutting tool positioning in a direction nominally tangent to the surface-normal of a workpiece at the point of contact between the cutting tool and workpiece and nominally parallel to the axis of rotation of the swing arm assembly by enabling the upper portion 60 of the base 48 to be repositioned in a fine-grained manner with respect to the lower portion 62 of the base 48.

Figure 2A:
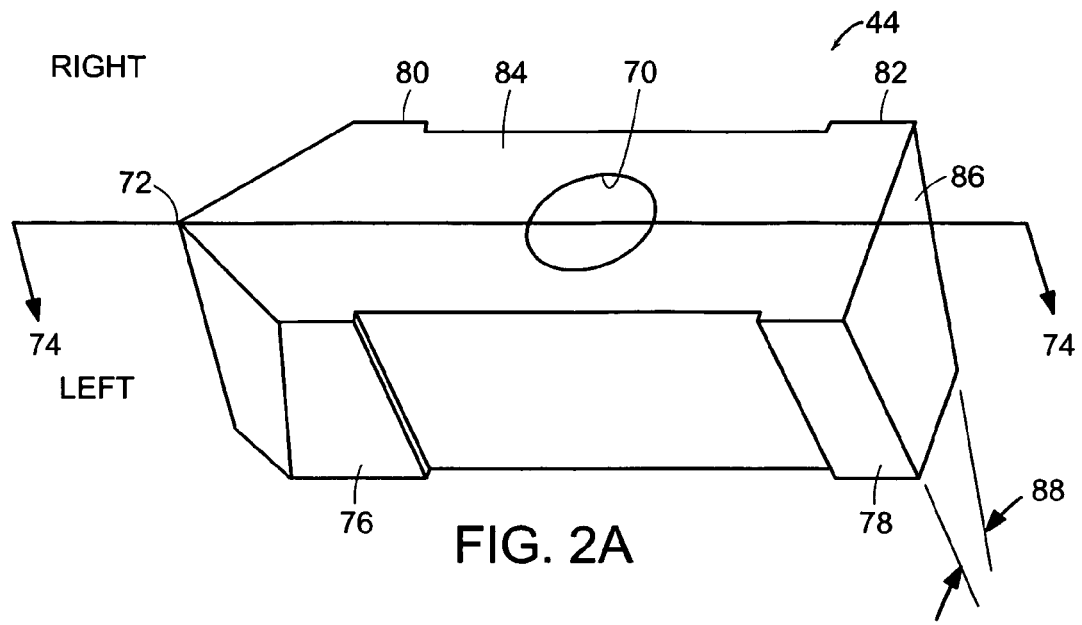
FIG. 2A is an isometric projection of a cutting tool according to principles of the preferred embodiments of the present invention.

FIG. 2A shows a first embodiment of the cutting tool according to principles of the present invention. The cutting tool 44 has a threaded hole 70, a cutting edge 72, a right/left plane of symmetry 74 that divides the tool into right and left halves, a left first mating surface 76 and a left second mating surface 78, a right first mating surface 80 and a right second mating surface 82, a top surface 84, and a back surface 86. The left first and second mating surfaces 76 and 78 and the right first and second mating surfaces 80 and 82 form a taper angle 88 bisected by the right/left plan of symmetry 74. The left first and second mating surfaces 76 and 78 and the right first and second mating surfaces 80 and 82 mate with the swing arm 102 of the swing arm assembly 42 as described hereinafter with respect to FIG. 5. The threaded hole 70 is substantially parallel to and nominally centered on the plane of symmetry 74.

In one preferred embodiment, the cutting edge 72 is a diamond. Alternatives for the cutting edge 72 can be various materials including cubic boron nitride, tungsten carbide, high speed steel, and other materials used for precision machining metals, plastics, ceramics, glasses and foams.

Figure 2B:
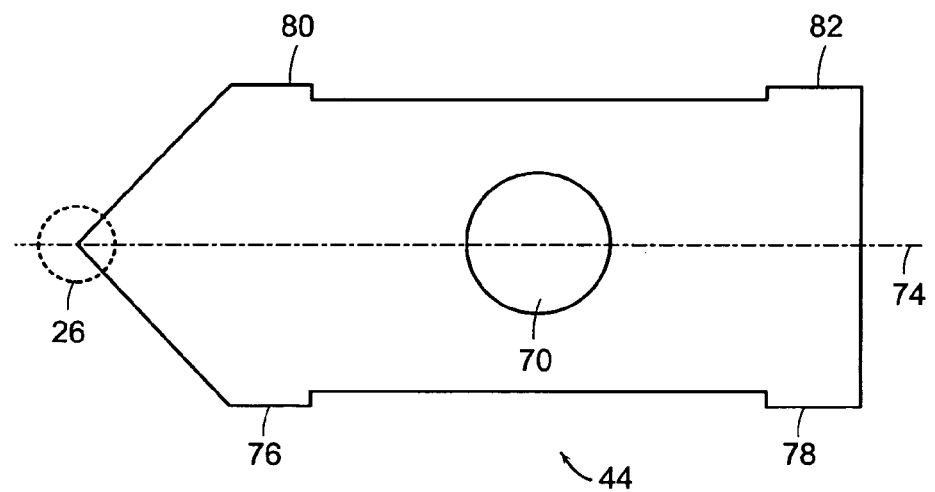
FIG. 2B is a top view of the cutting tool of FIG. 2A in accordance with a preferred embodiment of the present invention.
Figure 2C:
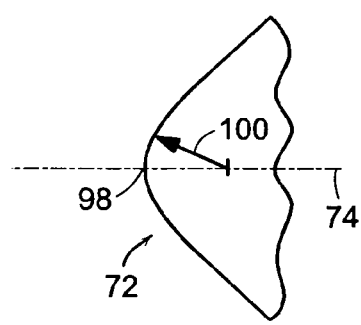
FIG. 2C illustrates an enlargement of the cutting tool cutting edge in accordance with a preferred embodiment of the present invention.

FIG. 2B is a top view of the cutting tool 44 of FIG. 2A in accordance with a preferred embodiment of the present invention. An enlargement of the cutting edge 72 is shown in FIG. 2C. A center point 98 on the cutting edge 72 lies in the plane of symmetry 74 of the cutting tool 44 as best seen in FIG. 2C. The cutting tool edge 72 has a radius of curvature 100 that lies in a plane that is substantially perpendicular to the plane of symmetry 74 of the cutting tool 44 and nominally in the plane of the top surface 84 of the cutting tool. In alternative embodiments the plane containing the radius of curvature can form a substantial angle with the top surface 84 of the cutting tool.

Figure 3:
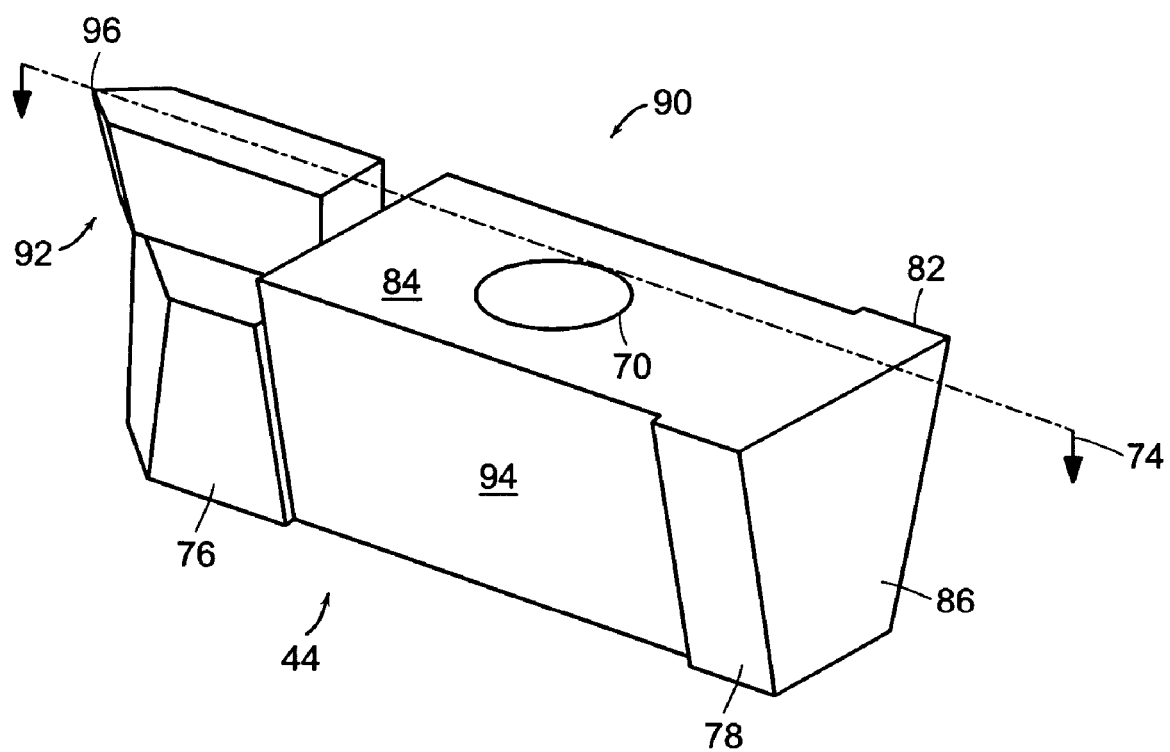
FIG. 3 is an isometric projection of an alternative embodiment of the cutting tool of FIG. 2A.
Figure 4:
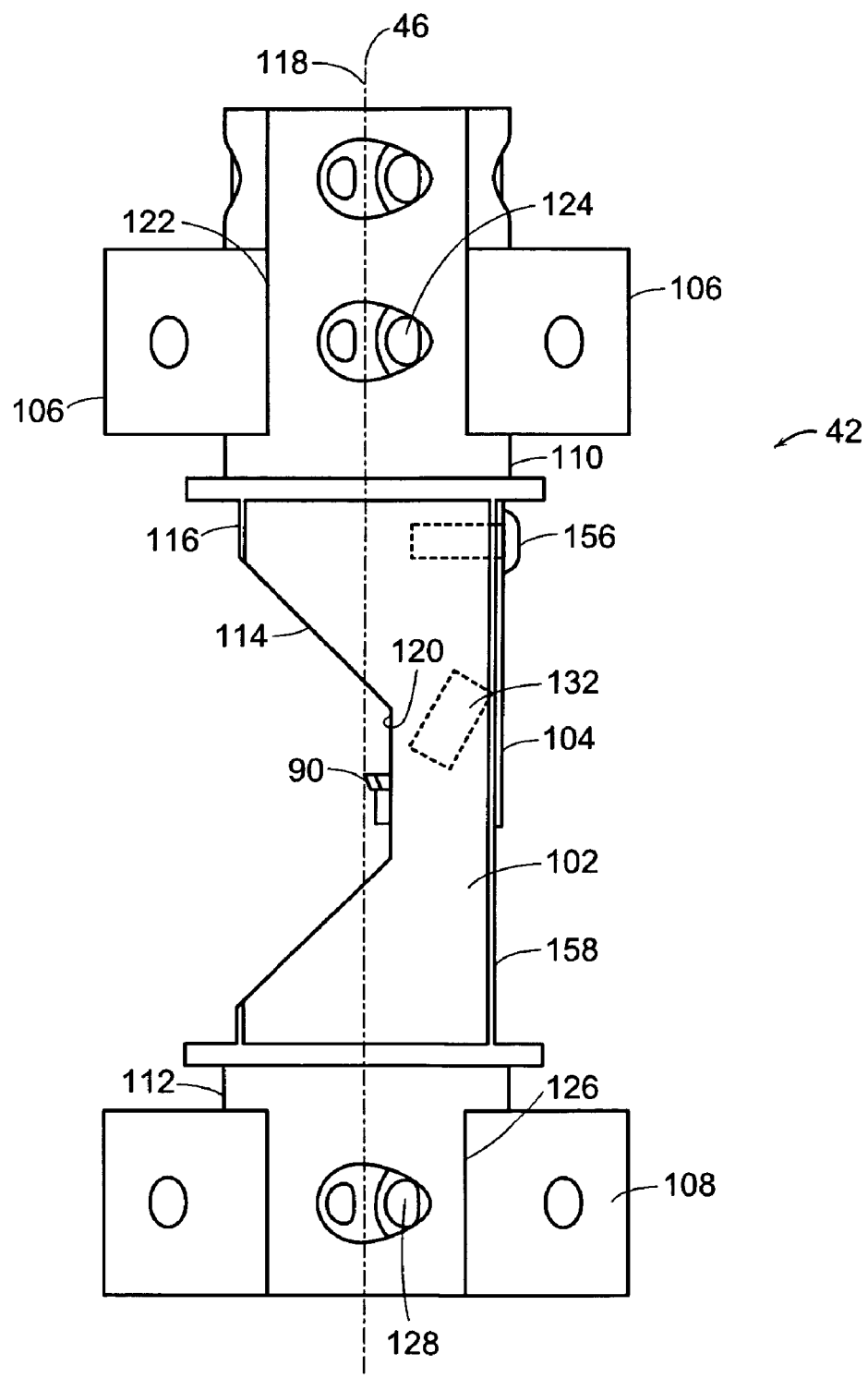
FIG. 4 is a side view sketch of a swing arm assembly of FIG. 1.

FIG. 3 shows an alternative embodiment of the cutting tool of FIG. 2A. The cutting tool 90, instead of being a single piece, has a cutting portion 92 set into a holder 94. The cutting portion 92 has a cutting edge 96. The holder 94 has left and right first and second mating surfaces 76, 78, 80 and 82 to mate with the swing arm assembly 42 as seen in FIG. 4. The holder 94 also has the threaded hole 70 substantially parallel to and nominally centered on the plane of symmetry 74.

In an alternate embodiment of the cutting tool, the cutting portion 92 is bonded directly to the swing arm 102 shown in FIG. 4, without the use of a holder 94. Bonding methods include, but are not limited to, epoxying, braising, soldering and diffusion bonding.

FIG. 4 is a left side view of the swing arm assembly 42 illustrated in FIG. 1. The swing arm assembly 42 has a swing arm 102, a tool clamp flexure 104, an upper pair of flexure blades 106, and a lower pair of flexure blades 108. The flexure blades are referred to herein as flexures and are pliant, extending members. The upper pair of flexures 106 and the lower pair of flexures 108 constrain the swing arm 102 in all degrees of freedom except rotation around an axis of rotation 46 that is nominally coincident with the long axis of the swing arm 102. In other preferred embodiments, the axis of rotation may be offset from but substantially parallel to the long axis of the swing arm. The swing arm 102 has an upper hub 110 and a lower hub 112. The swing arm 102 has a workpiece clearance cut 114 that is nominally midway between the upper hub 110 and the lower hub 112. The clearance cut 114 extends from a front face 116 of the swing arm 102 through the axis of rotation 46 and slightly beyond. A front/back plane 118 extends through the axis of rotation and parallel to the front face 116. The swing arm 102 has a back clearance surface 120 that is parallel to and spaced from the front/back plane 118. The clearance cut 114 allows the cutting tool edge 72 or 96 and a small portion of the cutting tool 44 or 90 to protrude from the back clearance surface 120 of the swing arm 102, and allows a workpiece to extend into the swing arm 102 as much as practicable.

In an alternate embodiment, one set of three flexures are attached to the swing arm and extend radially from the swing arm. The three flexures support the rotatable swing arm in the base and establish an axis of rotation for the swing arm. Those skilled in the art can appreciate that an embodiment of the present invention using two sets of flexures spaced apart on the swing arm so that the cutting tool is between the two sets, provides the swing arm with structural support at two opposite ends. In contrast, a single set of flexures at only one end of the swing arm provides a structural support that is less rigid. Decreasing the number of flexures from four to three also reduces the stiffness of the tool relative to the base. Preferred embodiments include a trade-off analysis to determine the number of flexures used. The trade-off in choosing three, four or more flexures and one or two sets of flexures involves considering the reduction of stiffness versus the reduction in moving mass and increase in the work space volume around the tool. To maintain a constant stiffness level at the tool, reducing the number of flexures requires increasing their dimension or choosing a material with a higher stiffness. Reducing the number of sets from two sets to one set of flexures (for example, by removing the lower flexures 108) requires the same trade-off analysis, increasing the bending stiffness of the swing arm and possibly decreasing the length of the flexures. The material of the flexures can include, without limitation, steel, beryllium-based alloys and materials that have a high fatigue strength to stiffness ratio. The material of the swing arm can include, without limitation, aluminum, steel, beryllium and composite materials that have a high stiffness to weight ratio.

The central portion of the upper flexure blade pair 106 is fixed to the swing arm 102 by bonding the flexure blades in a pair of upper slots 122 in the upper hub 110, and can be further secured by tightening a plurality of upper slot screws 124. The central portion of the lower flexure blade pair 108 is fixed to the swing arm 102 by bonding the flexure blades in a pair of lower slots 126 in the lower hub 112, and can be further secured by tightening a plurality of lower slot screws 128. A tool clamp screw 132 carried by the swing arm 102 works with the tool clamp flexure 104 to fix the cutting tool 44 or 90 in the swing arm 102.

FIG. 5 is a front view of the swing arm assembly 42 of FIG. 4 holding the cutting tool 90 of FIG. 3. The swing arm 102 has a right/left plane of symmetry 136 that contains the swing arm axis of rotation 46 and is perpendicular to the front/back plane 118, shown in FIG. 4. The swing arm 102 has a slot 138 that receives the cutting tool 90. The slot 138 has a plane of symmetry 140 that divides the slot 138 into right and left halves. The slot 138 is located in the swing arm 102 approximately midway between the upper hub 110 and the lower hub 112. The slot plane of symmetry 140 is parallel to the right/left plane of symmetry 136 and is offset from the swing arm axis of rotation 46 by a distance equal to an offset radius 142.

Figure 6:
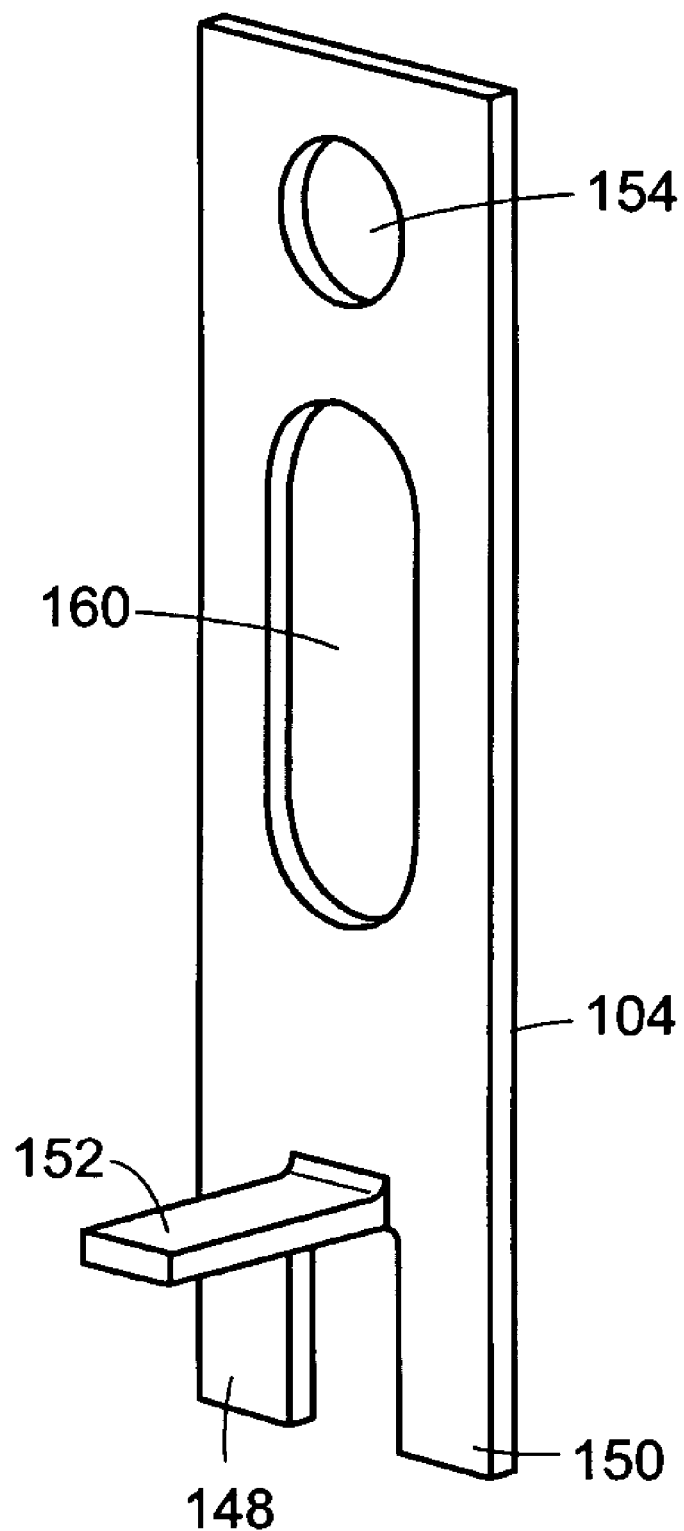
FIG. 6 is an isometric projection of a tool clamp flexure of the swing arm assembly of FIG. 4.

The cutting tool 90 is located in the swing arm 102 by mating four surfaces 76, 78, 80 and 82 on the cutting tool 90, which form a taper angle 88, to a pair of surfaces 144 and 146 in the swing arm slot 138, and mating the back surface 86 of the cutting tool 90 with a pair of back blades 148 and 150 as shown in FIG. 6 of the tool clamp flexure 104.

It can be appreciated by those skilled in the art that the holding force and alignment between a tool and a tool holder can be improved by providing the tool with a taper angle that mates with a receiving feature in a tool holder. The present embodiment improves upon this method by creating four mating areas on the tool for contact between the tool and the slot. Those skilled in the art will recognize that the discontinuity of the mating surface 76 and 78 and of the mating surface 80 and 82 by the recess in between the two portions provides four distinct areas of contact between the cutting tool 90 and the receiving surfaces 144 and 146 of the swing arm slot 138. This results in improved mating and alignment of the cutting tool 90 with the swing arm slot 138, compared to a design that utilizes simpler continuous surfaces on the cutting tool 90.

When the cutting tool 90 is held in the swing arm 102, the cutting tool plane of symmetry 74 and the swing arm slot 138 plane of symmetry 140 are coincident, and the cutting tool top surface 84 is nominally perpendicular to the swing arm axis of rotation 46. Furthermore, the center point 98 on the cutting tool edge 96 is offset from the swing arm right/left plane of symmetry 136 by a distance equal to the offset radius 142, and the center point 98 lies nominally in the swing arm front/back plane 118, as seen in FIG. 4. In alternate embodiments the center point 98 lies in front of or behind the swing arm front/back plane 118.

FIG. 6 shows the tool clamp flexure 104. The tool clamp flexure 104 has a front blade 152 that is interposed between the first back blade 148 and the second back blade 150 and is substantially perpendicular to the back blades 148 and 150. The tool clamp flexure 104 has a hole 154 for receiving a fastener 156 to secure the tool clamp flexure 104 to the swing arm back surface 158 as seen in FIG. 4. The tool clamp flexure 104 also has an access slot 160. The access slot 160 allows access to the tool clamp screw 132.

Figure 7:
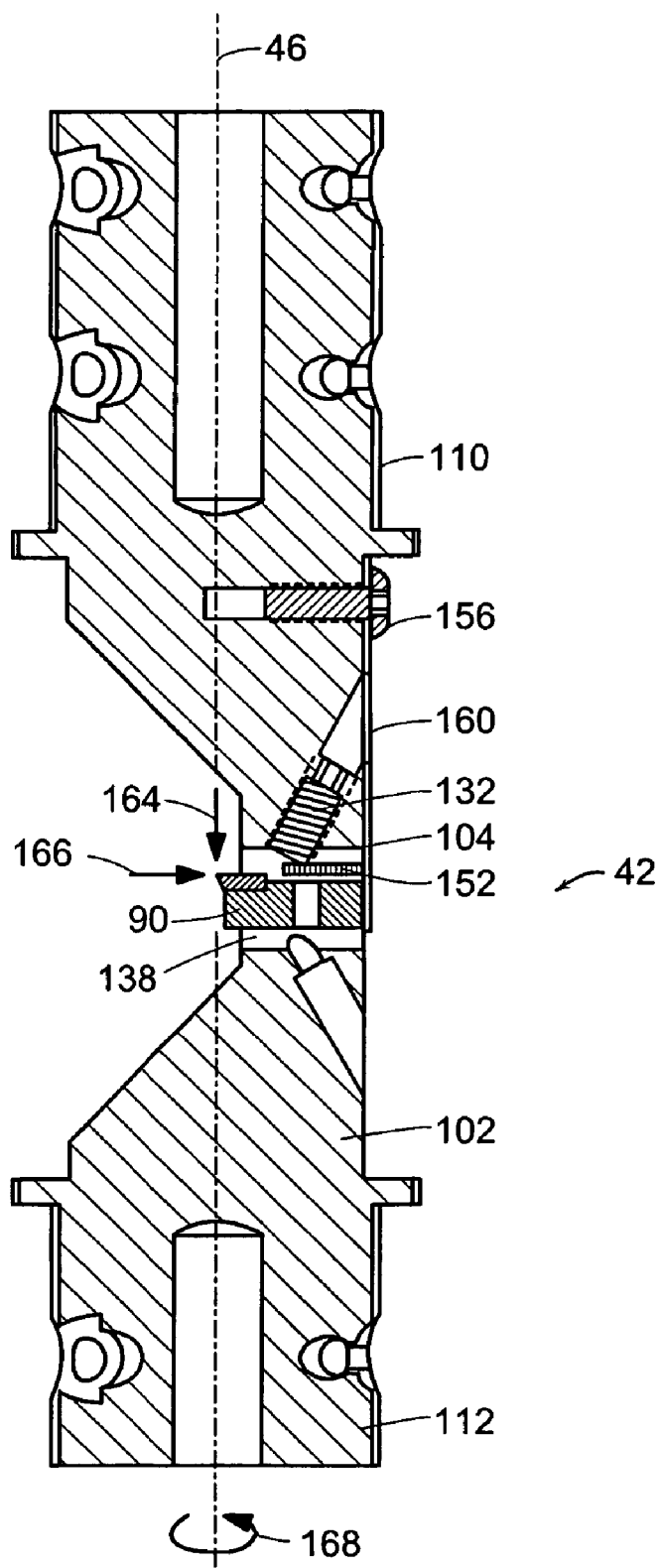
FIG. 7 is a side cross-sectional view of the swing arm assembly of FIG. 4.

FIG. 7 is a side cross-sectional view of the swing arm assembly 42. In operation, the tool clamp flexure 104 is located on the swing arm 102 such that the cutting tool 90 is located under the front blade 152 of the tool clamp flexure 104. The tool clamp screw 132 which is accessible through the flexure slot 160, pushes on the front blade 152 of the tool clamp flexure 104 causing the front blade 152 to deflect and contact the cutting tool top surface 84, forcing the cutting tool 90 downward in the swing arm slot 138. In an alternative embodiment a screw engages the threaded hole 70 in the cutting tool 90 to draw down the cutting tool 90 into the swing arm slot 138.

When the cutting tool edge 96 and workpiece 50 contact each other during use, a cutting force 164 and a thrust force 166 develops between the two bodies. The cutting force 164 is in a direction substantially parallel to the swing arm axis of rotation 46. The thrust force 166 is in a direction substantially perpendicular to the swing arm axis of rotation 46. Both the cutting force 164 and the thrust force 166 lie substantially in the plane of symmetry 140 of the slot 138 shown in FIG. 5. The cutting force 164 and thrust force 166 are opposed by the upper pair of flexure blades 106 and the lower pair of flexure blades 108, as seen in FIG. 5. Still referring to FIG. 7, the thrust force 166, in this example, also produces a torque 168 by acting at a distance equal to the off-set radius 142 from the swing arm axis of rotation 46. The torque 168 is opposed by a torque produced by the actuator 68 as shown in FIG. 1.

Figure 8:
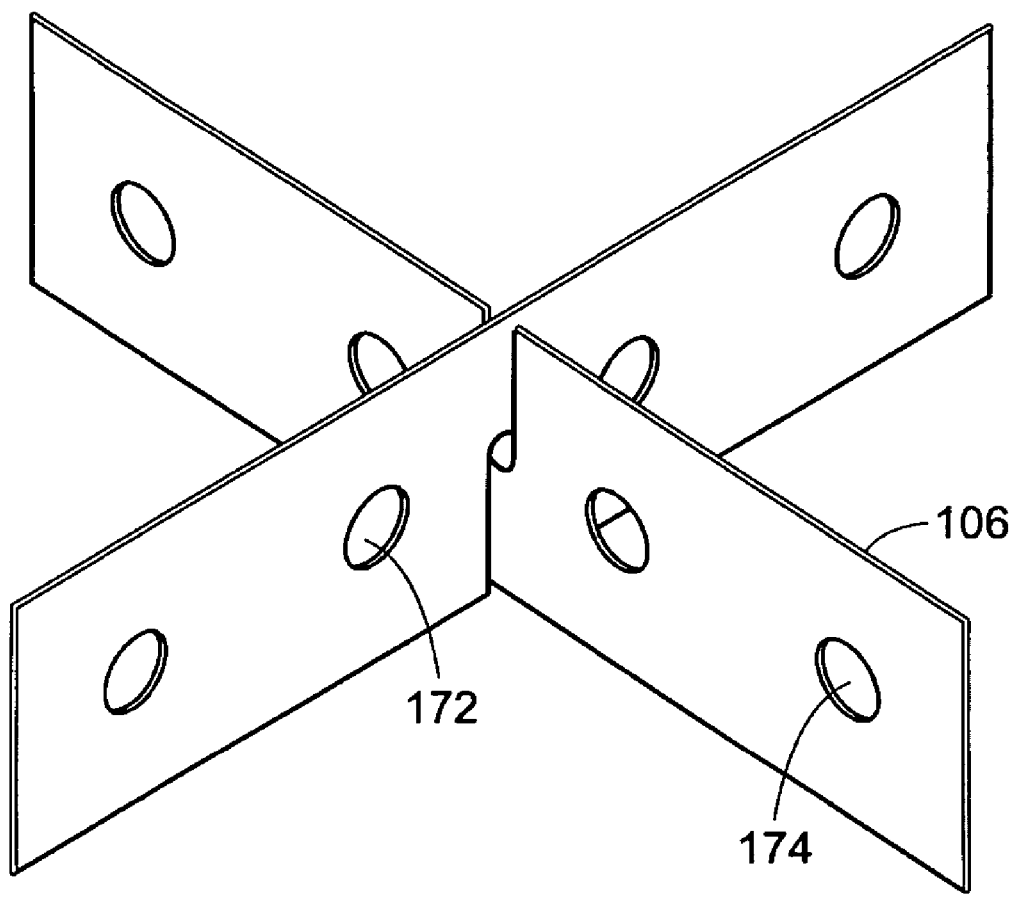
FIG. 8 is an isometric projection of a pair of flexures of the swing arm assembly of FIG. 4.

FIG. 8 shows the pair of upper flexure blades 106. The lower flexure blades 108 are similarly constructed in this embodiment. Each pair of flexure blades 106 and 108 has a first flexure blade and a second flexure blade positioned substantially perpendicular to each other. Each of the blades 106 has a plurality of holes 172 and 174. The outer holes 174 are used for securing the flexure blades 106 to the swing arm base 48. The inner holes 172 allow for the upper slot screws 124 to pass from one portion of the upper hub 110 to another portion of the hub for securing the flexure blades 106 in the slots 122. The hole in the flexure blade through which the screw passes provides adequate clearance so there is no interference with the tension.

Figure 9:
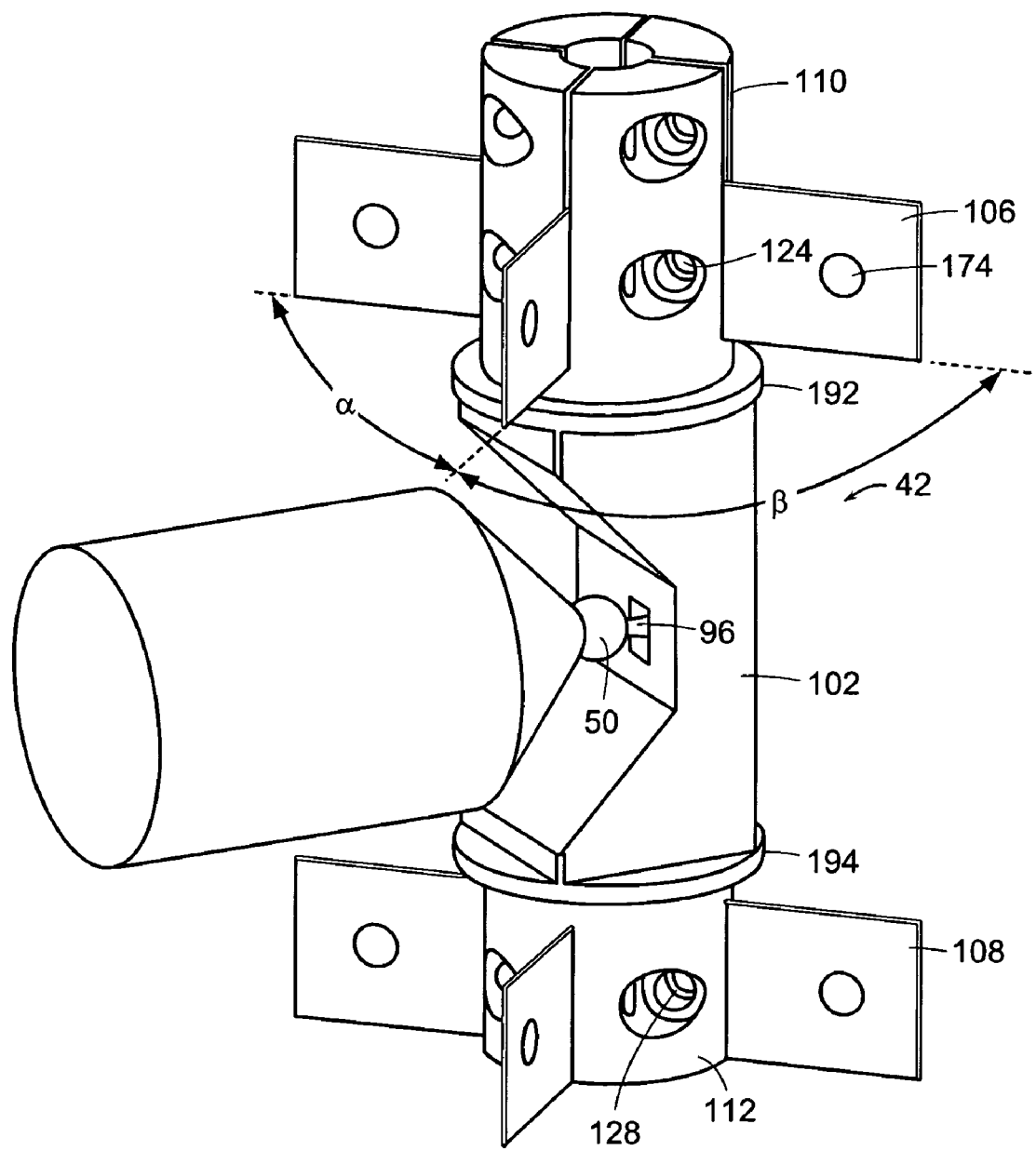
FIG. 9 is an isometric projection of the swing arm assembly of FIG. 4 illustrating two pairs of flexures of FIG. 8 and a workpiece in accordance with a preferred embodiment of the present invention.

FIG. 9 shows the swing arm assembly 42 and the workpiece 50. The swing arm assembly 42 has the upper pair of flexures or flexure blades 106 in the upper hub 110 and the lower pair of flexures or flexure blades 108 in the lower hub 112. In the swing arm assembly 42, the upper and lower pairs of flexure blades or elements 106 and 108 are oriented at an angle of forty-five degrees from the swing arm right/left plane of symmetry 136, as shown in FIG. 5, so as to maximize the open space between the workpiece 50 and the swing arm base 48, as best seen in FIG. 1.

The central portion of the pair of the upper flexure blades 106 is fixed to the swing arm 102 by bonding the flexure blades 106 in the upper slots 122 in the upper hub 110, and can be further secured by tightening the upper slot screws 124. The upper slot screws 124 pass through holes 172 of the upper flexure blades 106. The central portion of the pair of the lower flexure blades 108 is fixed to the swing arm 102 by bonding the flexure blades in the lower slots 126 in the lower hub 112, and can be further secured by tightening the lower slot screws 128. Those skilled in the art will recognize that by properly tightening the screws 124 and 128, the bonded joint can be preloaded in compression to the extent necessary to avoid stress reversal in the bonded joint during use of the embodiments of the present invention. It is well known that stress reversal and tension/compression cycles, reduce the fatigue life of a mechanical component.

Rotation of the swing arm 102 relative to the base 48 causes an out-of-plane bending in the upper and lower pairs of flexure blades 106 and 108. The in-plane stiffness of each flexure blade, when combined as a system of upper and lower pairs of flexure blades 106 and 108, constrains the swing arm 102 in five of six possible degrees of freedom, leaving free rotation around the swing arm axis of rotation 46 shown in FIG. 5. That is, the upper pair of flexure blades 106 and lower pair of flexure blades 108 support and constrain the swing arm 102 as a fixed-end/fixed-end beam with a single degree of freedom of rotation around the swing arm axis of rotation 46. Those skilled in the art will recognize that the swing arm 102 is actually over-constrained by the upper and lower pairs of flexure blades 106 and 108 in the sense that the blades will resist large rotations that would require them to stretch substantially. This is acceptable in the embodiments of the present invention since the swing arm 102 is subjected to relatively small rotation angles around the swing arm axis of rotation 46. Since the cutting edge 96 is located inside of the virtual cylinder formed by joining the upper hub 110 and lower hub 112, and is spaced a small distance (i.e. the offset radius 142) from the swing arm axis of rotation 46, the bending moment on the swing arm 102 from the cutting force 164 as represented by 170 in FIG. 5, is kept within a tolerable range. In an alternate preferred embodiment, the cutting edge 96 is located outside of the virtual cylinder formed by joining the upper hub 110 and lower hub 112, and is spaced a larger distance (i.e. the offset radius 142) from the swing arm axis of rotation 46.

One skilled in the art will recognize that the swing arm 102 and flexure blades 106 and 108 can be manufactured as a single unit by machining a single piece of material using a variety of methods including wire electro-discharge machining, and will also recognize that the swing arm 102, flexure blades 106 and 108, and a portion or all of the base 48 can be manufactured as a single unit by machining a single piece of material with the above described methods.

As described hereinbefore, preferred embodiments can include as a minimum, one set of three flexures that are disposed on the swing arm and extend radially from the swing arm. The blades are disposed around the swing arm in an angular relationship as illustrated in FIG. 9 of angle $\alpha$ or $\beta$ between the blades. The angles $\alpha$ and $\beta$ can be optimized such that the flexures keep the center line of the rotating piece fixed. In an embodiment, the three flexures form a T-shape wherein angles $\alpha=\beta=90°$. In another preferred embodiment; the angles $\alpha$ and $\beta$ are non-equidistant but are optimized to increase the work space around the tool while providing the desired amount of support and stiffness at the tool to resist the cutting forces developed between the tool and the workpiece.

Figure 10:
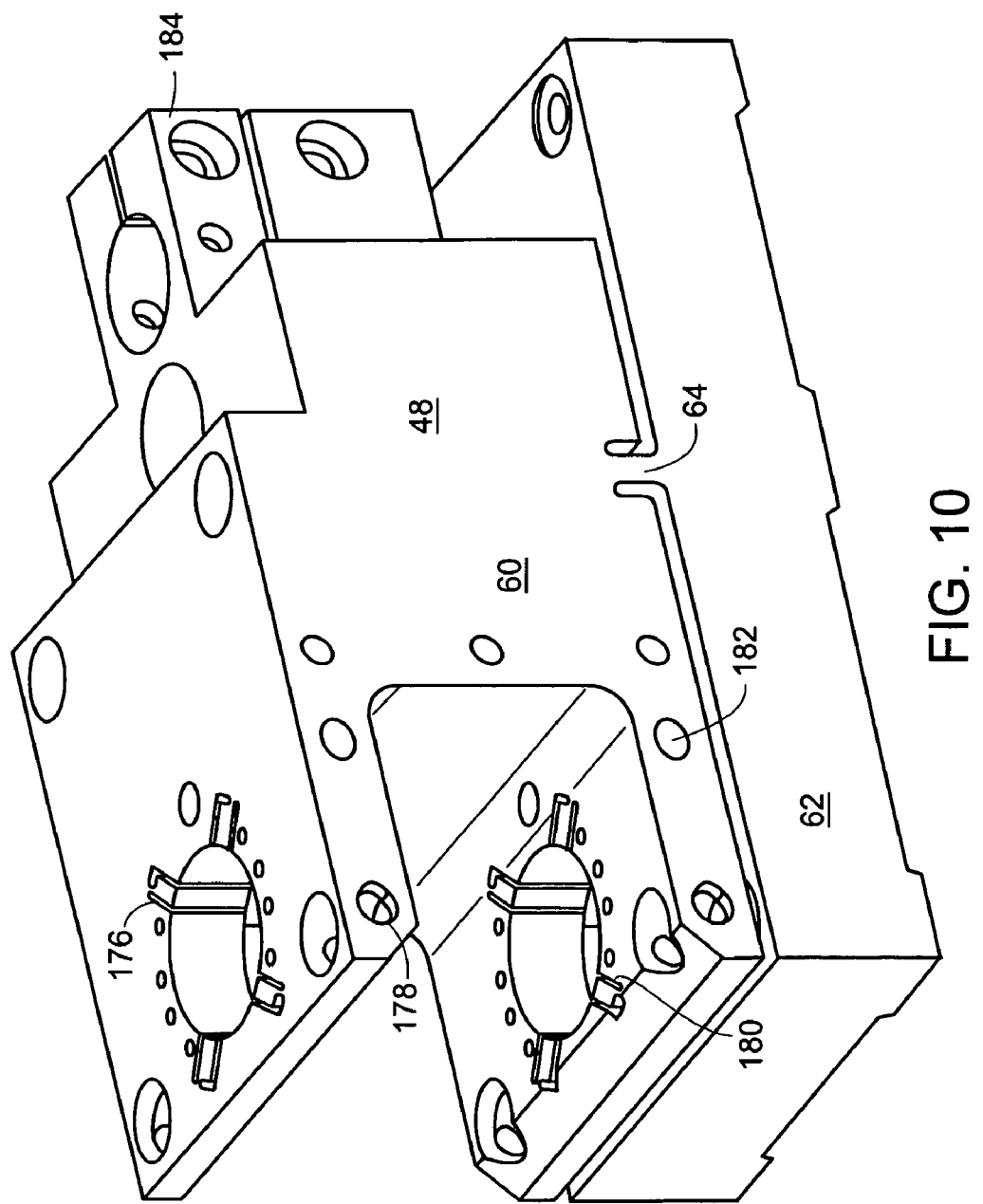
FIG. 10 is an isometric projection of the swing arm base of FIG. 1.

The swing arm base 48 is shown in FIG. 10 in accordance with a preferred embodiment of the present invention. The outer ends of the pair of the upper flexure blades 106 are fixed to the swing arm base 48 by bonding the flexure blades 106 in a plurality of base upper slots 176, and can be further secured by tightening a plurality of base upper slot screws 178. The outer ends of the pair of the lower flexure blades 108 are fixed to the swing arm base 48 by bonding the flexure blades in a plurality of base lower slots 180, and can be further secured by tightening the base lower slot screws 182. Those skilled in the art will recognize that by properly tightening the screws 178 and 182 the bonded joint can be preloaded in compression to the extent necessary to avoid stress reversal in the bonded joint during use of the invention. It is well known that stress reversal, tension/compression cycles, reduces the fatigue life of a mechanical component.

The upper and lower pairs of flexure blades 106 and 108 as seen in FIG. 9, are preloaded into tension during assembly of the flexure blade pairs with the swing arm 102 and the swing arm base 48. Those skilled in the art will recognize that the performance of the flexure blades is improved by having a certain amount of preload tension in the blades during use. The swing arm 102 and the swing arm base 48 are made of materials that have a similar coefficient of thermal expansion (CTE-1). The upper and lower pairs of flexure blades 106 and 108 are made of a material that has a higher coefficient of thermal expansion (CTE-2). In an embodiment, the swing arm 102 and swing arm base 48 are made of steel, and beryllium-copper is used for the pairs of flexure blades 106 and 108, resulting in a difference in coefficient of thermal expansion of approximately 3 parts per million per degree Fahrenheit. Initial assembly of the upper and lower pairs of flexure blades 106 and 108 with the swing arm 102 and the swing arm base 48 is performed at the ambient temperature that the fast tool servo will be used at, and is nominally room temperature. The upper and lower pairs of flexure blades 106 and 108 are bonded to the swing arm 102 and swing arm base 48 at a temperature above the ambient use temperature. The choice of temperature during the bonding process depends on the materials chosen for the swing arm 102, base 48, and the pairs of flexure blades 106 and 108, and the desired level of tension preload in the flexure blades. These parameters can be chosen to allow a bonding temperature in the range of the ambient temperature that the fast tool servo will be used to many hundreds of degrees Fahrenheit, thus accommodating bonding methods ranging from elevated temperature-cure adhesives to soldering and brazing. Because CTE-2 is greater than CTE-1, a tensile force is developed in the upper and lower pairs of flexure blades 106 and 108 when the temperature of the bonded assembly is returned to the ambient use temperature.

Still referring to FIG. 10, the flexure hinge 64 is shown between the upper portion 60 of the base 48 and the lower portion 62 of the base 48. As indicated with respect to FIG. 1, the differential screw assembly 66 has a tip 214, as shown in FIG. 1, that is carried by a block assembly 184 in the upper portion 60 and engages the lower portion 62 of the base 48. The rotation of the screw 66 is used in a method of adjusting the position of the cutting edge relative to the workpiece. Further, both the plurality of base upper slots 176 and the plurality of base lower slots 180 are located on the upper portion 60 of the base 48.

Figure 11:
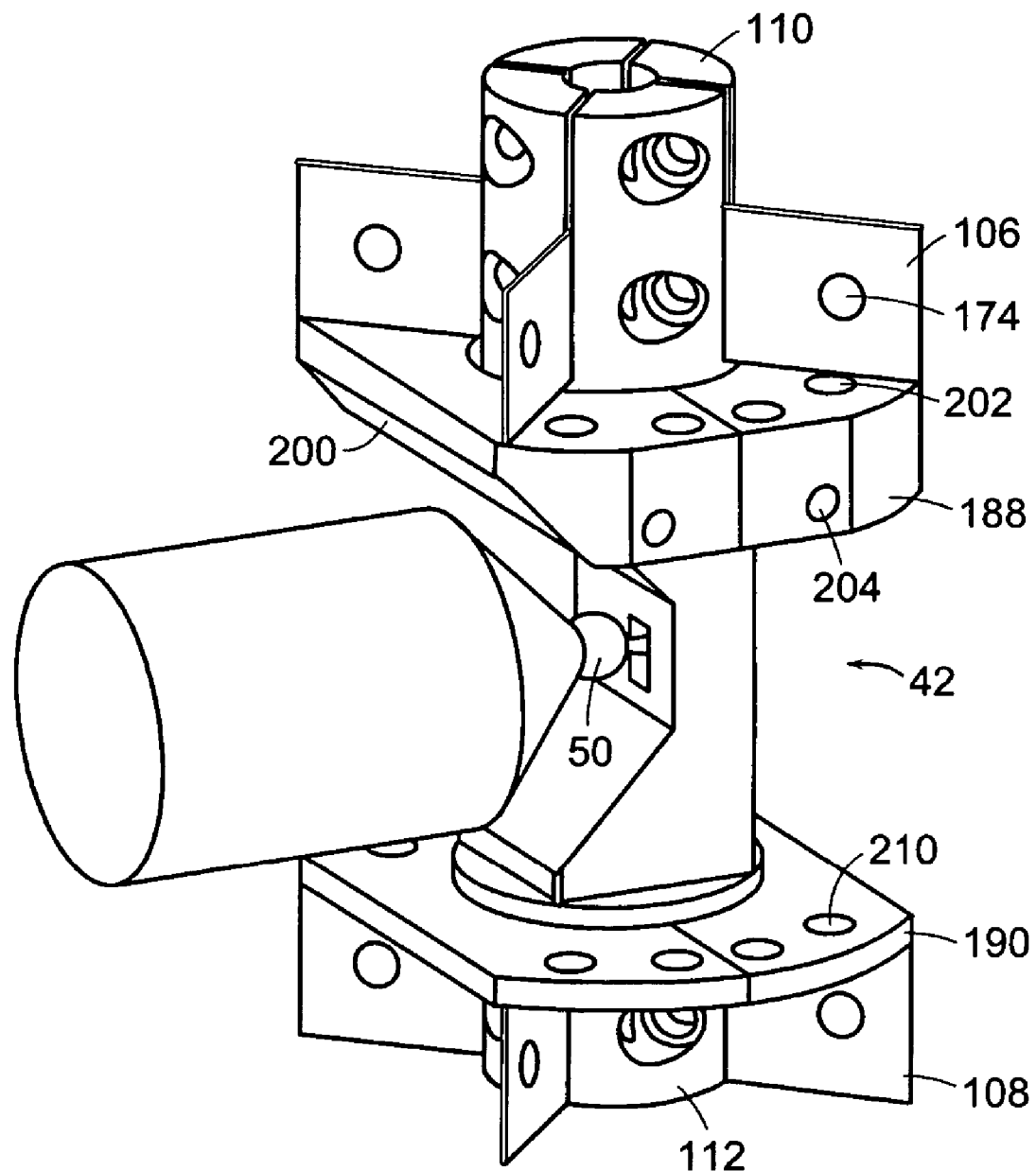
FIG. 11 is an isometric projection of the swing arm assembly of FIG. 4 with two pairs of flexures of FIG. 8, a workpiece, and chip shields in accordance with a preferred embodiment of the present invention.
Figure 12:
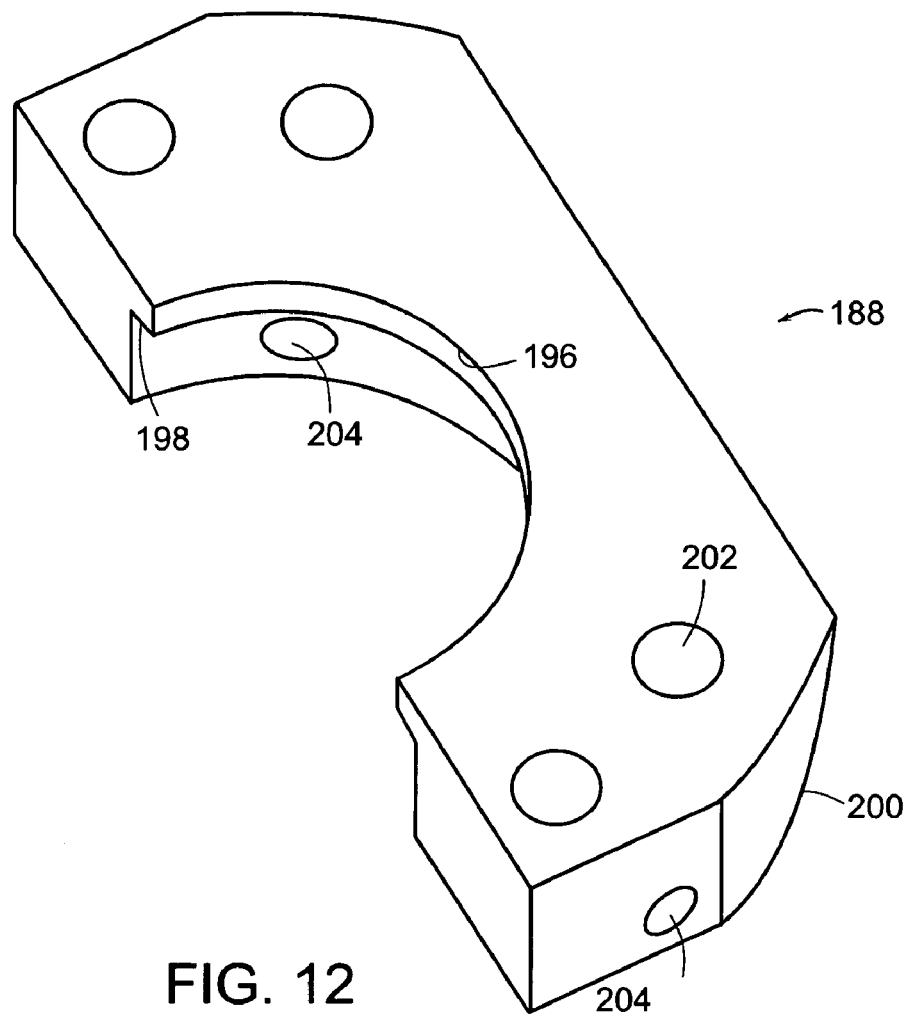
FIG. 12 is a perspective view of the upper chip shield of FIG. 11.
Figure 13:
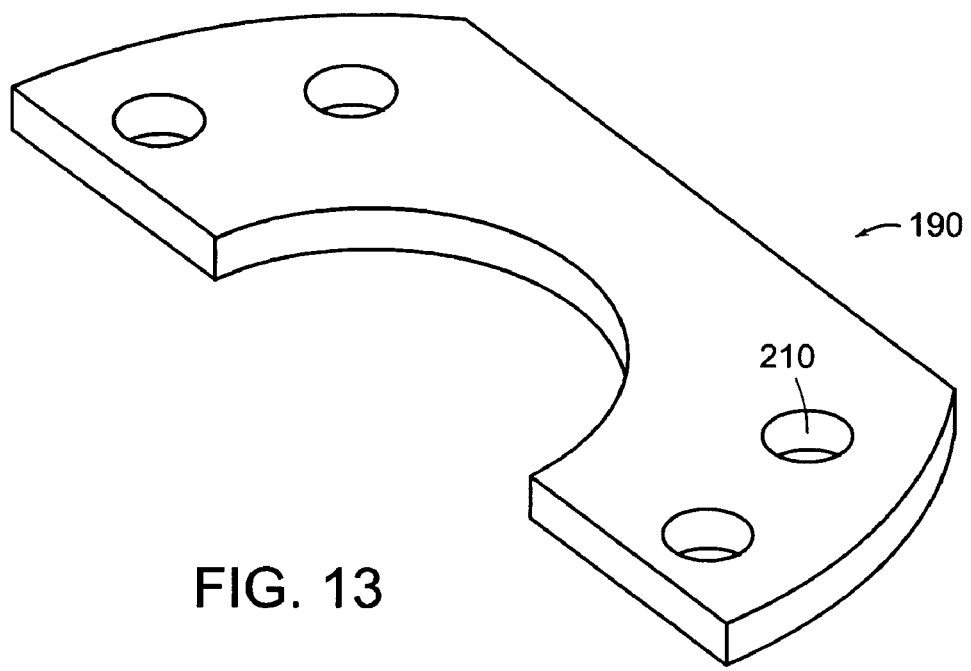
FIG. 13 is a perspective view of the lower chip shield of FIG. 11.

FIG. 11 shows the swing arm assembly 42 with the workpiece 50. The swing arm assembly 42 has an upper chip shield 188 and a lower chip shield 190 that protects the flexure blades 106 and 108 set in the upper hub 110 and lower hub 112 of the swing arm assembly 42 when the swing arm assembly 42 is secured to the base 48 as shown in FIG. 1. The upper chip shield 188 also shown in FIG. 12, is mounted below the upper flexure blades 106. The lower chip shield 190 also shown in FIG. 13, is mounted above the lower flexure blades 108.

The swing arm 102 has an upper skirt 192, as best shown in FIG. 9, and a lower skirt 194 to prevent debris generated during use from entering and accumulating between the swing arm 102 and the base 48 in the areas near the upper and lower pairs of flexure blades 106 and 108. The upper chip shield 188 mounts to the swing arm base 48 and engages the upper skirt 192 to form a simple labyrinth seal above the upper skirt 192. The lower chip shield 190 mounts to the swing arm base 48 and engages the lower skirt 194 to form a simple labyrinth seal below the lower skirt 194.

The upper chip shield 188 is formed of two pieces. One of the pieces is shown in FIG. 12 and has a lip 196 that forms an annular groove 198 that receives the upper skirt 192 of the swing arm 102. In addition, the upper chip shield 188 has a tapered edge 200 on the front portion to increase the clearance for the workpiece 50 and the workpiece holder 51. The upper chip shield 188 has a plurality of vertical holes 202 for receiving fasteners to secure the upper chip shield 188 to the base 48. In addition, the upper chip shield 188 has a plurality of horizontal holes 204 through which the hard stops 212 as seen in FIG. 14 extend.

The lower chip shield 190 is formed of two identical pieces. One of the pieces is shown in FIG. 13. The lower chip shield 190 has a plurality of holes 210 for receiving fasteners to secure the lower chip shield 190 to the base 48.

Figure 14:
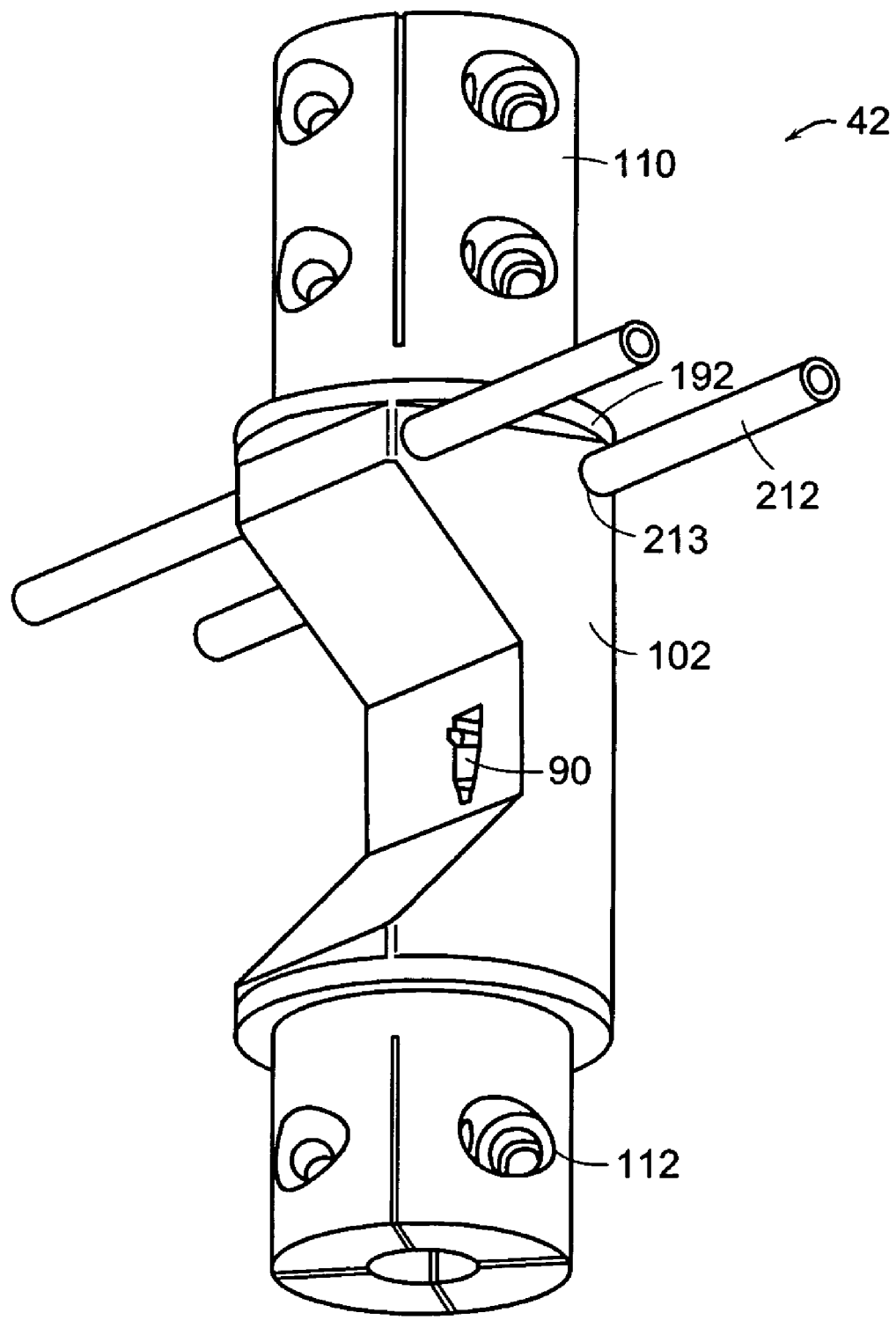
FIG. 14 is a perspective view of the swing arm assembly of FIG. 4 with hard stops.

FIG. 14 shows the swing arm assembly 42 with four hard stops 212. The hard stops 212 are located near the swing arm 102 below the upper skirt 192 and extend outward from the swing arm 102 substantially perpendicular to the swing arm right/left plane of symmetry 136. The upper chip shield 188, as seen in FIG. 12, has a thickened cross-section to accept the hard-stops 212. A small gap 213 between an end of each hard stop 212 and the swing arm 102 allows normal rotation of the swing arm. The hard stops 212 act in pairs to limit the rotation angle of the swing arm 102 to prevent damage to the upper and lower pairs of flexure blades 106 and 108. Excessive rotation of the swing arm 102 causes closure of a pair of gaps 213 that limits rotation of the swing arm.

Figure 15:
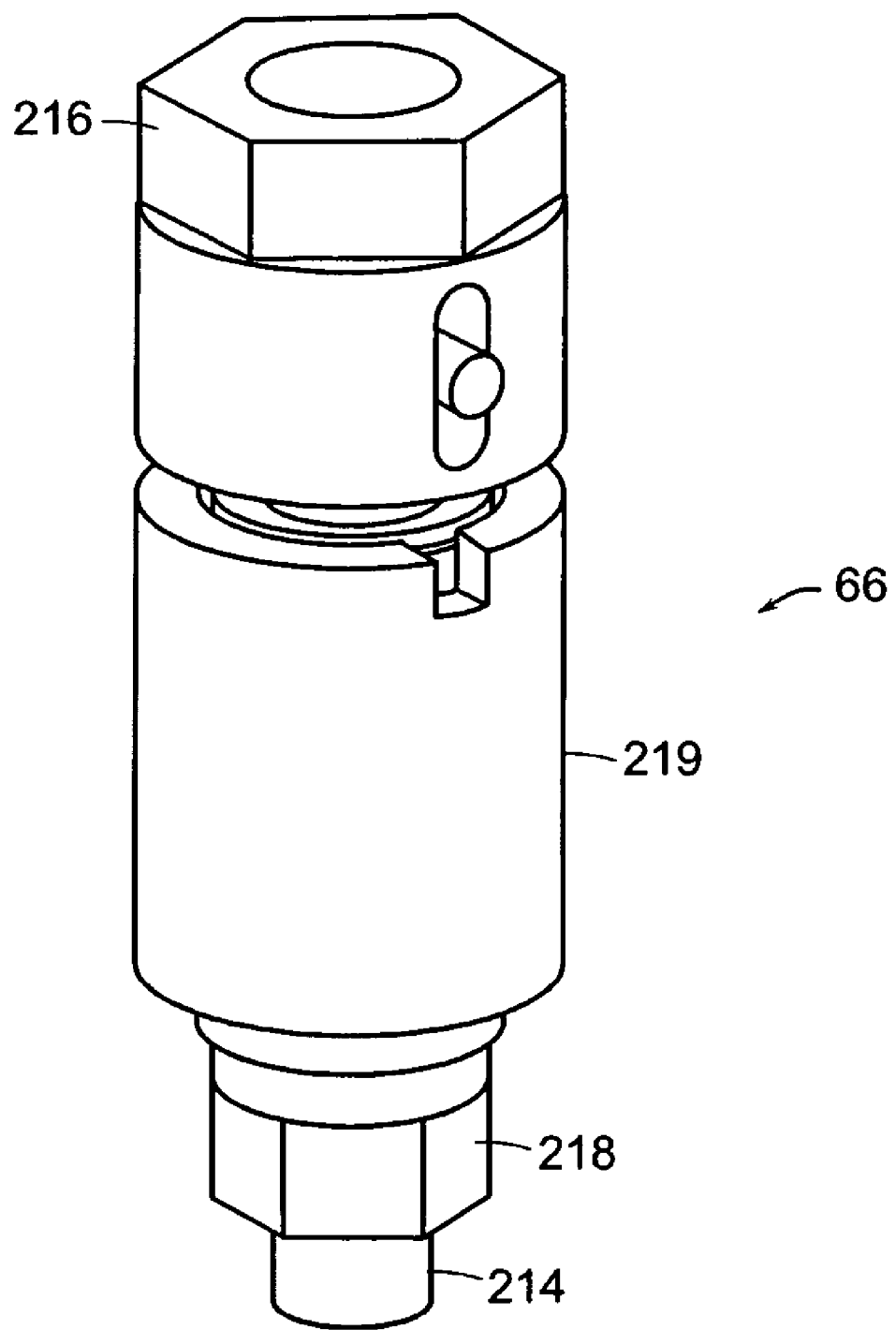
FIG. 15 is a perspective view of a differential screw assembly in accordance with a preferred embodiment of the present invention.

FIG. 15 is a perspective view of the differential screw assembly 66. The differential screw assembly 66 has a tip 214, a coarse adjustment screw 216, a fine adjustment screw 218, and a housing 219. The interface between the tip 214 and the fine adjustment screw 218 consists of a set of machined threads having a thread pitch P-1. The interface between the fine adjustment screw 218 and the housing 219 consists of a set of machined threads having a thread pitch P-2. In operation, the differential screw assembly 66 is mounted in the upper portion 60 of the swing arm base 48 with the tip 214 in contact with the lower portion 62 of the swing arm base 48.

Figure 16A:
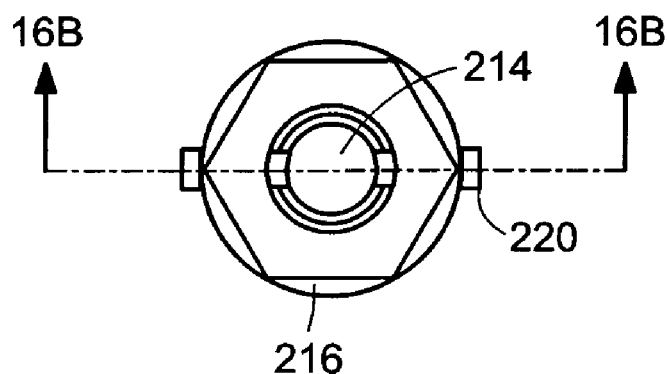
FIG. 16A is a top view of the differential screw assembly of FIG. 15.
Figure 16B:
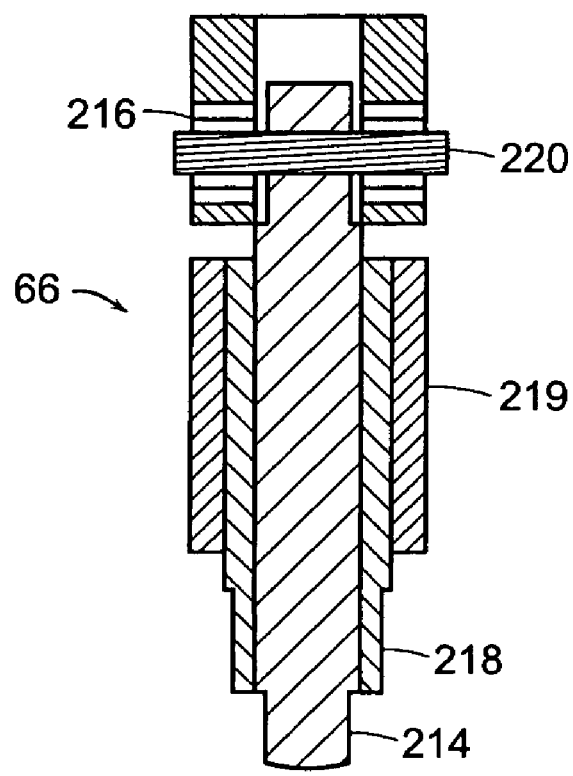
FIG. 16B is a cross-sectional view of the differential screw assembly taken along the line 16B-16B of FIG. 16A.

FIG. 16A is a top view of the differential screw assembly 66. FIG. 16B is a side cross-sectional view of the differential screw assembly 66 taken along the line 16B-16B of FIG. 16A. The extension of the tip 214 of the differential screw 66 is adjusted using the coarse adjustment screw 216 and the fine adjustment screw 218. Turning the coarse adjustment screw 216 transmits rotation through pin 220 to the tip 214 while the fine adjustment screw 218 is stationary. Locking the coarse adjustment screw 216 and rotating the fine adjustment screw 218 causes motion in one direction between the coarse adjustment screw 216 and fine adjustment screw 218, and motion in the opposite direction between the fine adjustment screw 218 and the housing 219, while the pin 220 prevents rotation of the tip 214. The motion of the tip 214 relative to the housing 219 is related to the difference in the thread pitches P-1 and P-2.

Figure 17:
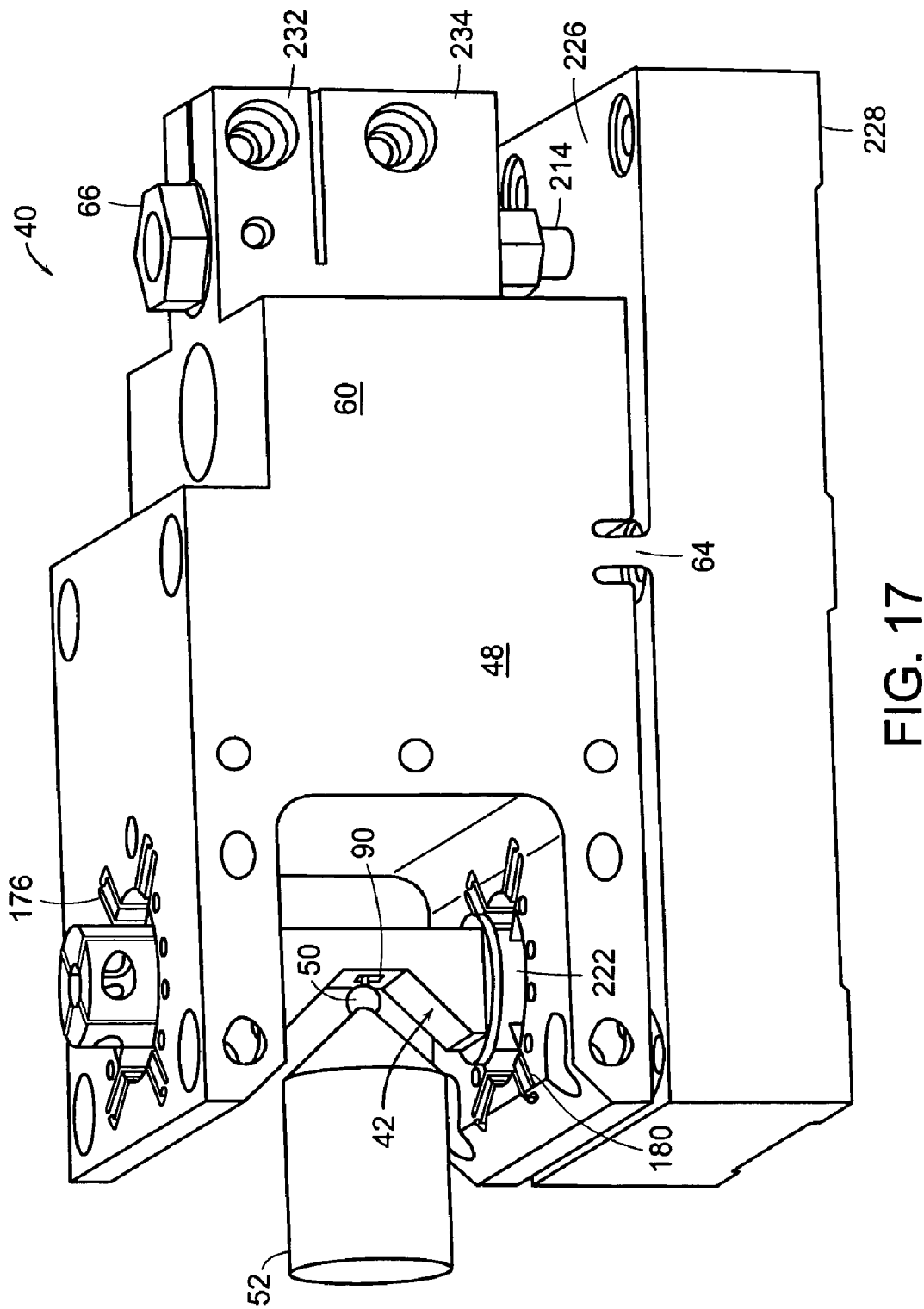
FIG. 17 is a perspective view of the rotary fast tool servo assembly of FIG. 1 without the actuator.

FIG. 17 shows the rotary fast tool servo assembly 40 without the actuator 68. The workpiece 50 is also shown. The swing arm assembly 42 is mounted in the upper portion 60 of the base 48. The base 48 has a pair of essentially concentric circular openings 222 to receive the swing arm assembly 42. Each of the two openings 222 has the plurality of slots 176 and 180 to receive the flexure blades extending radially from the swing arm 42.

Figure 18:
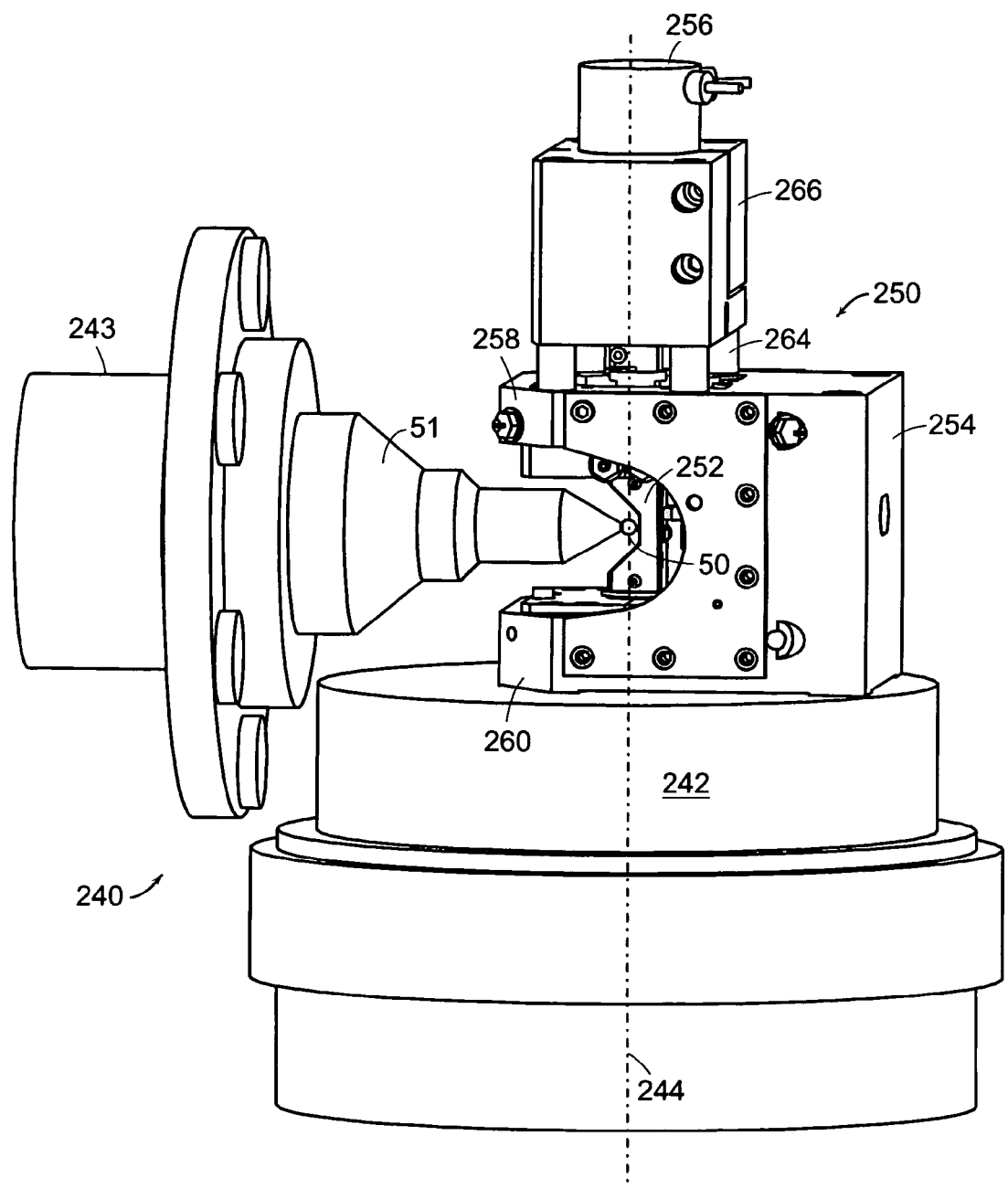
FIG. 18 is a side view of a workpiece on a spindle of a lathe with a rotary fast tool servo of an alternative embodiment on a rotary base according to the invention.

The differential screw assembly 66 is mounted in the upper portion 60 of the base 48. The upper portion 60 of the base 48 is joined to lower portion 62 of the base 48 by the flexure hinge 64. The flexure hinge 64 extends across the swing arm base from the left side of the base 48 to the right such that flexing of the flexure hinge 64 causes up/down repositioning of the cutting tool 90. By rotating the upper portion 60 of the base 48 about the flexure hinge 64, the cutting tool is adjusted vertically relative to the workpiece using the differential screw assembly 66. The lower portion 62 provides a surface 226 for the tip 214 of the differential screw assembly 66 to contact. The lower portion 62 has a mounting surface 228 for attaching the rotary fast tool servo assembly 40 to a machine tool 240, as seen in FIG. 18.

A preload spring maintains contact between the tip 214 of the differential screw assembly 66 and the surface 226 of the lower base 62. Adjustments of the coarse adjustment screw and fine adjustment screw cause the tip 214 to bear against the surface 226 of the lower base 62 causing a rotation of the upper portion 60 of the swing arm base 48 around an axis that is parallel to the long axis of the flexure hinge 64 and substantially at the center of the flexure hinge. This rotation of the upper portion 60 of the swing arm base 48 causes the cutting tool edge 96 to change elevation relative to the workpiece 50.

In a preferred embodiment of the present invention, a one degree rotation of the coarse adjustment screw 216 causes a 5 μm change in elevation of the cutting tool edge 96. An upper clamping feature 232 in the swing arm base 48 allows for enabling and disabling of the coarse adjustment screw 216. In a preferred embodiment, a one degree rotation of the fine adjustment screw 218 causes a 0.021 μm (21 nm) change in elevation of the cutting tool edge 96. A lower clamping feature 234 in the swing arm base 48 is used to hold the differential screw assembly 66 in the upper portion 60 of the swing arm base.

In the present embodiment of the rotary fast tool servo, the differential screw assembly 66 provides a ±1.27 mm of change in elevation of the cutting tool edge 96. Alternative embodiments of differential screw assemblies are available that provide other greater or lesser changes in elevation of the cutting tool edge 96.

In a preferred embodiment of the rotary fast tool servo 40, the swing arm 102 is configured to couple an actuator 68 which is mounted to the upper portion 60 of the swing arm base 48 with a thermally insulating spacer. The thermally insulating spacer, as shown in the next embodiments restricts the flow of heat from the actuator 68 into the swing arm base 48. An enclosure, as shown in the next embodiment, around the actuator 68 allows for the controlled removal of the heat generated by the actuator during use, helping to prevent the heat from entering the rest of the machine by thermal conduction, convection, and radiation.

Different methods for aligning the axis of rotation of the actuator 68 to the swing arm axis of rotation 46 are possible. One method includes precision machining of the mounting surfaces on the interface hardware between the actuator 68 and the upper portion 60 of the swing arm base 48, and precise alignment of the interface hardware to the swing arm axis of rotation 46 during assembly. Another method includes using a flexible coupling to accommodate misalignment between the actuator 68 and the swing arm 48. A flexible coupling is a well-known device used in the art for transmitting torque between two bodies while accommodating a misalignment between those bodies due to relaxed manufacturing and assembly tolerances.

Damping mechanisms, such as discussed with respect to the next embodiments, can be added between the swing arm 104 and the swing arm base 48 to improve the dynamic performance of the fast tool servo. The areas near the upper skirt 192, lower skirt 194, upper hub 110, and lower 112 are possible locations for installing damping mechanisms.

Displacement and rotation sensors, such as discussed with respect to the next embodiments, can be added between the swing arm 102 and the swing arm base 48 to provide real-time measurement data on the location and angular orientation of the swing arm relative to the swing arm base during operation of the fast tool servo. The areas near the upper skirt 192, lower skirt 194, and between the back surface 158 of the swing arm 102 and the swing arm base 48 are possible locations for installing displacement and rotation sensors. Additionally, the actuator 256 can be equipped with rotation sensors to provide real-time measurement data on the location and angular orientation of the swing arm 102 relative to the swing arm base 48.

Referring to FIG. 18, an alternative fast tool servo system 250 is shown in accordance with a preferred embodiment of the present invention. The fast tool servo 250 has a swing arm assembly 252, a base 254, and an actuator 256. The base 254 of the fast tool servo 250 is located on a rotating table 242 of the machine tool 240, such as an auxiliary spindle on a two-axis precision lathe. The rotating table 242 rotates about an axis of rotation 244 which is not coincident with the axis of rotation of the swing arm. Depending on the radius of curvature of the workpiece, the axis of rotation of the rotating table can be located inside or outside of the workpiece. For example, the workpiece shown in FIG. 18 can have the rotating table axis pass through the center of the small, spherical workpiece. To generate a surface on the workpiece that has a radius of curvature larger than the diameter of that workpiece, the axis of rotation can be located outside the workpiece. The workpiece 50 is retained by a workpiece holder 51 attached to a spindle 243 on the machine tool 240.

The base 254 has an upper portion 258 and a lower portion 260 which overlie and underlie, respectively, the predominant portion of the swing arm assembly 252. The actuator 256 is coupled to the swing arm assembly 252. The actuator 256 is mounted to the upper portion 258 of the base 254 with a plurality of thermally insulated spacers 264. The thermally insulating spacers 264 restrict the flow of heat from the actuator 256 into the base 254. In addition, the fast tool servo 250 has an enclosure 266 around the actuator 256 that allows for controlled removal of heat generated by the actuator 256 during use, helping to minimize and preferably prevent the heat from entering the rest of the fast tool servo system by thermal conduction, convection, and radiation.

Figure 19:
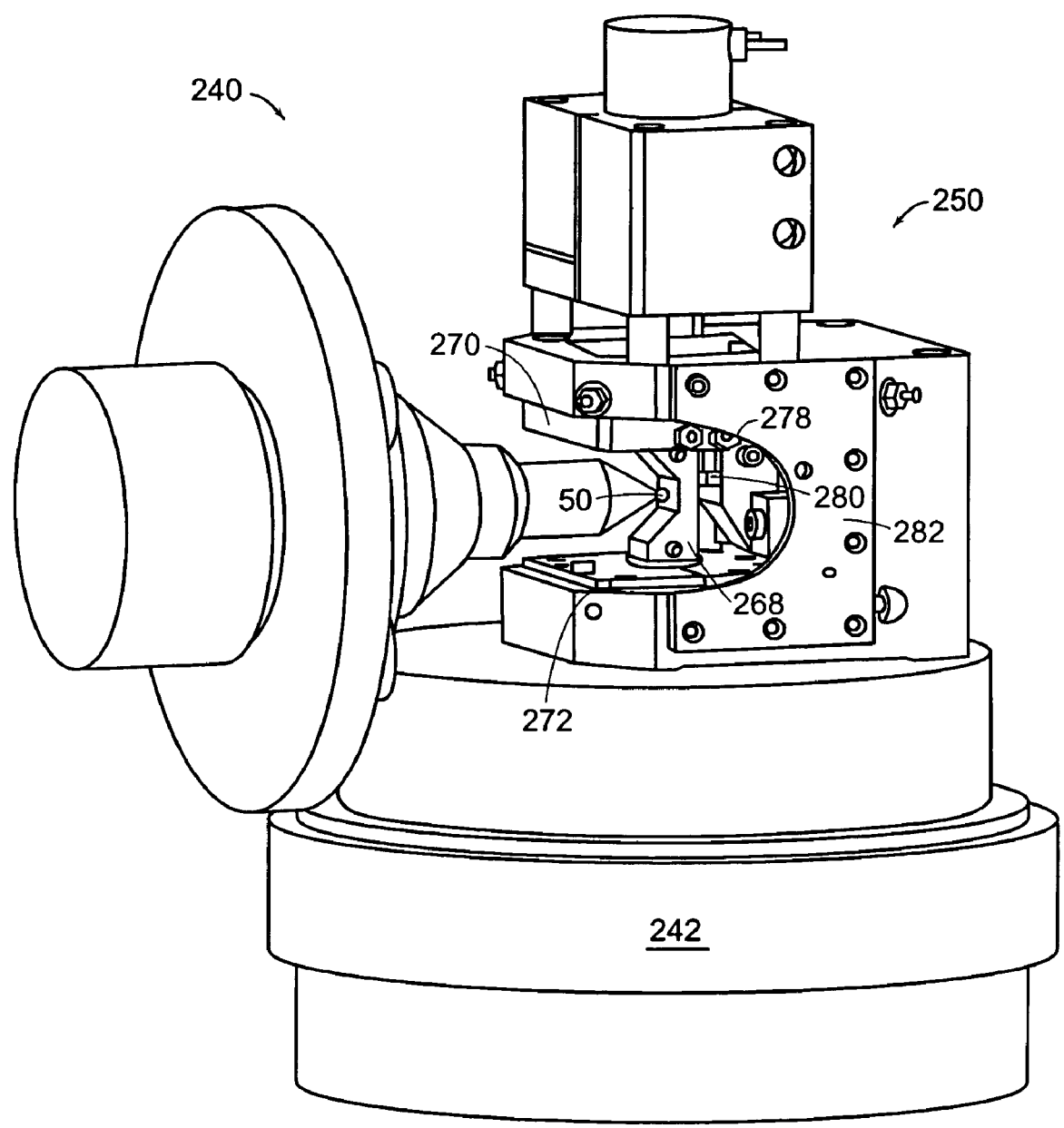
FIG. 19 is a view of a workpiece on a spindle with a rotary fast tool servo on a rotary base in accordance with a preferred embodiment of the present invention.
Figure 20:
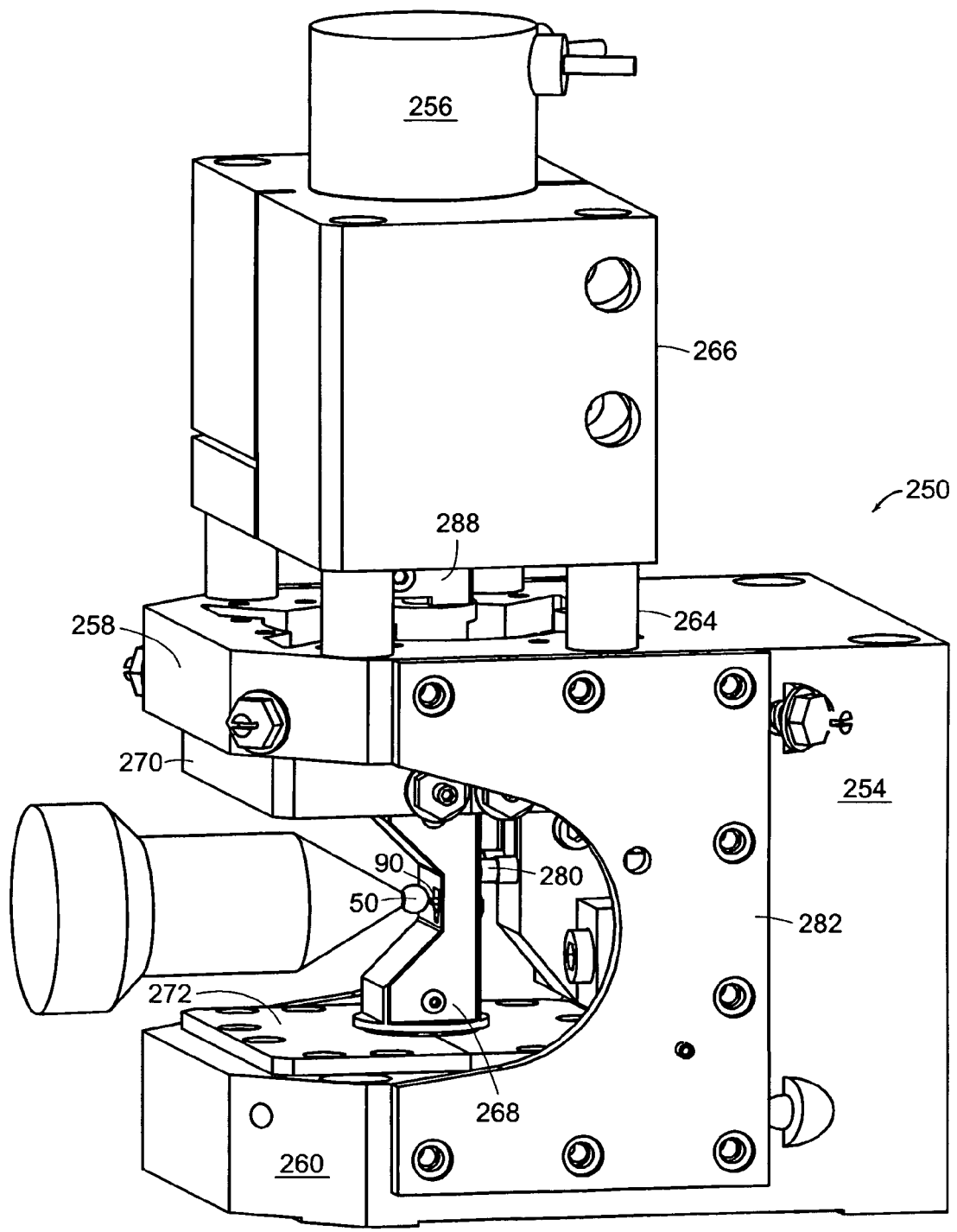
FIG. 20 is a skewed view of a rotary fast tool servo with a workpiece on a workpiece holder in accordance with a preferred embodiment of the present invention.

Another view of the fast tool servo 250 on the rotating table 242 of the machine tool 240 is shown in FIG. 19 in accordance with a preferred embodiment of the present invention. As best seen in FIG. 20, the cutting tool 90 is shown engaging the workpiece 50. As in the previous environment, the cutting tool 90 is carried in a slot 139 (best seen in FIG. 21) in a swing arm 268 of the swing arm assembly 252. In addition similar to the previous embodiment, the fast tool servo 250 has an upper chip shield 270 and a lower chip shield 272 that protect the flexure blades from being interfered with by chips or debris coming off of the workpiece 50 during the machining process.

The motion of the swing arm 268 of the swing arm assembly 252 is measured by a pair of sensors 280. The motion of the swing arm 268 is limited by a plurality of hard stops 278 as described hereinbefore. The sensors 280 are shown behind the swing arm 252, and can be better seen in FIG. 20.

Figure 22:
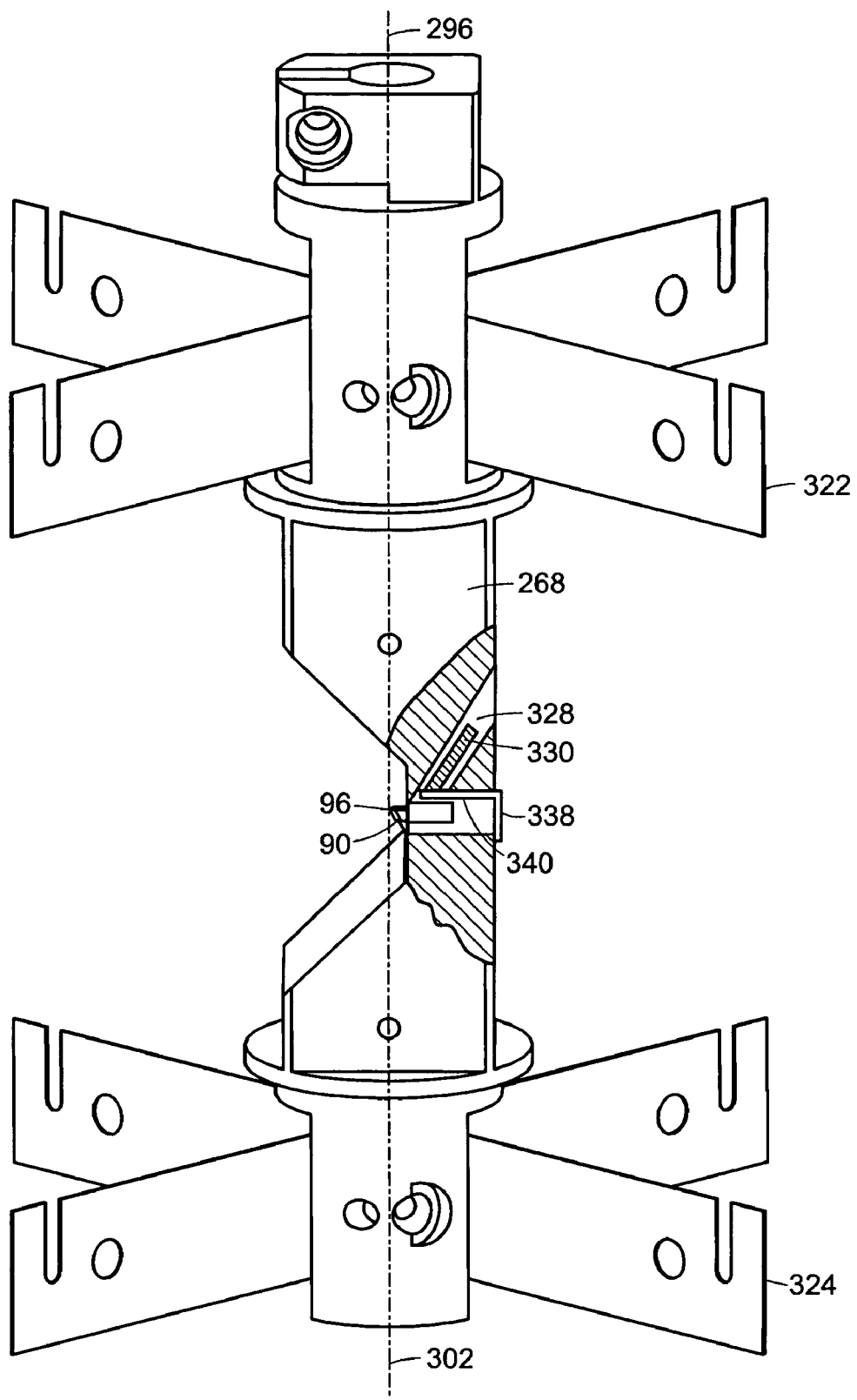
FIG. 22 is a sectional view of the swing arm with a cutting tool and retention mechanism in accordance with a preferred embodiment of the present invention.

FIG. 20 is a view of the fast tool servo 250 without showing the rotating table 242 of the machine 240 upon which it sits. The sensors 280 in this embodiment are a pair of eddy current sensors that measure rotation of the swing arm 268 around its centerline 296, and translation of the swing arm in a direction perpendicular to its front/back plane 302 as seen in FIG. 22. It is recognized that the sensors 280 that determine the rotation of the swing arm 268 can be other sensors such as, for example, but not limited to, capacitance gauges or other types of sensors capable of measuring small mechanical displacements that change at high frequency. In addition, the fast tool servo 250 has a pair of panels or side stiffeners 282 that extend from the upper base portion 258 to the lower portion 260 and provide for stiffening.

Figure 28:
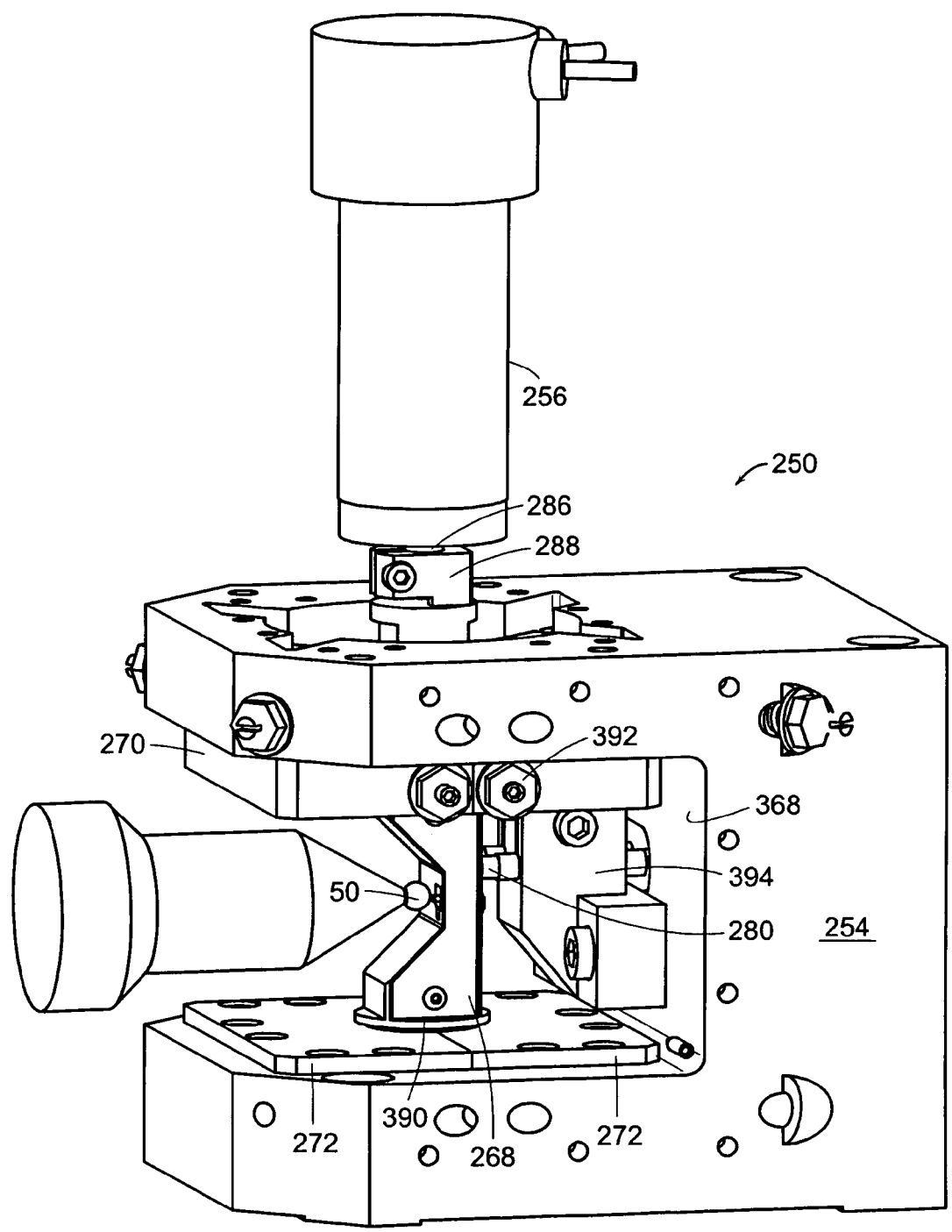
FIG. 28 is a side perspective view of the rotary fast tool servo system showing an actuator connected to the swing arm in accordance with a preferred embodiment of the present invention.

The actuator 256 is shown to be mounted to the upper portion 258 of the base 254. The thermally insulating spacers 264 support and thermally insulate the actuator 256 from the base 254 therein restricting the flow of heat from the actuator 256 into the base 254. In addition, the actuator 256 is surrounded by the enclosure 266 that allows for controlled removal of heat generated by the actuator 256 during use. The interface between the actuator 256 and the swing arm assembly 252 can be seen. The actuator 256 has an output shaft 286, as best seen in FIG. 28, which extends downwardly and is received by a clamp 288 on the swing arm assembly 252, as best seen in FIG. 21.

Figure 21:
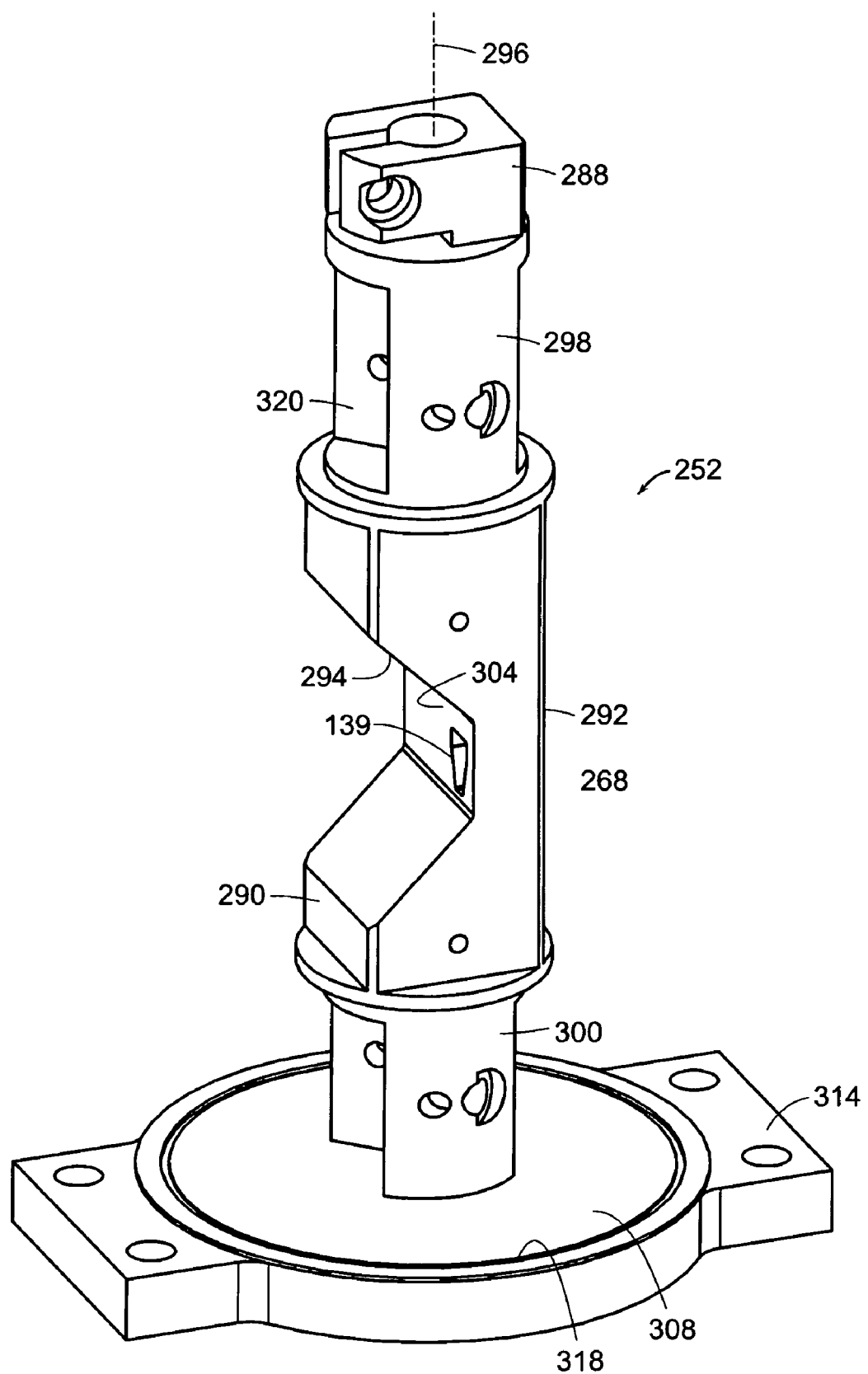
FIG. 21 is a perspective view of a swing arm with a damper plate in accordance with a preferred embodiment of the present invention.

Referring to FIG. 21, the swing arm assembly 252 has a swing arm 268 that has a front face 290, a rear face 292, and a clearance cut 294. The swing arm 268 has an axis of rotation 296 that nominally coincides with the long axis of the swing arm. The swing arm 268 has an upper hub 298 and a lower hub 300. The clearance cut 294 is located approximately midway between the upper hub 298 and the lower hub 300. The clearance cut 294 extends from the front face 290 of the swing arm 268 through the axis of rotation and slightly beyond. A front/back plane 302, as best seen in FIG. 22, extends through the axis of rotation 296 and is parallel to the front face 290. A back clearance surface 304 of the swing arm 268 is parallel to and spaced from the front/back plane 302. The clearance cut 294 allows the cutting tool edge 96 and a small portion of the cutting tool 90 to protrude from the back clearance surface 304 of the swing arm 268, as seen in FIG. 22, and allows the workpiece to extend into the swing arm 268 as much as possible.

As will be described in further detail hereinafter, the fast tool servo system 250 has several mechanisms for damping of motion. There is a desire to dampen the motion so that unintentional motion does not propagate. With respect to this, the fast tool servo system 250 has a damping plate 308 that is secured to the lower hub 300 of the swing arm 268. The damping plate 308 is interposed between the lower portion 260 of the base 254 and a bottom plate 314. The bottom plate 314 has a circular groove 318 that receives the damping plate 308.

A viscous fluid such as grease, or a viscoelastic material, is constrained between the damping plate 308 and the lower portion 260 of the base 254 and the bottom plate 314. Rotation of the swing arm 268 causes relative motion between the damping plate 308 and the lower portion 260 of the base 254 and the bottom plate 314, producing a shear force in the grease or viscoelastic material that dissipates energy associated with rotation of the swing arm 268.

In an alternate embodiment damping of unwanted motion between the swing arm 268 and the base 254 is accomplished by the relative motion of an electrically conducting plate carried by one through a magnetic field that is referenced to the other resulting in eddy current losses in the plate.

As in the previous embodiments, the swing arm 268 is secured to the base 254 by a plurality of flexure blades. The lower and upper hubs 300 and 298 each have a pair of sectors of a cylinder or pie slice shaped grooves 320 for receiving the flexure blades, as seen in FIGS. 21-24.

Figure 23:
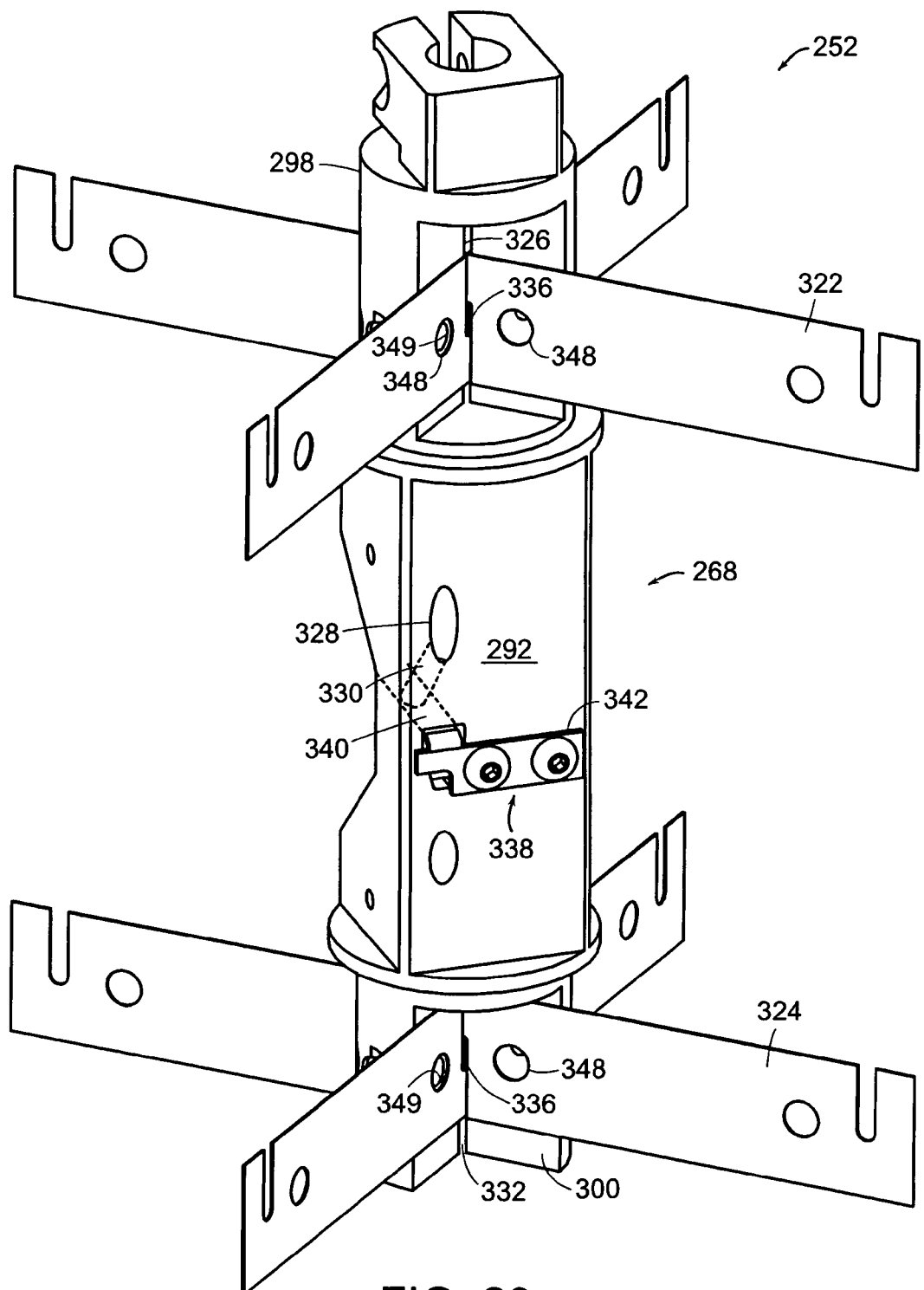
FIG. 23 is a rear view of the swing arm showing the tool clamp flexure of the retention mechanism in accordance with a preferred embodiment of the present invention.

Referring to FIG. 22, the swing arm assembly 252 has a pair of upper flexure blades 322 and a pair of lower flexure blades 324 secured to the swing arm 268. The pair of upper flexure blades 322 intersect each other at a groove 336 in each blade at a slot 326 in the upper hub as best seen in FIG. 23. The pair of lower flexure blades 324 intersect in a similar manner.

Still referring to FIG. 22, the swing arm 268 is shown with a portion broken away. The swing arm has a bore 328 for receiving a screw 330 for retaining the cutting tool 90 as described below with reference to FIG. 23. The center point 98 as best seen in FIG. 2C on the cutting tool edge 96 lies nominally in the front/back plane 302 of the swing arm.

Referring to FIG. 23, a back perspective view of the swing arm assembly 252 is shown. The lower pair of flexure blades 324 are positioned in the lower hub 300 by sliding them up into a slot 332 in the lower hub 300. The upper pair of flexure blades 322 are slid into position one at a time into the slot 326 in the upper hub 298 wherein the blade extending from the left front to the right rear in FIG. 23 is inserted first in position and the other blade is slid above and slid down such that the center grooves slots 336 engage. The center slots 336 are similar to that shown in FIG. 8 as related to the first embodiment.

The swing arm assembly 252 has a tool clamp flexure 338 that has a forward arm 340 as seen in FIG. 22 that is biased by the screw 330 into engagement with the cutting tool 90. Referring back to FIG. 23, the tool clamp flexure 338 has a back 342 that is secured to the rear face 292 of the swing arm 268. The screw 330 provides for biasing the forward arm 340 to secure the tool similar to the arrangement in FIG. 7 as related to the first embodiment. In the alternative, a screw can pull the cutting tool 90 in a downward direction using the lower hole.

Figure 24A:
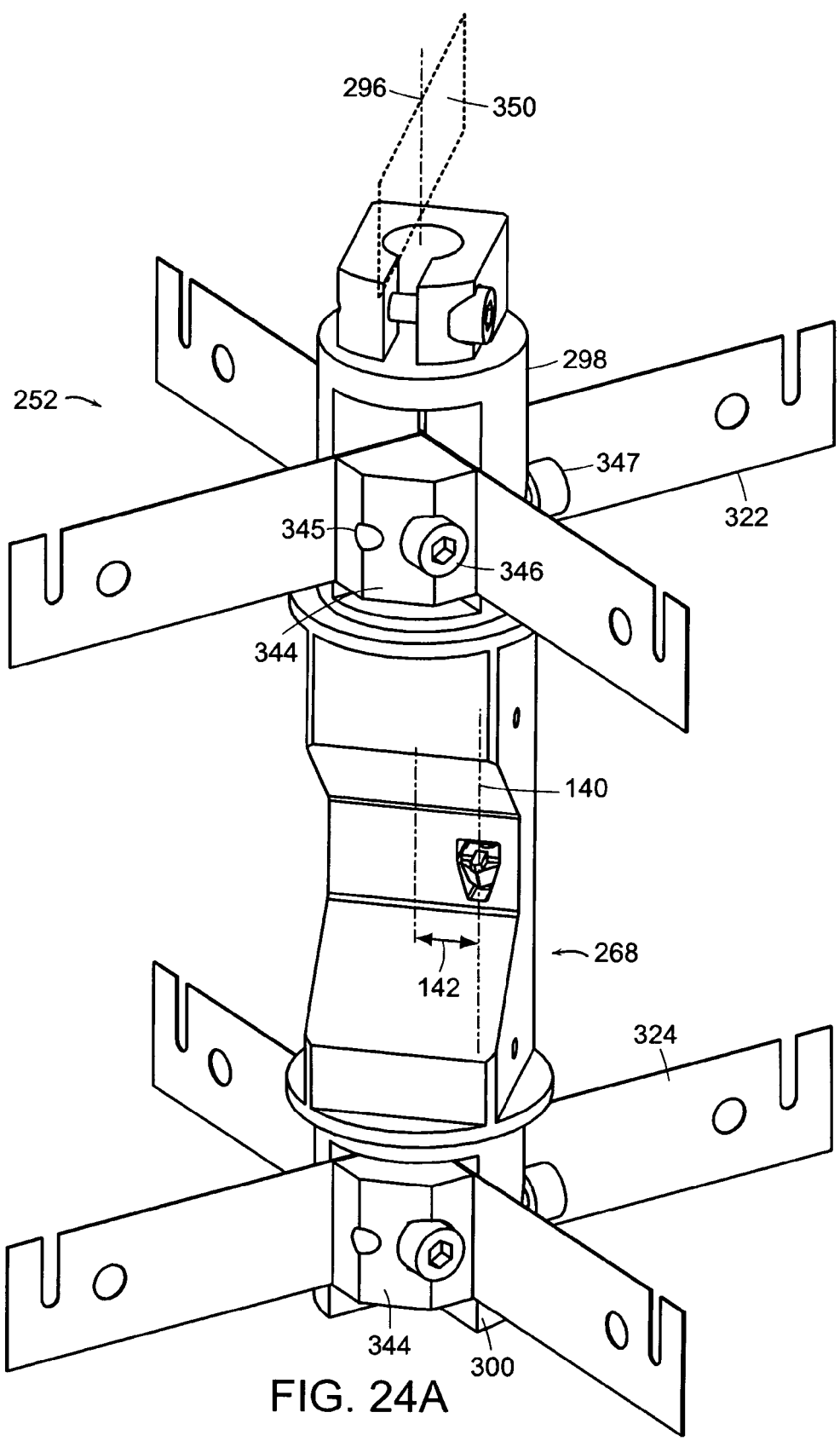
FIG. 24A is a front view of the swing arm showing a clamp mechanism for the pair of flexures in accordance with a preferred embodiment of the present invention.

FIG. 24A shows a front perspective view of the swing arm 268 with the upper pair of flexure blades 322 secured to the upper hub 298 and the lower pair of flexure blades 324 secured to the lower hub 300. The swing arm assembly 252 has a pair of blocks 344 associated with each of the upper hub 298 and the lower hub 300 for securing the respective flexure blades 322 and 324. A fastener 346 extends through the block 344 through a hole 348 in the flexure blade and into a threaded hole 349 in the hub, and a fastener 347 extends through a clearance hole in the hub into a threaded hole 345 in the block 344 as seen in FIG. 23, for securing the flexure blades 322 or 324 between the block 344 and the surface of the sector groove of the hub.

The swing arm 268 has a right/left plane of symmetry 350 that contains the swing arm axis of rotation 296 and is perpendicular to the front/back plane 302 as shown in FIG. 22. The right/left plane of symmetry 350 is analogous to the right/left plane of symmetry 136 as shown in FIG. 5. The slot 138, 139 in the swing arm 268 that receives the cutting tool 90 has a plane of symmetry 140 that divides the slot into a right half and a left half portion. The slot 138, 139 is located in the swing arm 268 approximately midway between the upper hub 298 and the lower hub 300. The slot plane of symmetry 140 is parallel to the right/left plane of symmetry 350 and is offset from the swing arm axis of rotation 296 by a distance equal to the offset radius 142. The center point on the cutting tool (analogous to the center point 98 in FIG. 2C) is in the plane of symmetry 140 of the slot 138, 139 and therefore offset from the swing arm right/left plane of symmetry 350 by a distance equal to this offset radius 142.

Figure 24B:
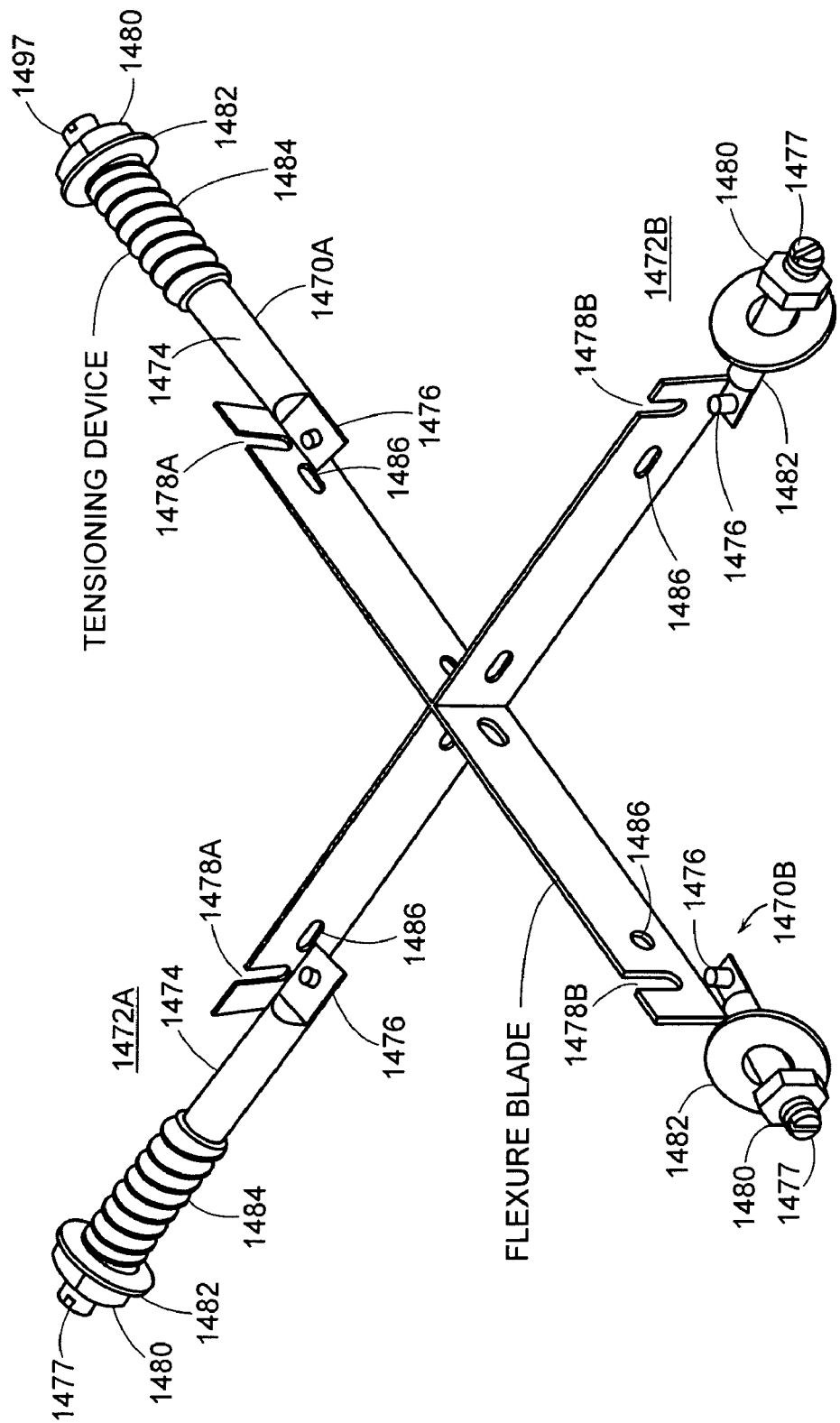
FIG. 24B illustrates a removable tensioning member for use in pre-tensioning flexures.

FIG. 24B illustrates a pair of tensioning member assemblies 1470A, 1470B and 1472A, 1472B, respectively. The tensioning member assemblies 1470, 1472 are used to apply pre-tensioning to upper flexures 322 and lower flexures 324. Each assembly includes a first member 1470A, 1472A, each having a shaft 1474 having a protruberance 1476 on the distal end for engaging a recess 1478 in flexures 322, 324. Each first member 1470A, 1472A further includes a nut 1480 and washer 1482 at the proximate end. A spring 1484 is slidably disposed around shaft 1474. Each assembly further includes a second member 1470B, 1472B having a shaft disposed between a proximate end having a nut 1480 and washer 1482 and a distal end having a protruberance 1476 for engaging a second recess in flexure 322, 324.

Pretensioning flexures is accomplished by placing flexures 322, 324 in the housing and then sliding respective first members 1470A, 1472A and second members 1470B, 1472B into respective recesses in housing such that protruberances 1476 can engage first and second recesses 1478A, 1478B, respectively. The distal ends of the springs 1484 bear against stationary surfaces (relative to the flexures). When the recesses 1478A, 1478B are engaged, then one or more nuts 1480 can be tightened using a wrench, producing a compressive deflection in the spring 1484, which develops a tensile force in the flexure 322 or 324. The nut can be tightened or loosened until a desired tensile force is applied to the flexures 322, 324. A slot 1477 at the proximal end of each member allows restraining rotation of the member while adjusting the nut using a tool such as a screwdriver. When a desired tension is achieved, clamping blocks are secured against flexures 322, 324 with screws passing through clearance holes 1486 such that the flexure is retained in position at the determined tensile force. When the clamping blocks are secure, the first and second tensioning assemblies 1470, 1472 can be removed.

Figure 25:
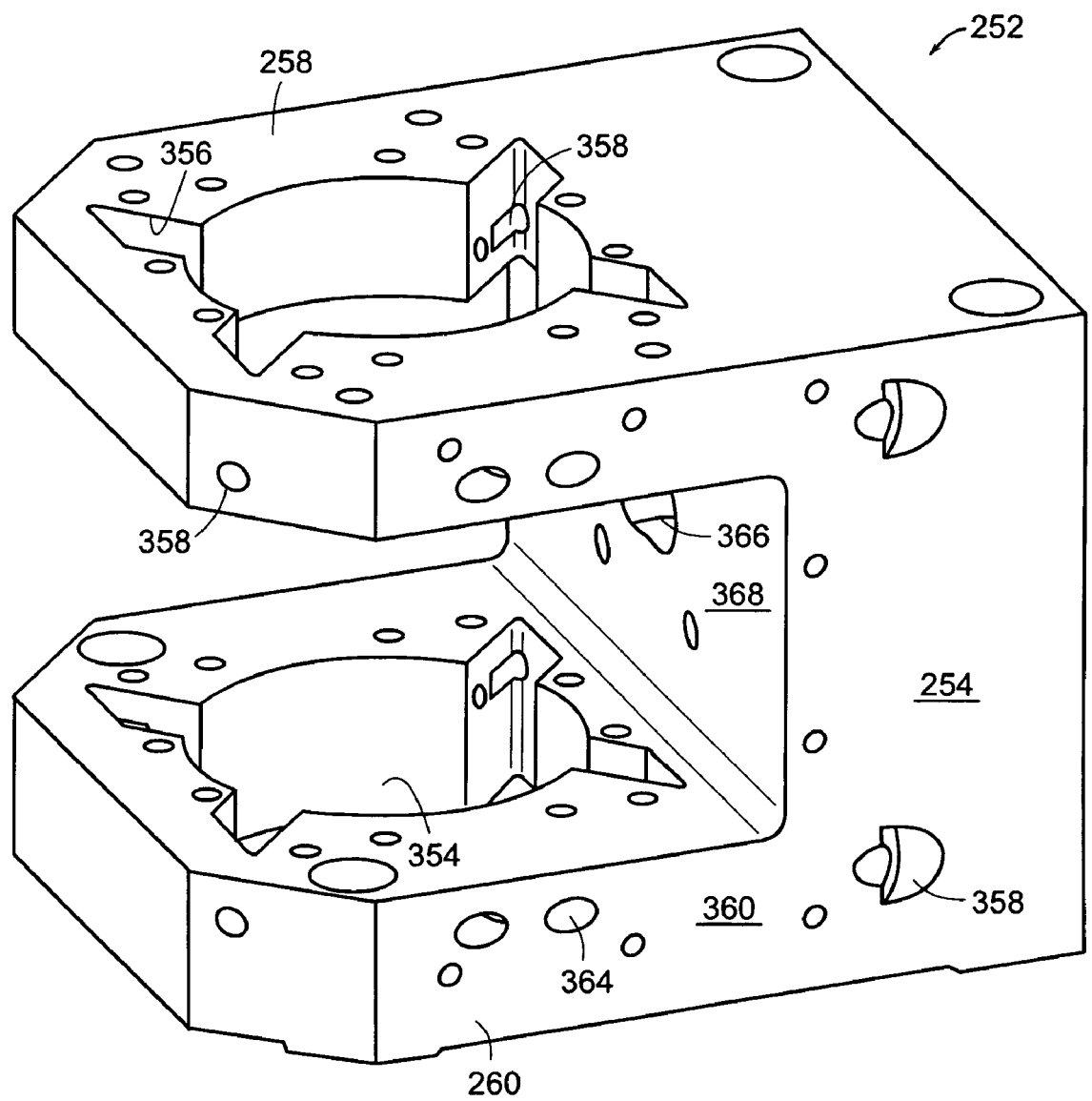
FIG. 25 is a perspective view of the base of the rotary fast tool in accordance with a preferred embodiment of the present invention.

FIG. 25 is a perspective view of the base 254 of the fast tool servo system 250. The base 254 has the upper portion 258 and the lower portion 260 with a generally circular cutout 354 with additional portions cutout 356 for forming an "x" shape for receiving the ends of the flexure blades 322 and 324. The "x" shape is oriented to maximize the clearance between the base 254 and the workpiece 50. In a preferred embodiment the portions cutout 356 are oriented so that the flexure blades 322 and 324 are at a 45° angle from the surface-normal of a workpiece at the point of contact between the cutting tool 90 and workpiece 50.

Figure 26:
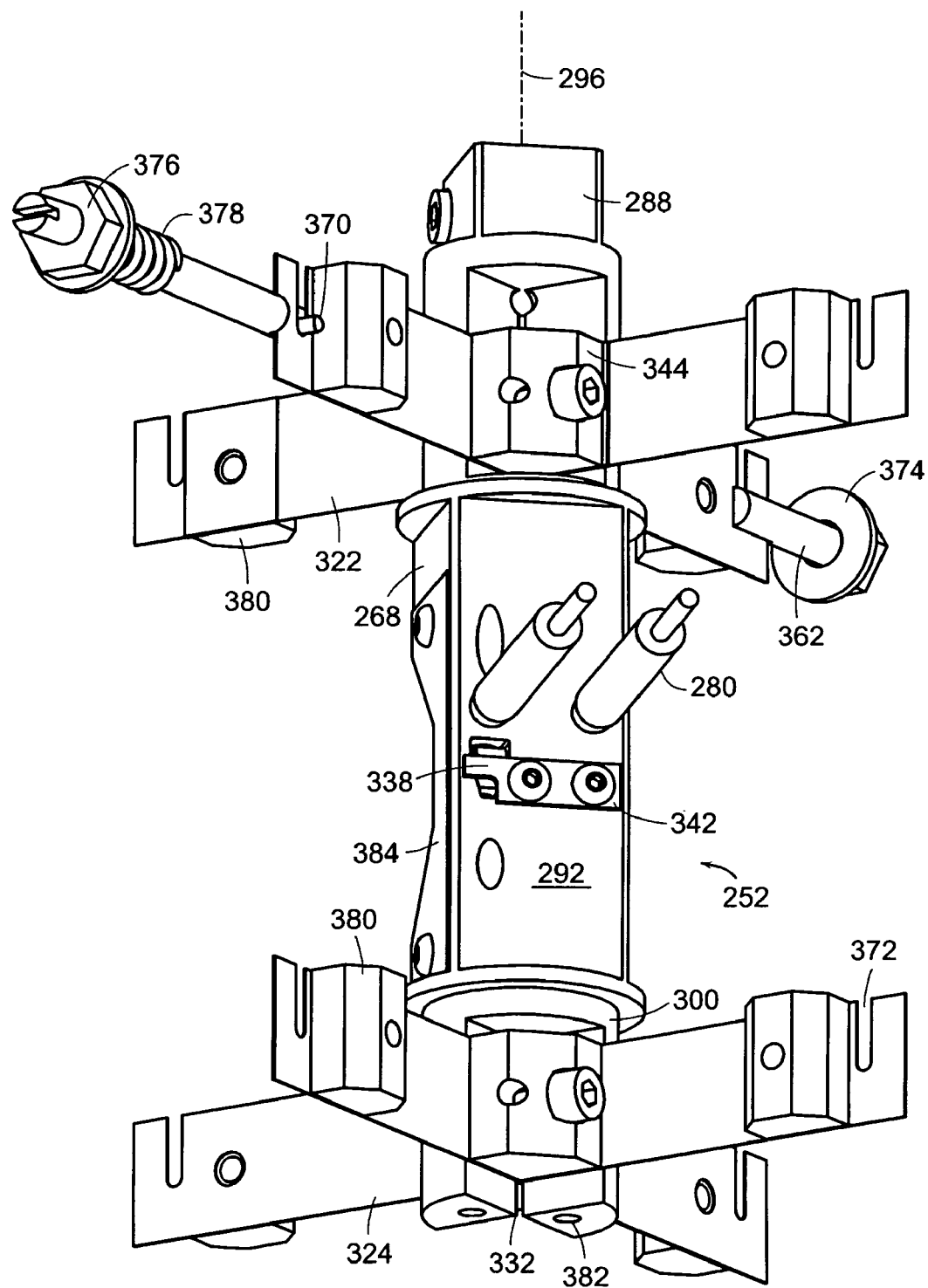
FIG. 26 is a back bottom perspective view of the swing arm with flexure blades, a tensioning device, and sensors in accordance with a preferred embodiment of the present invention.
Figure 27:
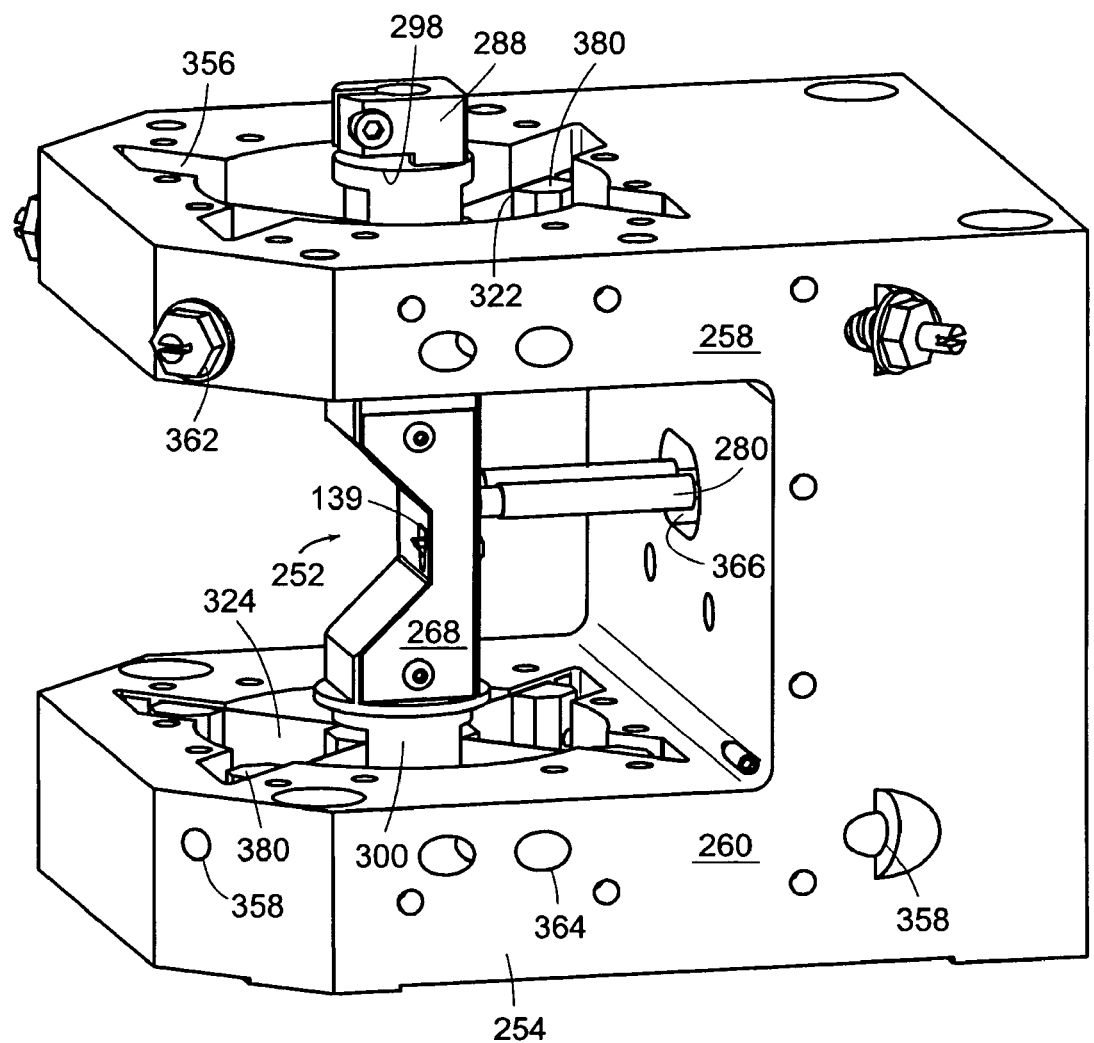
FIG. 27 is a side perspective view of the base with the swing arm in accordance with a preferred embodiment of the present invention.

A plurality of holes 358 extend from the cut-out portions 356 to the outer surfaces 360 of the upper and lower portions 258 and 260 of the base 254 to receive a plurality of tensioning rods 362 as shown in FIG. 26. Additional holes 364 extend from the cut-out portion 356 to the outer surface 360 of the base 254 in order to allow the flexure blades to be secured by a plurality of clamping blocks 380 after being properly tensioned as seen in FIG. 27. The base has an opening 366 on a back surface 368 behind the cylindrical cut-out 354 that is used in conjunction with mounting the sensors 280.

Referring to FIG. 26, a back bottom perspective view of the swing arm assembly 252 including the flexure blades 322 and 324 with one of the four tensioning devices is shown in accordance with a preferred embodiment of the present invention. Each of the upper and lower flexure blades are placed in tension prior to fixing the blades 322 and 324 to the base. One of the upper flexure blades 322 is shown with a pair of tensioning rods 362. Each tensioning rod 362 has a pin 370 that is received in a slot 372 in the flexure blade 322 or 324. The tensioning rod 362 has a washer 374 and a threaded nut 376 at the other end which engage the base 254 in pulling the ends of the flexure blades 322 away from each other (i.e., place the blade in tension). One of the tensioning rods 362 has a spring device 378 for providing a finely controlled tension force on the flexure blades 322 or 324 as the nut 376 is turned. Differentially adjusting the nuts 376 on a pair of tensioning rods 362 causes displacement of the swing arm axis of rotation 296, in a direction along the long axis of that pair of tensioning rods, relative to the base 254. By differentially adjusting each of the four pairs of tensioning rods 362 the orientation and location of the swing arm axis of rotation 296 can be adjusted relative to the base 254 before the outer ends of the flexure blades 322 and 324 are fixed to the base with the clamping blocks 380. The clearance hole in the flexure blade is large enough to accommodate this adjustment without interference.

Each flexure blade 322 has a pair of clamping blocks 380 mounted to the blade that are received within the cut-out portion 356 of the base 254. These blocks 380 each receive a fastener to secure the flexure blades 322 and 324 to the base 254 in tension after the swing arm axis of rotation 296 is aligned to the base 254 and the flexure blades are tensioned.

In addition, still referring to FIG. 26, the lower portion of the lower hub 300 has a pair of attachment holes 382 below where the lower flexure blades 324 are slid into position in the slot 332. If the damping plate 308 is attached, such as shown in FIG. 21, the damping plate 308 is attached to the lower hub 300 using these attachment holes 382.

On each side of the center portion of the swing arm 268 there are disposed a pair of plates 384, one shown in FIG. 26, for help in damping unwanted motion of the swing arm 268. The back 342 of the tool clamp flexure 338 is secured to the rear face 292 of the swing arm 268. In a preferred embodiment, the eddy current sensors 280 are shown engaging the rear face 292 of the swing arm 268.

Referring to FIG. 27, the swing arm assembly 252 is positioned in the base 254, the hubs 298 and 300 are located in their respective cylindrical cut-out 354 portion. The clamping blocks 380 for securing the swing arm assembly 252 to the base 254 are shown such that the flexure blades 322 and 324 are interposed between the blocks 380 and the wall of the additional cutout 356. The tensioning rods 362 are shown extending through the hole 358 in the upper portion 258 of the base 254. The additional holes 364 are used to secure fasteners to the clamping block 380 to retain the flexure blades 322 and 324.

The sensors 280 are shown extending from the opening 366 in the base 254 to the swing arm 268. The tensioning rods 262 are shown in the upper portion; similar rods are used in the lower portion but are not shown in this figure. After the flexure blades 322 and 324 are fixed to the base 254 by the clamping blocks 380, the tensioning rods 362 can be loosened by backing off nuts 376, although it is generally not necessary to do so. The cutting tool 90 is projecting from the slot 138, 139 in the swing arm 268.

Referring to FIG. 28, the upper chip shield 270 and the lower chip shield 272 are shown secured to the base 254. The swing arm 268 has a pair of annular rings or skirts 390 that interact with the shields 270 and 272 as described with respect to the first embodiment.

The swing arm assembly 252 has a plurality of hard stops 392. The hard stops 392 are retained by the upper chip shield 270. The hard stops 392 prevent excessive rotation of the swing arm 268 that can damage the flexure blades 322 and 324, and work identically as described and shown in the embodiment illustrated in FIG. 14. Referring to FIG. 14, a small gap 213 between an end of each hard stop 392 (212) and the swing arm 268 (102) allows normal rotation of the swing arm. The hard stops 392 (212) act in pairs to limit the rotation angle of the swing arm 268 (102) to prevent damage to the upper and lower pairs of flexure blades 322 and 324. Excessive rotation of the swing arm 268 (102) causes closure of a pair of gaps 213 that limits rotation of the swing arm.

The sensors 280 are shown in a mounting block 394 mounted to the back face or back surface 368 of the base 254. The output shaft 286 of the actuator 256 is held by the clamp 288 to connect the actuator 256 to the swing arm assembly 252. It is recognized that a flexible coupling can be used between the output shaft 286 and the swing arm assembly 252 to accommodate misalignment, between the output shaft of the actuator and the swing arm assembly.

Figure 29:
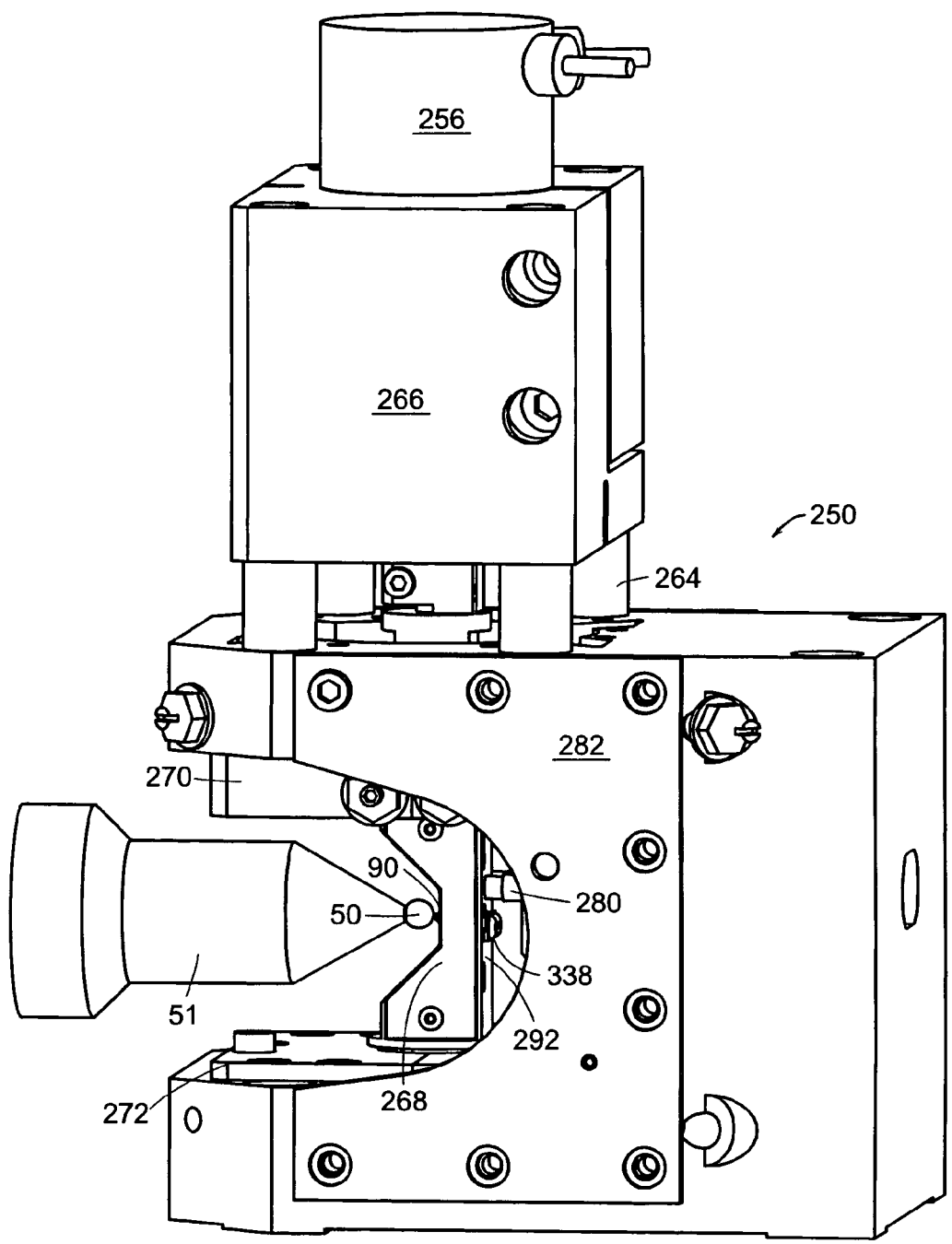
FIG. 29 is a side perspective view of the rotary fast tool servo showing an enclosure encircling the actuator and a side stiffener on the base in accordance with a preferred embodiment of the present invention.

FIG. 29 is a side view of the fast tool servo system 250 in accordance with a preferred embodiment of the present invention and is a view similar to that of FIG. 20. The cutting tool 90 is shown engaging the working piece 50 retained on the workpiece holder 51. The upper chip shield 270 and the lower chip shield 272 protect the upper flexure blades 322 and the lower flexure blades 324, as seen in FIG. 27 from chips and debris that are produced during machining. The sensor 280 is shown engaging the rear face 292 of the swing arm 268. In addition, the tool clamp flexure 338 is shown secured to the swing arm.

The thermal insulating spacers 264 restrict the flow of heat from the actuator 256 into the base 254. The enclosure 266 encircles the actuator 256 to allow controlled removal of heat. The side stiffeners 282 stiffen the base 254.

In a preferred embodiment, the system for a high bandwidth rotary fast tool servo establishes the swing arm axis of rotation 296 and 46 in a vertical direction. Other preferred embodiments of the system can establish the swing arm axis of rotation 296 in a horizontal direction, or any other direction, depending on the intended application of the fast tool servo.

In operation, the fast tool servo 250 is used in conjunction with the machine tool 240, for example, a precision lathe, as shown in FIG. 18. The spindle 243 rotates about a horizontal axis whereas the rotating table 242 rotates about a vertical axis. In addition, one of the units moves in the cross-slide direction that is in and out of the page with respect to FIG. 18 whereas the other one is capable of moving into the in-feed slide position that is in a left and right direction. The position and velocity of the cross-slide and in-feed slide are measured within a precision lathe controller 412. In addition, the rotation position and velocity of the workpiece 50 and the auxiliary spindle (rotary table) 242 can be measured with sensors located in the machined tool 240.

Figure 31:
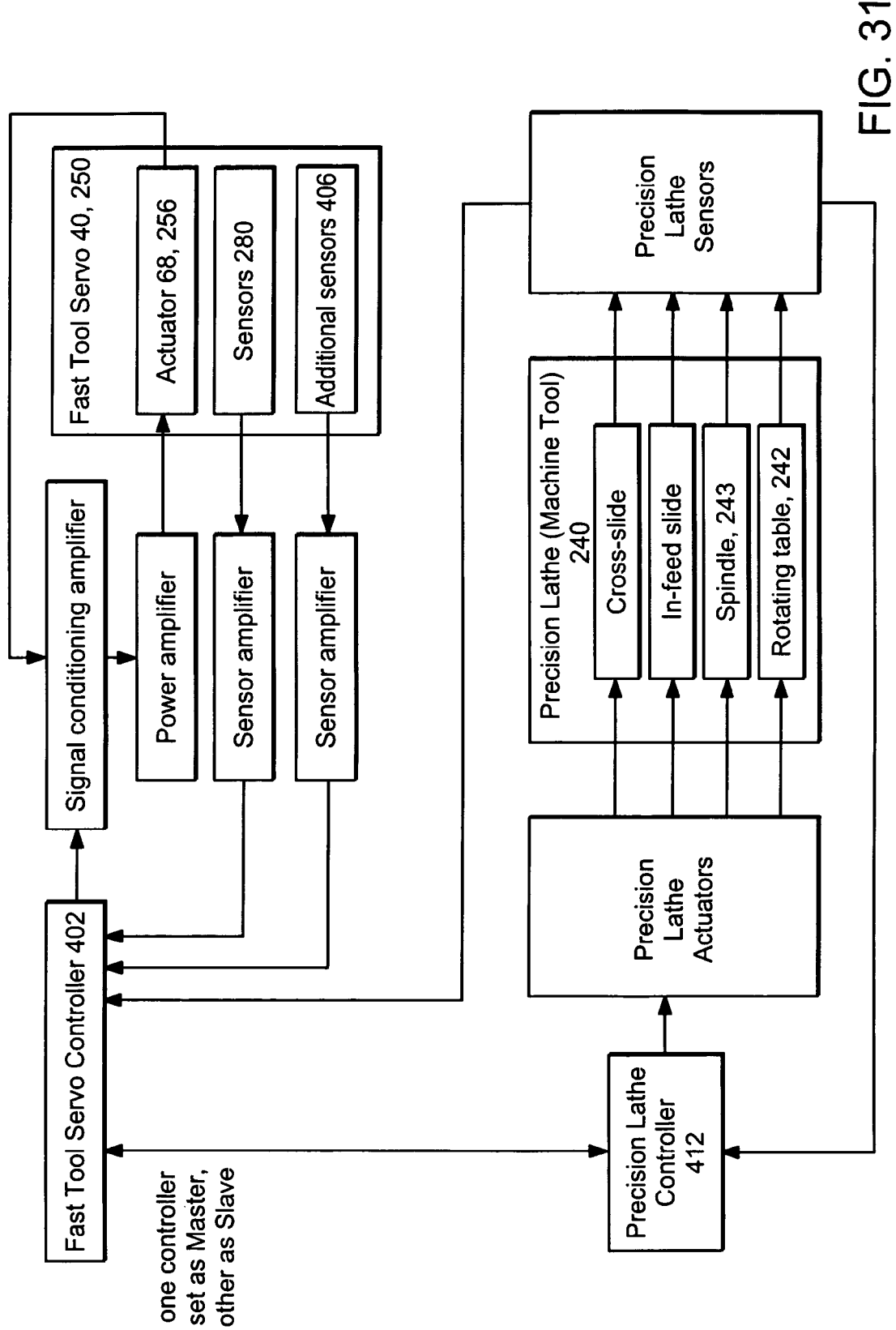
FIG. 31 is a schematic of a control system in accordance with a preferred embodiment of the present invention.

FIG. 31 shows a schematic diagram of the inter-relationship in control of the fast tool servo system 250 with that of a precision lathe or machine tool 240. The machine tool 240 with rotating table 242 such as shown in FIGS. 18, 19, or 32A-C has sensors to determine the position of the workpiece spindle 243 and therein the workpiece 50. The spindle 243 is held by a base unit which is capable of moving in at least one direction. The position of the base unit, the rotational speed and position of the workpiece spindle 243 form inputs into a precision lathe controller 412. The rotating table 242, on which the fast tool servo 250 is mounted, is capable of being moved in a controlled fashion in a direction perpendicular to the direction of the base unit in addition to rotating about a vertical axis. The translational and rotational positions of the rotating table are likewise input into the precision lathe controller 412. In addition to the sensors within the precision lathe 240, the fast tool servo 250 has a plurality of sensors 280 and 406. With respect to the base 254, the position of the swing arm 268 is detected. With sensors such as, for example, sensors 280 as shown in FIG. 29, the rotation position and translation of the swing arm 268 in a direction perpendicular to its front/back plane 118, 302 is detected.

The fast tool servo controller 402 uses feedback information via the sensor amplifiers from the sensors 280 and additional sensors 406 to compute the position and velocity of the tool 90, and produces a command signal for the fast tool servo actuator 256. The command signal from the fast tool servo controller 402 to the actuator 256 is modified by a signal conditioning amplifier that uses feedback from the actuator 256, and the signal indicative of the modified command forms an input to a power amplifier that drives the actuator 256. The fast tool servo controller 402 may synthesize angular velocity information for the swing arm 268 from the position sensors. In an alternate embodiment, a velocity sensor such as, for example, a tachometer is disposed on the actuator.

In a preferred embodiment, the fast tool servo controller 402 is the master controller and the precision lathe controller 412 is the slave controller. Sensors associated with the precision lathe 240 may provide feedback information regarding the position and velocity of the cross-slide, in-feed slide, spindle, and rotating table to both the precision lathe controller 412 and the fast tool servo controller 402. The fast tool servo controller 402 uses the precision lathe sensor information and the fast tool servo sensor information 280 and 406 to compute the spatial relationship between the workpiece 50 and the tool 90. The fast tool servo controller 402 compares the computed relationship between the workpiece 50 and the tool 90 to the desired relationship between the workpiece and the tool, and generates commands to the precision lathe controller 402 to position and orient the cross-slide, in-feed slide, spindle, and rotating table, and also generates commands to the fast tool servo controller to position the tool 90. The precision lathe controller uses feedback information from the precision lathe sensors to compute signals that are issued to the precision lathe actuators to affect the commanded positions and orientations of the cross-slide, in-feed slide, spindle, and rotating table. The fast tool servo controller 402 uses feedback information via the sensor amplifiers from the sensors 280 and additional sensors 406 to compute the position and velocity of the tool 90, and generates a command signal for the fast tool servo actuator 256. The command signal from the fast tool servo controller 402 to the actuator 256 is modified by a signal conditioning amplifier that uses feedback from the actuator 256, and the signal indicative of the modified command forms an input to a power amplifier that drives the actuator 256.

In a preferred embodiment, the fast tool servo system can be a computer numeric control (CNC) machine tool system. A preferred embodiment of the present invention can include a programmable computer.

In an alternate embodiment the precision lathe controller 412 is the master controller and the fast tool servo controller 402 is the slave controller. In this embodiment the fast tool servo controller 402 is responsible for local control of the tool 90 as described with respect to the previous embodiment, and the precision lathe controller 412 is responsible for local control of the precision lathe 240 as described hereinbefore. In this embodiment, the fast tool servo controller 402 may provide the precision lathe controller 412 with information on the position and velocity of the tool 90. The precision lathe controller 412 treats the fast tool servo system 250 as an additional machine axis under its command and synchronizes the position and velocity of the tool 90 with the position and velocity of the cross-slide, in-feed slide, spindle, and rotating table in accordance with the desired relationship between the tool 90 and workpiece 50.

In a preferred embodiment, the fast tool servo controller 402 with an actuator 256 having the capability of two-thousand movements per second and a range of travel of ±0.14 degrees, sensors 280, and an offset radius 142 of 5 mm allows the fast tool servo 250 to develop a tool tip acceleration in excess of 25 g's following a 5 micron peak to valley sinusoidal surface with 50 nm accuracy at 2 kHz.

Figure 30:
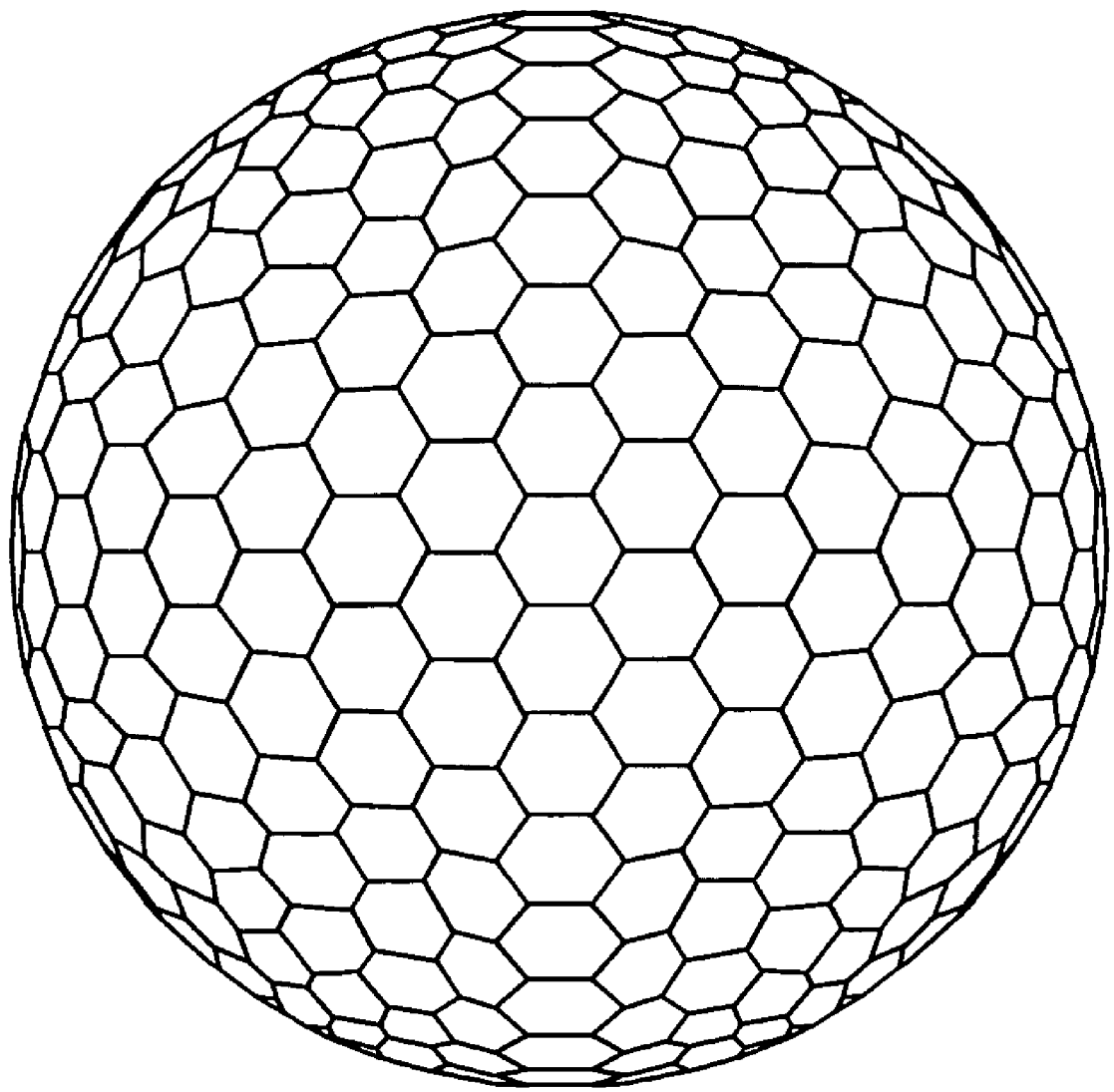
FIG. 30 is a front view of an exemplary workpiece in accordance with a preferred embodiment of the present invention.

The cutting edge 72 on the cutting tool 90 is spaced from the axis of rotation 46, 296 by an offset radius 142 as shown in FIGS. 5 and 24. Rotation of the swing arm 102, 268 caused by the actuator 68 causes a controlled rapid movement of the cutting edge into and out of engagement with the workpiece as the spindle rotates therein, allowing the production of workpieces with complex shapes. For example, referring to FIG. 30, a stasphere shape having a plurality of icosahedron or multiside polyhedron features such as, for example, depressions or dimples with smooth or abrupt transitions between surfaces is produced by the rotation of the workpiece on the spindle as the cutting edge is moved into and out of engagement with the material while the rotating table 242 carries the fast tool servo 40, 250 from the pole of the workpiece to its equator. In addition, the applications of the preferred embodiments include production of lenses for telescopes or ophthalmics.

Figure 32A:
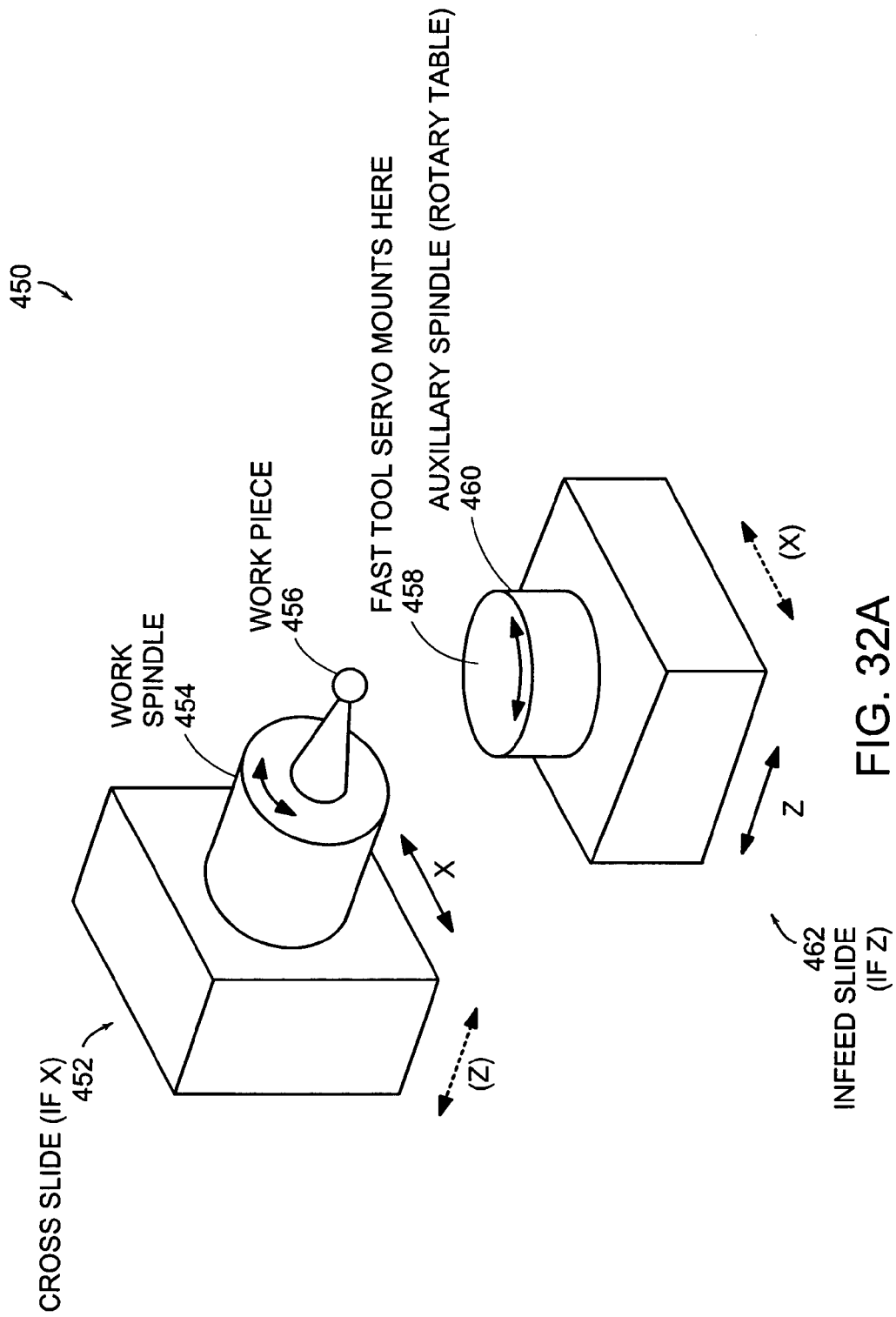
FIG. 32A is a perspective view of a lathe with a workpiece and an auxiliary rotary table without the fast tool servo in accordance with a preferred embodiment of the present invention.
Figure 32C:
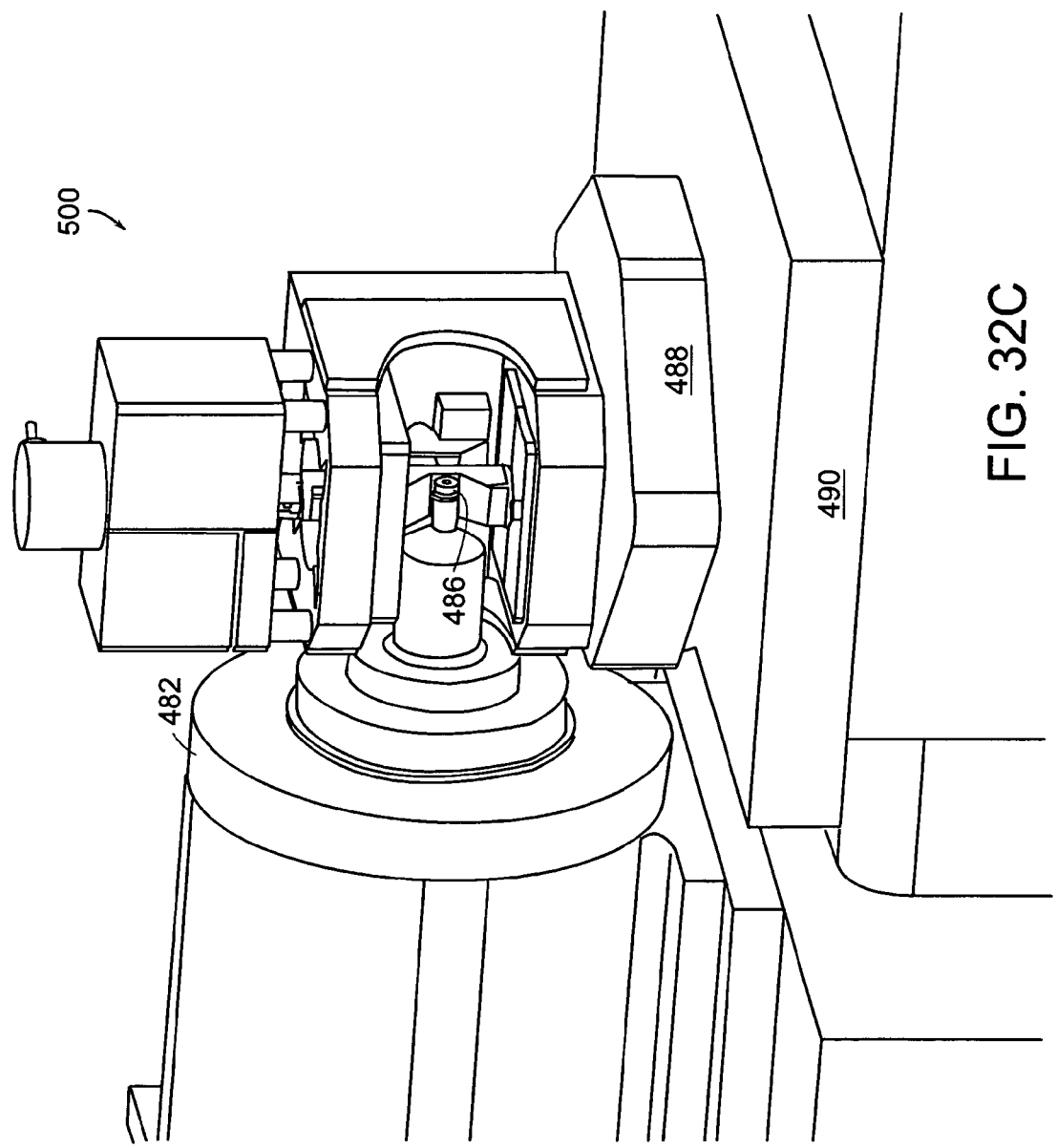

FIGS. 32B and 32C illustrate views of a precision lathe having a workpiece 486 and a fast tool servo system in accordance with a preferred embodiment of the present invention. These figures illustrate enlarged views of the fast tool servo system which is placed on a rotary table 488, in relation to the workpiece 486, the cross-slide 452 and in-feed slide 462 described hereinbefore.

FIGS. 33A and 33B are schematic diagrams of a variable reluctance actuator in accordance with a preferred embodiment of the present invention. In a preferred embodiment the actuator and swing arm are an integral unit. This embodiment includes a normal-direction variable reluctance rotary actuator for an approximately 10 kHz and higher rotary fast tool servo system. Two pairs of actuators provide back and forth rotation of a swing arm 530 that holds a tool 522 at a location spaced from the axis of rotation, creating a tool motion towards and away from a workpiece. In a preferred embodiment, using a flux density of approximately 1.5 Tesla, a 1000 g's of tool acceleration required to follow a 5 micron peak-to-valley sinusoidal surface at, for example, greater than 10 kHz can be achieved. This embodiment operates using the principle of variable reluctance wherein a force is generated between two components in a magnetic circuit as it naturally attempts to reduce the overall reluctance of the magnetic circuit. In the present embodiment, reducing one or more of the air gaps between the movable rotor 546 and the stator 543 reduces the reluctance of the magnetic circuit. The permanent magnets 540 and 542 provide magnetic flux biasing so that the magnetic flux generated by the current (i) in the coils 544 causes rotation of the rotor 546. The permanent magnets 540 and 542 produce a constant bias flux through the rotor 546.

For the direction of the current (i) shown in FIG. 33B the magnetic flux generated by the coils 544 adds to the flux produced by the permanent magnets 540 and 542 in the upper left corner of the rotor 530 and the lower right corner of the rotor, and subtracts from the flux produced by the permanent magnets in the lower left corner and in the upper right corner, causing clockwise rotation of the rotor. Reversing the direction of the current (i) shown in FIG. 33B causes the magnetic flux generated by the coils 544 to add to the flux produced by the permanent magnets 540 and 542 in the lower left corner of the rotor 530 and the upper right corner of the rotor, and subtracts from the flux produced by the permanent magnets in the upper left corner and the lower right corner, causing counter clockwise rotation of the rotor. One benefit of the bias flux is that it linearizes the torque versus current relationship for the actuator. Another benefit is that it reduces the reactive power needed to drive the alternating flux in the air gaps by a factor of four compared to a non-biased magnetic circuit.

In an alternative embodiment, a current-carrying coil around a magnetic material can be used to establish the constant bias flux through the rotor. A normal-direction variable reluctance actuator is an electromagnet that closes the gap between itself and a target. The attractive force increases with the inverse of the gap squared and can thus provide a small stroke actuator with a high force density. FIG. 33B illustrates stators having windings 544 which can be formed out of various coils. A permanent magnet system 540, 542, is disposed between the stators. A rotor 530 is disposed in the center of the permanent magnets. The system induces a force that provides for the back and forth rotation of the rotating swing arm, or rotor, 530 that holds the tool 522. The geometry of the flexures 524, 526, 528 is optimized to provide the necessary guidance and support of the swing arm.

Figure 34A:
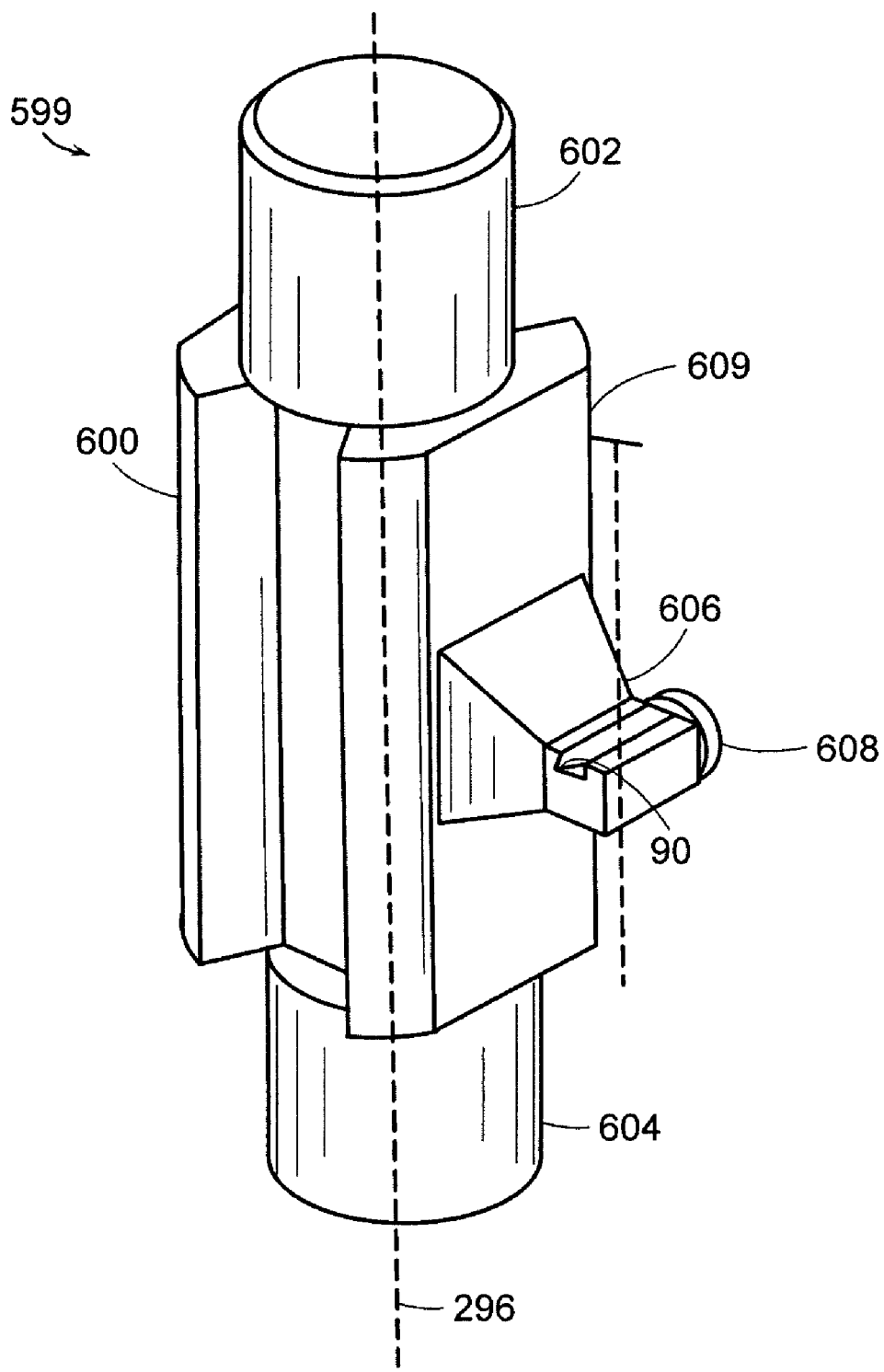
FIG. 34A illustrates an embodiment of a magnetically conductive rotor.
Figure 34B:
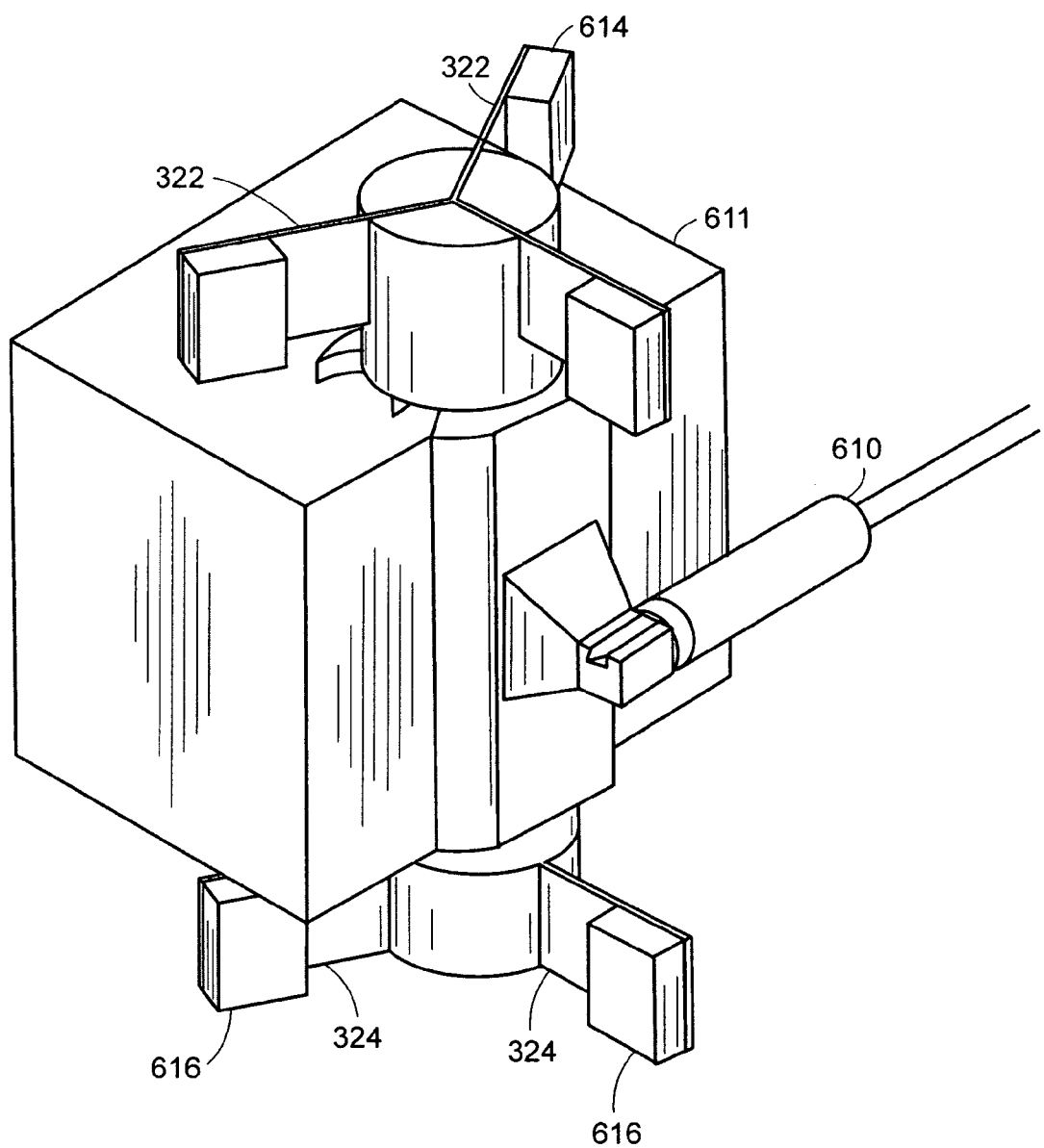
FIG. 34B illustrates an embodiment of the magnetically conductive rotor mounted in a stator.

FIG. 34A illustrates an embodiment for a rotary fast tool servo (FTS) having a magnetically conductive rotor 600 having an upper hub 602 and lower hub 604 attached thereto. In addition, rotor 600 has a tool swing arm 606 attached substantially midway between the upper hub 602 and lower hub 604. Rotor 600 may be fabricated from soft magnetic materials using methods known in the art. Fabricating rotor 600 from magnetic materials such as laminated iron alloys lets rotor 600 convey magnetic flux efficiently during operation. Tool swing arm 606 may be attached to rotor 600 using techniques such as, for example, adhesive bonding or mechanical attachment. Tool 90 is attached to swing arm, or foundation, 606 using releasable mechanical attachment techniques so that tool 90 can be replaced when cutting edge 96 becomes worn. A position sensor target 608 may be located proximate to tool 90 for use in monitoring the position of tool 90. In an embodiment, position sensor target 608 is communicatively coupled to a capacitance sensor 610 (FIG. 34B). The embodiment of FIG. 34A differs from previously discussed embodiments in that the swing arm is attached directly to the rotor 600 on which the actuation forces are generated. As with previously discussed embodiments, the tool 90 extends outward from the axis 296 by a determined distance, herein referred to as offset 609.

Figure 34C:
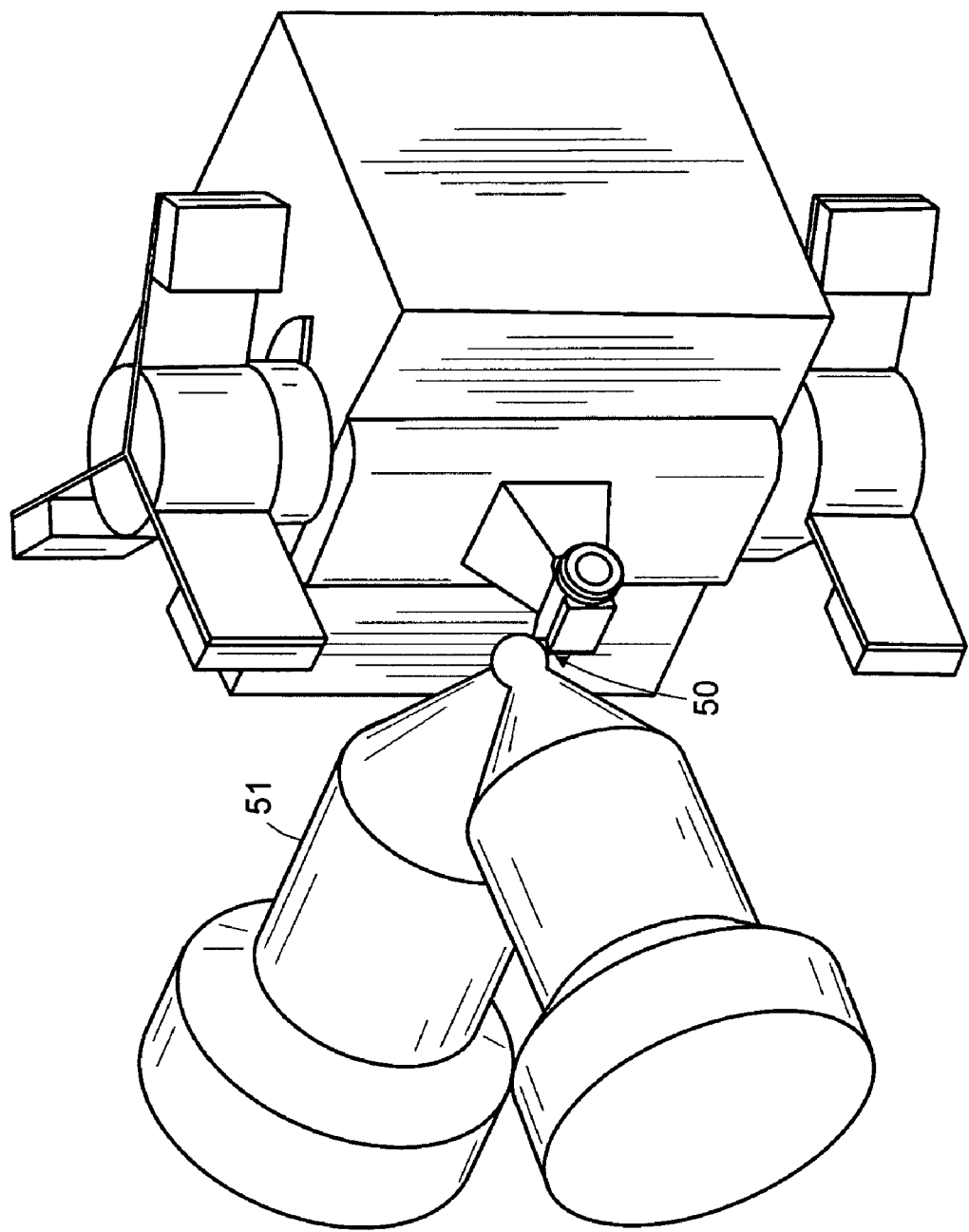
FIG. 34C illustrates a perspective view of a workpiece being operated on by a tool mounted on the magnetically conductive rotor.

FIG. 34B illustrates magnetically conductive rotor 600 installed in a stator 611 and coupled to capacitance sensor 610. Upper flexures 322 and lower flexures 324 are employed with upper clamping block 614 and lower clamping block 616, respectively. In the embodiment of FIG. 34B, flexures 322, 324 may have dimensions of approximately 0.010 inches thick×0.5 inches tall×0.375 inches long. FIG. 34C shows a perspective view of tool 90 engaging a workpiece 50 which is retained by holder 51.

Figure 34D:
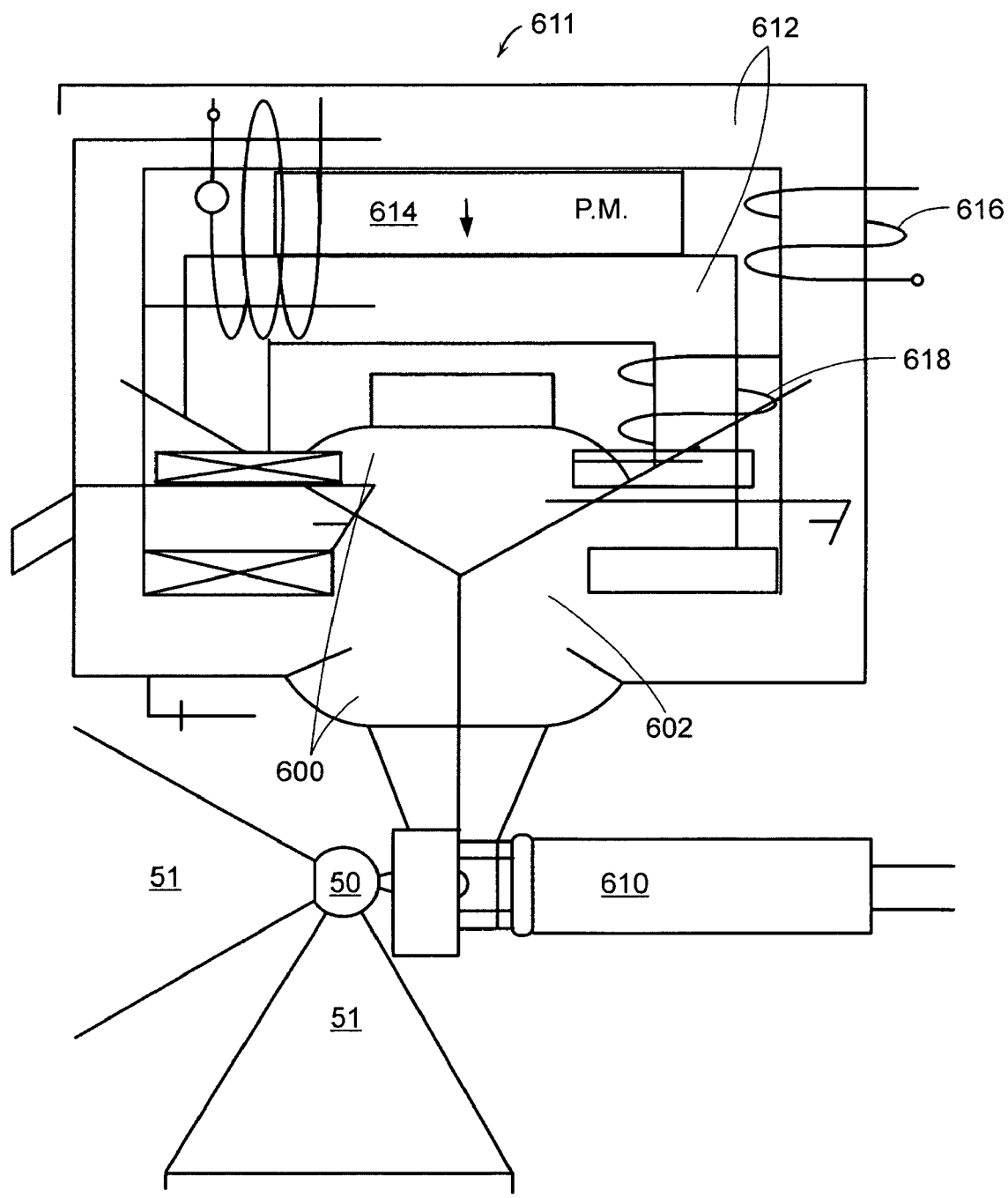
FIG. 34D illustrates a schematic plan view of an embodiment incorporating the magnetically conductive rotor.

FIG. 34D illustrates a schematic plan view of the magnetically conductive rotor 600 and stator 611. Stator 611 includes two stator cores 612, and may include electromagnets and permanent magnets for generating constant and alternating magnetic fluxes required for manipulating tool 90. For example, stator 611 can include a permanent magnet 614, an inner winding 618, and an outer winding 616. If desired, the gaps between the stator cores 612 and rotor 600 can be filled with a viscous substance such as grease or oil to provide squeeze-film damping of non rigid-body modes of the rotor and for easing impacts associated with hard stopping rotor 600 which occurs when it makes contact with the stator core 612. In addition, the stator core can be layered by fabricating it out of sheets of soft magnetic material that are alternated with sheets of electrically nonconductive material for improved efficiency.

Figure 35A:
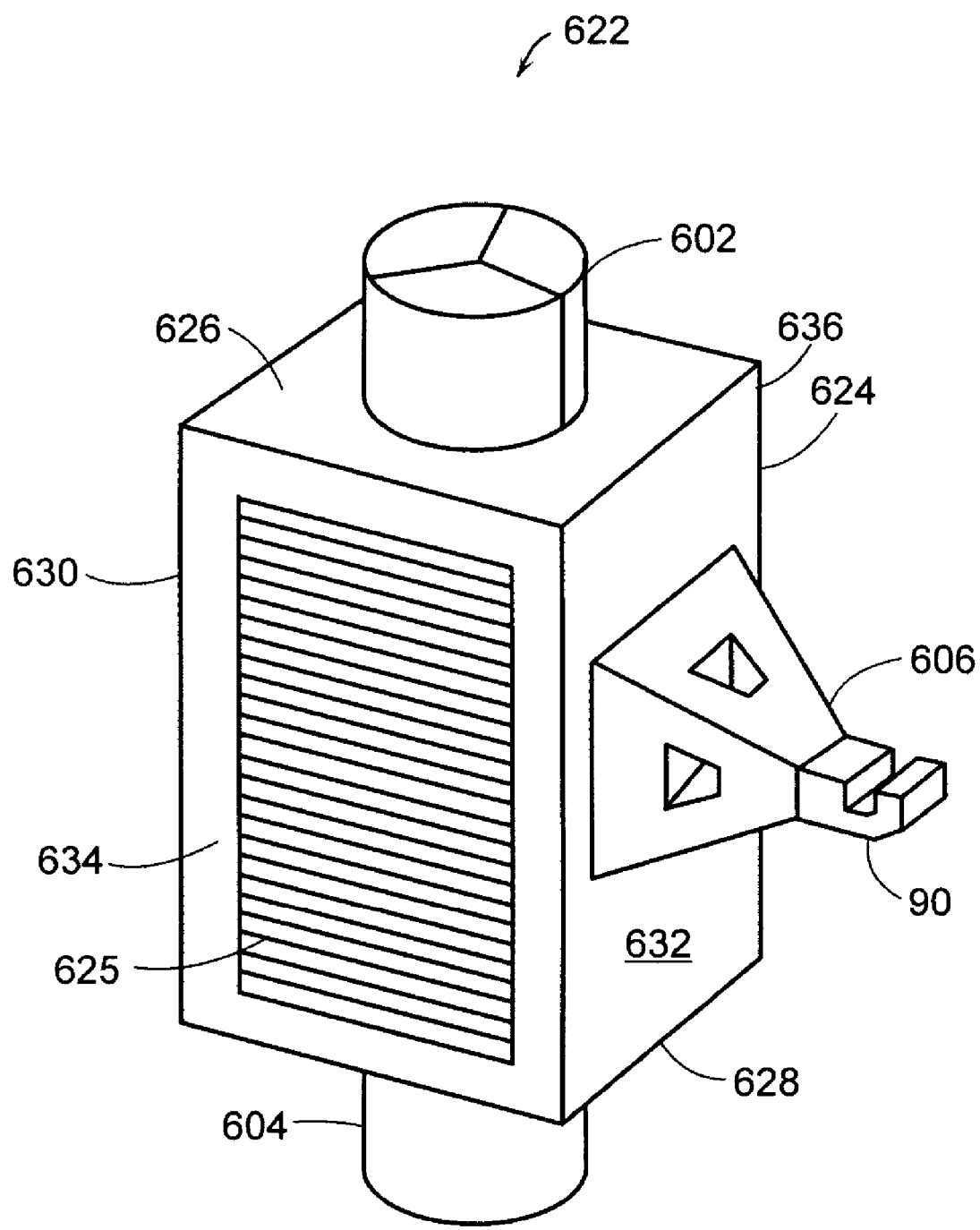
FIGS. 35A and 35B illustrate embodiments of a rotor employing a shell and laminate stack having magnetically conductive layers.

Still other embodiments of rotor 600 are possible. For example, a square rotor 622 can be implemented as shown in FIG. 35A. In FIG. 35A, a square rotor 622 includes an outer shell 624, an upper hub 602, a lower hub 604, a tool swing arm 606, a tool 90 and a laminated rotor stack 625. Shell 624 is connected to upper hub 602 at one end and lower hub 604 at the opposing end. Shell 624 is attached to swing arm 606.

Shell 624 has an upper surface 626, a lower surface 628, a first side face 630, a second side face 632, a first framed side 634 and a second framed side 636. Upper surface 626 is coupled to upper hub 602. Lower surface 628 is oppposedly mounted from upper surface 626 and coupled to lower hub 604, first side face 630 and second side face 632 are oppposedly mounted and span between upper surface 626 and lower surface 628. First framed side 634 and second framed side 636 are oppposedly mounted and span the distance between upper surface 626 and lower surface 628. The four sides enclose a volume which is substantially filled with a laminate stack 625 consisting of alternating layers of soft magnetic laminate material and electrically insulating laminate material. The rotor laminates can be held in place using adhesive bonding such as, for example, epoxy to ensure that laminate stack 625 remains in place within the enclosed volume of rotor 600. Mechanical retention devices can also be used for further retaining laminate stack 625. Upper hub 602 and lower hub 604 can be used with flexures 322, 324 or with other components such as hydrostatic bearings. Use of shell 624 provides torsional stiffness to rotor 600 when operating on a workpiece 50. In an alternative embodiment, the rotor laminate stack 625 or the stator laminated core 612 can be made from a non-laminated soft magnetic material, for example, compacted powdered iron-alloy metal.

Figure 35B:
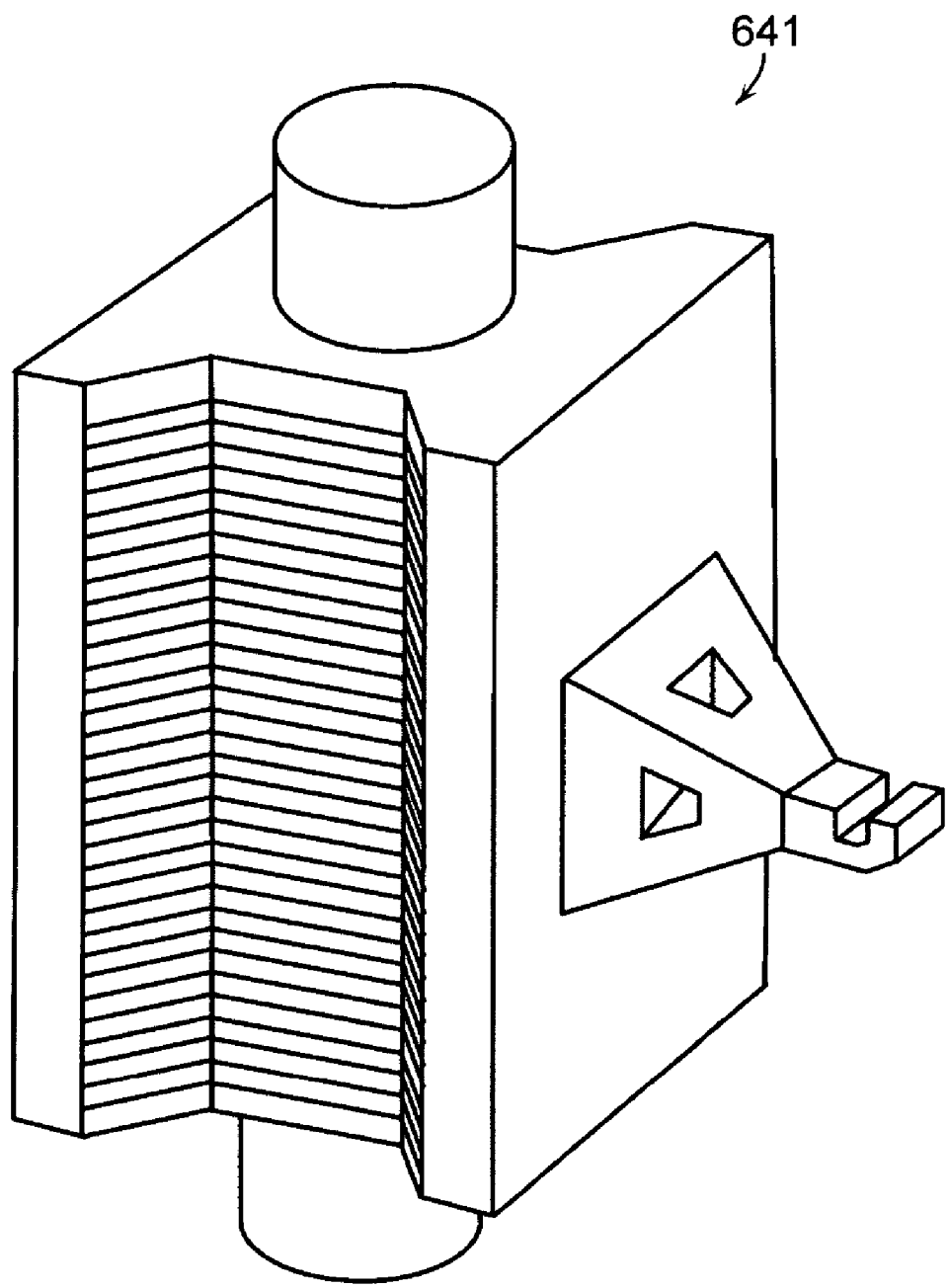

FIG. 35B illustrates a perspective view of an alternative embodiment of a rotor having a shelled configuration. The configuration of FIG. 35B may produce greater torque, when compared to the embodiment of FIG. 35A because it employs a longer lever arm by way of its shape. The embodiment of FIG. 35B is referred to as an x-rotor because of its shape when viewed from above.

Figure 35C:
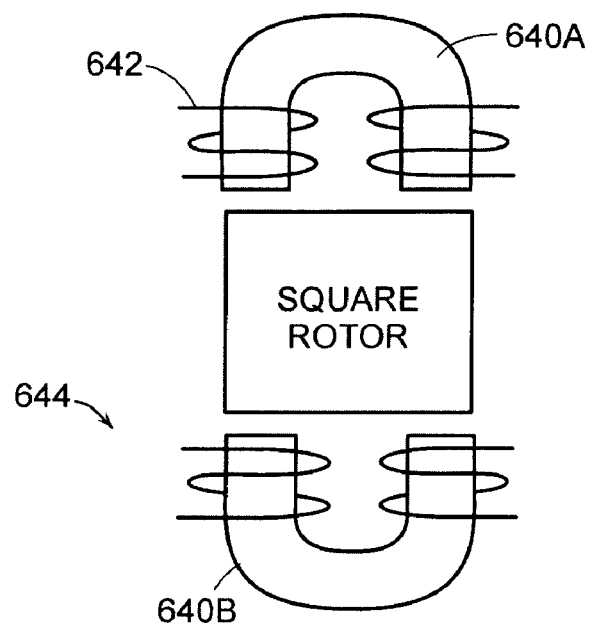
FIGS. 35C and 35D illustrate exemplary stator geometries for use with the rotors of FIGS. 35A and 35B, respectively.
Figure 35D:
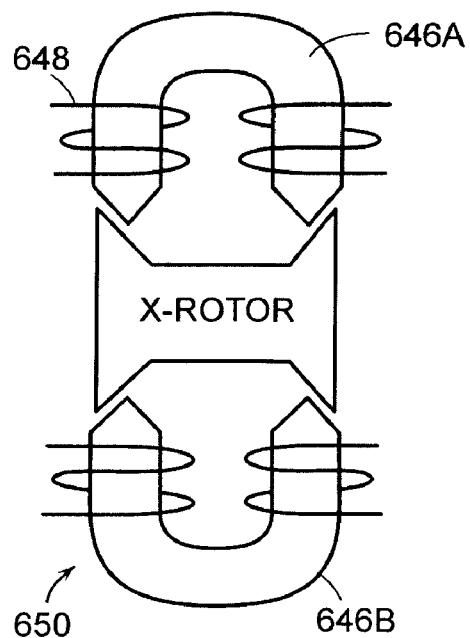

FIGS. 35C and 35D illustrate plan views of the square rotor (FIG. 35A) and x-rotor (FIG. 35B) along with exemplary stator configurations. FIG. 35C employs "U" shaped stator cores 640A, B having a first set of windings 642 and a second set of windings 644. FIG. 35D employs "U" shaped stator cores having ends cut in a "V" configuration, herein referred to as v-stator cores 646A, B, to provide uniform gaps with the x-rotor. V-stator cores 646A, B have a first v-winding set 648 and a second v-winding set 650.

Figure 36A:
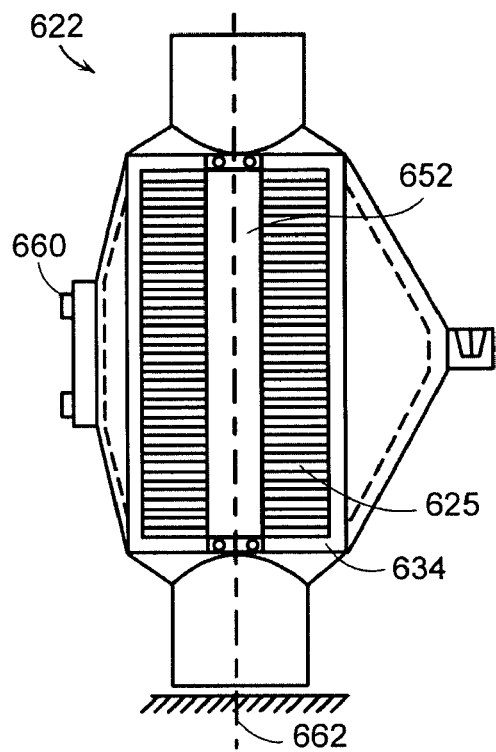
FIG. 36A illustrates an exemplary embodiment or a rotor having a laminate stack and counter weight.

The shelled rotor 622, 641 configurations of FIGS. 35A and 35B can be modified to provide greater stiffness. For example, stiffeners, or shear panels, can be employed in conjunction with first framed side 634 and second framed side 636 to provide added torsional rigidity to rotor 622, 641. In addition, still further embodiments may be used as shown in FIGS. 36A, B and 36C, D.

Figure 35E:
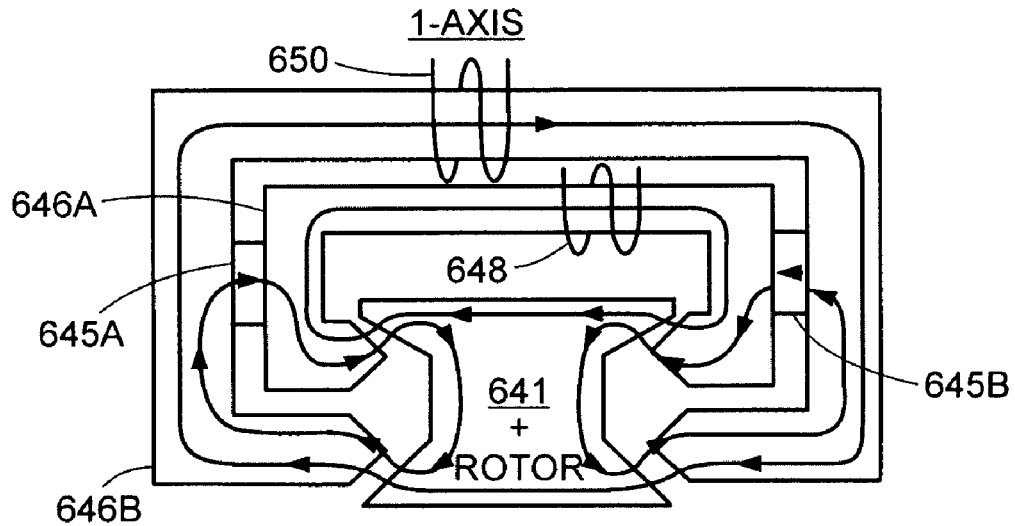
FIGS. 35E-H illustrate an alternative X-rotor embodiment that provides two axes of movement for a rotor.
Figure 35F:
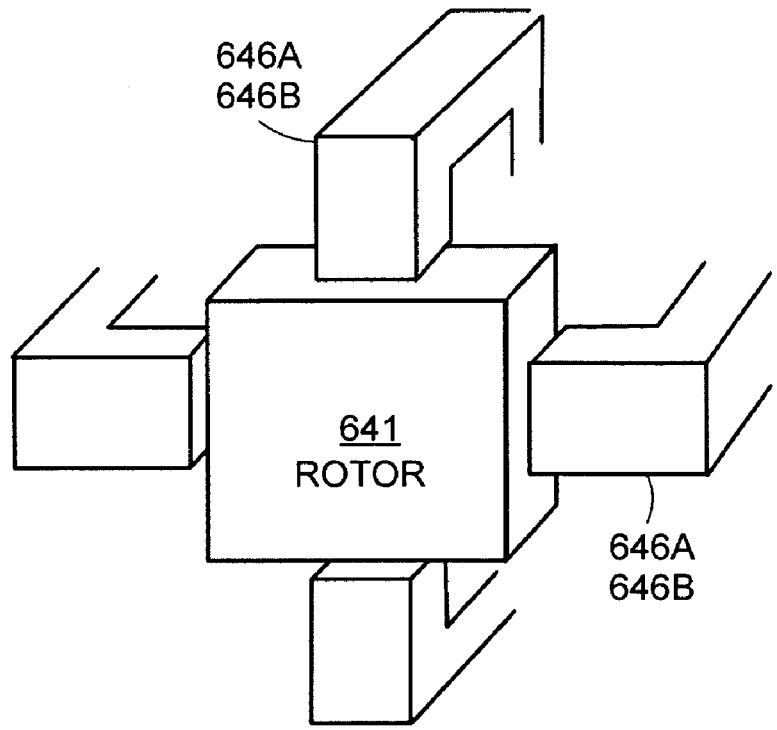

FIGS. 35E-H illustrate an embodiment of the x-rotor design that provides for two axes of movement. Employing rotors having two axes of movement is useful in applications such rotating a mirror about two non-parallel axes of rotation for steering a light beam. FIG. 35E illustrates an x-rotor configuration as taught in FIG. 35D, with the exception that one of the stators is folded back similarly as shown in FIGS. 41A through 45C. Folding back a stator provides greater access to one side of the rotor 641. The inner stator 646A and outer stator 646B form a first stator pair as shown in FIGS. 34B-D. FIG. 35F illustrates an exemplary arrangement of a first stator pair and a second stator pair arranged orthogonally to each other in a manner allowing both pairs to engage the same rotor.

Figure 35G:
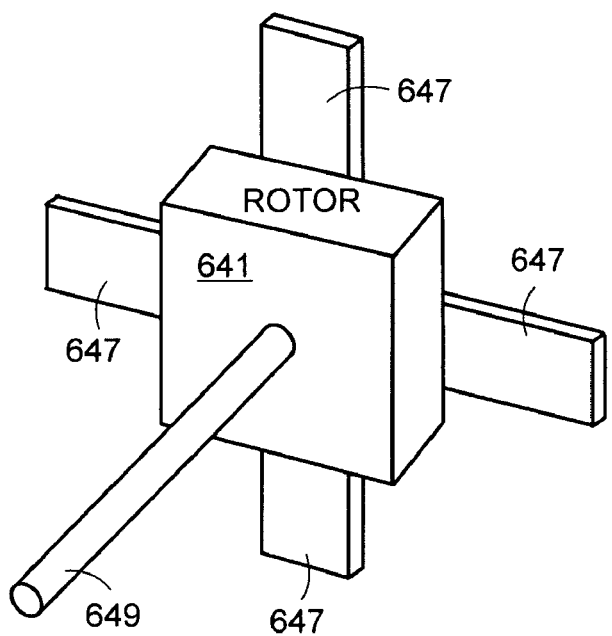

FIG. 35G illustrates a rear view of the rotor showing at least four flexure blades 647 and one torque rod 649 for collectively supporting rotor 641. In a preferred embodiment the flexure blades 647 are arranged in a radial fashion in pairs around the rotor, and all nominally point at the center of gravity of the rotor. In a preferred embodiment torque rod 649 extends from the rotor 641 along a line passing through the center of gravity of the rotor, and is substantial enough to constrain translation of the rotor in a direction parallel to the long axis of the torque rod. Together, the four flexures 647 and torque rod 649 constrain all motions of the rotor except for rotations along an axis in a plane nominally parallel to the front surface of the rotor and passing through the center of gravity of the rotor.

Figure 35H:
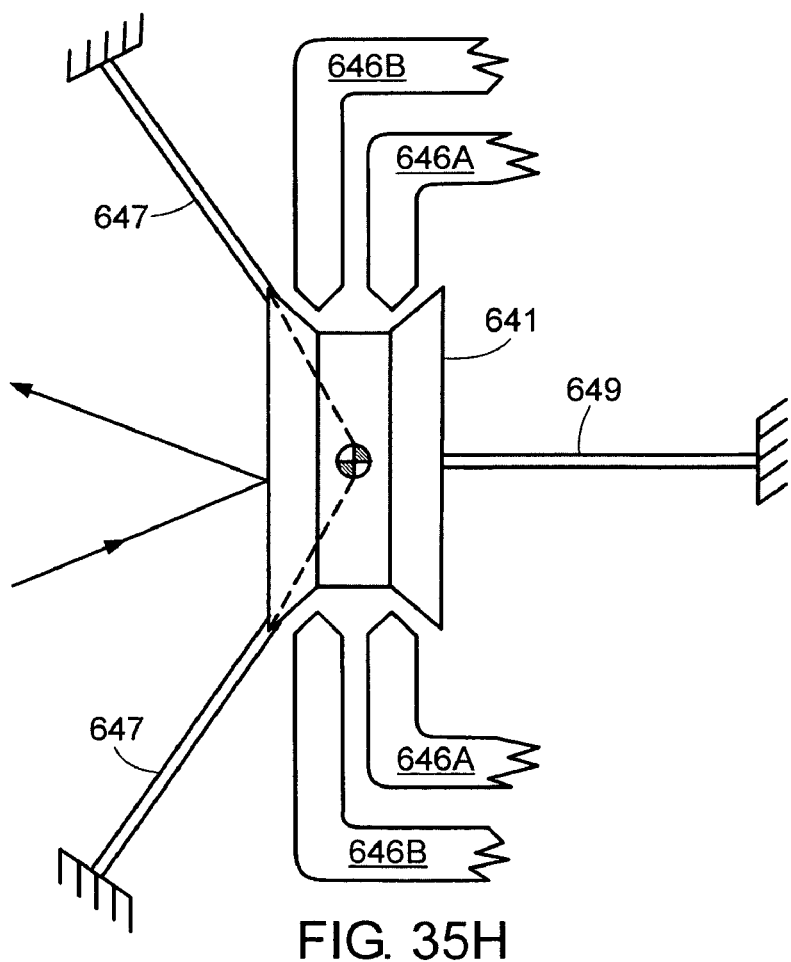

FIG. 35H illustrates a cross-sectional view through the center of the torque rod 649 and one of the pairs of flexures 647, and shows the inner and outer stators 646A and B of one of the stator pairs. The cross-section through the other pair of flexures looks substantially the same. Each of the two axes of rotation are actuated by magnetic forces as described in conjunction with other embodiments. Coordinated actuation of each of the two axes produces coordinated two axis rotation of the rotor which can have an integral mirrored surface, or an integral mount for holding a mirror.

FIGS. 35E-H employ torque rod 649 operating in conjunction with two pairs of flexures to facilitate operation in a manner similar to the described embodiments employing only flexures. In fact, torque rod 649 is essentially a flexure that has been made thin in two directions to allow bending around two axes.

Figure 36B:
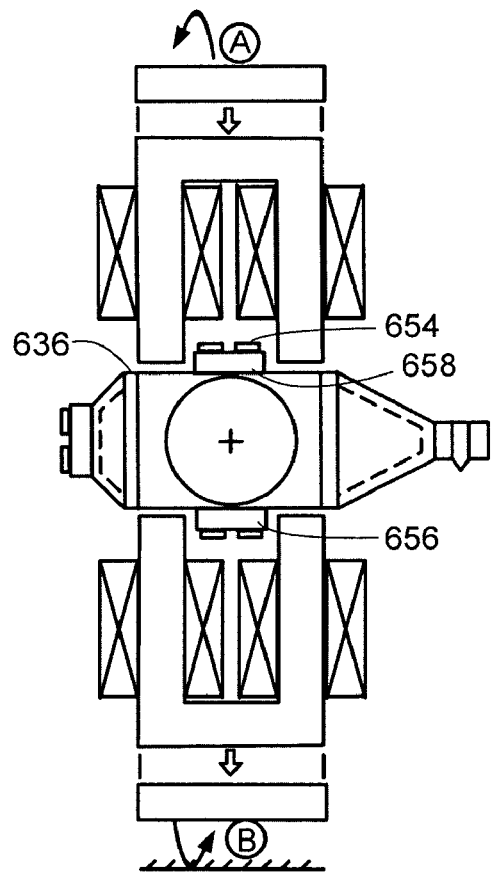
FIG. 36B illustrates an exemplary stator configuration for use with the rotor of FIG. 36A.

FIG. 36A illustrates a side view of square rotor 622 having a laminate stack 625, first and second framed sides 634, 636, and stiffeners 652, 654, respectively. Stiffeners 652, 654 may be made of electrically conductive material or nonconductive material as desired. If stiffeners 652, 654 are made of electrically conductive material, and if the shell is electrically conductive, then the conductive loop formed by the stiffeners and shell linking the alternating flux in the rotor core can be broken using a first insulator 656 and a second insulator 658 (FIG. 36B). The embodiment of FIG. 36A may further include one or more counter weights 660 for balancing the rotor to mitigate undesirable centrifugal forces. Counter weight 660 can be attached to rotor 622 using adhesive techniques or using mechanical fasteners. Alternatively, counter weight 660 can be a feature machined into the material used to fabricate rotor 622, thus being integral therewith. Counter weight 660 can be located nearer the axis of rotation 662 for reducing the rotational inertia of rotor 622.

FIG. 36B illustrates a plan view of rotor 622 employing a counter weight 660 and first and second stiffeners 652, 654.

Figure 36C:
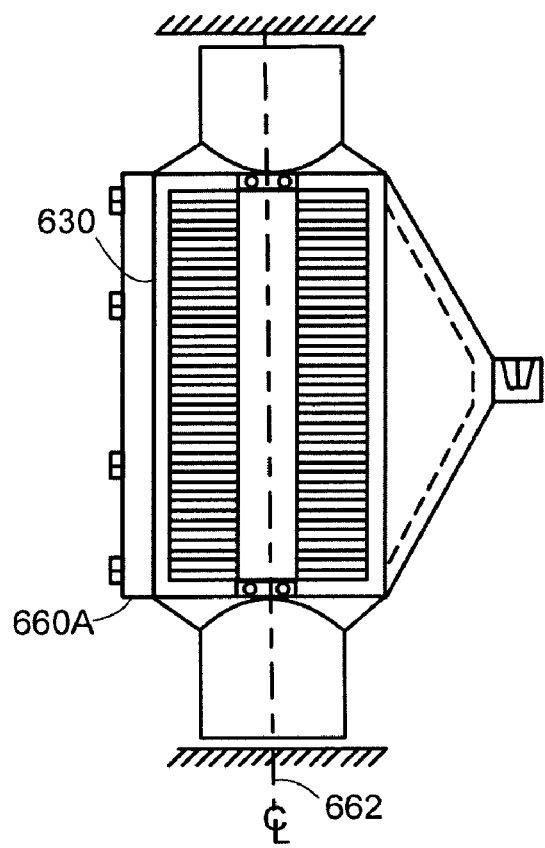
FIG. 36C illustrates an exemplary rotor having an alternative counter weight configuration as compared to the embodiment of FIG. 36A.
Figure 36D:
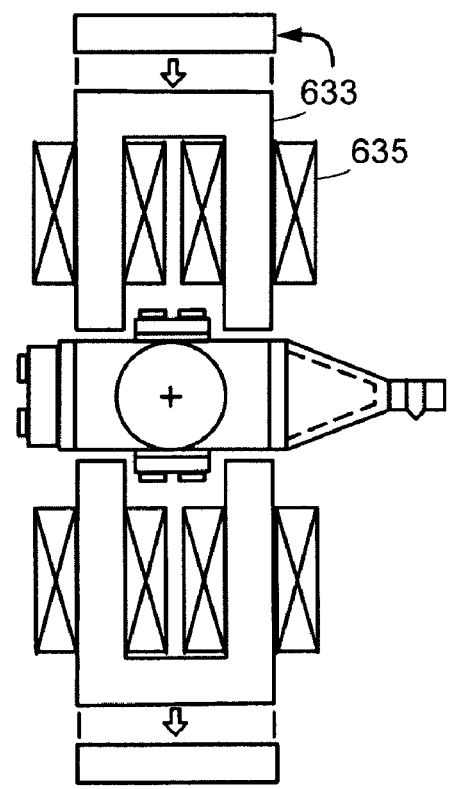
FIG. 36D illustrates an exemplary stator configuration for use with the rotor embodiment of FIG. 36C.

FIGS. 36C and D illustrate side and plan views, respectively, of rotor 622 that utilizes a counter weight 660A mounted against first side face 630 with substantially no offset. The embodiment of FIGS. 36C and D employ a rotor that is not as wide as the embodiment of FIG. 36B so that stator cores 633 and coils 635 can be situated in a smaller volume. As seen from the embodiments of FIGS. 34A-D, 35A-D and 36A-D, components making up the fast tool servo can take many forms and can be fabricated from many types of materials depending on the particular characteristics needed for certain applications.

While embodiments of the fast tool servo thus far described have employed a tool 90 located approximately midway between upper flexures 322 and lower flexures 324, other tool 90 locations and flexure placements can be employed. For example, tool 90 may be attached to a tool arm, or tool head, and placed at an upper end (or lower end) of a rotor. Such an implementation makes possible locating other components, such as flexures and motors, below the tool arm in an environmentally protected, or sealed, volume.

Figure 37A:
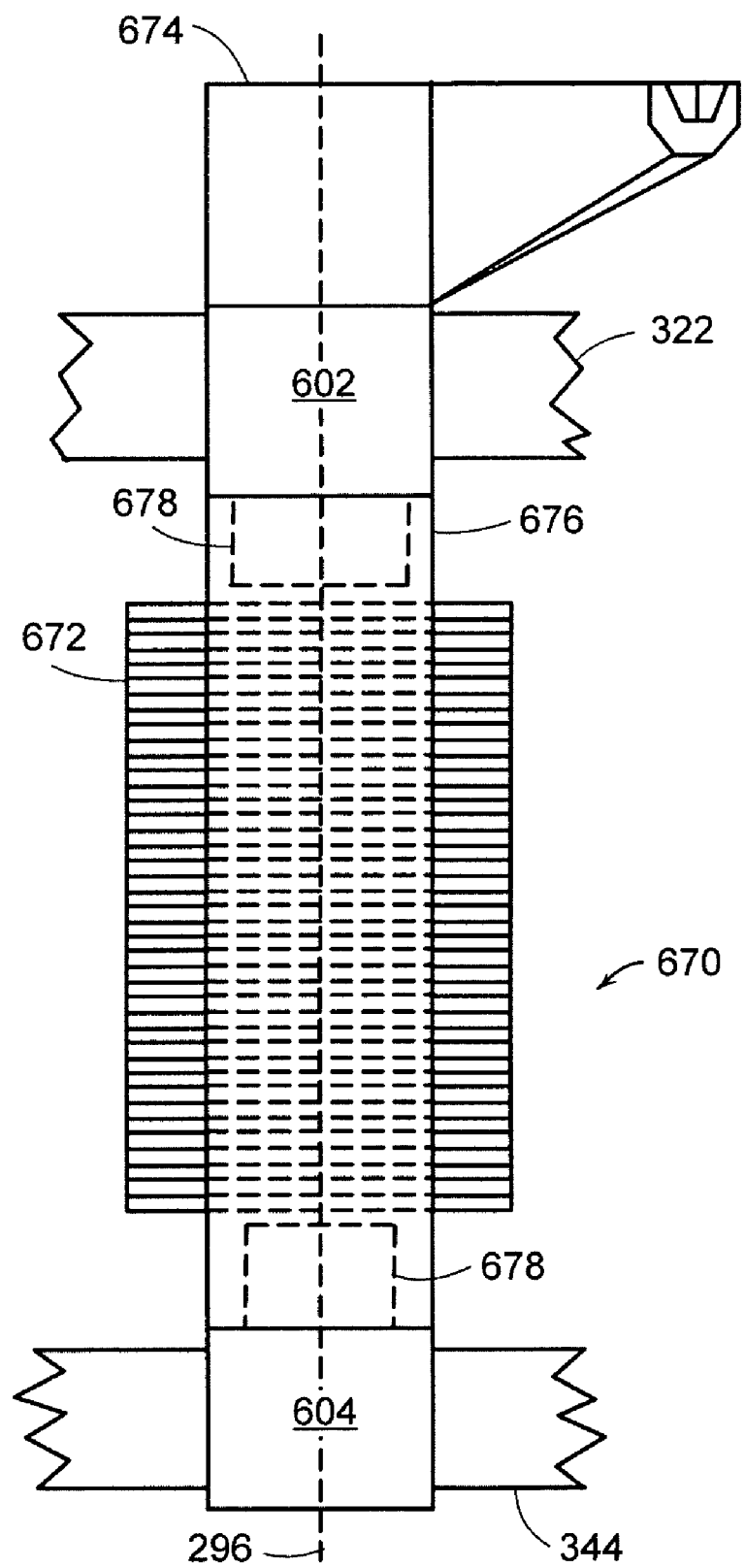
FIG. 37A illustrates an exemplary embodiment of a rotor having a tool head mounted to an upper end.

FIG. 37A illustrates an exemplary embodiment of a rotor 670 substantially made up of laminates 672. Laminates 672 consist of alternating layers of magnetically conductive sheets and electrically insulative sheets. In the embodiment of FIG. 37A, the laminates 672 are arranged perpendicular to the axis of rotation 296. Laminates 672 can also be arranged parallel to axis of rotation 296 in alternative configurations. Laminates 672 can be potted in epoxy, or other suitable material, to prevent delamination of the stack and to provide greater resistance to physical impacts.

Rotor 670 includes an upper hub 602 having an upper set of flexures 322 and a lower hub 604 having a lower set of flexures 324. A torque tube 767 provides support and stiffness to the laminates 672 and a means of coupling the upper hub 602 and lower hub 604 to the laminates. The junction of the torque tube 676 with upper and lower hubs 602, 604, respectively, may form a bond line 678 (FIG. 37A). In a preferred embodiment, the bond line 678 is in shear. An alternate embodiment of the torque tube configuration is shown in FIG. 37D. Upper torque tube 692 and lower torque tube 694 may be adhesively coupled to an insulating spacer 696 using an adhesive bonding agent such as epoxy, or the like.

Figure 37B:
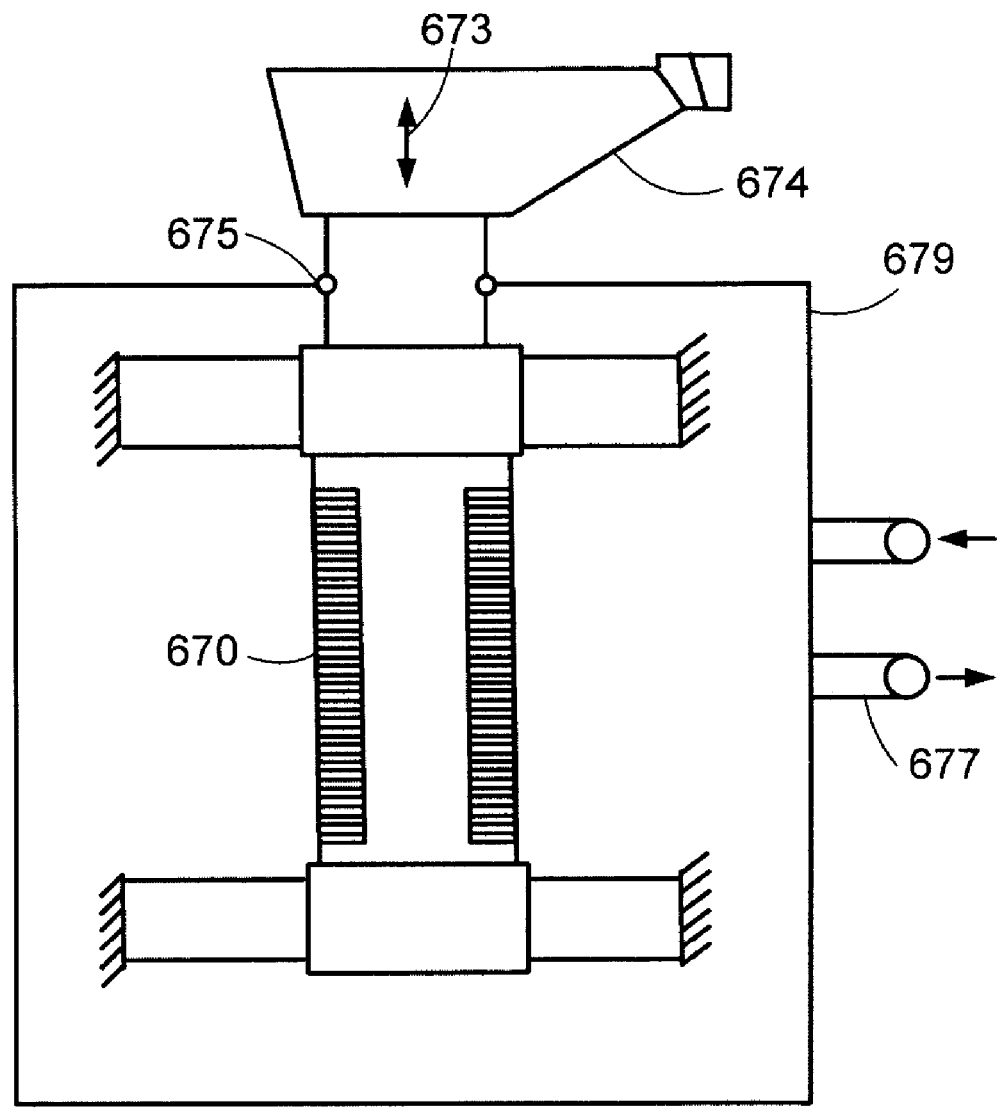
FIG. 37B illustrates an exemplary embodiment of a fast tool servo employing the rotor configuration of FIG. 37A.
Figure 37C:
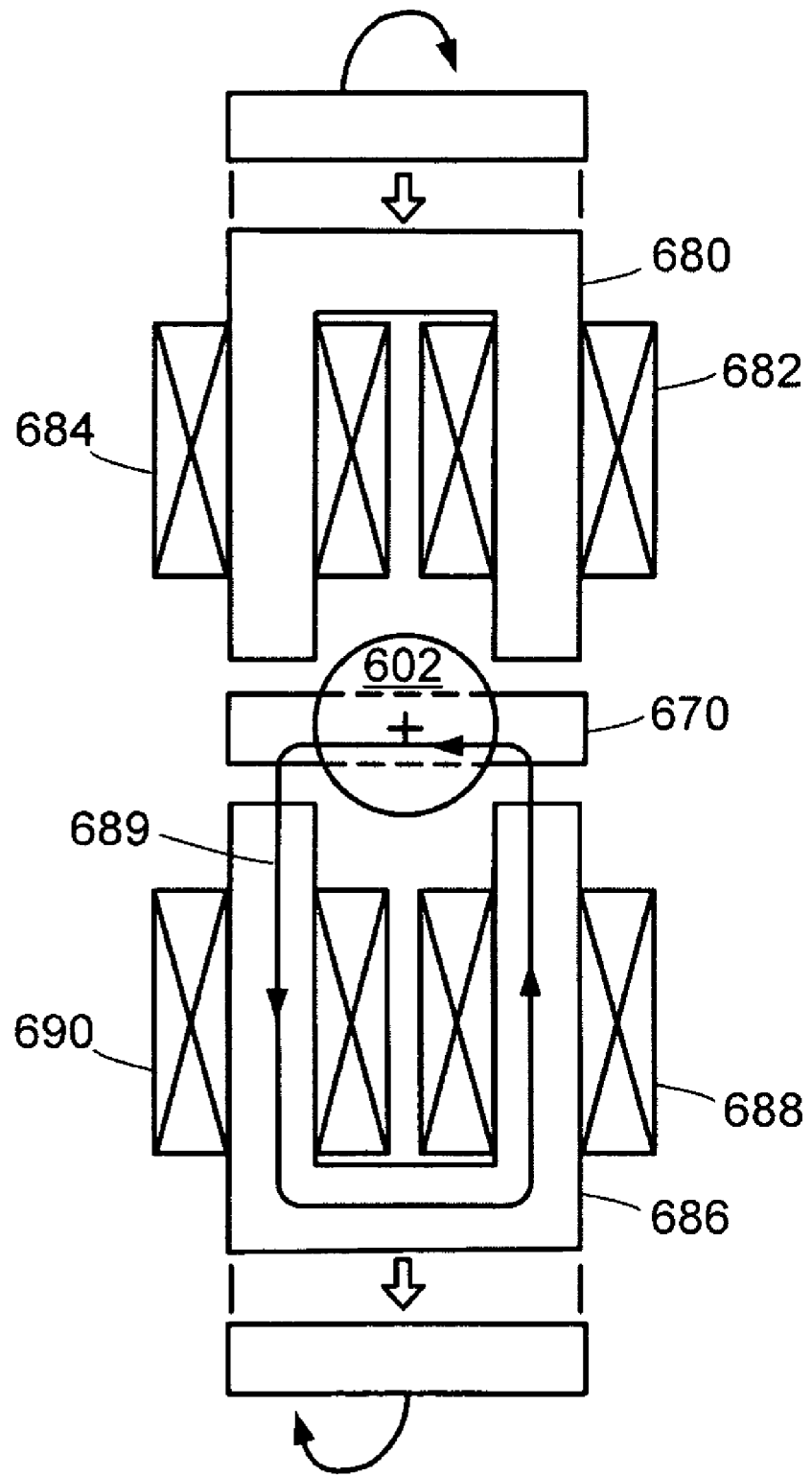
FIG. 37C illustrates an exemplary stator configuration for use with the rotor of FIG. 37A and also illustrates an AC flux path associated with the stator.
Figure 37D:
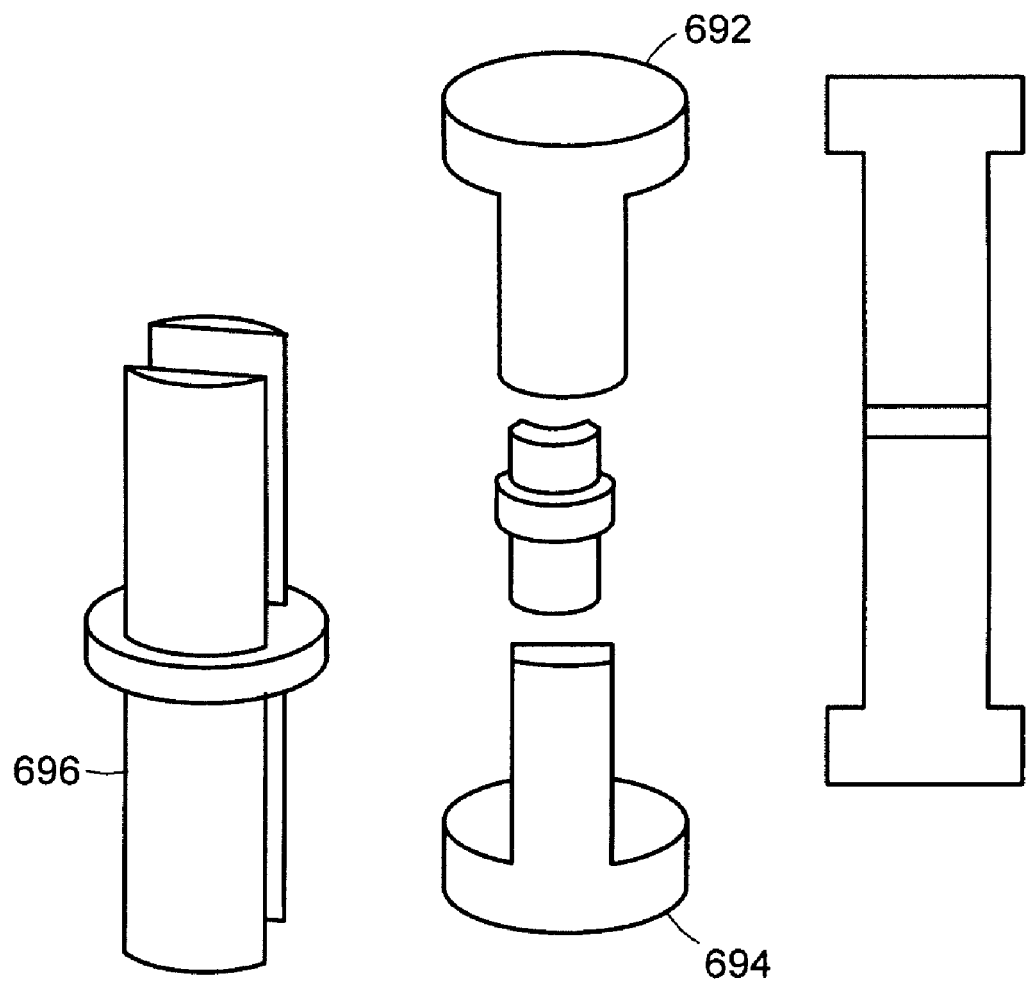
FIG. 37D illustrates an exemplary rotor making use of torque tubes.

FIG. 37B illustrates rotor 670 mounted in a housing 679. Placing tool arm 674 at the upper end of rotor 670 and hub 602 makes it possible to enclose the rotor 670 and flexures 322, 324 in a housing 679. First stator core 680, first stator core A-winding 682, first stator core B-winding 684, second stator core 686, second stator core A-winding 688 and second stator core B-winding can also be enclosed in housing 679 (FIG. 37C). The embodiment in FIG. 37B can also include a seal 675 made from a compliant material such as rubber, silicon, and the like. Seal 675 contacts an upper portion of rotor 670 on one side and housing 679 on an opposed side. Seal 675 acts to prevent debris such as tool cuttings, cutting fluids, dust, and the like from entering housing 679. In addition, seal 675 can also operate to keep cooling fluids used to cool rotor 670 and stator cores 680, 686 from leaving casing 679 at the junction with rotor 670. Cooling lines 677 can be used to circulate cooling fluids through housing 679 if desired. Fluid introduced into the housing 679 can also be used to provide damping of unwanted vibrations between the rotor and stator.

FIG. 37C illustrates rotor 670 operating in conjunction with a first stator core 680 and a second stator core 686. First stator core 680 may include a first stator core A-winding 682 and a first stator core B-winding 684 for carrying an AC current for generating an alternating magnetic flux for operation on rotor 670. Second stator core 686 may also include a second stator core A-winding 688 and a second stator core B-winding 690. An exemplary AC flux 689 is shown associated with second stator core 686. In an alternate embodiment the first and second windings on each stator core can be either combined into one winding or divided into more than two windings. In another alternate embodiment the windings can also carry a constant current to produce a constant magnetic flux in the rotor.

Windings 682, 684, 688, 690 may be made up of a plurality of windings surrounding a respective stator leg. The windings can consist of solid conductor wire or braided wire. In addition, the wire can have cross sections that are circular, elliptical, square, rectangular or of other geometrical shape as desired. In addition, the thickness and type of insulating material can vary according to design criteria and performance requirements. For example, in a preferred embodiment capable of operating at speeds on the order of 10 KHz, tool arm 674 is mounted outside casing 679 and Litz wire, in the range of #32-#36 AWG (American Wire Gauge), is used.

Figure 38A:
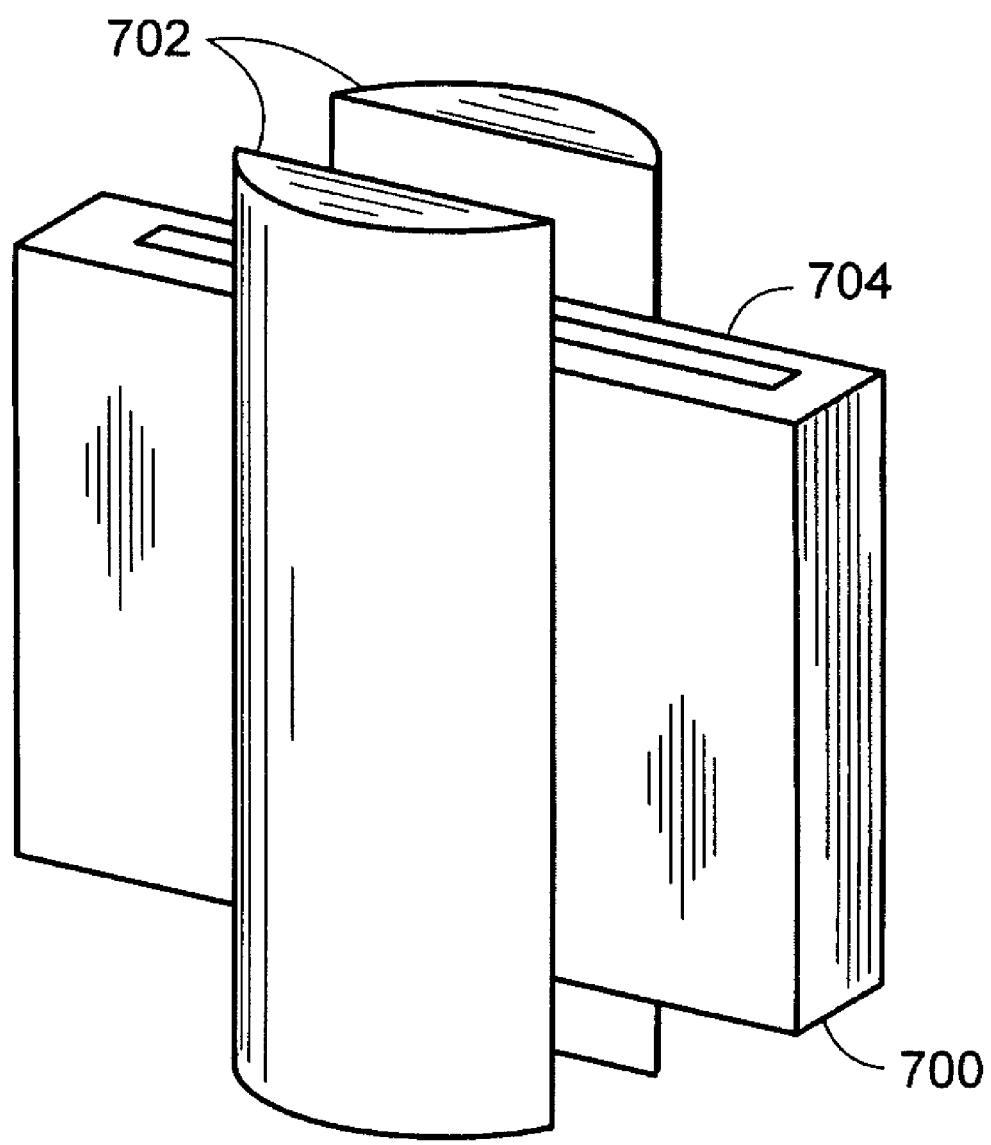
FIG. 38A illustrates a laminated iron core and nonconductive pair of stiffeners that can be used for implementing a rotor.

The shape and composition of rotor 670 can take still other forms. By way of example, an embodiment of rotor 670 can include a laminated iron core and stiffeners 702. FIG. 38A illustrates a laminate stack 700 and the stiffeners 702. In a preferred embodiment the stiffeners 702 are made of an electrically nonconductive material such as ceramic. In a further embodiment they are made of aluminum oxide to match the coefficient of thermal expansion of the rotor laminates. Other electrically conductive materials can be used for the stiffeners if an alternate means of breaking the conductive loop around the rotor laminates is employed.

Figure 38B:
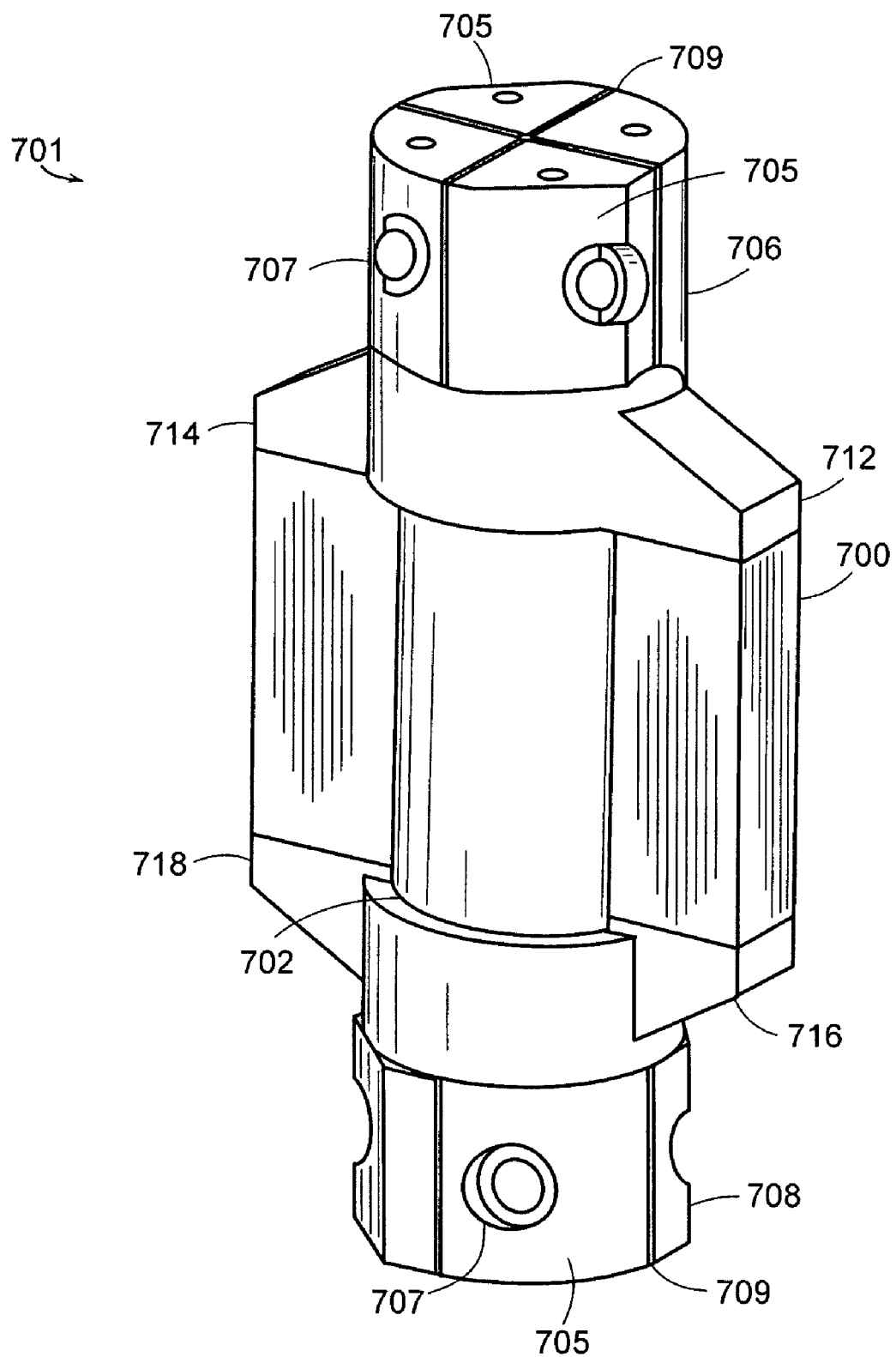
FIG. 38B illustrates an exemplary embodiment of a rotor having a laminated core, upper hub and lower hub.

FIG. 38B illustrates an embodiment of a rotor assembly 701 employing laminate stack 700 and ceramic stiffeners 702. In addition, rotor 701 includes an upper hub 706 and a lower hub 708. The hubs are made of nonmagnetizable metal such as certain stainless steels or aluminum. The upper and lower hubs 706, 708 each have slots 709 for receiving metal flexures, clamping blocks 705 having recesses 707 for accepting mechanical fasteners for retaining the flexures, and opposedly mounted wings, 712, 714 for upper hub and 716, 718 for lower hub, also referred to as extensions, protruding to substantially the outer edge of laminate stack 700.

For example, upper hub 706 includes a first wing 712 and a second wing 714. The wings are designed to provide mechanical structure for retaining laminate stack 700 and for protecting laminate stack 700 if the rotor contacts the stator, such as would occur in a hard stop caused by over travel of the rotor. First wing 712 and second wing 714 are typically machined from the stock used for hub 706; however, the wings can be fabricated separately and attached to hub 706 using mechanical fasteners, welding, and the like. Lower hub 708 includes a first wing 716 and a second wing 718 that operate substantially as the upper wings 712, 714.

Figure 38C:
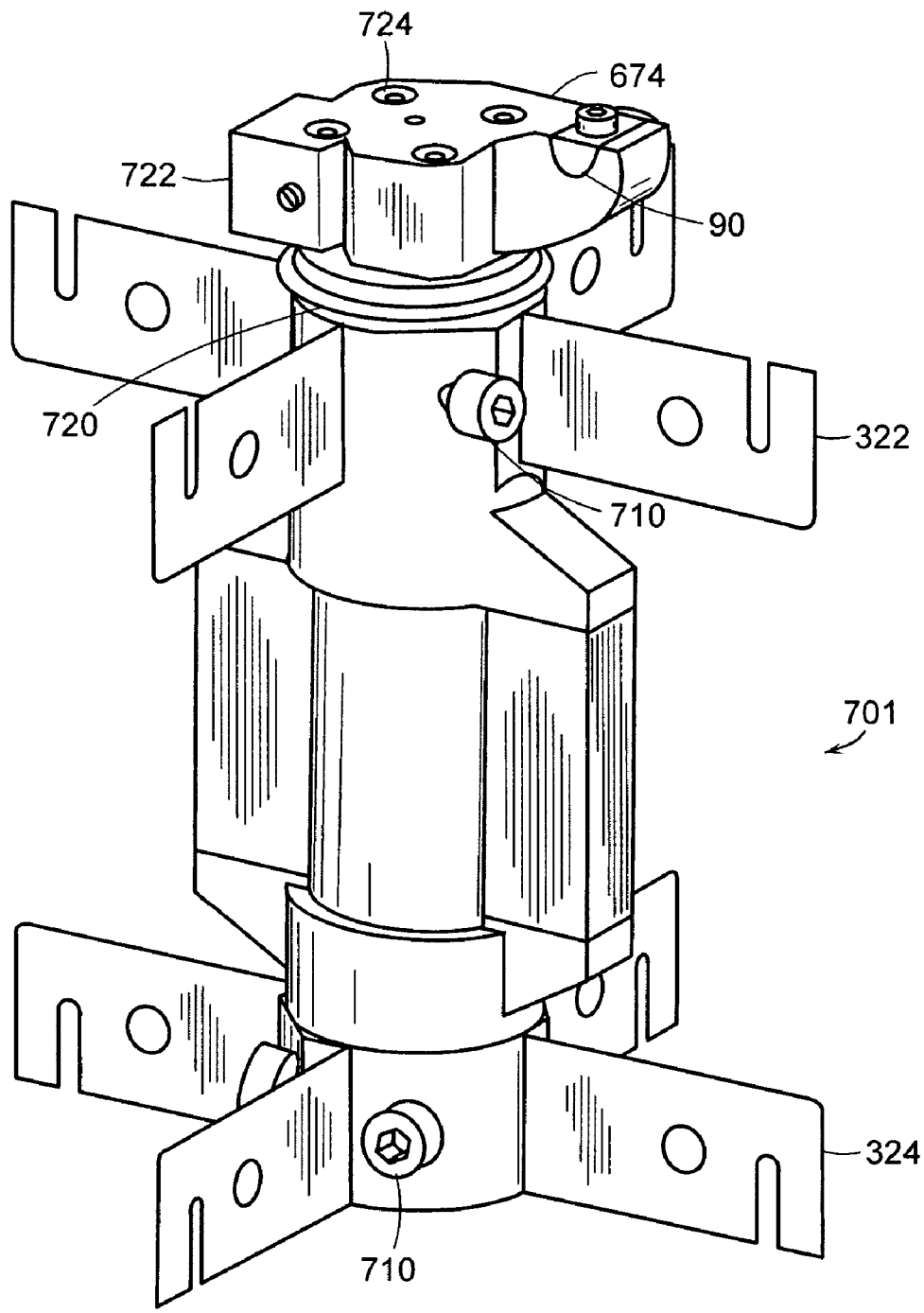
FIG. 38C illustrates the rotor of FIG. 38B further including a tool arm and having upper and lower flexure pairs installed.

FIG. 38C illustrates rotor assembly 701 having upper flexures 322, lower flexures 324 and swing arm 674 attached thereto. Upper and lower flexures 322, 324, respectively, operate in substantially the same manner as the flexures described in conjunction with previous embodiments of the fast tool servo. Swing arm 674 is preferably fabricated, or machined, from nonmagnetic metal capable of withstanding the forces applied to tool 90. Swing arm 674 is attached to upper hub 706 using mechanical fasteners 724. Swing arm 674 may include one or more counter weights 722 for offsetting the mass unbalance caused by locating tool 90 off the rotational axis of rotor 701. Counter weight 722 can be attached to swing arm 674 using mechanical fasteners, adhesive bonding techniques, or welding. A seal 720, such as an o-ring, may be used between the lower surface of swing arm 674 and the housing 679 to prevent debris from entering the housing.

Figure 38D:
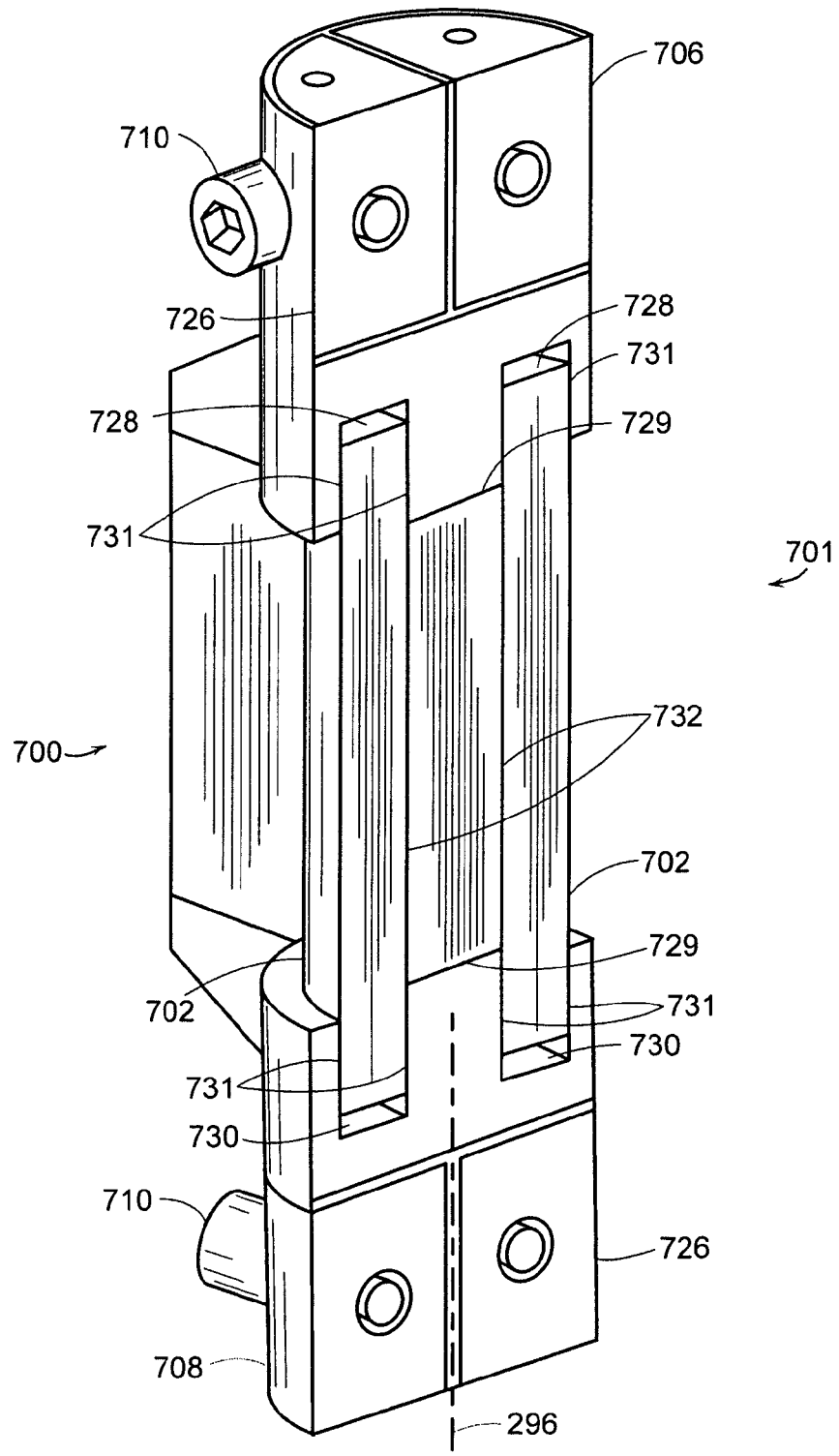
FIG. 38D illustrates a cut away view of the rotor of FIG. 38C showing the components making up the rotor as well as bonding areas used to join the components.

FIG. 38D illustrates a cut away view of rotor 701. In the figure, flexure shims 726 are shown. Flexure shims 726 are used to adjust the location of the flexures relative to the laminate stack 700. Machining tolerances can be made more precise if shim 726 usage is undesirable.

It is preferable to have laminate stack 700 in compression when rotor 701 is operated with tool 90 to prevent separation of the laminate layers. Adhesives, such as epoxy, may be used to bond the laminate stack, hubs, and stiffeners together and provide compression pressure against laminate stack 700. Epoxy is placed between the laminate stack and hubs at bond line 729, which includes the wings 712, 714, 716, and 718, and between the hubs and stiffeners at bond line 731, and between laminate stack and stiffeners at bond line 732. Bond lines 729, 731, and 732 are nominally 50 microns thick. Adhesive based compression is achieved by providing a small volume at the junction between the ends of the ceramic stiffeners 702 and upper hub 706, herein referred to as upper glue channels 728, and between stiffeners 702 and the lower hub 708, herein referred to as lower glue channels 730. An adhesive is selected based on its ability to adequately adhere to the surfaces it contacts, ability to withstand environmental parameters such as heat and forces, and further based on a shrinkage factor associated with set up of the adhesive. For example, an epoxy may be selected because its cured volume is on the order of 5% smaller than its wet, or uncured, volume. If such an epoxy is used in upper glue channels 728 and lower glue channels 730, and the height of the glue channels is greater than the bond line thickness 729, for example, 10 times greater, then the greater volumetric shrinkage in the glue channels will produce a tensile stress between the stiffeners and the hubs and a balancing compressive stress between the hubs and the laminate stack. Laminate stack 700 will see a compression force as the epoxy dries. An adhesive may further be applied to the surfaces between the upper surface of laminate stack 700 and upper first wing 712 and upper second wing 714, and between the lower surface, or side, of laminate stack 700 and lower first wing 716 and lower second wing 718 of lower hub 708 for additional strength.

When fabricating a rotor 701 as shown in FIGS. 38C and D, it is desirable to choose materials having substantially the same coefficients of thermal expansion as the laminate stack to reduce the chances of placing undue stress on the adhesive joints. For example, in an embodiment alumina is used for stiffeners 702. In addition, the adhesive selected for joining the hubs 706, 708 to laminate stack 700 and stiffeners 702 can be selected by taking into account its coefficient of thermal expansion.

When bonding components of rotor 701, bonding pads having a determined thickness can be used to establish a known spacing, or dimension, for the glue channels. For example, in a preferred embodiment of rotor 701, 50 micron pads are used to establish the bond line thickness between the laminate stack 700 and upper hub 706 as depicted by 704 in FIG. 38A, and between laminate stack 700 and lower hub 708, and between laminate stack 700 and the inside surfaces of the ceramic stiffeners 702. In addition, a 500 micron gap is established in the glue channels between the upper and lower surfaces of ceramic spacers 702 and upper hub 706 and lower hub 708, respectively. When using adhesives on rotor 701, bond thicknesses are selected so as to prevent parts from touching each other and starving the glue joint, as would occur if the bond line is too thin, and to prevent the rotor assembly from becoming too flexible, as would occur if bond lines were made too thick. Computer modeling tools such as finite element analysis (FEA) applications can be used to simulate the performance of various rotor and stator configurations.

Figure 39A:
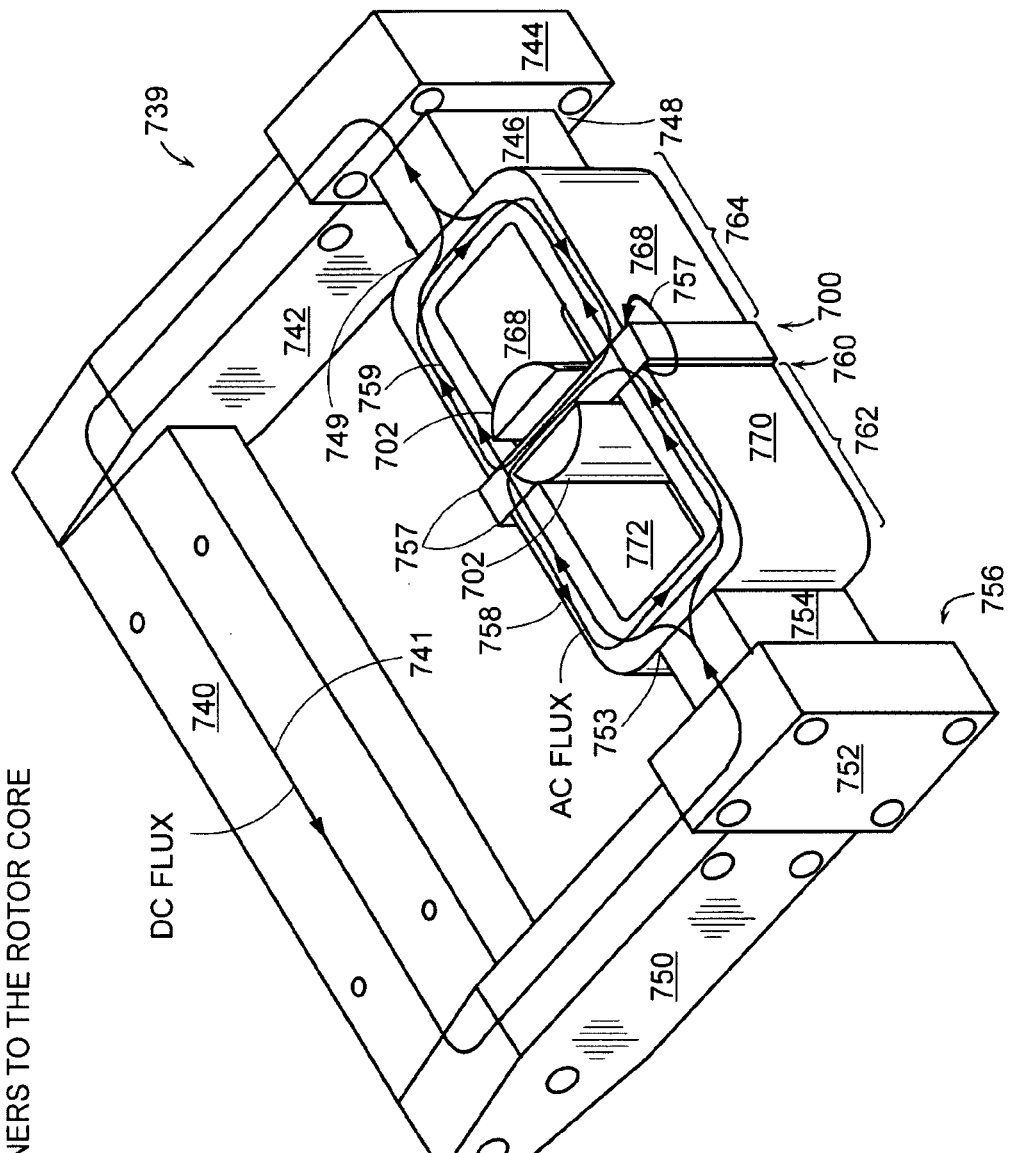
FIG. 39A illustrates a magnetic circuit including two stator cores, a laminate stack, a stiffener pair, and a constant magnetic flux circuit that can be used with embodiments of a rotor.

FIG. 39A illustrates an exemplary embodiment of the magnetic circuit consisting of two stator cores, a rotor core (laminate stack), and a constant magnetic flux circuit. The constant or "DC" magnetic flux portion of the magnetic circuit 739 is made from soft magnetic materials and consists of a rear core member 740, a first core leg 742, a first leg transition block 744, a first stator coupling member 746 and a first spacing shim 748. The DC portion of the magnetic circuit 739 is symmetric in this embodiment and includes a second core leg 750, a second leg transition member 752, a second stator coupling member 754 and a second spacing shim 756. First stator 764 is coupled to first stator coupling member 746 with an air gap 749 and second stator 762 is coupled to second stator coupling member 754 with an air gap 753. Laminate stack 700 is shown in the space between the ends of first arm 766 and second arm 768 of first stator 764 and the ends of the first arm 770 and second arm 772 of second stator 762. An air gap 757 exists between the laminate stack and each of the four arms. Laminate stack 700 rotates in the space between the stators in response to magnetic fields generated by stator windings. An AC flux path 758 is shown in conjunction with second stator 762. In a preferred embodiment the air gaps 749 and 753 are adjusted with shims 748 and 756, respectively, with consideration to the air gaps 757, so that the forces acting on the stators 762 and 764 from the DC flux are balanced. The stiffeners 702 are also shown in relation to magnetic circuit 739.

Figure 39B:
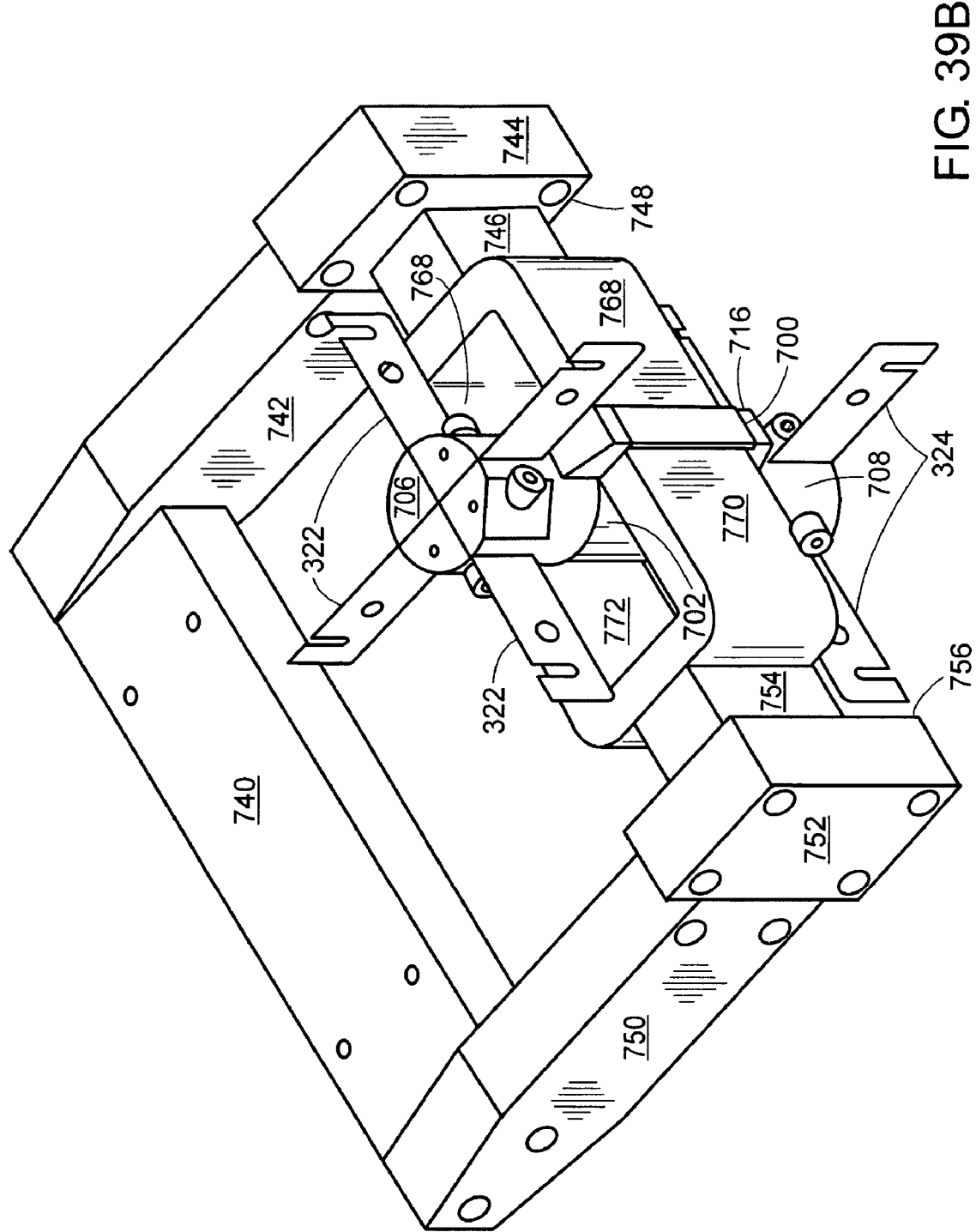
FIG. 39B illustrates a perspective view of the magnetic circuit of FIG. 39A along with an assembled rotor having upper and lower flexures installed therewith.
Figure 39C:
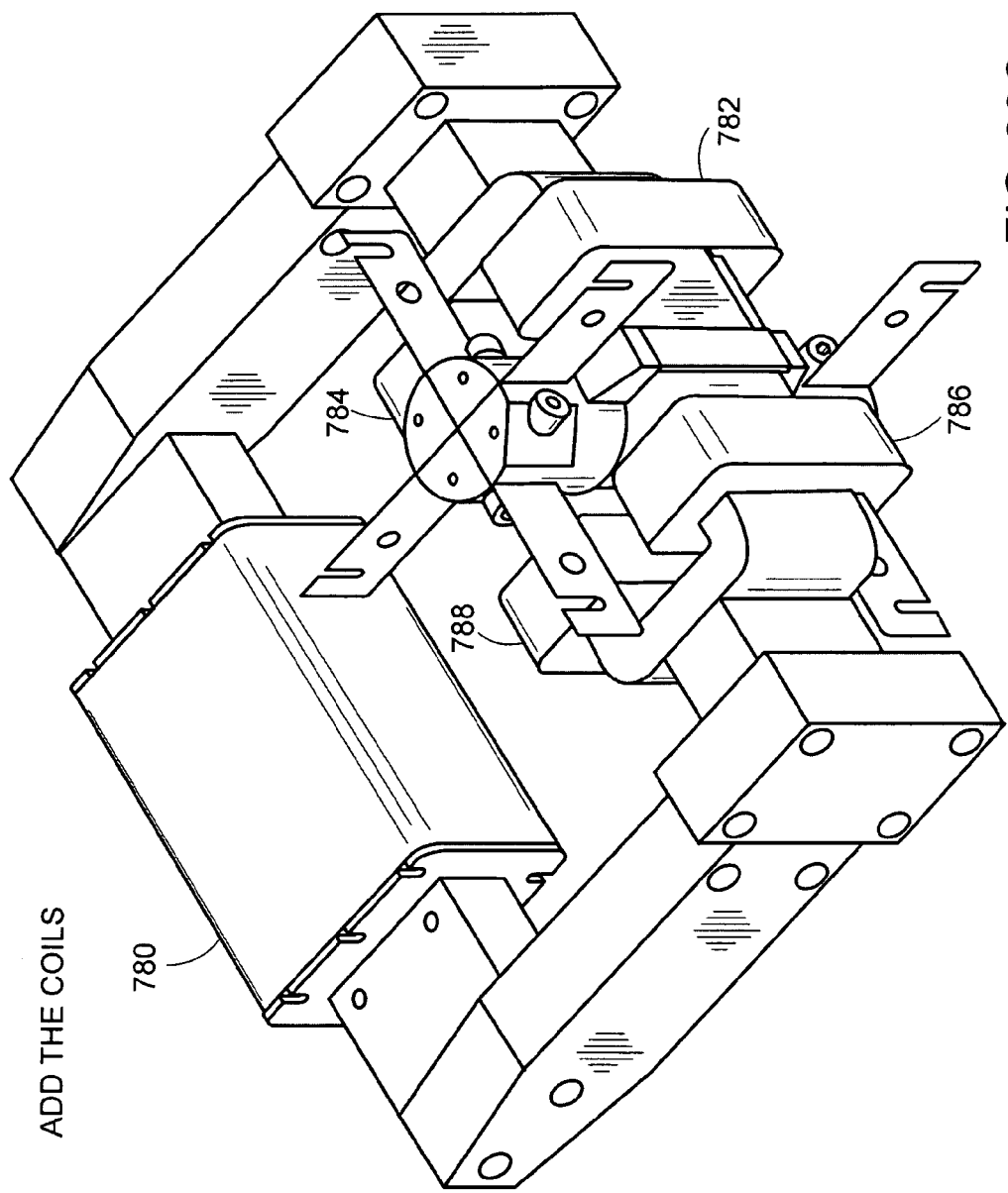
FIG. 39C illustrates the magnetic circuit, stator, and rotor of FIG. 39B along with the AC and DC stator windings.

FIG. 39B illustrates magnetic circuit 739 along with a rotor assembly 701 including upper flexures 322 and lower flexures 324. FIG. 39C illustrates magnetic circuit 739, a complete rotor assembly 701, a DC coil 780, a first arm coil 782 and second arm coil 784 for first stator 764, and a first arm coil 786 and a second arm coil 788 for second stator 762. The DC coil 780 provides a DC bias flux through stator frame assembly 739. DC coil 780 can be positioned such that the current passing through the wire making up the windings, encircles substantially the full length of the rear core member 740. The first arm coils 782, 786 and second arm coils 784, 788 operate as AC coils. When the AC coils are driven, rotor assembly 701 rotates about axis 296.

Figure 40A:
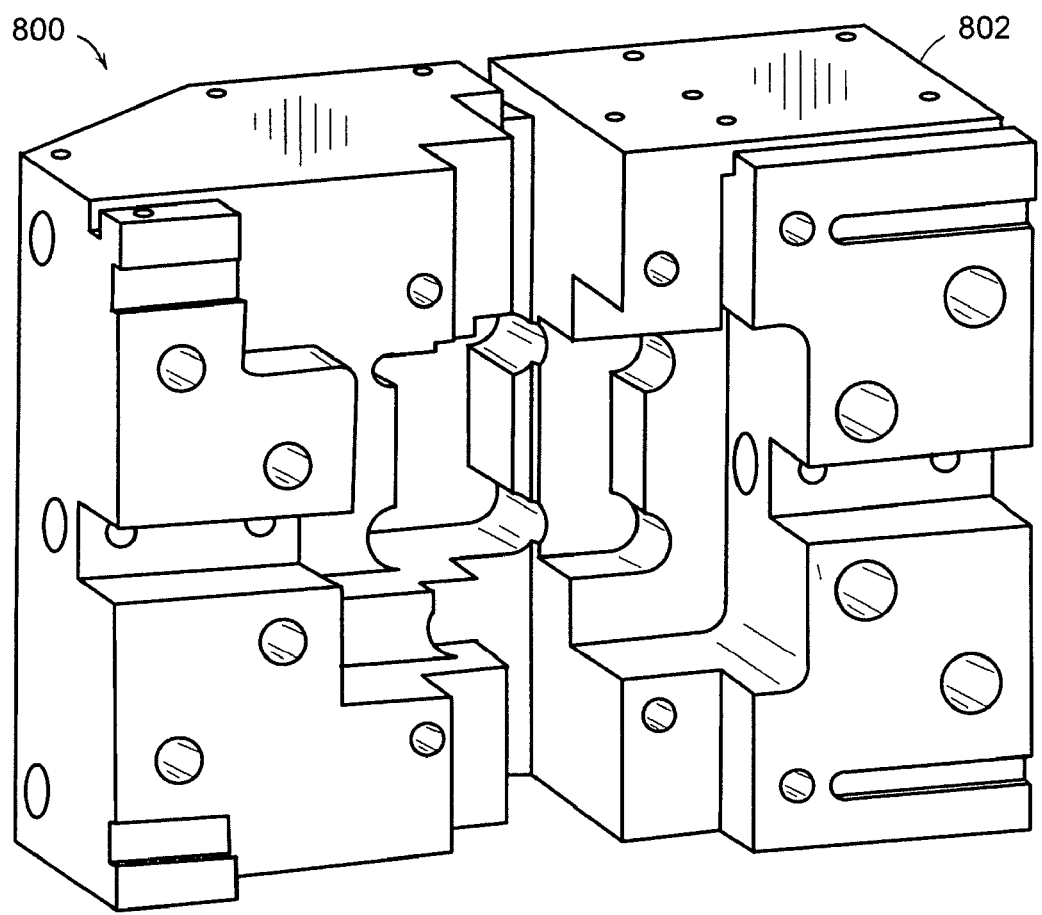
FIG. 40A illustrates a front view of one-half of the stator housing that can be used with embodiments of a rotor having upper and lower flexures.
Figure 40B:
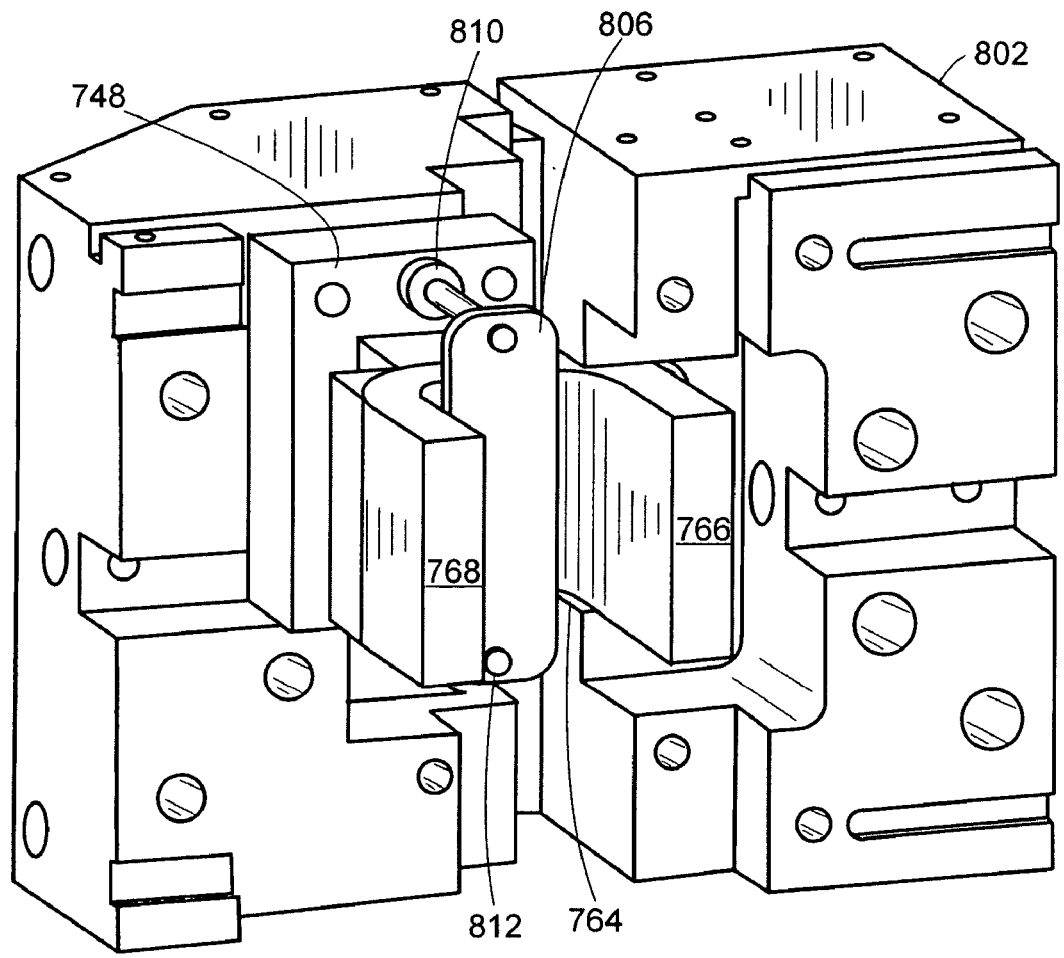
FIG. 40B illustrates a front view of one-half of a stator housing having a stator installed therein.

In a preferred embodiment, the housing containing the stator cores and rotor is made up of two halves, a first stator housing section 802 and a second stator housing section 804. FIG. 40A illustrates a side view of first stator section 802. First and second stator sections 802, 804 are substantially identical so features associated with one section correspond to identical features on the other section. Stator section 802 can be machined out of non-magnetizable material such as certain stainless steels, aluminum alloy, titanium, composite, ceramic or plastic. FIG. 40B illustrates first stator section 802 with selected components installed therein. In particular, first stator 764 is mounted on first stator section 802 using fasteners 810, 812 and a first stator clamp 806. First stator clamp 806 is made of non-magnetic and electrically non-conductive material. In addition to, or in lieu of, clamp 806 and fasteners 810, 812 first stator 764 is attached to stator housing section 802 with adhesive bonding agents.

Figure 40C:
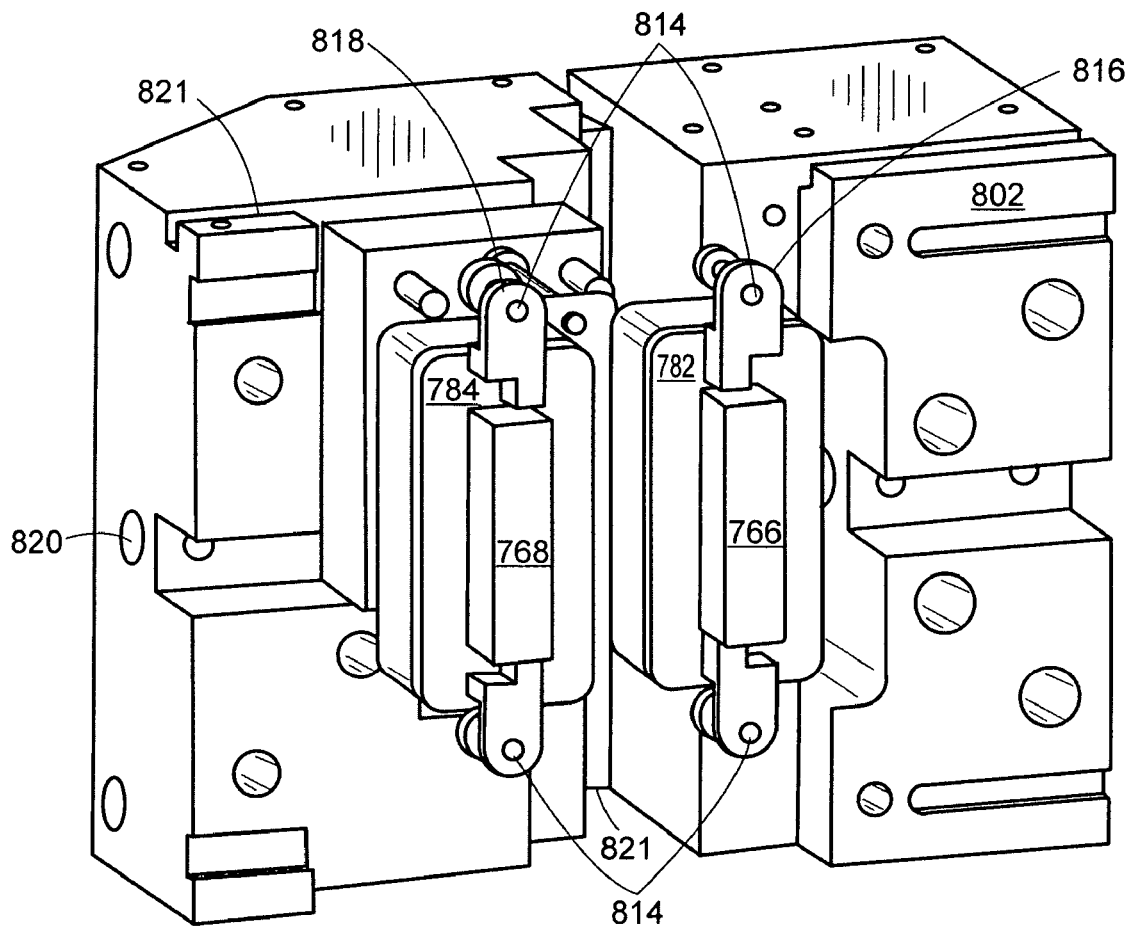
FIG. 40C illustrates a front view of one-half of a stator housing having a stator and windings installed therein.

FIG. 40C illustrates first stator section 802 along with additional components used in assembling a fast tool servo. More specifically, first arm coil 782 and second arm coil 784 are shown installed on first stator 764. First and second arm coils 782, 784 may be wound onto bobbins designed to slide over first and second arms 766, 768, respectively. The wound bobbins may be potted before placement on first stator section 802 to prevent movement of the wound coils if desired. First stator bobbin clamps 816 and 818 may be used to hold coils 782 and 784 in place. The bobbin clamps 816, 818 are made of non-magnetic and electrically non-conductive material and can be retained using fasteners 814 and/or adhesive bonding agents. The first stator housing may include a plurality of passageways 820 disposed therethrough. Passageways 820 may be designed for facilitating use of cooling fluids or for facilitating routing of electrical conductors. For example, leads associated with coils 782 and 784 may be routed through passage 820 for coupling to an AC power source. For example, cooling fluids can be routed through passages 821. Additionally, fluids for providing viscous damping between the rotor and stator can be routed through passages 821.

Figure 40D:
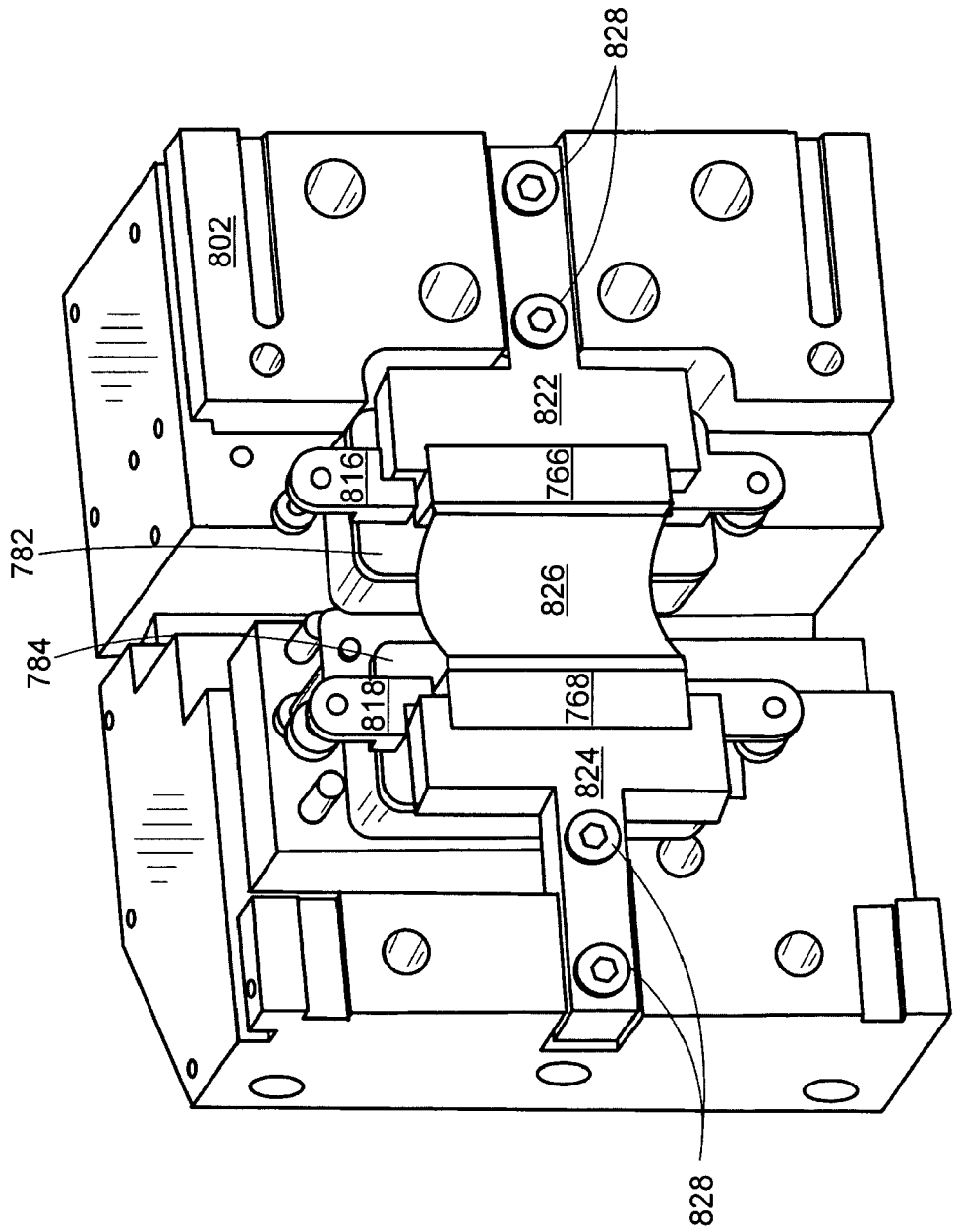
FIG. 40D illustrates a front view of one-half of a stator housing having stator, windings and retaining hardware installed therein.
Figure 40E:
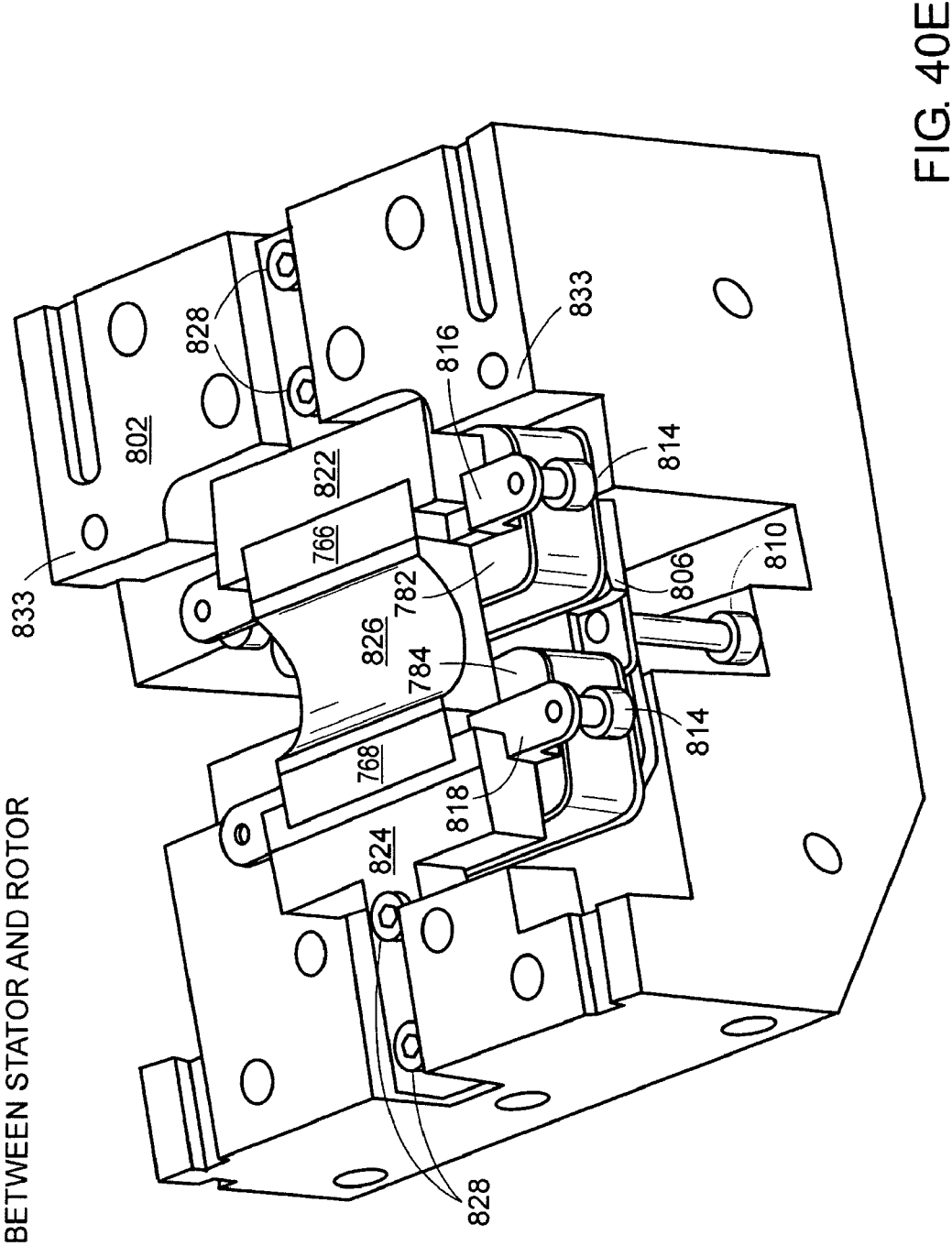
FIG. 40E illustrates a front-bottom view of one-half of a stator housing having a stator, windings, and retaining hardware installed therein.

FIG. 40D illustrates first stator housing 802 having still other components attached thereto for operation in conjunction with first stator 764. A first stator support 822 is in contact with the outer surface of first arm 766. First stator support 822 is attached to housing 822 using fasteners 828. A second stator support 824 is similarly mounted with respect to second arm 768. First and second stator supports 822, 824 are machined from non-magnetic materials preferably having a permeability approximating that of air so as to not short the magnetic flux within first stator 764 when operating. First and second stator supports 822, 824 wrap around the outer surfaces of first and second arms 766, 768 so as to contact and support at least a portion of the upper and lower surfaces thereof, and to provide contact areas for the wings 712, 714, 716, 718 of the upper hub and lower hub, respectively, of the rotor to act as hard stops. An inner support 826 is mounted between the inner surfaces of first arm 766 and second arm 768. The first stator support 822, second stator support 824 and inner support 826 operate cooperatively to keep the laminations of first stator 764 under compression. Inner support 826 has a rear face that is substantially flat and rests on the outer faces of first and second arm coils 782, 784. The front face of inner support 826 is shaped to follow the curvature of a ceramic stiffener 702. Inner support 826 may be retained in position using a press, or friction fit, using adhesive bonding or by way of mechanical fasteners or other attachment elements. FIG. 40E illustrates a front-bottom view of stator housing 802 showing the elements contained in FIG. 40E. The stator housing has sufficient clearance to allow final machining of the ends of the stator arms 766, 768 to establish a close-tolerance relationship between them and the mounting surface 833 for the outer ends of the flexures. A preferred method of machining is grinding in a direction parallel to the laminations of the stator.

Referring to FIGS. 40D and 40E, inner support 826 suggests the possible use of a hydrostatic bearing to support the rotor relative to the stator. In certain embodiments it may be advantageous to provide support to the rotor in the radial and axial directions through the use of an externally pressurized fluid bearing (hydrostatic). In an embodiment, inner support 826 can be adapted to provide fluid film bearing surfaces with the cylindrical stiffeners 702 of the rotor to provide radial support and establish an axis of rotation, and to provide fluid film bearing surfaces with features on the rotor such as the hubs 706, 708 to provide axial support of the rotor. Examples of embodiments that may benefit from a hydrostatic bearing include the systems shown in FIGS. 41A through 45C, where either the magnetic force on the rotor from the DC flux or inertial forces on the rotor result in a net force on the rotor that might not be tolerable by a system employing flexures.

Figure 40F:
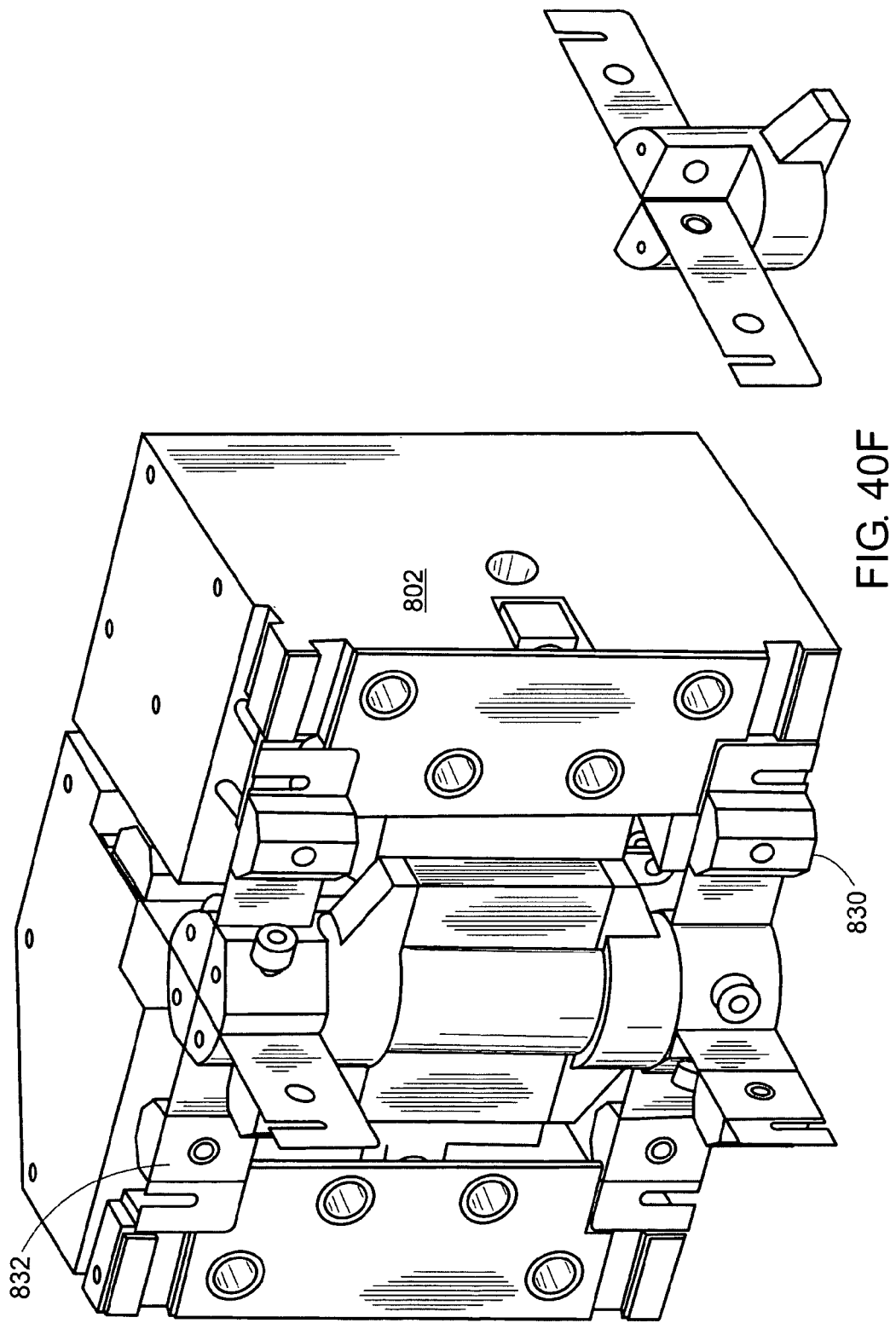
FIG. 40F illustrates the stator housing of FIG. 40G with a rotor assembly installed therein.
Figure 40H:
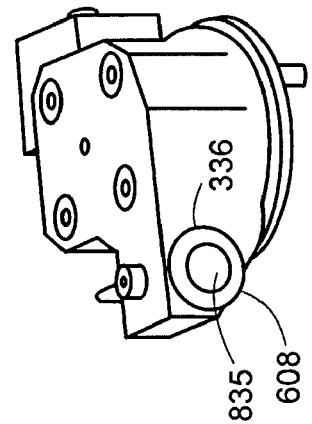
FIG. 40H illustrates a tool arm with a cutting tool mounted thereto.
Figure 40G:
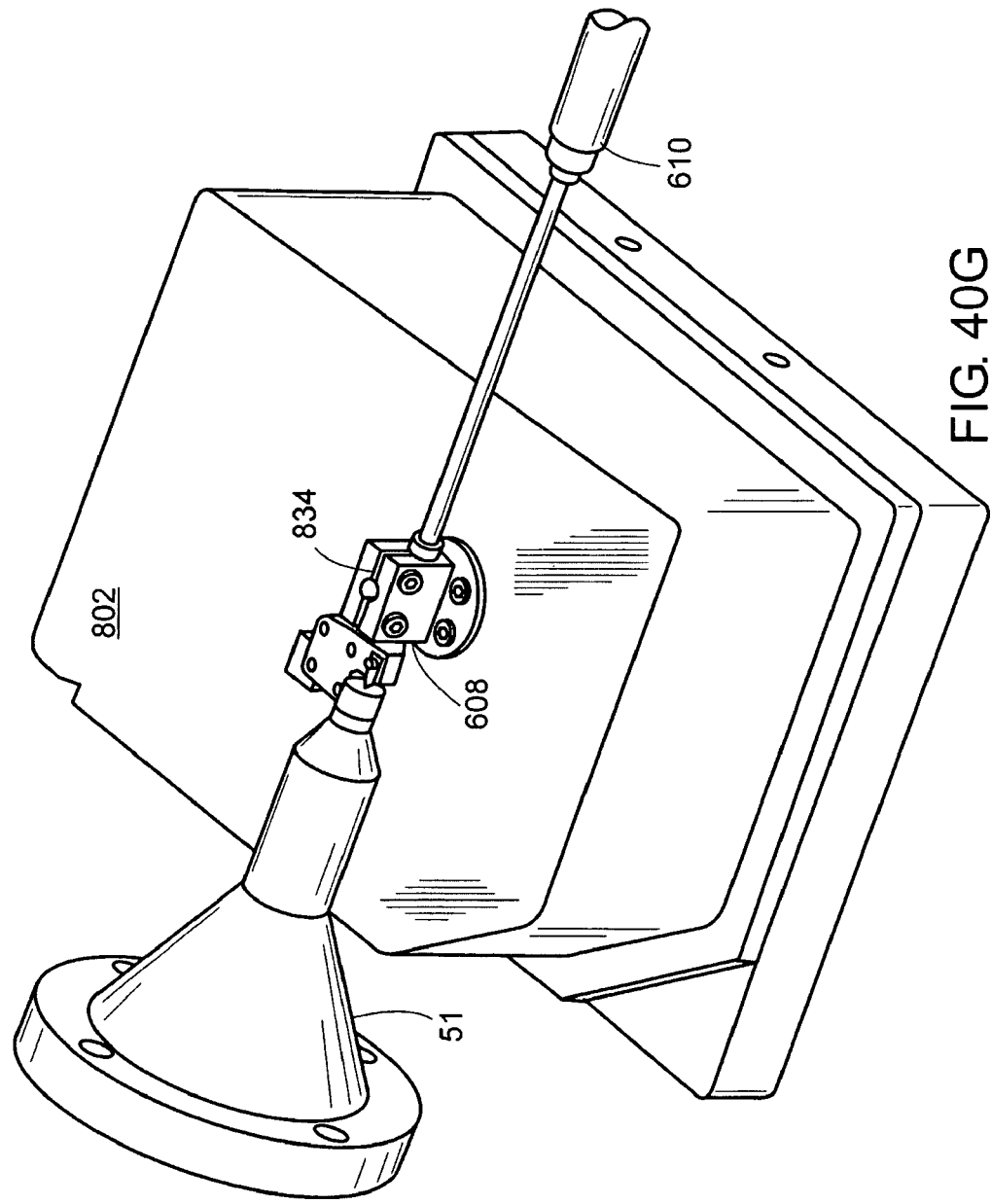
FIG. 40G illustrates a fast tool servo consisting of two stator halves, a rotor assembly, a displacement sensor, and a tool engaging a workpiece.

FIG. 40F illustrates a perspective view of stator housing 802 with rotor assembly 701 installed therein. Clamp blocks 830 are used in conjunction with flexure shims 832, which allow aligning the rotor 701 relative to the stator housings 802 and 804. FIG. 40G illustrates a perspective view of a rotary fast tool servo operating on a workpiece. A displacement sensor 610 is supported in position by a sensor bracket 834. The distal end 608 of the displacement sensor 610 is communicatively coupled to a sensor target 835 integral with the swing arm 606, and tracks the position of swing arm 606 and thus position of tool 90. A seal 836 may be made of compliant material and used to exclude debris from the space between the end 608 of the sensor and the sensor target 835. In a preferred embodiment, the sensor is a capacitance gauge. The embodiment shown in FIG. 40G is capable of operating at speeds approaching 20 kHz and producing tool tip accelerations of 1000 g's.

Figure 41A:
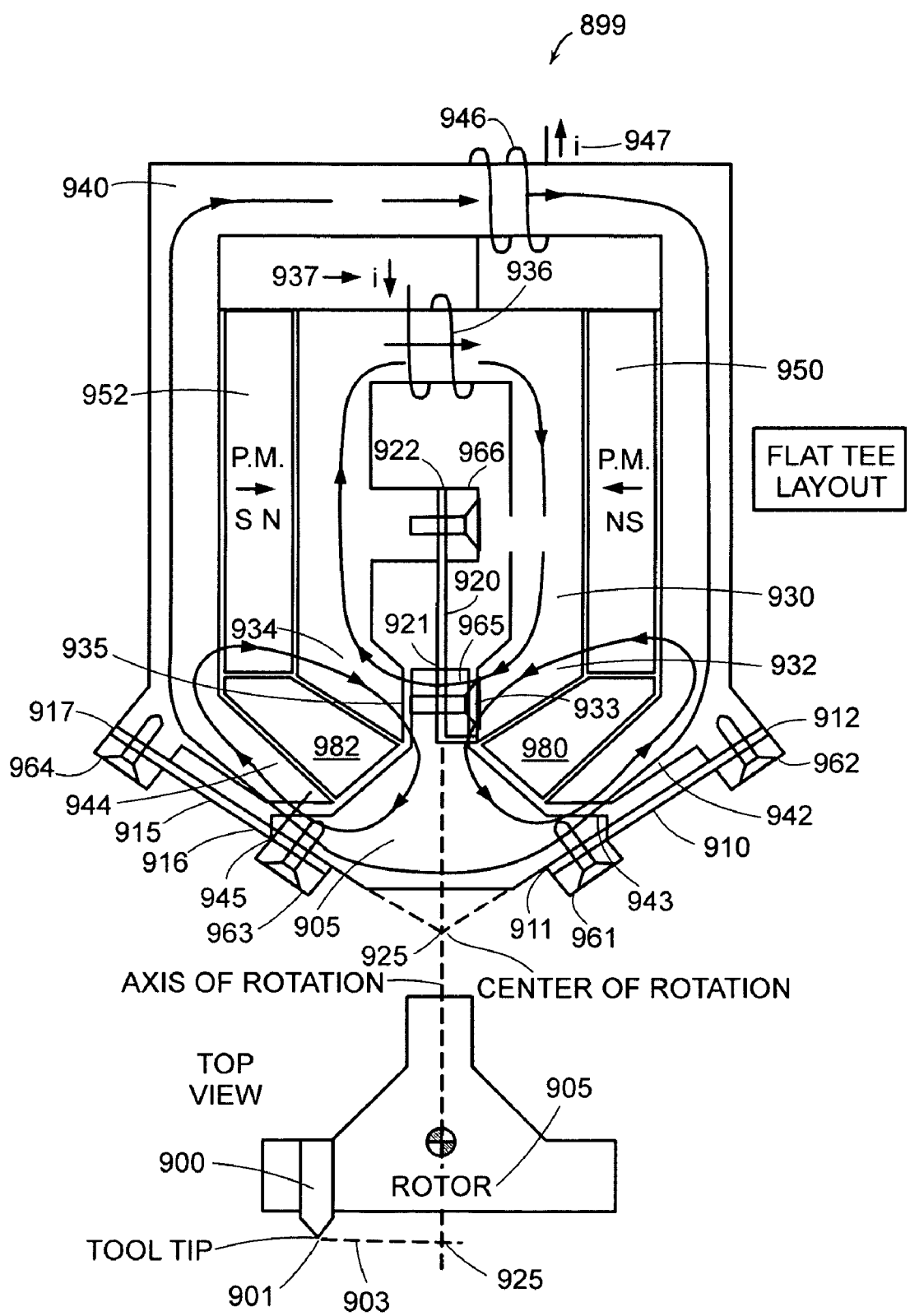
FIGS. 41A, 41B and 41C depict a "Flat Tee System" designed according to the principles of this invention.
Figure 41B:
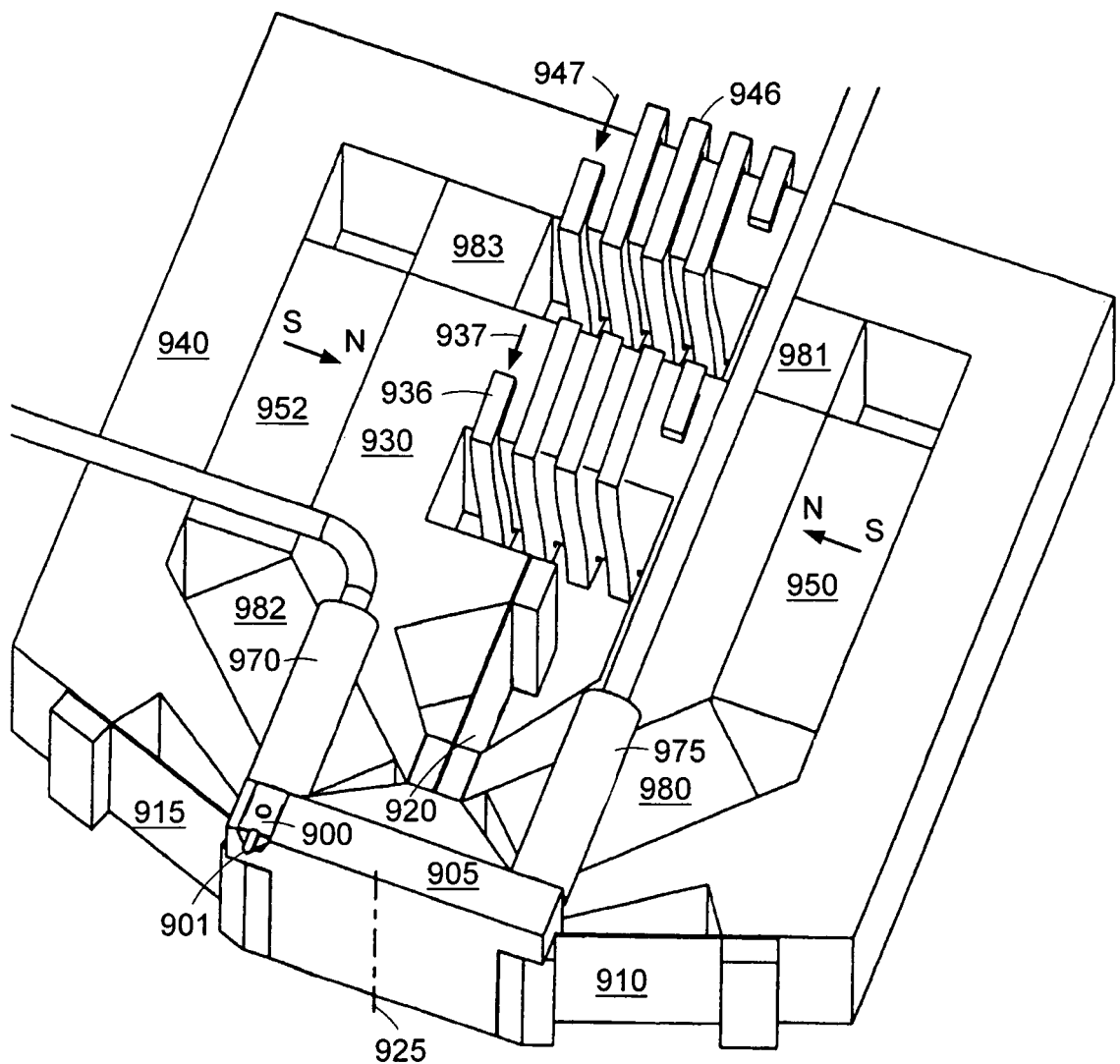
Figure 41C:
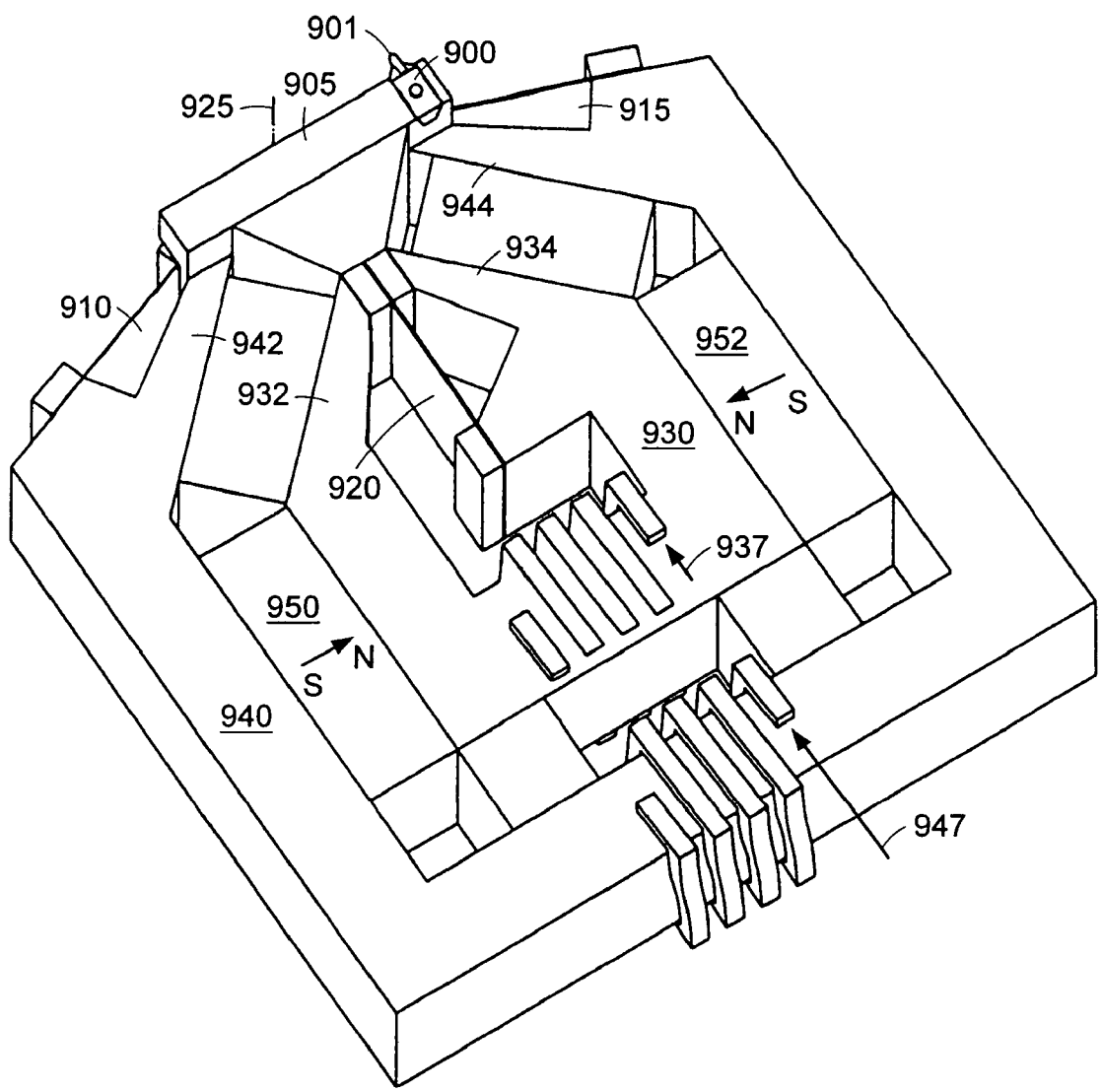

The embodiment shown in FIGS. 41A, 41B, and 41C can be referred to as the "Flat Tee System". Referring to FIGS. 41A, 41B, and 41C a tool 900 is attached to a rotor 905 that is supported by a first front flexure 910, a second front flexure 915, and a back flexure 920. The virtual intersection of the three flexures 910, 915, 920 establish an axis of rotation 925 for the rotor 905. The cutting edge 901 of the tool 900 lies in a plane 903 that passes through axis of rotation 925. An inner stator core 930 has a first inner pole piece 932 and a second inner pole piece 934 that forms a first inner pole gap 933 and a second inner pole gap 935 with the rotor 905. An inner core wire coil 936 is wrapped around the inner stator core 930 in a manner such that a current 937 in the inner core wire coil 936 causes the first inner pole piece 932 to be temporarily magnetized in a first or northerly polarity and the second inner pole piece 934 to be temporarily magnetized in a second or southerly polarity. An outer stator core 940 has a first outer pole piece 942 and a second outer pole piece 944 that forms a first outer pole gap 943 and a second outer pole gap 945 with the rotor 905. An outer core wire coil 946 is wrapped around the outer stator core 940 in a manner such that a current 947 in the outer core wire coil 946 causes the first outer pole piece 942 to be temporarily magnetized in northerly polarity and the second outer pole piece 944 to be temporarily magnetized in a southerly polarity.

A first permanent magnet 950 and second permanent magnet 952 contact the inner stator core 930 and the outer stator core 940 such that the north poles of each permanent magnet contact the inner stator core and the south poles of each permanent magnet contact the outer stator core. In an alternative embodiment a non-magnetic spacer can be placed between the permanent magnets and the cores to adjust the DC flux produced in the gaps 933, 935, 943, 945. In a preferred embodiment the inner end 911 of the first front flexure 910 is mounted to the rotor 905 by clamping block 961, and the outer end 912 of the first front flexure 910 is mounted to the outer stator core 940 using clamping block 962. In a preferred embodiment the inner stator core 930, outer stator core 940, and rotor 905 are made from a high magnetic permeability material such as laminated iron alloys, for example, 50% nickel and 50% iron, or amorphous iron. Alternatively, a portion of the rotor 905 is made from a high magnetic permeability material in a manner that establishes a low reluctance path for the magnetic flux passes between the poles 932, 934, 962, and 964 and the rotor 905. In a preferred embodiment the inner end 916 of the second front flexure 915 is mounted to the rotor 905 by clamping block 964, and the outer end 917 of the second front flexure 915 is mounted to the outer stator core 940 by a clamping block 964. In a preferred embodiment, the inner end 921 of back flexure 920 is mounted to rotor 905 by a clamping block 965, and the outer end 922 of the back flexure 920 is mounted to inner stator core 930 by clamping block 966. In a preferred embodiment the clamping block 965 is made from a high magnetic permeability material and forms the first inner pole gap 933 with the first inner pole piece 932 of the inner stator core 930. A first sensor 970 measures the displacement of rotor 905 at a location on the back of the rotor that is nominally behind the tool 900. First sensor 970 measures the displacement of the rotor 905 relative to the inner stator core 930 and outer stator core 940. A second sensor 975 measures the displacement of the rotor 905 at a location that is nominally the mirror image of the location of the first sensor 970, with the plane containing the back flexure 920 and the axis of rotation 925 being the plane of reflection. The second sensor 975 measures the displacement of the rotor 905 relative to the inner stator core 930 and outer stator core 940.

A first spacer 980, a second spacer 981, a third spacer 982, and a fourth spacer 983 contacts the inner stator core 930 and the outer stator core 940 in a manner providing structural support to the pole pieces 932, 934, 942, and 944. In a preferred embodiment the spacer blocks 980, 981, 982, and 983 are permanent magnets arranged such that the north poles of each make contact with the inner stator core and the south poles of each contacts the outer stator core. In an alternate embodiment the spacer blocks 980, 981, 982, and 983 are made of a low magnetic permeability material.

The flow of current 937 and 947 in the directions shown in FIGS. 41A, 41B and 41C causes the magnetic flux from the permanent magnets and the stator cores to add at the first inner pole gap 933 and second outer pole gap 945, and to subtract at the second inner pole gap 935 and first outer pole gap 943, resulting in a net torque on the rotor 905 that causes a clockwise rotation of the rotor relative to the stator cores 930 and 940 as viewed in FIGS. 41A, 41B, and 41C. Reversing the direction of the flow of current 937 and 947 shown in FIGS. 41A 41B, and 41C causes the magnetic flux from the permanent magnets and the stator cores to add at the second inner pole gap 935 and first outer pole gap 943, and to subtract at the first inner pole gap 933 and second outer pole gap 945, resulting in a net torque on the rotor 905 that causes a counterclockwise rotation of the rotor relative to the stator cores 930 and 940 as viewed in FIGS. 41A, 41B, and 41C.

The embodiment taught in FIGS. 41A, 41B, and 41C may not be readily realizable because the permanent magnets 950 and 952 create a static force on the rotor 905 that creates a compressive preload stress in the first front flexure 910, second front flexure 915, and back flexure 920. It is well known to those practiced in the art that an excessive compressive preload stress in a flexure may lead to mechanical instability which can result in a buckling of one or more of the flexures 910, 915 and 920 causing a poorly defined axis of rotation 925.

Figure 42A:
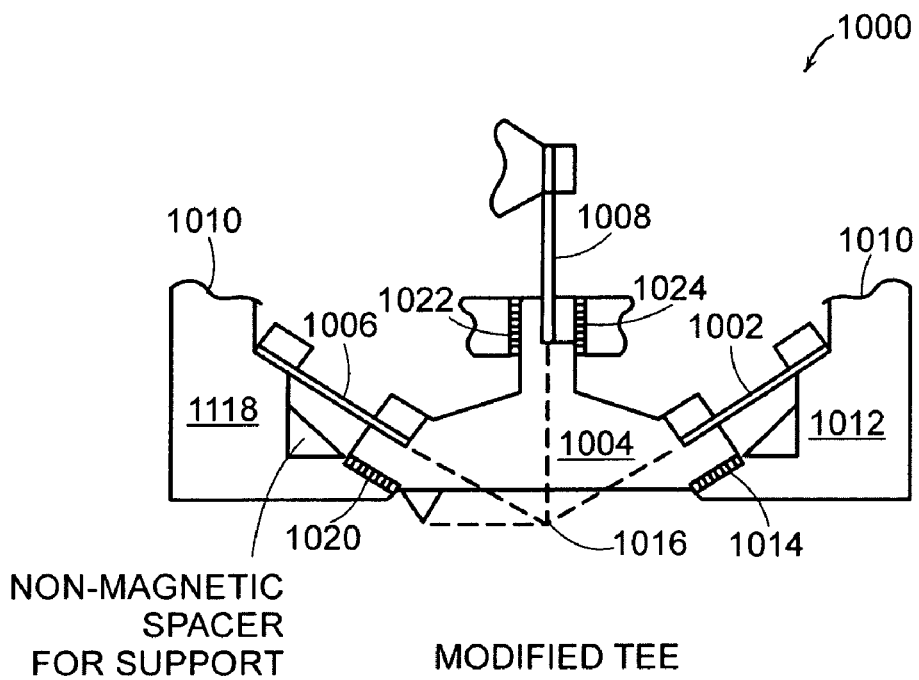
FIGS. 42A and 42B depict a "Modified Flat Tee System" designed according to the principles of this invention.
Figure 42B:
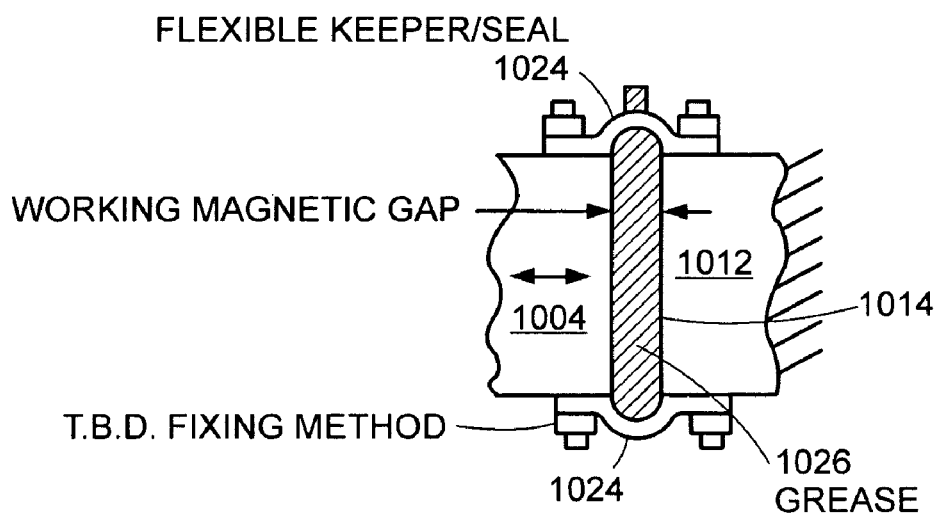

The embodiment shown in FIGS. 42A and 42B may be referred to as the "Modified Flat Tee System." FIG. 42A illustrates the front portion of the system depicted in FIGS. 41A, 41B, and 41C, but with first outer pole piece 1012 and second outer pole piece 1018 of outer stator core 240 rearranged to the front of the rotor 1004.

The first outer pole piece 1012 forms a first outer pole gap 1014 with rotor 1004, and the second outer pole piece 1018 forms a second outer pole gap 1020 with rotor 1004. In this case permanent magnets 950 and 952 create a static force on rotor 1004 which produces a tensile preload stress in the first front flexure 1002, second front flexure 1006, and back flexure 1008. A tensile preload in the flexures 910, 915, and 920 improves the mechanical stability of the flexures and provides a well defined axis of rotation 925. FIG. 42B is a sketch showing a method of keeping debris out of the gaps 1014 and 1020. A flexible seal 1024 connects the rotor 1004 and the outer pole piece 1012 and encloses the gap 1014. The addition of a viscous fluid 1026 in the gap 1014 can provide squeeze-film damping to the motion of the rotor 1004. A similar arrangement as shown in FIG. 42B protects the gap 1020, and can be used to protect the gaps 1024 and 1022.

Figure 43A:
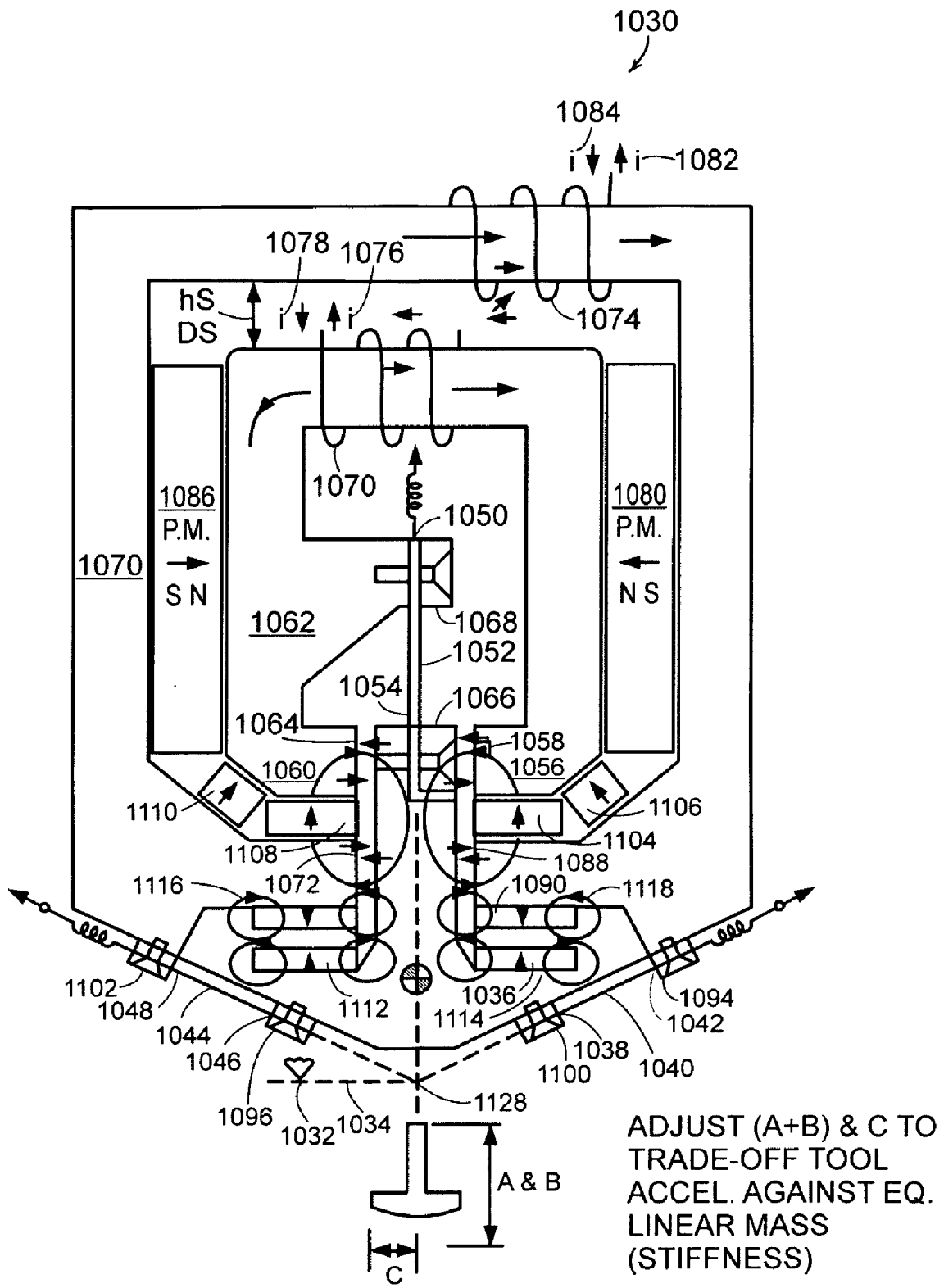
FIGS. 43A, 43B and 43C depict a "Balanced Tee System" designed according to the principles of this invention.
Figure 43B:
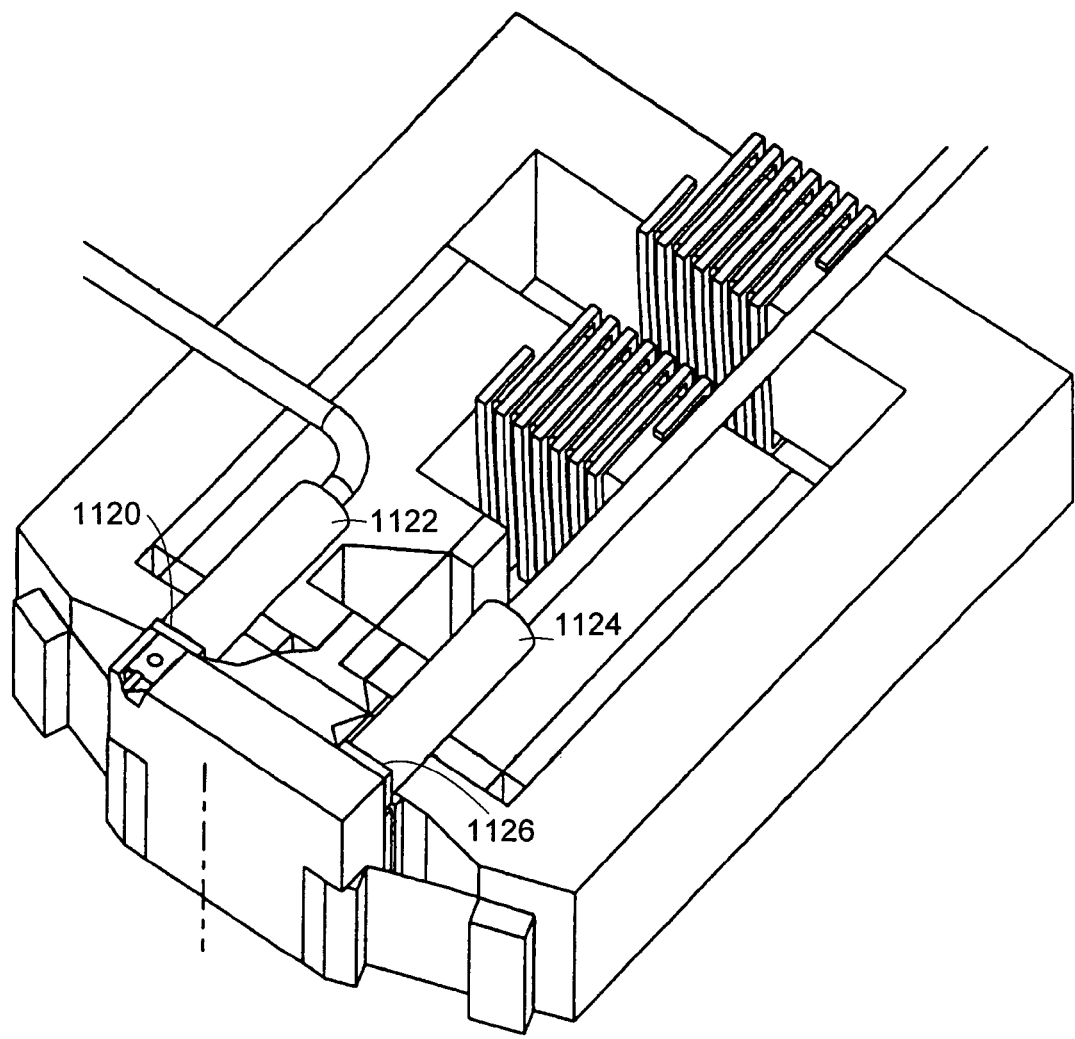
Figure 43C:
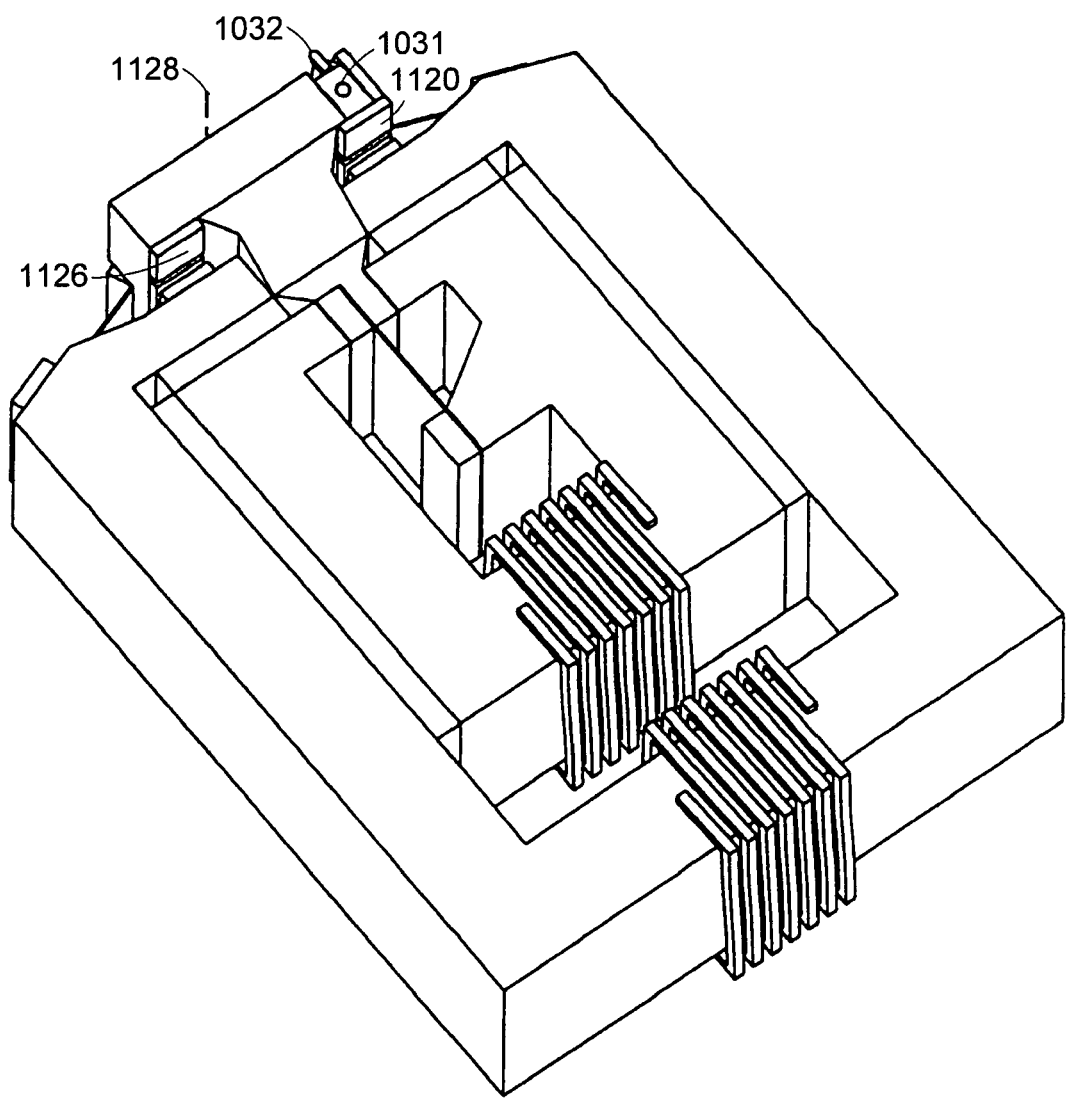

The embodiment shown in FIGS. 43A, 43B, and 43C can be referred to as the "Balanced Tee System". Referring to FIGS. 43A, 43B, and 43C a tool 1031 is held in a rotor 1036 that is supported by a first front flexure 1040, a second front flexure 1044, and a back flexure 1052. The virtual intersection of the three flexures 1040, 1044, 1052 establish an axis of rotation 1128 for the rotor 1036. The cutting edge 1032 of the tool 1031 lies in a plane 1034 passing through the axis of rotation 1128. An inner stator core 1062 has a first inner pole piece 1056 and a second inner pole piece 1060 that forms a first inner pole gap 1058 and a second inner pole gap 1064 with rotor 1036. An inner core wire coil 1070 is wrapped around inner stator core 1062 in a manner such at a current 1078 in inner core wire coil 1070 causes first inner pole piece 1056 to be temporarily magnetized in a northerly polarity and the second inner pole piece 1060 to be temporarily magnetized according to a southerly polarity. A current 1076 in the inner core wire coil 1070 causes first inner pole piece 1056 to be temporarily magnetized in a southerly polarity and the second inner pole piece 1060 to be magnetized in a northerly polarity. An outer stator core 1070 has a first outer pole piece 1090 and a second outer pole piece 1092 that forms a first outer pole gap 1088 and a second outer pole gap 1072, with rotor 1036. An outer core wire coil 1074 is wrapped around the outer stator core 1070 in a manner such at a current 1082 in the outer core wire coil 1074 causes the first outer pole piece 1090 to be temporarily magnetized in a northerly polarity and the second outer pole piece 1092 to be temporarily magnetized in a southerly polarity. A current 1084 in the outer core wire coil 1074 causes the first outer pole piece 1090 to be temporarily magnetized in a southerly polarity and the second outer pole piece 1092 to be magnetized in a northerly polarity.

A first permanent magnet 1080 and second permanent magnet 1086 contact the inner stator core 1062 and the outer stator core 1070 such that the north poles of each permanent magnet contact the inner stator core and the south poles of each permanent magnet contact the outer stator core. In an alternative embodiment a non-magnetic spacer can be placed between the permanent magnets and the cores to adjust the DC flux produced in the gaps 1058, 1064, 1072, 1088. In a preferred embodiment the inner end 1038 of the first front flexure 1040 is mounted on the rotor 1036 using clamping block 1100, and outer end 1042 of first front flexure 1040 is mounted to outer stator core 1070 using clamping block 1094. In a preferred embodiment inner stator core 1062, outer stator core 1070, and rotor 1036 are made from a high magnetic permeability material. Alternatively, a portion of rotor 1036 is made from a high magnetic permeability material in a manner establishing a low reluctance path for the magnetic flux passing between the poles 1056, 1060, 1090 and 1092 and the rotor 1036. In a preferred embodiment the inner end 1046 of second front flexure 1044 is mounted to rotor 1036 using clamping block 1096, and outer end 1048 of second front flexure 1044 is mounted to outer stator core 1070 using clamping block 1102. In a preferred embodiment the inner end 1054 of the back flexure 1052 is mounted to rotor 1036 using clamping block 1066, and the outer end 1050 of the back flexure 1052 is mounted to inner stator core 1062 using clamping block 1068. In a preferred embodiment the clamping block 1066 is made from a high magnetic permeability material and forms the first inner pole gap 1058 with the first inner pole piece 1056 of the inner stator core 1062. A first sensor 1122 measures the displacement of rotor 1036 by sensing a target 1120 attached to the back of the rotor that is nominally behind the tool 1031. The first sensor 1122 measures the displacement of rotor 1036 relative to the inner stator core 1062 and outer stator core 1070. A second sensor 1124 measures the displacement of rotor 1036 by sensing a target 1126 attached to the back of the rotor at a location that is nominally the mirror image of the location of the first target 1120, with the plane containing the back flexure 1052 and the axis of rotation 1128 being the plane of reflection. The second sensor 1124 measures the displacement of rotor 1036 relative to inner stator core 1062 and outer stator core 1070.

A first spacer 1104, second spacer 1106, third spacer 1108, and a fourth spacer 1110 contact the inner stator core 1062 and the outer stator core 1070 in a manner providing structural support to pole pieces 1056, 1060, 1090, and 1092. In a preferred embodiment spacer blocks 1104, 1106, 1108 and 1110 are permanent magnets arranged such that the north poles of each contacts the inner stator core and the south poles of each contacts the outer stator core, respectively. In an alternate embodiment the spacer blocks 1104, 1106, 1108, and 1110 are made of a low magnetic permeability material. Permanent magnets 1112 and 1114 are mounted to the rotor 1036, and permanent magnets 1116 and 1118 are mounted to the outer stator core 1070. The permanent magnets 1112 and 1116 are arranged so that their north faces are towards each other, and the permanent magnets 1114 and 1118 are arranged similarly, thus producing a repulsion force between the rotor 1036 and the outer stator core 1070 capable of creating a tensile preload stress in the first front flexure 1040, second front flexure 1044, and back flexure 1052. A tensile preload in the flexures 1040, 1044, and 1052 improves the mechanical stability of the flexures contributing to a well defined axis of rotation 1128.

The flow of current 1078 and 1082 in the directions shown in FIGS. 43A, 43B, and 43C causes the magnetic flux from the permanent magnets and the stator cores to add at the first inner pole gap 1058 and second outer pole gap 1072, and further causes magnetic flux to subtract at the second inner pole gap 1064 and first outer pole gap 1088. If the area, length, and magnetic flux in gaps 1058, 1064, 1088, and 1072 are equal, then the forces acting on the rotor at the location of each gap will be equal, resulting in a net torque on the rotor 1036 that causes a clockwise rotation thereof relative to stator cores 1062 and 1070 as viewed in FIGS. 43A, 43B, and 43C. The direction of current shown by 1078 and 1082 cause the forces between the rotor 1036 and the first inner pole gap 1058 and second outer pole gap 1072 to be in the opposite direction, thus producing no net force on the rotor but a relatively low torque on it. Reversing the direction of the flow of current 1078 and 1082 causes a counter-clockwise rotation of rotor 1036 relative to stator cores 1062 and 1070 as viewed in FIGS. 43A, 43B, and 43C. If the direction of current in the inner core wire coil 1070 is as shown by 1078, and the direction of current in the outer core wire coil 1074 is as shown by 1084, then the magnetic flux from the permanent magnets and the stator cores will add at the first inner pole gap 1058 and first outer pole gap 1088, and cause magnetic flux to subtract at the second inner pole gap 1064 and second outer pole gap 1072. In this case the forces acting on the rotor 1036 will be in the same direction, resulting in a large torque on the rotor causing a clockwise rotation while producing a net force on the rotor. In a similar fashion, application of the currents 1076 and 1082 will result in a large torque on the rotor 1036 causing a counter-clockwise rotation of the rotor.

Figure 44:
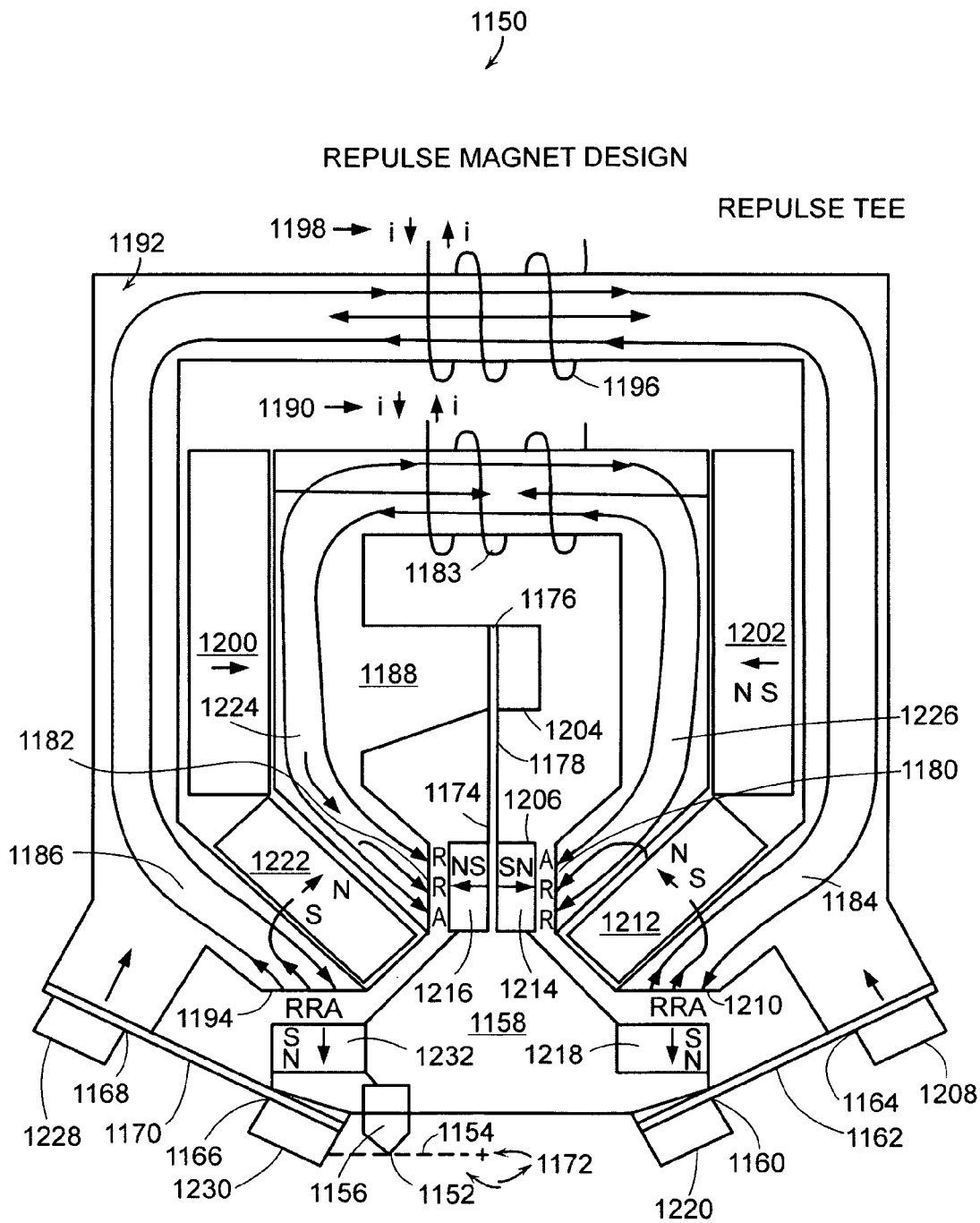
FIG. 44 depicts a "Repulse Tee System" designed according to the principles of this invention.

The embodiment of FIG. 44 may be referred to as the "Repulse Tee System" Referring to FIG. 44 a tool 1156 is held in a rotor 1158 that is supported by a first front flexure 1162, a second front flexure 1170, and a back flexure 1178. The virtual intersection of the three flexures 1162, 1170, 1178 establish an axis of rotation 1172 for the rotor 1158. Cutting edge 1152 of the tool 1156 lies in a plane 1154 passing through axis of rotation 1172. An inner stator core 1188 has a first inner pole piece 1226 and a second inner pole piece 1224 that forms a first inner pole gap 1180 and a second inner pole gap 1182 with rotor 1158. An inner core wire coil 1183 is wrapped around an inner stator core 1188 in a manner such that a current 1190 in the inner core wire coil 1183 causes first inner pole piece 1226 to be temporarily magnetized in a northerly orientation and the second inner pole piece 1224 to be temporarily magnetized in a southerly orientation. An outer stator core 1192 has a first outer pole piece 1184 and a second outer pole piece 1186 that forms a first outer pole gap 1210 and a second outer pole gap 1194 with the rotor 1158. An outer core wire coil 1196 is wrapped around the outer stator core 1192 in a manner such that a current 1198 in outer core wire coil 1196 causes first outer pole piece 1184 to be temporarily magnetized in a northerly orientation and the second outer pole piece 1186 to be temporarily magnetized in a southerly orientation.

A first permanent magnet 1202 and a second permanent magnet 1200 contact the inner stator core 1188 and the outer stator core 1192 such that the north poles of each permanent magnet contact the inner stator core and the south poles of each permanent magnet contact the outer stator core. In an alternative embodiment a non-magnetic spacer can be placed between the permanent magnets and the cores to adjust the DC flux produced in the gaps 1180, 1182, 1210, 1194. In a preferred embodiment the inner end 1160 of the first front flexure 1162 is mounted to the rotor 1158 by a clamping block 1220, and the outer end 1164 of the first front flexure 1162 is mounted to the outer stator core 1192 by clamping block 1208.

In a preferred embodiment the inner stator core 1188, the outer stator core 1192, and the rotor 1158 are made from a high magnetic permeability material. Alternatively, a portion of the rotor 1158 is made from a high magnetic permeability material in a manner that establishes a low reluctance path for the magnetic flux passes between the poles 1226, 1224, 1184, and 1186 and the rotor 1158. In a preferred embodiment inner end 1166 of second front flexure 1170 is mounted to rotor 1158 by a clamping block 1230, and outer end 1168 of second front flexure 1170 is mounted to the outer stator core 1192 by a clamping block 1228.

In another preferred embodiment inner end 1174 of back flexure 1178 is mounted to the rotor 1158 using a clamping block 1206, and outer end 1176 of back flexure 1178 is mounted to inner stator core 1188 using clamping block 1204. In a preferred embodiment clamping block 1206 is made from a high magnetic permeability material and forms the first inner pole gap 1180 with the first inner pole piece 1226 of inner stator core 1188. As illustrated in FIGS. 41A, 41B, and 41C, a first sensor 970 measures the displacement of the rotor 1158 at a location on the back of the rotor that is nominally behind the tool 1156. The first sensor 970 measures the displacement of the rotor 1158 relative to the inner stator core 1188 and outer stator core 1192. A second sensor 975 measures the displacement of the rotor 1158 at a location that is nominally the mirror image of the location of the first sensor 970, with the plane containing the back flexure 1178 and the axis of rotation 1172 being the plane of reflection. The second sensor 975 measures the displacement of the rotor 1158 relative to the inner stator core 1188 and outer stator core 1192.

A third permanent magnet 1212 and a fourth permanent magnet 1222 contact the inner stator core 1188 and the outer stator core 1192 in a manner that provides structural support to the pole pieces 1226, 1224, 1184, and 1186. In a preferred embodiment the permanent magnets 1212 and 1222 are arranged such that the north poles of each contact the inner stator core and the south poles of each contact the outer stator core. A fifth permanent magnet 1214, a sixth permanent magnet 1216, a seventh permanent magnet 1218, and a eighth permanent magnet 1232 are further attached to the rotor 1158. The fifth permanent magnet 1214 is integral with the clamping block 1206. The permanent magnets 1214 and 1216 are arranged so that their north poles face the inner pole pieces 1226 and 1224, respectively. The opposing magnetic flux between permanent magnets 1212 and 1214, and between 1222 and 1216 tend to center the rotor 1158 between inner stator core pole pieces 1226 and 1224. The permanent magnets 1218 and 1232 are arranged so that their south poles face the outer pole pieces 1184 and 1186, respectively.

The opposing magnetic flux between the permanent magnets 1212 and 1218, and between 1222 and 1232 produces a repulsion force between the rotor 1158 and the outer stator core 1192 capable of creating a tensile preload stress in the first front flexure 1162, second front flexure 1170, and back flexure 1178. A tensile preload in the flexures 1162, 1170, and 1178 may improve the mechanical stability of the flexures and leads to a well defined axis of rotation 1172.

The flow of current 1190 and 1198 in the directions shown in FIG. 44 causes the magnetic flux from the permanent magnets and the stator cores to add at first inner pole gap 1180 and second outer pole gap 1194, increasing the repulsion forces at those gaps between the stator cores and the rotor 1158. The flow of current 1190 and 1198 in the directions shown in FIG. 44 causes magnetic flux to subtract at the second inner pole gap 1182, and the first outer pole gap 1210, decreasing the repulsion forces at those gaps between the stator cores and the rotor 1158. The net result of a flow of current 1190 and 1198 is to produce a net torque on the rotor 1158 that causes a counter-clockwise rotation of the rotor relative to the stator cores 1188 and 1192 as viewed in FIG. 44. Similarly, reversing the direction of the flow of current 1190 and 1198 shown in FIG. 44 results in a net torque on the rotor 1158 that causes a clockwise rotation of the rotor relative to the stator cores 1188 and 1192 as viewed in FIG. 44.

In the embodiment of FIG. 44 the magnetic flux near the gaps 1180, 1182, 1210, and 1194 may not be substantially confined to those gaps. As a result, the pole pieces 1226, 1224, 1184, and 1186, and the rotor 1158 may tend to attract, or grab, objects made from magnetic material that are proximate to the system. Additionally, the magnet flux may not be substantially confined to the rotor 1158, the inner stator core 1188, and the outer stator core 1192, which may result in lowered efficiency.

Figure 45A:
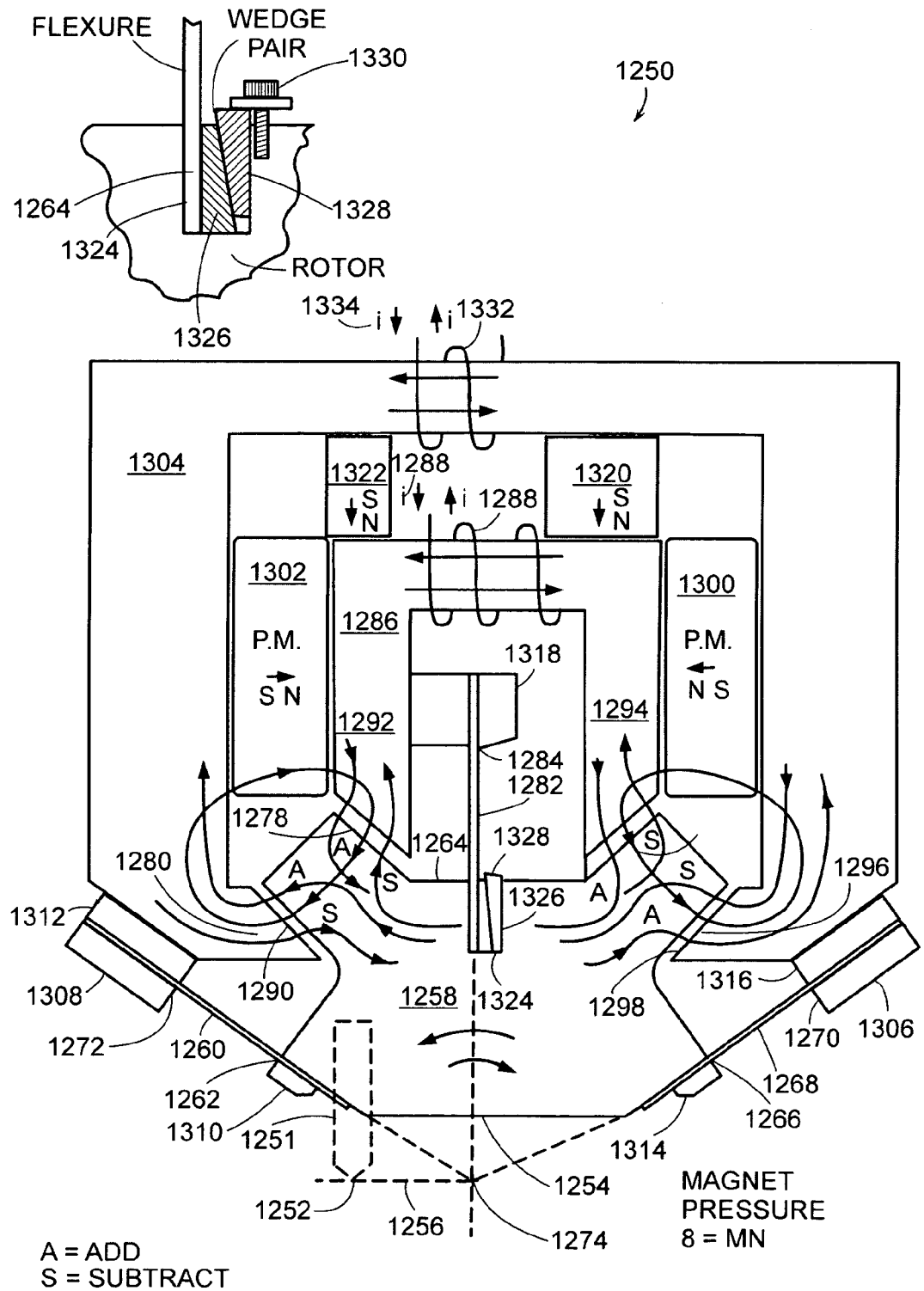
FIGS. 45A, 45B, and 45C depict a "Y-Rotor System" designed according to the principles of this invention.
Figure 45B:
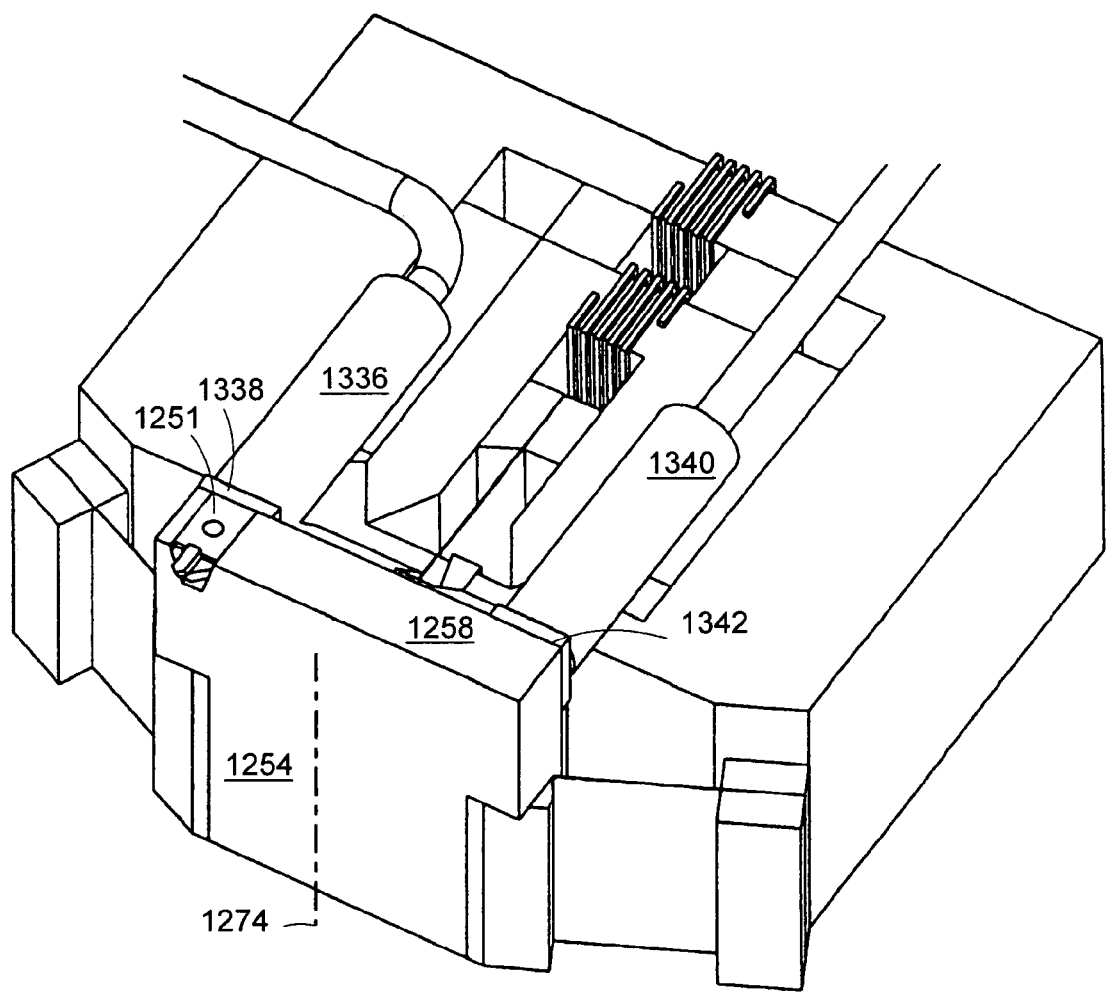
Figure 45C:
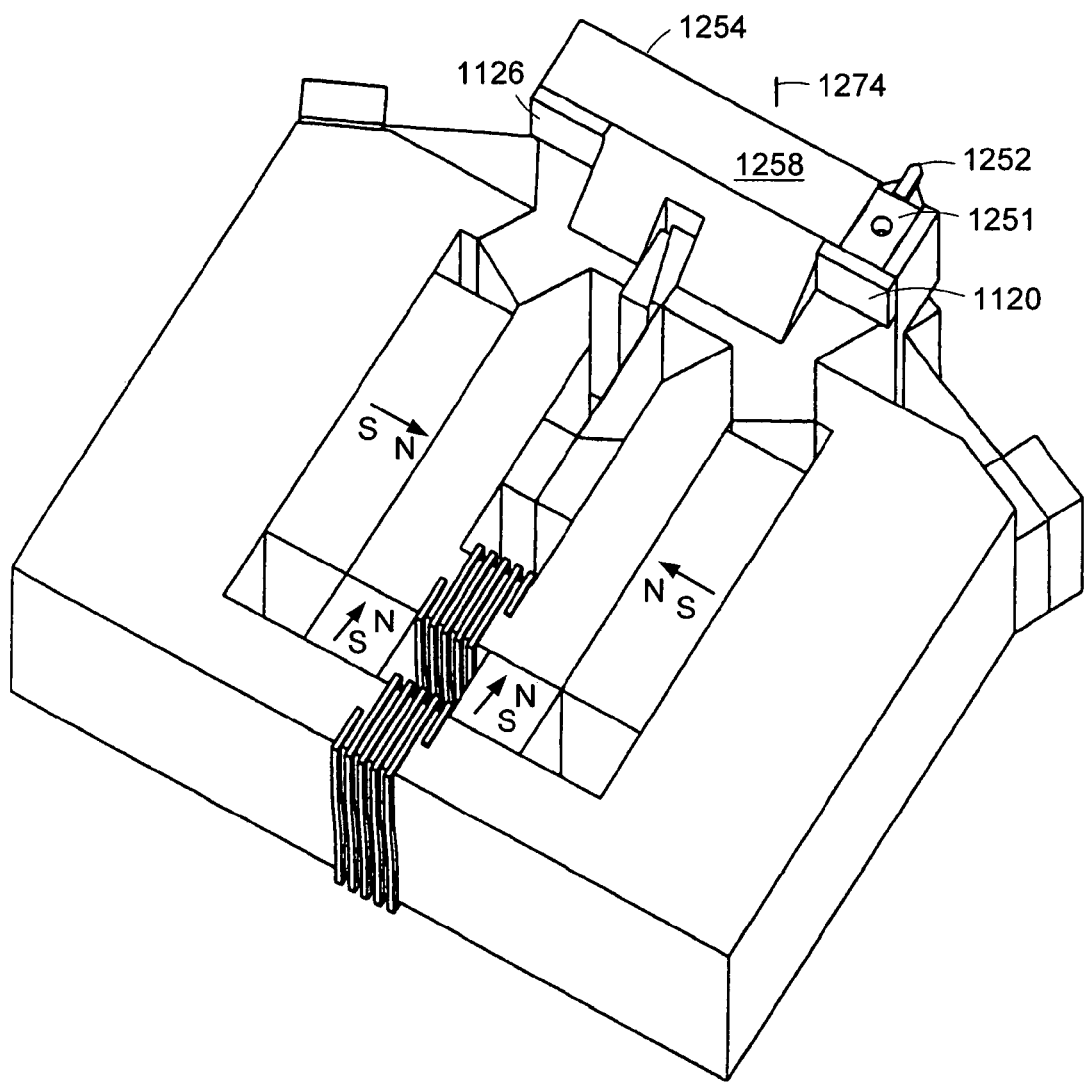

The system shown in FIGS. 45A, 45B, and 45C may be referred to as the "Y-rotor Configuration." Referring to FIGS. 45A, 45B, and 45C a tool 1251 is held in a rotor 1258 that is supported by a first front flexure 1268, a second front flexure 1260, and a back flexure 1282. The virtual intersection of the three flexures 1268, 1260, 1282 establish an axis of rotation 1274 for the rotor 1258. Cutting edge 1252 of tool 1251 lies in a plane 1256 that passes through axis of rotation 1274. An inner stator core 1286 has a first inner pole piece 1294 and a second inner pole piece 1292 that forms a first inner pole gap 1276 and a second inner pole gap 1278 with the rotor 1258.

An inner core wire coil 1288 is wrapped around inner stator core 1286 in a manner such that a current 1289 in the inner core wire coil 1288 causes first inner pole piece 1294 to be temporarily magnetized in a northerly orientation and the second inner pole piece 1292 to be temporarily magnetized in a southerly orientation.

An outer stator core 1304 has a first outer pole piece 1296 and a second outer pole piece 1280 that forms a first outer pole gap 1298 and a second outer pole gap 1290 with rotor 1258. An outer core wire coil 1332 is wrapped around outer stator core 1304 in a manner such that a current 1334 in the outer core wire coil 1332 causes first outer pole piece 1296 to be temporarily magnetized in a northerly orientation and the second outer pole piece 1280 to be temporarily magnetized in a southerly orientation. A first permanent magnet 1300 and a second permanent magnet 1302 contact the inner stator core 1286 and the outer stator core 1304 such that the north poles of each permanent magnet contact the inner stator core and the south poles of each permanent magnet contact the outer stator core. In an alternative embodiment a non-magnetic spacer can be placed between the permanent magnets and the cores to adjust the DC flux produced in the gaps 1276, 1278, 1298, 1290.

In a preferred embodiment, the inner end 1266 of the first front flexure 1268 is mounted to rotor 1258 using a clamping block 1314, and outer end 1270 of the first front flexure 1268 is mounted to a first front spacer block 1316 which in turn is mounted to the outer stator core 1304 using a clamping block 1306. In a preferred embodiment the inner end 1262 of the second front flexure 1260 is mounted to rotor 1258 using a clamping block 1310, and the outer end 1272 of the second front flexure 1260 is mounted to a second front spacer block 1312 which is mounted to the outer stator core 1304 using a clamping block 1308. In a preferred embodiment the inner end 1264 of the back flexure 1282 is mounted to a receiving slot 1324 in rotor 1258 by a first wedge 1326, a second wedge 1328, and a device 1330 for causing a clamping force on the inner end 1264 of the flexure. The outer end 1284 of the back flexure 1282 is mounted to a back spacer block 569 which in turn is mounted to the inner stator core 1286 using a clamping block 1318. In a preferred embodiment inner stator core 1286, outer stator core 1304, and rotor 1258 are made from a high magnetic permeability material. Alternatively, a portion of rotor 1258 can be made from a high magnetic permeability material in a manner establishing a low reluctance path for the magnetic flux passing between the poles 1294, 1292, 1296, and 1280 and rotor 1258. In a preferred embodiment spacer blocks 1316, 1312, and 569 are made of a low magnetic permeability material to inhibit the flow of magnetic flux between the rotor 1258 and the stator cores 1286 and 1304 through the flexures 1268, 1260, and 1282.

In an embodiment, the area of first inner pole piece 1294 at gap 1276 is larger than the area of the first outer pole piece 1296 at gap 1298, and the area of the second inner pole piece 1292 at gap 1278 is larger than the area of the second outer pole piece 1280 at gap 1290. Those practiced in the art will recognize that if the length of the gaps 1276 and 1298 are equal, and if the length of the gaps 1278 and 1290 are equal, then the forces acting on the rotor from the permanent magnets 1300, 1302, 1320, and 1322 will be higher in gaps 1298 and 1290 than in gaps 1276 and 1278, thus producing a net force from the permanent magnets on the rotor 1258 creating a tensile preload stress in first front flexure 1268, second front flexure 1260, and back flexure 1282.

In FIG. 45B, a first sensor 1336 measures the displacement of rotor 1258 by sensing a target 1338 which is attached to the rear side of the rotor 1258. First sensor 1336 measures displacement of rotor 1258 relative to inner stator core 1286 and outer stator core 1304. A second sensor 1340 can measure the displacement of rotor 1258 by sensing a target 1342 attached to the rear of rotor 1258 at a location that is substantially the mirror image of the location of the first target 1338. In this configuration, the plane containing the back flexure 1282 and the axis of rotation 1274 is considered to be the plane of reflection. Second sensor 1340 measures the displacement of rotor 1258 relative to inner stator core 1286 and outer stator core 1304. A first spacer 1320 and a second spacer 1322 contact inner stator core 1286 and outer stator core 1304 in a manner providing a structural support between the two stator cores. In a preferred embodiment spacer blocks 1320 and 1322 are permanent magnets arranged such that the north poles of each contacts the inner stator core and the south poles of each contacts the outer stator core. In an alternative embodiment spacer blocks 1320 and 1322 are made of a low magnetic permeability material.

The flow of current 1289 and 1334 in the directions shown in FIGS. 45A, 45B, and 45C causes magnetic flux from the permanent magnets and the stator cores to add at the first inner pole gap 1276 and second outer pole gap 1290, and further causes the magnetic flux to subtract at second inner pole gap 1278 and first outer pole gap 1298, thus resulting in a net torque on the rotor 1258 causing a counter-clockwise rotation of the rotor relative to the stator cores 1286 and 1304 as viewed in FIGS. 45A, 45B, and 45C. Reversing the direction of the flow of current 1289 and 1334 causes the magnetic flux from the permanent magnets and the stator cores to add at the second inner pole gap 1278 and first outer pole gap 1298, causing the magnetic flux to subtract at the first inner pole gap 1276 and the second outer pole gap 1290, thus resulting in a net torque on the rotor 1258 causing a clockwise rotation of the rotor relative to the stator cores 1286 and 1304 as viewed in FIGS. 45A, 45B, and 45C.

The rotating element in the embodiments illustrated in FIGS. 41A through 45C can be adapted to hold a mirror instead of a cutting tool for use as a short-stroke, high angular acceleration, compact-sized mirror mount for use in an optical system, such as an optical free space communications system. For example, referring to FIGS. 45A, 45B, and 45C, the tool 1251 may be omitted and the rotor 1258 may act as a mount for a mirror. Alternatively, tool 1251 may be replaced by a mirrored surface on the rotor 1258. In both embodiments, the mirror rotates about the axis of rotation 1274. Those practiced in the art will recognize that if the axis of rotation 1274 does not pass through the center of mass of the rotor 1258 that inertial forces will be developed and act upon the flexures during rotation of the rotor. The spacing between the axis 1294 and center of mass of the rotor and the magnitude of the tensile preload in the flexure from the permanent magnets can be tailored to accommodate/tolerate these inertial forces.

FIGS. 46A and 46B illustrate a rotary fast tool servo 1357 operating with a two-axis lathe 1380 and a rotary axis 1374 for machining a textured surface on a spherical workpiece 1364. The fast tool servo 1357 is mounted on a rotary axis 1374. In a preferred embodiment rotary axis 1374 is mounted to a slide 1372. In a preferred embodiment slide 1372 can travel away and towards a spindle 1368 that is mounted to a second slide 1370 capable of traveling in a direction substantially perpendicular to the direction of travel of the slide 1372. In another embodiment the directions of travel of the slides 1370 and 1372 are interchanged. In still another embodiment the spindle is mounted directly to the machine base 1378 and the rotary axis is mounted to the slide 1372 which is in turn mounted to the slide 1370. Alternatively, the rotary axis 1374 is mounted directly to the machine base 1378 and the spindle 1368 is mounted to the slide 1370 that in turn is mounted to the slide 1372. The rotary axis may provide the motion depicted by the arrow 1376, allowing positioning the first fast tool servo in the range shown by the fast tool position 1358 and 1360. The angular extent of the range between 1358 and 1360 is in the range of 0 to 180 degrees, and allows the tool 1354 and 1356 to engage the workpiece 1364 at points lying in an arc extending from the spindle rotational axis 1366 to perpendicular to the axis 1366 and beyond perpendicular. During operation, the rotary fast tool servo 1357 produces a reaction torque on the rotary axis 1374. The rotary axis 1374 can be allowed to float as a reaction mass or be locked and allowed to transmit the torque to the machine 1380. In the first case the rotary axis 1374 acting as a reaction mass transmits a negligible disturbance to the machine 1380. In the latter case, the machine 1380 experiences a disturbance torque whose value does not depend on the angle of the rotation of the rotary axis 1374. It is well known to those practiced in the art that if the rotary axis 1374 is allowed to act as a reaction mass that the interaction between the tool 1352 and the workpiece 1364 will be negligibly affected by the operation of the fast tool servo 1357, allowing for the production of a high quality surface on the workpiece 1364. It is further known that in some instances a disturbance torque on the machine 1380 does not preclude the production of a high quality surface on the workpiece 1364.

In contrast, if the fast tool servo 1357 were of a type not adhering to the principles of this invention and produced a linear motion of the tool 1352 relative to the fast tool servo base 1362, then the fast tool servo 1357 would generate a reaction force on the rotary axis 1374. In the case where the fast tool servo is at position 1358 the slide 1372 would act as a reaction mass and absorb the reaction force without disturbing the machine 1380. In the case where the fast tool servo is at position 1360 the reaction force would pass directly through the slide 1372 and disturb the machine 1380, possibly degrading the quality of the machine surface of the workpiece 1364.

Figure 47:
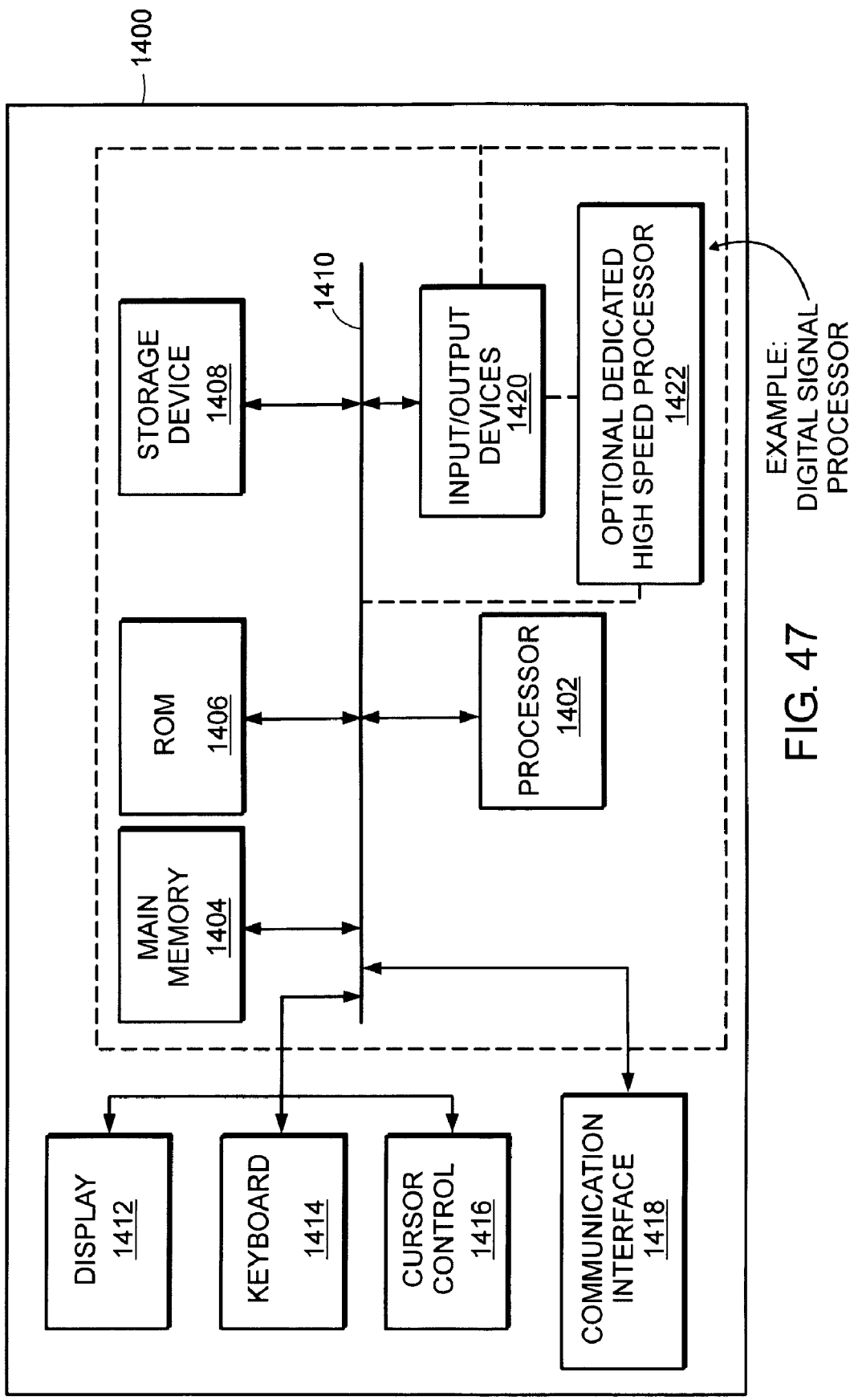
FIG. 47 illustrates a schematic diagram of a general purpose computer architecture that can be used for controlling preferred embodiments in accordance with aspects of the present invention.

FIG. 47 illustrates a general purpose computer that is configurable for use as a fast tool servo controller by way of software executable instructions. The exemplary computer 1400 includes a processor 1402, main memory 1404, read only memory (TOM) 1406, storage device 1408, bus 1410, display 1412, keyboard 1414, cursor control 1416, and communication interface 1418, input/output devices 1420, and an optional dedicated high speed processor 1422 such as a digital signal processor (DSP).

The processor 1402 may be any type of conventional processing device that interprets and executes instructions. Main memory 1404 may be a random access memory (RAM) or a similar dynamic storage device. Main memory 1404 stores information and instructions to be executed by processor 1402. Main memory 1404 may also be used for storing temporary variables or other intermediate information during execution of instructions by processor 1402. ROM 1406 stores static information and instructions for processor 1402. It will be appreciated that ROM 1406 may be replaced with some other type of static storage device. The data storage device 1408 may include any type of magnetic or optical media and its corresponding interfaces and operational hardware. Data storage device 1408 stores information and instructions for use by processor 1402. Bus 1410 includes a set of hardware lines (conductors, optical fibers, or the like) that allow for data transfer among the components of computer 1420.

Display device 1412 may be a cathode ray tube (CRT), or the like, for displaying information to a user. Keyboard 1414 and cursor control 1416 allow the user to interact with the computer 1400. Cursor control 1416 may be, for example, a mouse. In an alternative configuration, keyboard 1414 and cursor control 1416 can be replaced with a microphone and voice recognition means to enable the user to interact with the computer 1400.

Communication interface 1418 enables the computer 1400 to communicate with other devices/systems via any communications medium. For example, communication interface 1418 may be a modem, an Ethernet interface to a LAN, or a printer interface. Alternatively, communication interface 1418 can be any other interface that enables communication between the computer 1400 and other devices or systems. Input/output devices 1420 may be digital-to-analog converters for sending commands from the controller to the FTS and machine 1380, and analog-to-digital converters or digital-to-digital links for the controller to receive data from sensors in or associated with the FTS and machine 1380. Optional dedicated high speed processor 1422 may be a digital signal processor with its own dedicated memory, capable of controlling the FTS at a faster rate than the processor 1402 which would handle slower speed events such as user interface functions.

By way of example, a computer 1400 consistent with preferred embodiments performs operations necessary to complete desired actions in response to processor 1402 executing sequences of instructions contained in, for example, memory 1404. Such instructions may be read into memory 1404 from another computer-readable medium, such as a data storage device 1408, or from another device via communication interface 1418. Execution of the sequences of instructions contained in memory 1404 causes processor 1402 to perform a method for precisely controlling a rotary fast tool servo while operating on a workpiece. For example, processor 1402 may execute instructions to perform the functions of establishing a desired material removal pattern for a given workpiece, of positioning a tool for engaging the workpiece, of monitoring forces on the tool while engaged in a workpiece, of rotating a workpiece about an axis while the tool is moved in a determined pattern to remove material from the workpiece, and the like. Alternatively, hard-wired circuitry may be used in place of or in combination with software instructions to implement the present invention. Thus, the present invention is not limited to any specific combination of hardware circuitry and software.

Figure 48:
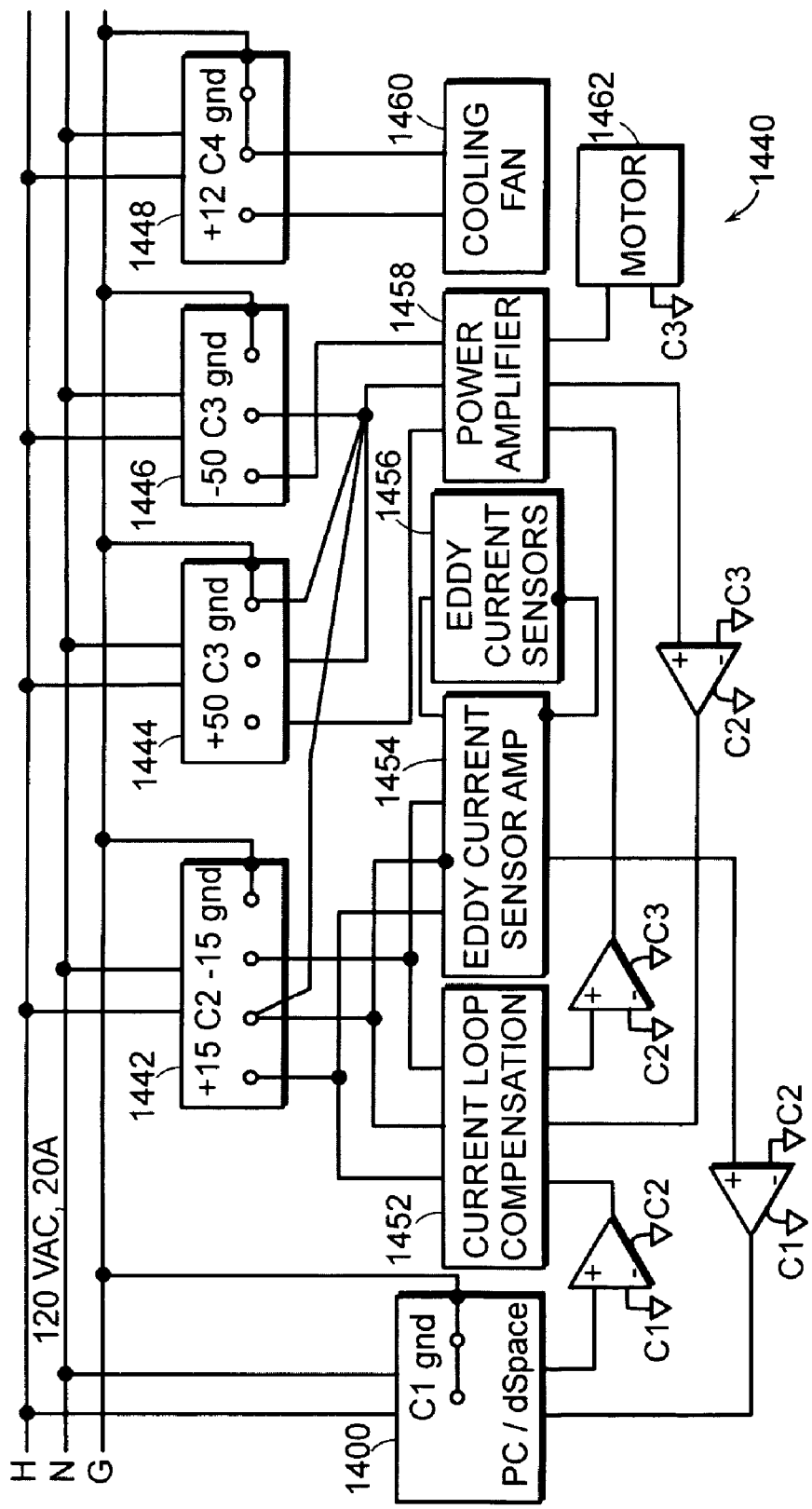
FIG. 48 illustrates a schematic diagram of an exemplary electrical circuit useful for operating embodiments of the rotary fast tool servo.

FIG. 48 illustrates a schematic diagram of an exemplary electrical circuit 1440 useful for powering and controlling embodiments of a rotary fast tool servo operating at speeds in the range of 2 kHz to 20 kHz. Circuit 1440 can be powered using 120 VAC power at, say, 20 amps. The AC power may be applied to a +/−15 volt DC power supply 1442 for powering an analog current loop compensation controller 1452 and a displacement sensor amplifier 1454. Sensor amplifier 1454 may in turn supply displacement sensors 1456. In one embodiment the displacement sensor is an eddy current sensor, in another embodiment it is a capacitance sensor. In addition, a +50 volt DC power supply 1444 and a −50 volt DC power supply 1446 may be powered with AC for driving a power amplifier 1458 which is used to drive the motor (actuator) 1462 for the rotary fast tool servo. A 12 volt DC power supply may be powered using AC and used for driving a cooling fan 1460. Circuit 1440 may also include general purpose computer 1400 operating as a controller.

In a preferred embodiment operating at 2 kHz, the actuator for the fast tool servo is a commercially available moving magnet galvanometer such as a Cambridge technology, Inc. model 6880. This actuator acts as a "motor" in the rotary fast tool servo. A current control loop having a 30 kHz crossover frequency and implemented using analog components was used to compensate for the motor electrical dynamics. The current control loop was further integrated with an appropriate power op-amp and linear power supplies. An outer position loop uses a PC-based digital controller (dSPACE GmbH 1103-board) with a sampling rate on the order of 80 kHz for controlling the tool position. The position loop has a crossover frequency in the range of 1 kHz. A pair of eddy current sensors provides position feedback through the differential rotation angle measurement of the swing arm just behind and above the tool. An example of eddy current sensors that can be used in the preferred embodiment is Kaman Aerospace Corporation's model DIT-5200-15N-001. The sensors have a measured noise level approximately equivalent to a tool motion of 10 nm PP. The 16-bit analog-to-digital converter has a measured noise level of approximately 6 bits PP, which translates into a tool motion of 5 nm PP. The sensor noise in the digital controller is approximately 15 nm PP. Without forced cooling of the motor a coil current of ±8 amps at 2 kHz can be used. The addition of forced cooling allows doubling of the current so that a design point of 5 μm PP at 2 kHz can be achieved.

Figure 49A:
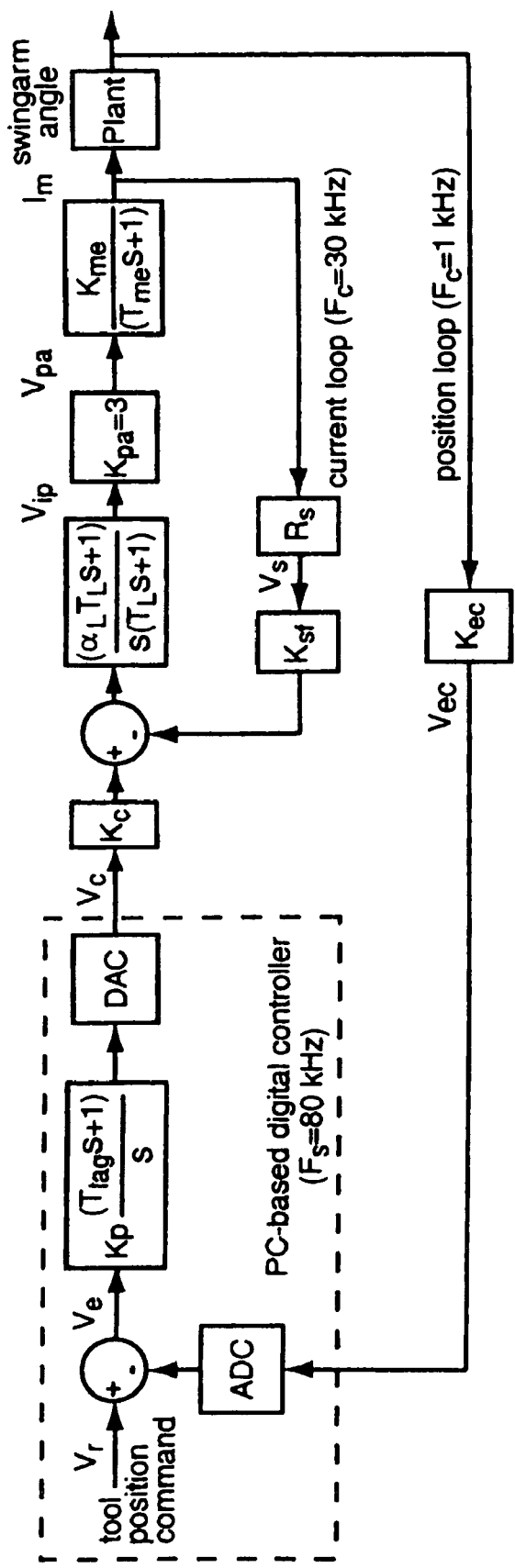
FIG. 49A illustrates a schematic diagram of an exemplary control system that can be used with embodiments of the rotary fast tool servo.
Figure 49B:
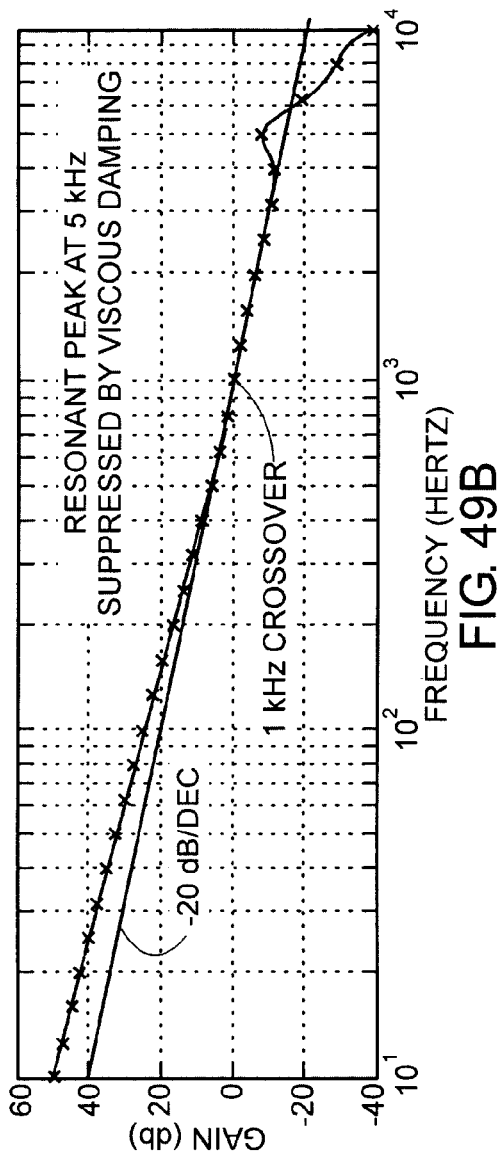
FIGS. 49B-49F illustrate exemplary transfer functions associated with operation of embodiments of the rotary fast tool servo.
Figure 49C:
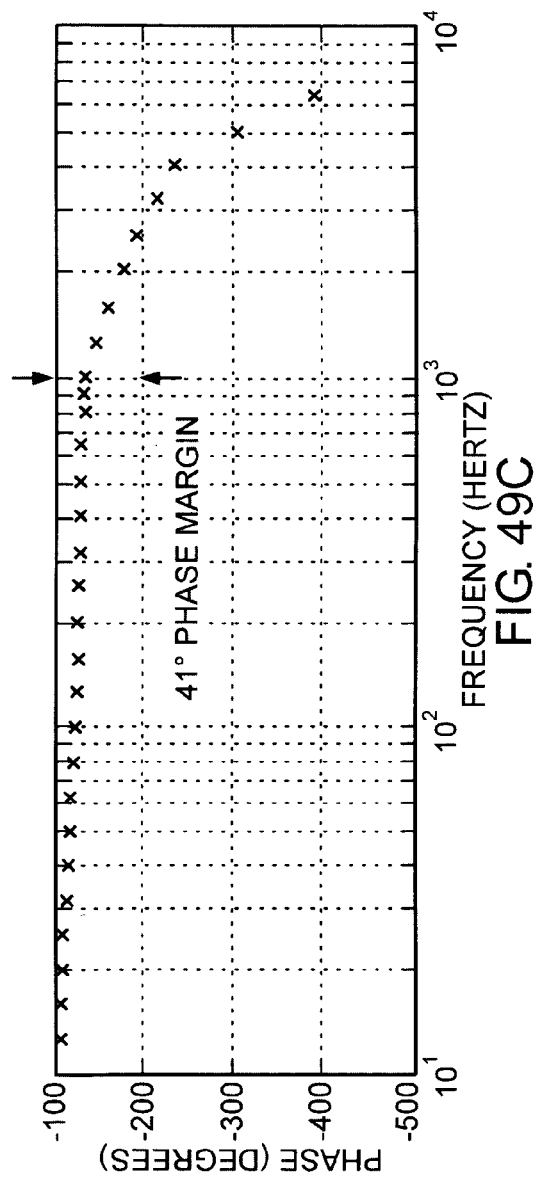
Figure 49D:
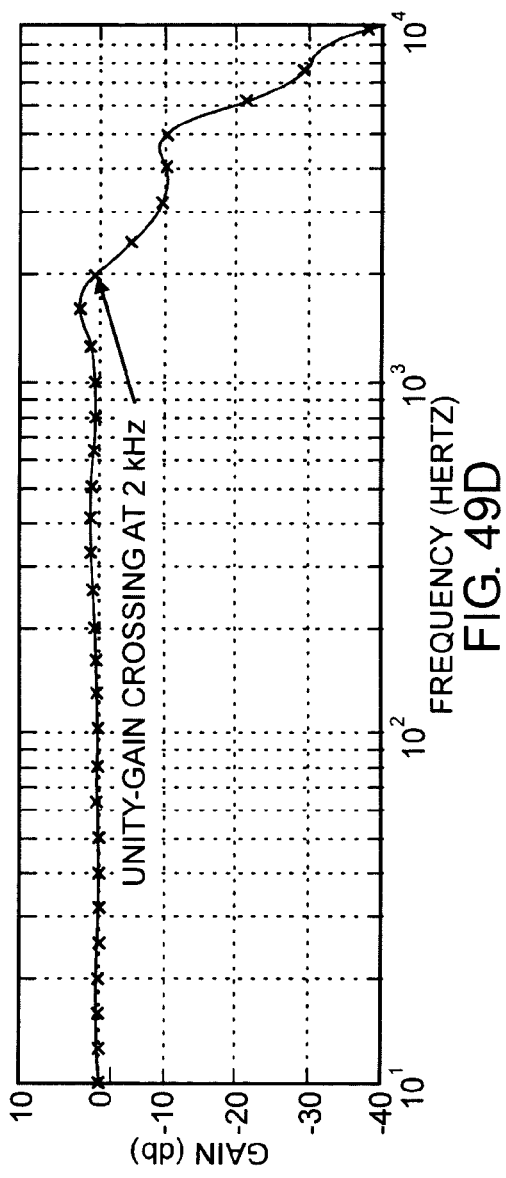
Figure 49E:
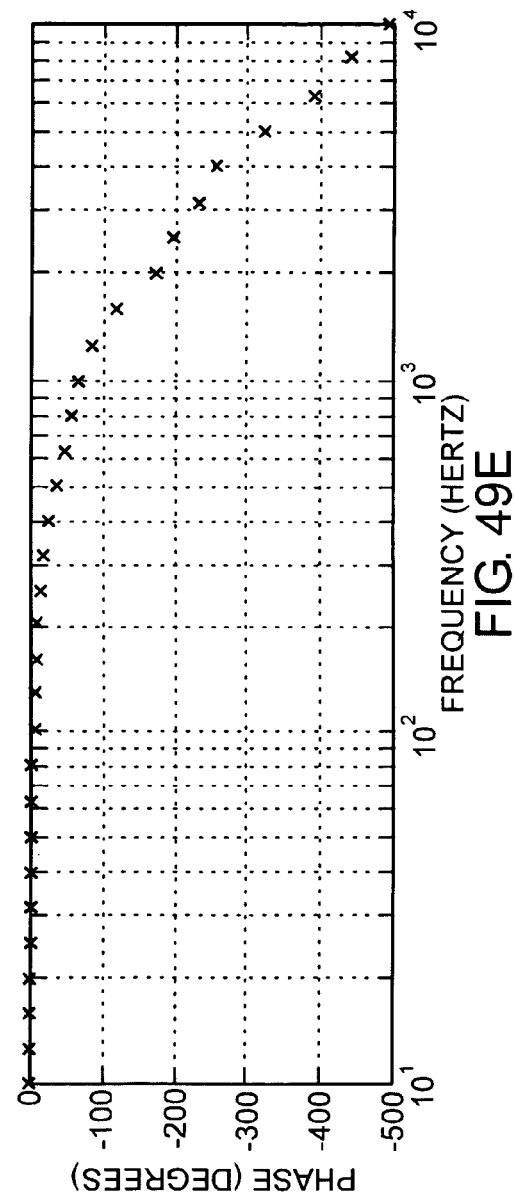

FIG. 49A is a block diagram of a tool position control system for a fast tool servo having viscous damping. In an embodiment operating at 2 kHz, a current control loop having a loop transmission crossover frequency above 20 kHz was used. The constant gain block "$K_{pa}=3$" represents the power amplifier. An example of a power amplifier than can be used is an Apex Microtechnology Corporation PA04 configured for a non-inverting DC gain of 3. The measured gain of the power amplifier is essentially constant up to approximately 1 Mhz, with essentially negligible phase up to 100 kHz and only about −8° of phase at 200 kHz.

A satisfactory mechanical model of the fast tool servo depicted by FIGS. 28 and 29 is two lumped rotary inertias joined by a torsional spring. The two inertias are the motor rotor and the swing arm, and the torsional spring is the rigid coupling between them in series with the motor output shaft. Since the flexure blades used to support the swing arm are much more compliant than the rigid coupling and the motor output shaft, to first order they can be ignored and the coupled mode of the motor rotor and the swing arm can be treated as a free mass. Additionally, the speed-dependent back-EMF of the motor is sufficiently small to be negligent, providing a further simplification of the dynamic model.

A first resonant mode of the two inertias occurs at approximately 5 kHz. If the fast tool servo is operated without using additional viscous damping, a notch filter on the 5 kHz resonance or an additional pole at 5 kHz may be used to phase stabilize the resonance. Achieving a crossover frequency of 1 kHz may require using a lead compensator to achieve a magnitude roll-off of approximately −1 decade per decade (dec/dec) of frequency in the vicinity of crossover. A lag compensator may also be used, with its pole set at zero to achieve a high desensitivity (controller authority) at low frequencies for rejecting disturbances.

The embodiments above have low phase margins of approximately 13° and 23°, respectively. To overcome this, viscous damping can be used with the fast tool servo mechanism. The viscous damper may be a substantially circular plate attached to the bottom of the swing arm and captured in a tight-fitting reservoir of heavy grease as shown in FIG. 21. With a damper, the 5 kHz resonance peak magnitude can be reduced by substantially 20 dB. FIGS. 49B-E show the measured transfer functions for the tool position loop after viscous damping was added to the fast tool servo. The loop transmission crossover frequency is approximately 1 kHz with a phase margin of approximately 41°. In the closed-loop response the phase angle changes fairly smoothly up to the unity-gain crossing frequency of 2 kHz, which will make feedforward compensation viable for improving the performance of the fast tool servo.

Referring back to FIG. 49A, the current control loop is the portion of the block diagram connecting the command voltage ($V_c$) to the motor current ($I_m$). As previously noted, the constant gain block $K_{pa}=3$ represents the power amplifier. The motor electrical dynamics are in the block after the power amplifier. In this embodiment, the coil inductance and resistance combine with the current sense resistor ($R_s$) to create a time constant $T_{me}=2.55(10)^{-4}$ (sec) and a DC gain of $K_{me}=0.91$ (amps/volt). The compensation dynamics for this loop are in the block preceding the power amplifier and consist of a lead transfer function cascaded with a pure integrator. The constant gain term of the compensator was put on the input side of the summing junction in the form of the gains $K_c$ and $K_{sf}$ to make the assignment of resistor values for the compensation op-amp circuit more readily achievable.

Figure 49F:
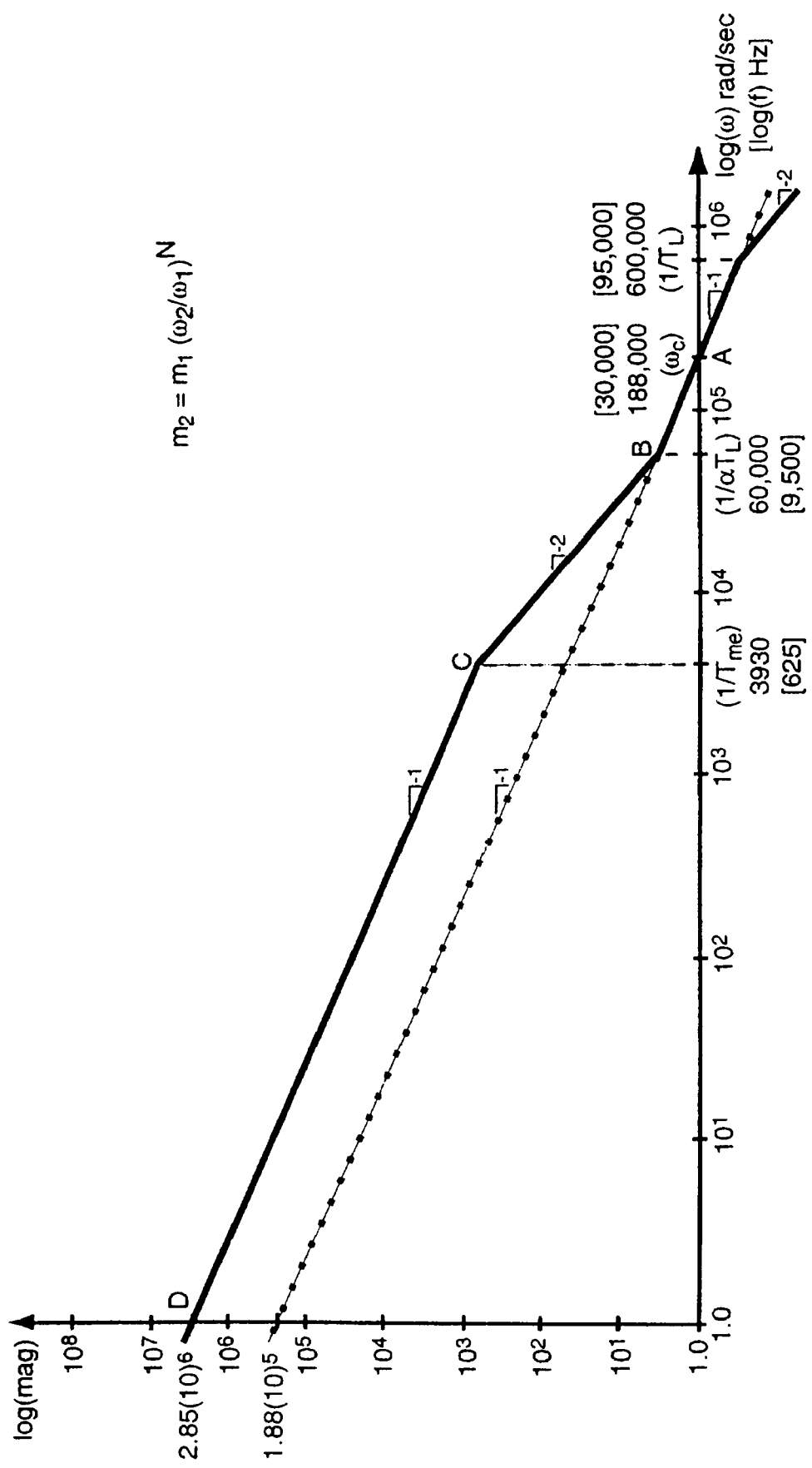

FIG. 49F illustrates a Bode magnitude plot of the negative loop transmission of the current control loop. FIG. 49F is helpful for illustrating the loop shaping techniques useful for designing current compensation.

The solid upper curve in FIG. 49F is a straight-line approximation of the Bode magnitude plot for the current control loop transmission used in our fast tool servo. Starting at a low frequency end, the pure integrator provides the current loop with a high gain for rejecting low frequency disturbances. As the plot moves to the right towards higher frequencies along the magnitude curve, the pole from the motor electrical dynamics ($1/T_{me}$) is encountered, which causes the slope to decrease from −1 (dec/dec) to −2 (dec/dec). Before reaching the desired cross over frequency ($\omega_c$) the lead zero ($1\alpha/T_L$) is encountered, which brings the slope back up to −1 (dec/dec) so that crossover can be passed through with a positive phase margin. After crossover the lead pole ($1/T_L$) is encountered, which rolls off the gain at −2 (dec/dec) to avoid high frequency noise. In the compensation circuit illustrated the calculated phase angle stays above −135° for frequencies below and around crossover. The measured closed-loop performance of the current loop has a −3 dB point at 30 kHz and negligible phase up to 4 kHz. If there was a larger spread between the motor electrical pole and the lead zero, then conditional stability of the loop in the event of any saturation of the power elements may need to be addressed.

Design of the current loop compensation is accomplished by first assigning values to the lead transfer function, and then moving backwards along the magnitude plot from the crossover point to determine the product of the constant gain terms in the loop transmission. Choosing α=10 for the lead transfer function provides a reasonable tradeoff between a maximum phase advance of 55° and limiting the increase in gain on the higher frequency signals in the compensation network to a factor of 10. The time constant ($T_L$) is picked by setting the geometric mean of the lead zero and pole equal to the crossover frequency so that the maximum phase advance occurs at crossover. To determine the product of the constant gain terms in the loop transmission, we start at crossover and use the similar triangles relationship shown in the upper-right corner of FIG. 49F to move backwards along the magnitude plot until reaching the frequency 1 (rad/sec). Since the transfer functions for the current loop in FIG. 49A are expressed in Bode forma, then the product of the constant gain terms in the loop transmission is equal to the magnitude at point "D".

Figure 49H:
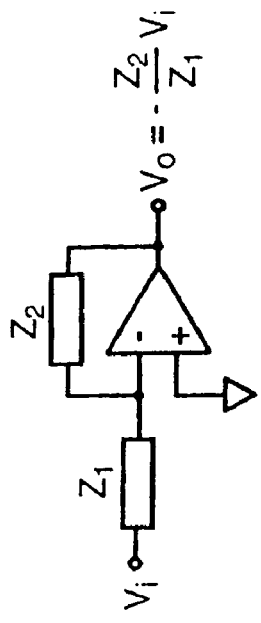
FIGS. 49G-49I schematically illustrate exemplary control representations that can be used with embodiments of the rotary fast tool servo.
Figure 49I:
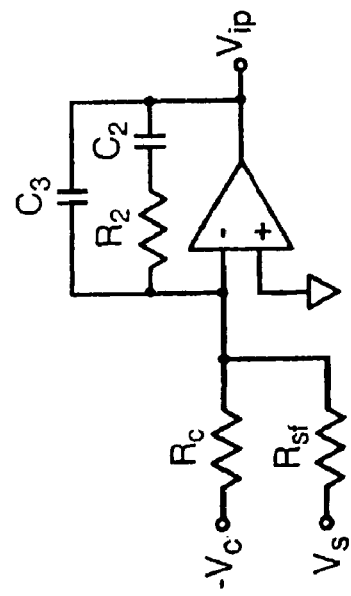
Figure 49G:
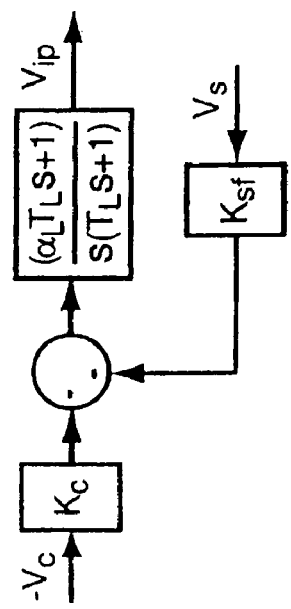

FIG. 49G shows the mapping from the current compensation block diagram to an operational amplifier circuit. At low frequencies the compensation should operate as an integrator. At mid frequencies, just before and around crossover, the zero should compensate for the integrator and make the gain constant. At high frequencies (above crossover) the pole should roll off the gain. The middle circuit with the generic complex impedances in FIG. 49H shows the ideal op-amp relationship between the input and output. Referring to the actual op-amp circuit in FIG. 49I and first ignoring the capacitor $C_3$. At low frequencies the capacitor $C_2$ lets very little current through the feedback path, so its impedance dominates over that of the resistor $R_2$ and an integrator is formed. At mid frequencies the impedance of the capacitor $C_2$ becomes negligible compared to that of $R_2$, so that the gain approaches a constant value of $(-R_2/R_c)$ or $(-R_2/R_{sf})$, depending on which input is being considered. The capacitor $C_3$, is then added, whose value is chosen so that its impedance is high at low and mid frequencies, and low at high frequencies. At low and mid frequencies $C_3$ looks like an open circuit and acts as if it were not there, and at high frequencies $C_3$ looks like a short and the gain approaches zero. The inverting terminal of an operational amplifier configured as shown in FIG. 49H acts as a summing point for the individual input signals acting through their respective impedance ($Z_1$), so superposition applies. To obtain the passive component values, the ratio of complex impedances ($Z_2/Z_1$) is formed for each input in terms of the component variables, and then terms are matched with the coefficients for the corresponding transfer function in the block diagram. The values of the gains $K_{sf}$ and $K_c$ are set so that a 10 Amp swing in the motor current ($I_m$) causes the same voltage swing at the inverting terminal as does a ±010 volt swing in the command voltage ($V_c$).

The lower, dotted line with a constant slope of −1 (dec/dec) in FIG. 49F represents an alternate current compensation network. In this case, the compensation zero cancels the stable pole from the motor electrical dynamics and a free integrator is used to provide high gain at low frequencies. The circuit topology for this compensation is the same as the one shown in FIG. 49H after omitting the capacitor $C_3$. Finding the product of the constant gain terms in the loop transmission and assigning values to the analog component are accomplished by the same methods described above. The alternate compensation provides a constant phase angle of −90° at all frequencies, and therefore a conservative phase margin of 90°. Note that the gain at frequencies below the motor pole is approximately a factor of ten less than that of the more aggressive compensation that we used (described earlier). Therefore, the more aggressive compensation is better at rejecting disturbances in the current control loop. The difference in gain between the two compensators is in the op-amp circuit, and a factor of ten increase may require more scrutiny of the signal levels in the current loop. Also, the alternate compensation needs an additional high frequency pole above the crossover frequency to roll off its gain to avoid high frequency noise. This is done by including the capacity $C_3$ shown in FIG. 49I.

With regard to high frequency noise and the need to roll off the gain of the compensator after crossover, considering the internal signal $V_{ip}$ of the current loop in FIG. 49A provides the necessary insight. Note that the op-amp feedback compensation does not include the pole from the motor electrical dynamics. Without the high frequency pole in the compensation, once the frequency of the compensator's zero is reached, the gain of the op-amp circuit would stay at a constant (high) value for all frequencies above it, making the circuit sensitive to any high frequency noise. This may be unnecessary, and can be easily mitigated by placing a high frequency pole in the compensation by adding capacitor $C_3$ shown in FIG. 49I.

Figure 49J:
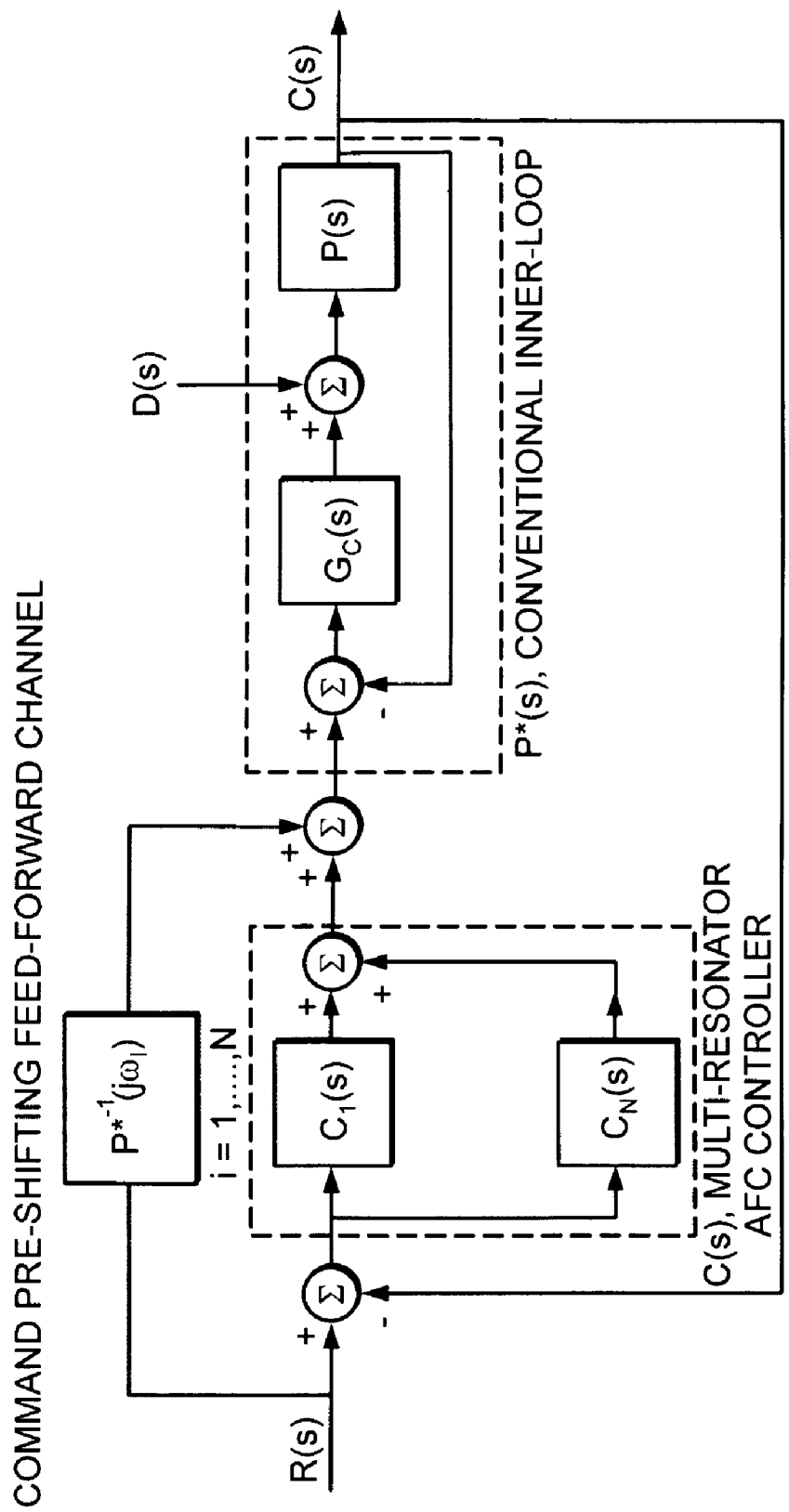
FIGS. 49J and 49K illustrate schematic representations of command pre-shifting and adaptive feed forward cancellation that can be used with embodiments of the rotary fast tool servo.
Figure 49K:
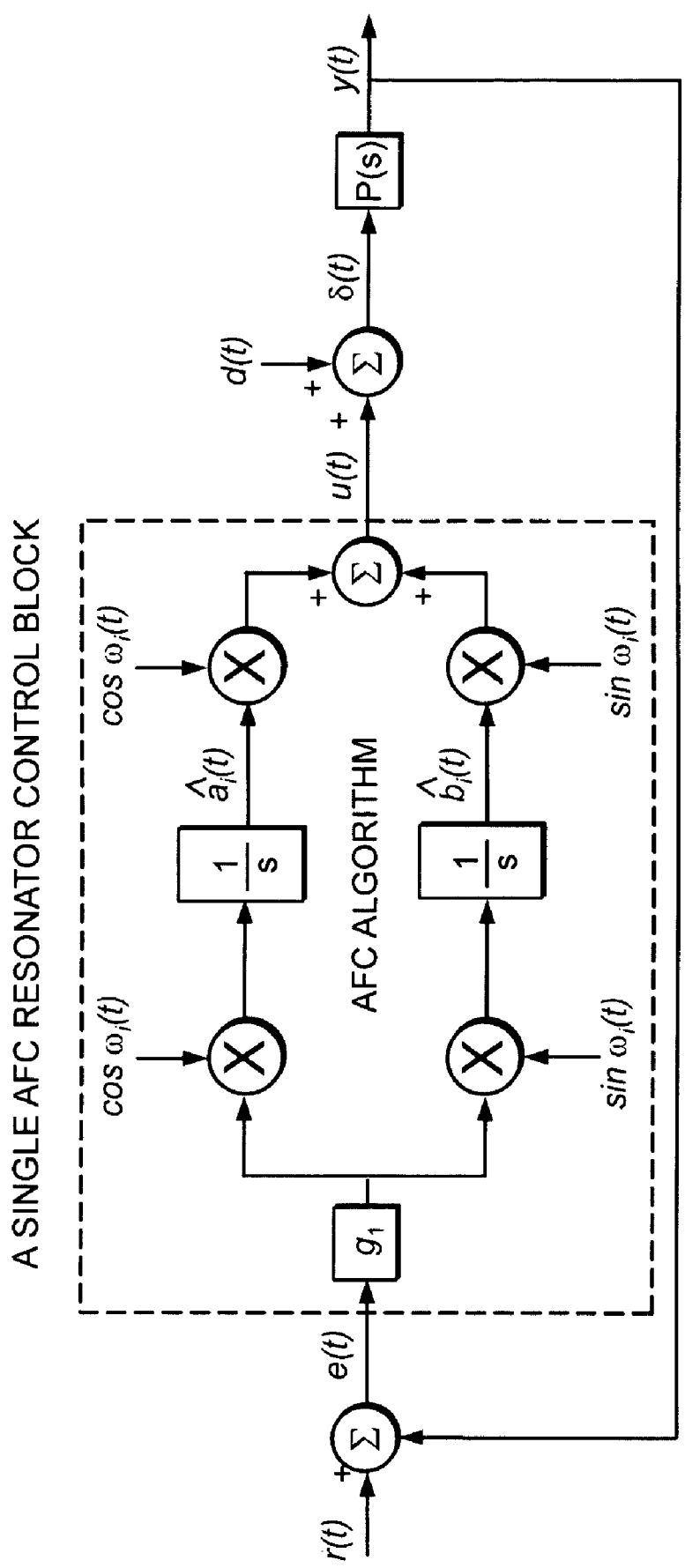

FIGS. 49J and 49K illustrate the implementation of command pre-shifting and adaptive feedforward cancellation to the control system of FIG. 49A to further improve performance of the rotary fast tool servo.

Figure 49L:
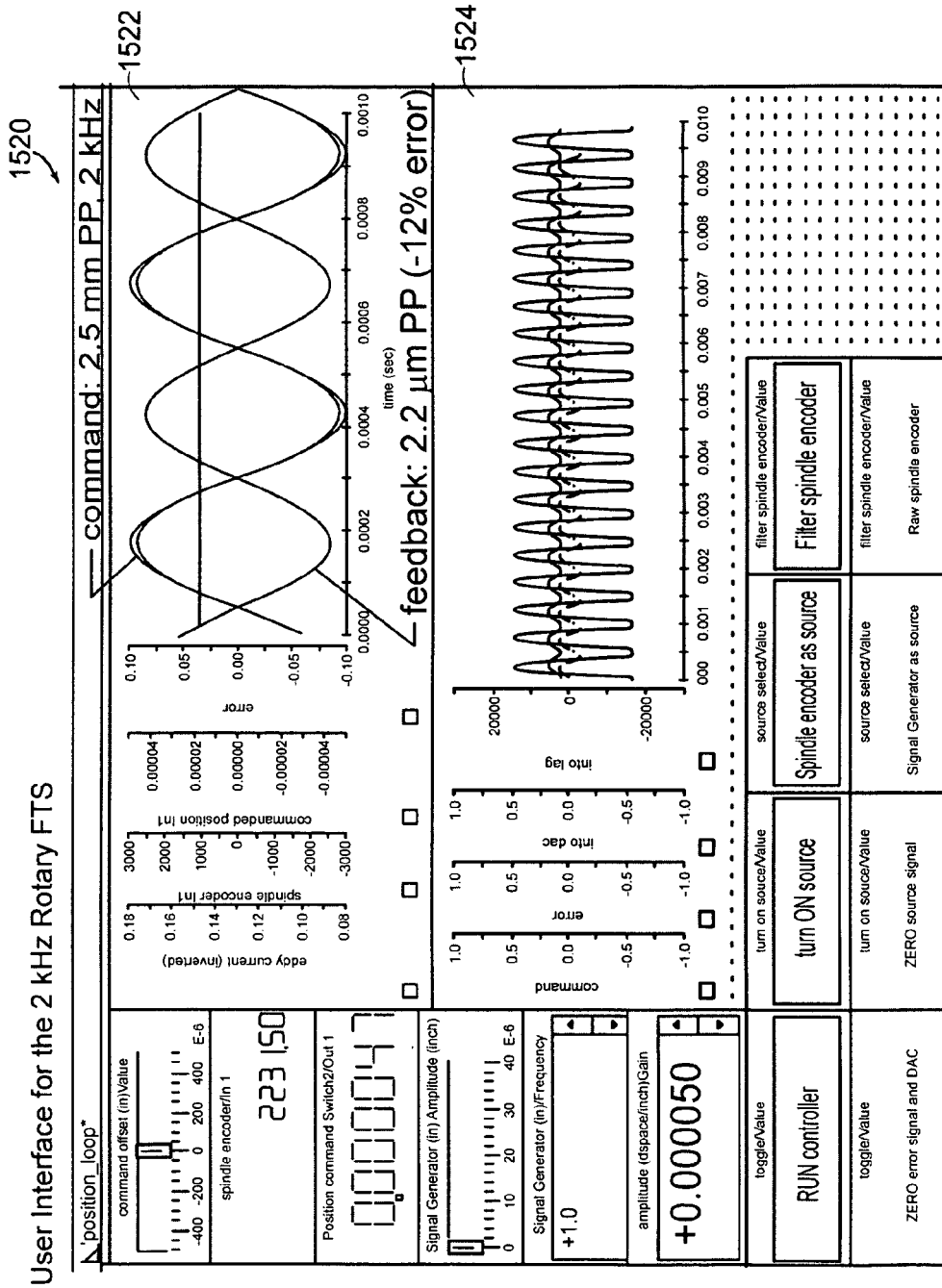
FIGS. 49L-49M illustrate exemplary user interfaces that can be used for operating the rotary fast tool servo.

FIG. 49L includes an illustrative data display 1520 containing a first display window 1522 showing error signals as a function of time for a rotary fast tool servo. A second data display 1524 may contain data representative of the tool response. Display 1520 may also include selection buttons 1526 that are operated using a pointing device. Selection buttons 1526 may pull up pop-up windows allowing additional data entry, or the buttons 1526 may be self executing in that they perform a desired function upon selection thereof.

Figure 49M:
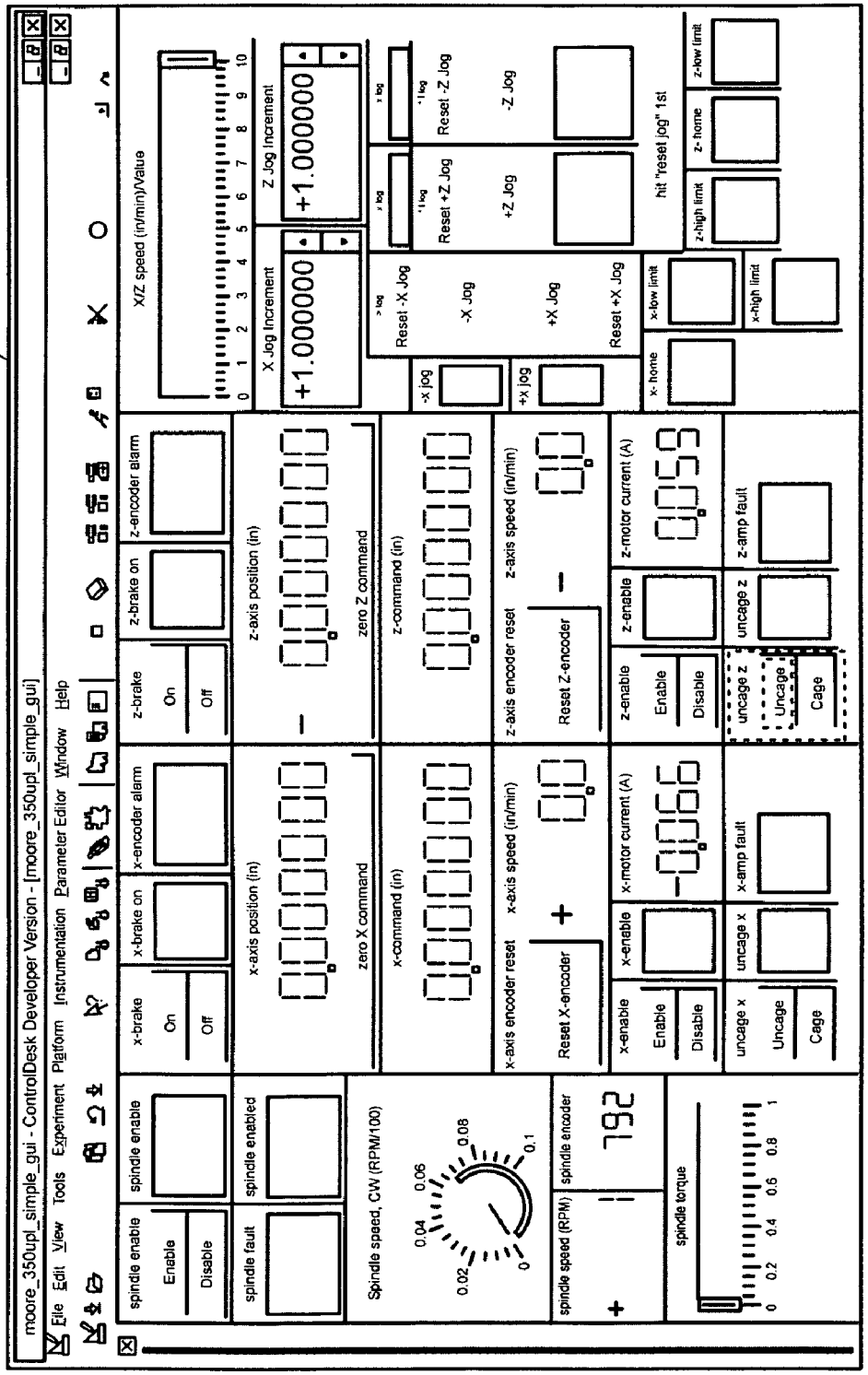

FIG. 49M contains an exemplary graphical user interface 1530 organized as a machine tool controller, such as for example controlling the spindle and two slides of the two-axis lathe shown in FIGS. 46A and 46B. Interface 1530 can include a plurality of alphanumeric display windows as well as numerous selection buttons for activation by a user.

Figure 50:
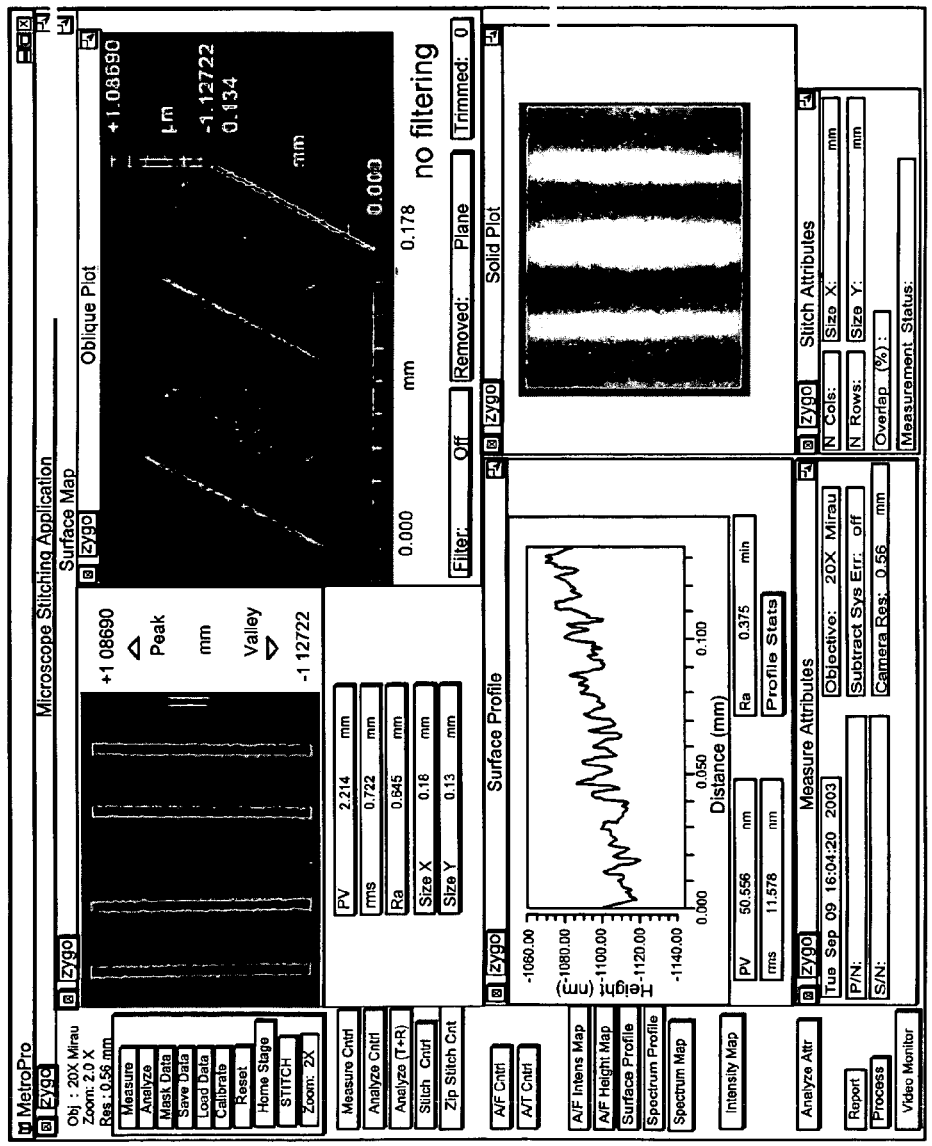
FIG. 50 illustrates a measurement of the surface of a workpiece machined with an embodiment of the rotary fast tool servo.

FIG. 50 illustrates the data from a measurement of the surface of a workpiece machined with an embodiment of the FTS operating at 2 kHz. An optically smooth surface with a roughness of 12 nm RMS was produced on a sinusoidally varying surface having a peak-to-peak excursion of 2.2 micron and a spatial wavelength in the range of 30 to 110 micron.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the diagrams. While various elements of the preferred embodiments have been described as being implemented in software, other embodiments in hardware or firmware implementations may alternatively be used, and vice-versa.

It will be apparent to those of ordinary skill in the art that methods involved in the rotary fast tool servo system may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

An operating environment for the rotary fast tool servo system can include a processing system with at least one high speed processing unit and a memory system. In accordance with the practices of persons skilled in the art of computer programming, the present invention is described with reference to acts and symbolic representations of operations or instructions that are performed by the processing system, unless indicated otherwise. Such acts and operations or instructions are sometimes referred to as being "computer-executed," or "processing unit executed."

It will be appreciated that the acts and symbolically represented operations or instructions include the manipulation of electrical signals by the processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or nonvolatile mass storage system readable by the processing unit. The computer readable medium includes cooperating or interconnected computer readable media, which exist exclusively on the processing system or is distributed among multiple interconnected processing systems that may be local or remote to the processing system.

It is to be understood that the above-described embodiments are simply illustrative of the principles of the invention. Various and other modifications and changes may be made by those skilled in the art which will embody the principles of the invention and fall within the spirit and scope thereof. The claims should not be read as limited to the described order or elements unless stated to that effect. Therefore, all embodiments that come within the scope and spirit of the following claims and equivalents thereto are claimed as the invention.

What is claimed:

1. A high speed servo tool device for fabricating a three-dimensional surface, said device comprising:
    a housing;
    a rotatable arm positioned within said housing, said rotatable arm having an upper end and an oppositely mounted lower end;
    an upper hub having an upper surface and a lower surface, said lower surface coupled to said upper end of said rotatable arm;
    a lower hub coupled to said lower end of said rotatable arm;
    an upper set of flexures retained by said upper hub and extending radially outward, said flexures retained at said radially extending ends by said housing, said upper set of flexures further positioned such that rotation of said rotatable arm flexes said upper set of flexures;
    a cutting tool; and
    a tool arm coupled to said upper surface of said upper hub for retaining said cutting tool, said tool arm further located outside said housing such that said tool arm rotates with said rotatable arm.

2. The device of claim 1 further comprising:
    a lower set of flexures retained by said lower hub and extending radially outward, said flexures retained at said radially extending ends by said housing, said lower set of flexures further positioned such that rotation of said rotatable arm flexes said lower set of flexures.

3. The device of claim 2 wherein said tool operates at speeds in the range of 100 Hz to 20 kHz.

4. The device of claim 3 further comprising: a controller for controlling operation of said device while operating on a workpiece.

5. The device of claim 4 wherein said housing further includes a first stator and a second stator proximate to and substantially surrounding at least a portion of said rotatable arm.

6. The device of claim 5 wherein said first and second stator and said rotor consist at least partially of a laminate stack consisting of a plurality of magnetic layers and a plurality of electrically non-conducting layers.

7. The device of claim 6 wherein said first and second stators include at least one coil, respectively.

8. The device of claim 7 wherein said rotatable arm is displaced using a magnetic flux generated by said at least one coil associated with said first and second stator, respectively.

9. The device of claim 8 further comprising:
    a sensor for monitoring a position of said tool when operating on said workpiece, said sensor communicatively coupled to said tool arm.

10. The device of claim 1 wherein said upper set of flexures provides a radial constraint to motion of said rotatable arm.

11. The device of claim 10 wherein said upper set of flexures further provides an axial constraint with respect to motion of said rotatable arm.

12. The device of claim 1 wherein said cutting tool is replaced with a mirror.

13. The device of claim 8 wherein said first stator and said second stator are magnetically coupled to a stator frame having a magnetic flux source.

14. The device of claim 13 wherein said magnetic flux source provides a constant magnetic flux and said first stator coil and said second stator coil provide a varying magnetic flux.

15. The device of claim 14 wherein said rotatable arm moves with respect to said first stator and said second stator at least in part by way of a superposition of said constant magnetic flux and said varying magnetic flux.

16. The device of claim 15 wherein said stator frame magnetic flux source is comprised of a coil.

17. The device of claim 15 wherein said stator frame magnetic flux source is comprised of a permanent magnet.

18. A high speed servo tool comprising:
    a housing;
    a rotor partially disposed within said housing and having an axis of rotation;
    a first set of flexures coupled to said rotor at an inner end of respective ones of said first set, said first set of flexures further having respective outer ends extending outwardly from said rotor, said first set of flexures for moveably retaining said rotor about said axis of rotation, said first set of flexures further acting as a radial constraint and providing axial stiffness to said rotor while operating about said axis;
    a first stator partially surrounding said rotor and having a first stator winding set; and
    a second stator partially surrounding said rotor and having a second stator winding set.

19. The servo tool of claim 18 wherein said rotor includes a laminate stack having an outer surface.

20. The servo tool of claim 19 wherein said first and second stator include laminate stacks, respectively.

21. The servo tool of claim 20 wherein said outer surface acts as a mirror.

22. The servo tool of claim 20 wherein said rotor includes a tool arm for supporting a tool.

23. The servo tool of claim 22 wherein said tool is a cutting tool.

24. The servo tool of claim 23 wherein said tool is a mirror.

25. The servo tool of claim 24 wherein said mirror operates in conjunction with an electromagnetic signal.

26. The servo tool of claim 20 wherein said rotor operates at a speed above 100 Hz.

27. The servo tool of claim 26 further comprising:
    a second set of flexures coupled to said rotor at an inner end of respective ones of said second set, said second set of flexures further having respective outer ends extending outwardly from said rotor, said second set of flexures for moveably retaining said rotor about said axis of rotation, said second set of flexures further acting as a radial constraint and further providing axial stiffness to said rotor while operating about said axis.

28. The servo tool of claim 27 wherein said rotor is operated about said axis using magnetic flux generated by said first and second stators operating in conjunction with said first stator winding set and said second stator winding set, respectively.

29. The servo tool of claim 28, further comprising:
a controller for providing machine-readable instructions for causing a tool to engage said workpiece in a manner producing a desired three-dimensional shape after removal of material from said workpiece by said tool.

30. The servo tool of claim 19 further comprising:
a stiffening structure integral with said rotor for supporting said laminate stack.

31. The servo tool of claim 30 wherein said rotor further includes a mirrored surface for reflecting electromagnetic radiation incident upon said surface.

32. The servo tool of claim 28, further comprising:
a controller for providing machine-readable instructions for causing a mirror to rotate around an axis in a manner producing a desired steering of a light beam reflected from said mirror.

33. The servo tool of claim 18 further comprising a magnetic flux circuit including a rear core member, a first core leg and a second core leg.

34. The servo tool of claim 18 further comprising a plurality of stiff ceramic supports.

35. The servo tool of claim 20 wherein the laminate stacks comprise thin laminations to suppress eddy currents.

36. The servo tool of claim 18 further comprising a capacitance sensor with an o-ring seal.

37. The servo tool of claim 18 further comprising a bias actuator that applies a bias to a magnetic circuit of the tool.

* * * * *

UNITED STATES PATENT AND TRADEMARK OFFICE
CERTIFICATE OF CORRECTION

PATENT NO. : 7,574,947 B2  
APPLICATION NO. : 10/940427  
DATED : August 18, 2009  
INVENTOR(S) : Montesanti et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1288 days.

Signed and Sealed this

Seventh Day of September, 2010

David J. Kappos  
*Director of the United States Patent and Trademark Office*